United States Patent [19]
Honore et al.

[11] 3,983,559
[45] Sept. 28, 1976

[54] NOVEL STRUCTURE FOR RADIO POSITION FIXING USING HYPERBOLIC PHASE MEASUREMENT

[75] Inventors: Etienne A. H. Honore, Chatenay-Malabary; Emile L. G. Torcheux, Paris, both of France

[73] Assignee: Societe d'Etude et d'Application des Techniques Nouvelles NEO-TEC, Paris, France

[22] Filed: Dec. 18, 1972

[21] Appl. No.: 316,428

[30] Foreign Application Priority Data
Dec. 17, 1971  France .......................... 71.45492
July 27, 1972  France .......................... 72.27058
July 27, 1972  France .......................... 72.27059

[52] U.S. Cl. ............................................ 343/105 R
[51] Int. Cl.² ............................................ G01S 1/30
[58] Field of Search ................................ 343/105 R

[56] References Cited
UNITED STATES PATENTS
3,774,215  11/1973  Reed .............................. 343/105 R Primary Examiner—Maynard R. Wilbur
Assistant Examiner—Richard E. Berger
Attorney, Agent, or Firm—Roger S. Borovoy; Alan H. MacPherson

[57] ABSTRACT

A radio position-fixing system using hyperbolic phase measurement, including two transmitting stations which radiate a specific, programmed, sequential and recurrent waveform and a movable receiver capable of synchronously receiving and detecting the transmitted waveforms and, by combining the signals in a predetermined manner, measuring certain phase differences in the signals which are representative of the hyperbolic position-line information for the receiver relative to the two transmitters.

30 Claims, 85 Drawing Figures

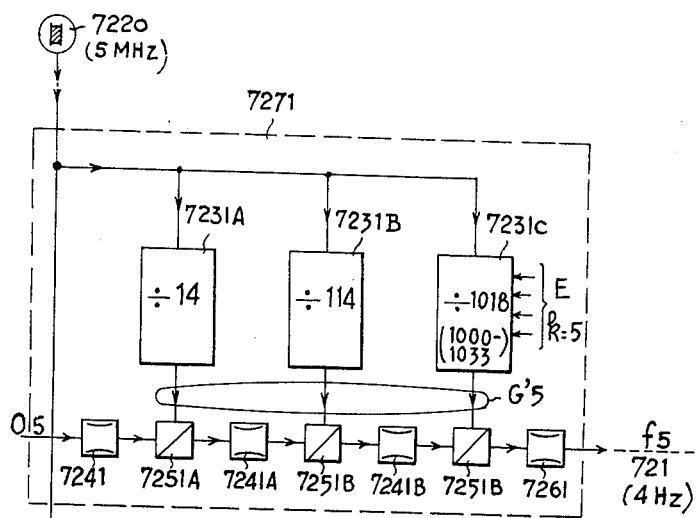
Fig. 9
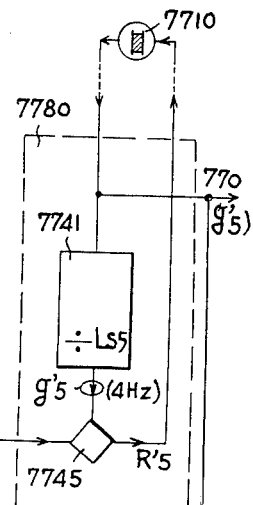
Fig. 10
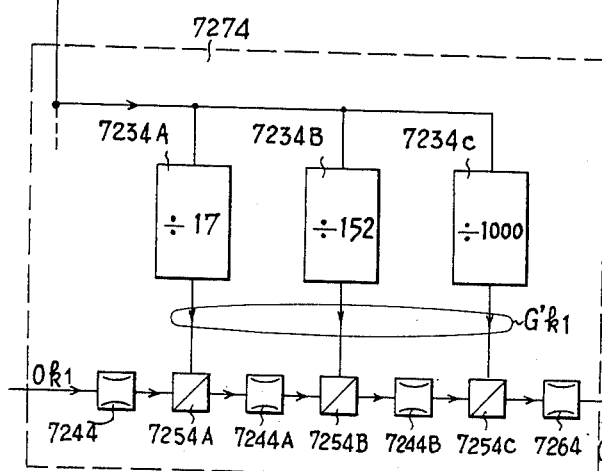
Fig. 11
Fig. 12

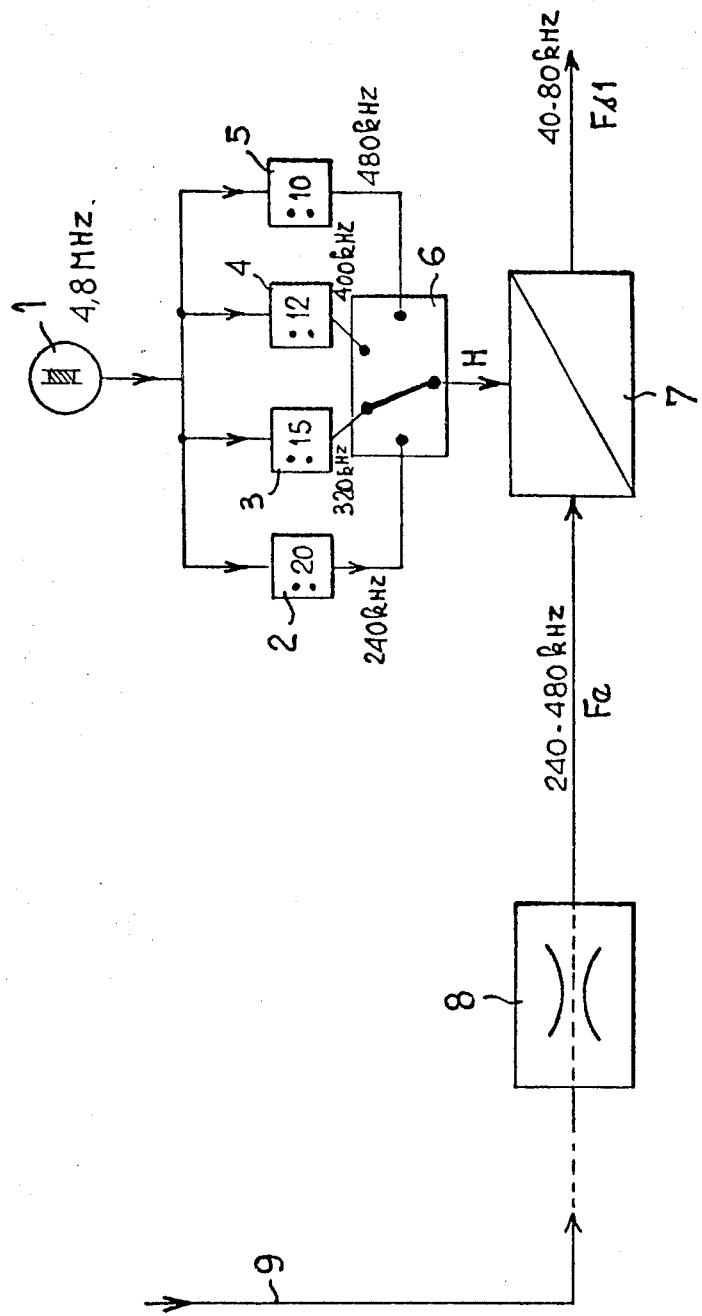
FIG.A1

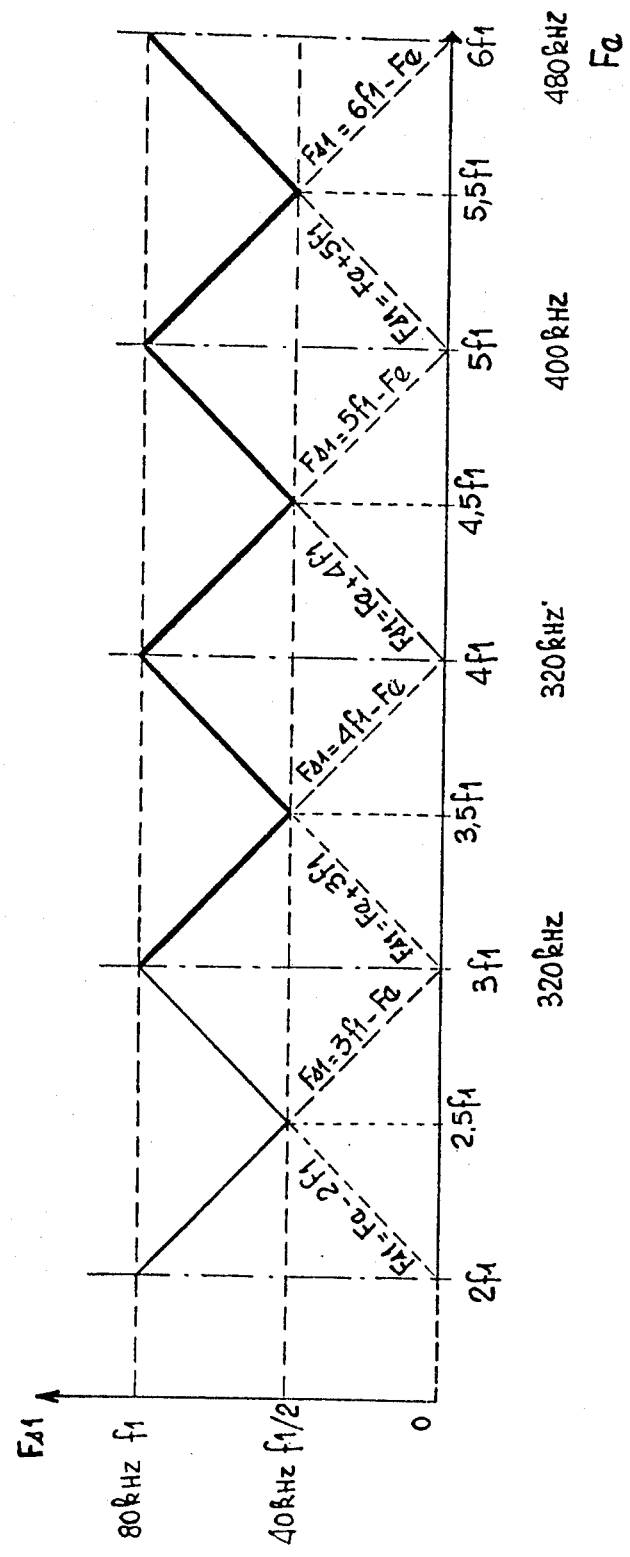
FIG.A2

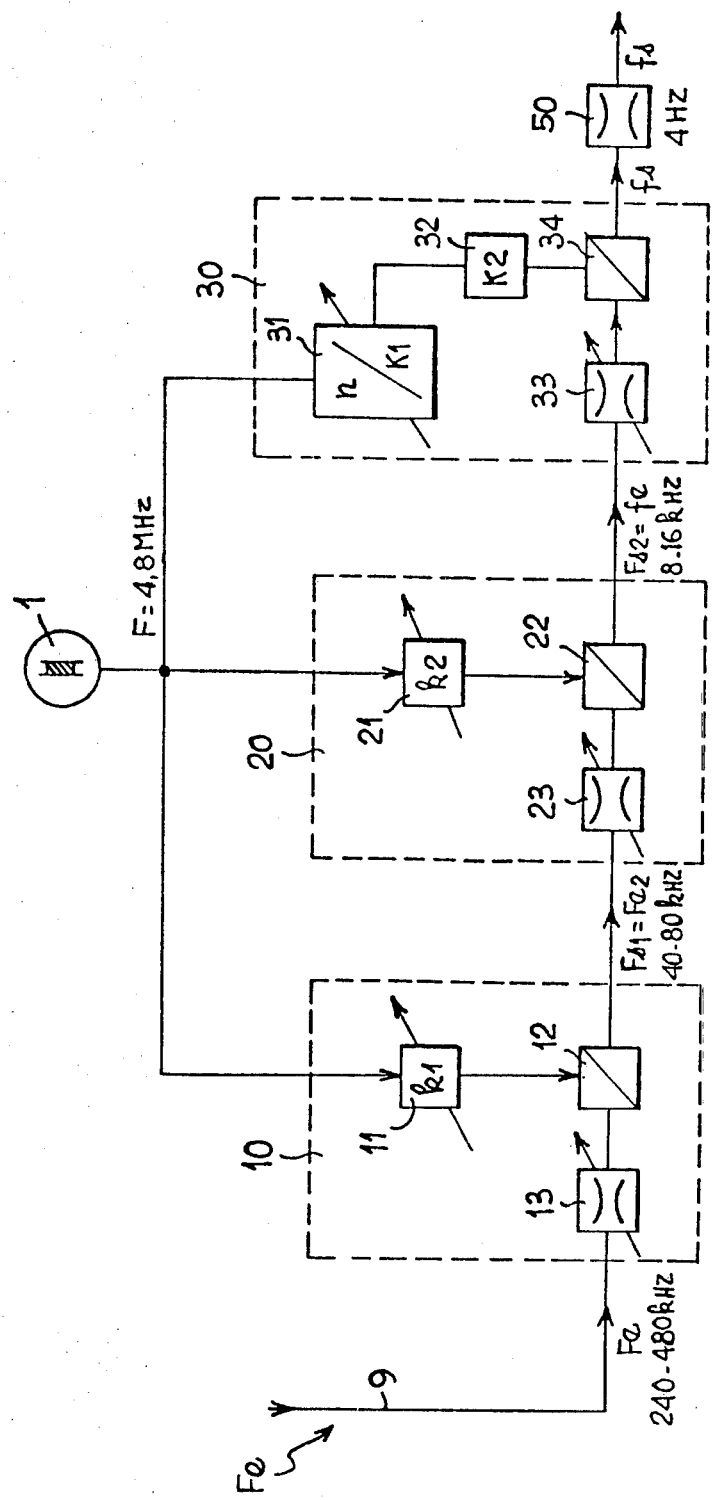

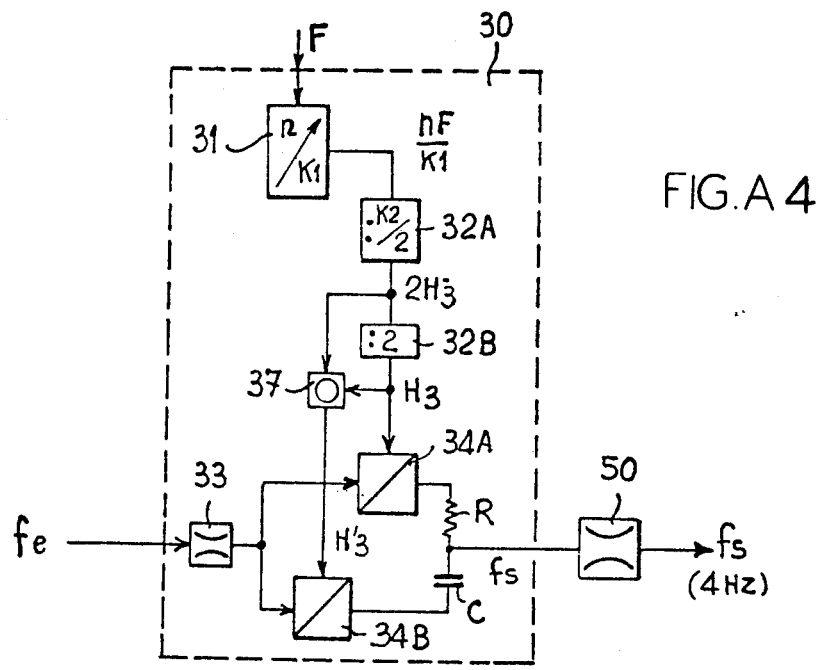
FIG.A 4
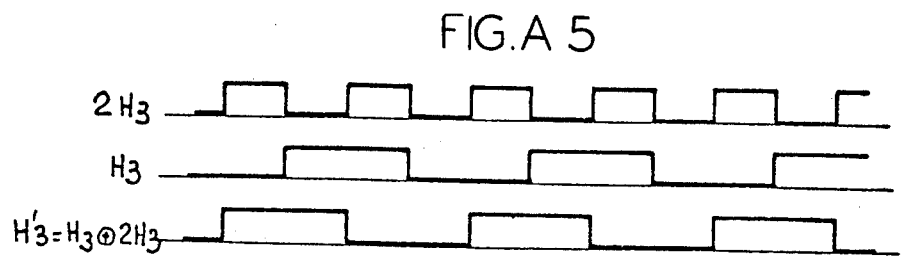
FIG.A 5
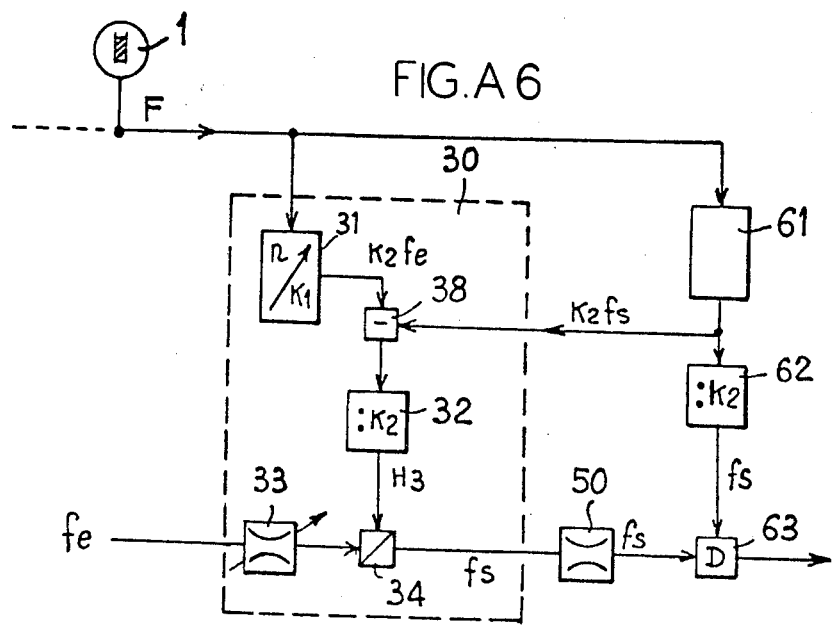
FIG.A 6

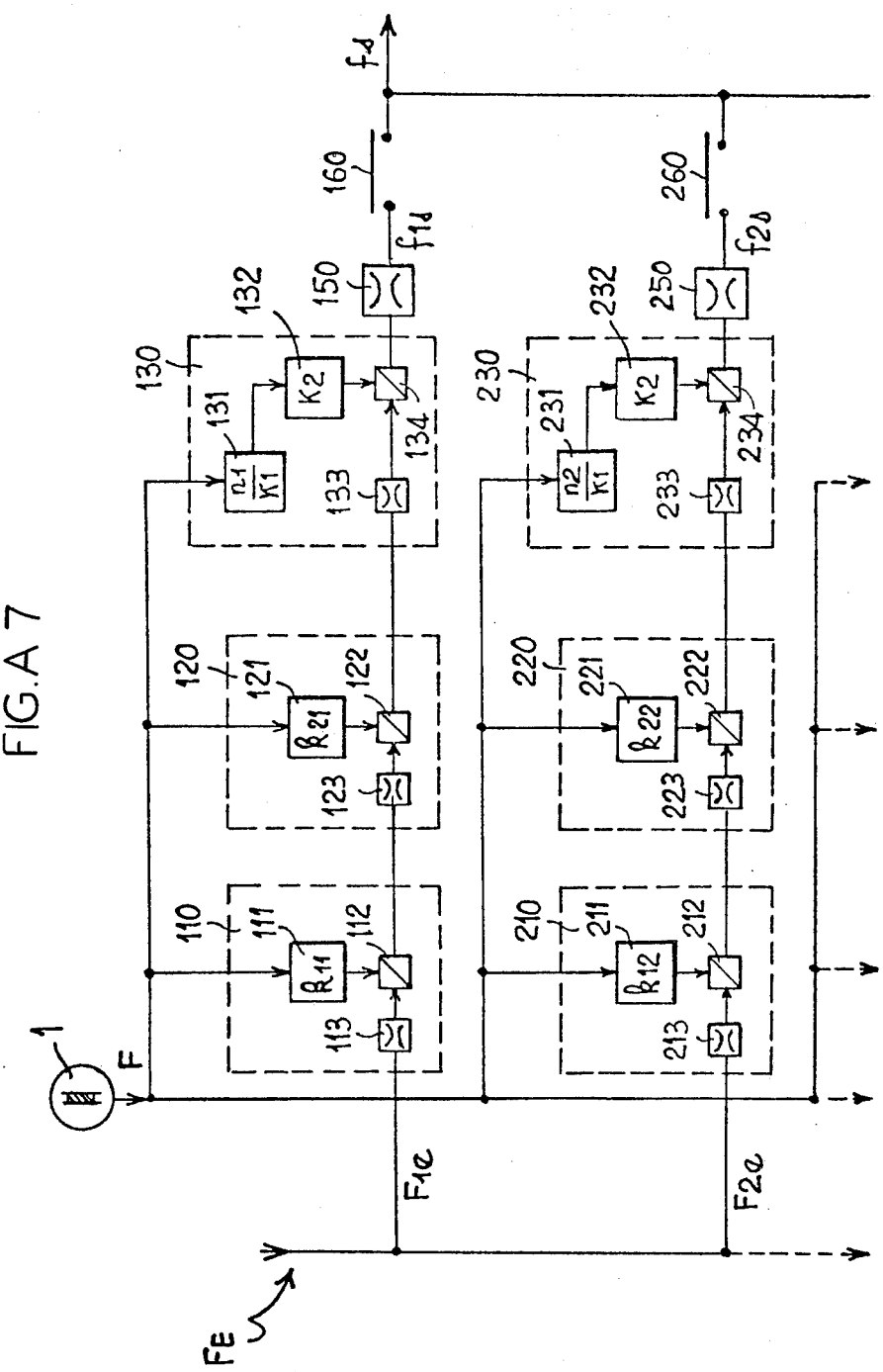
FIG.A 7

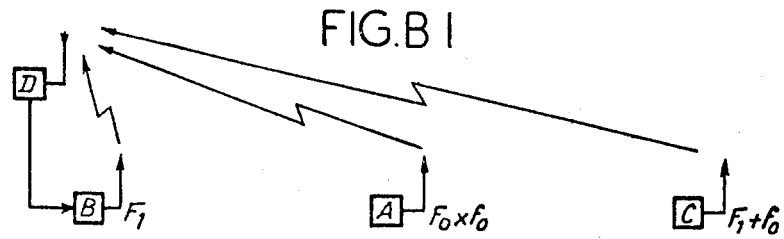
FIG.B 1
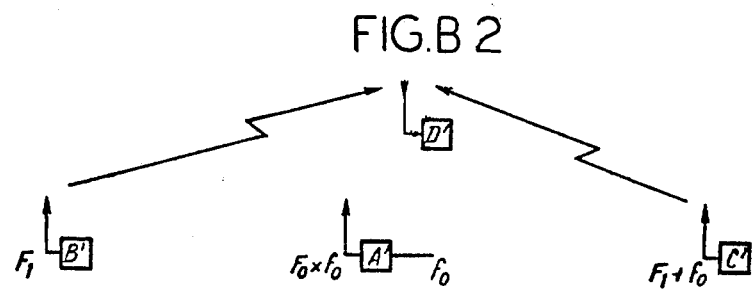
FIG.B 2
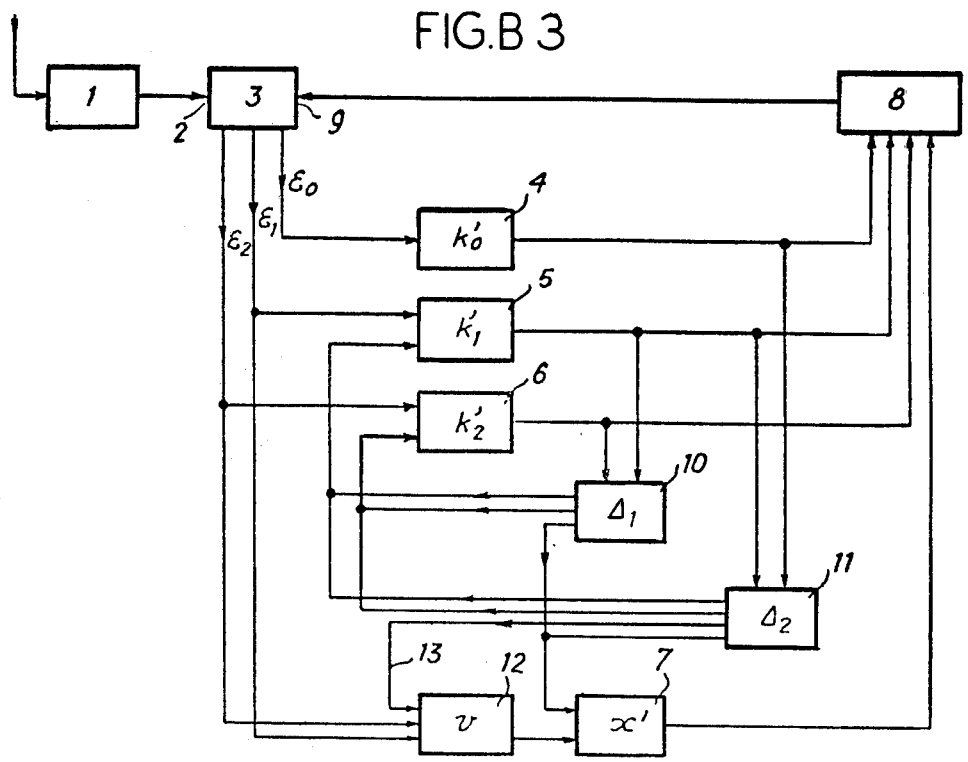
FIG.B 3

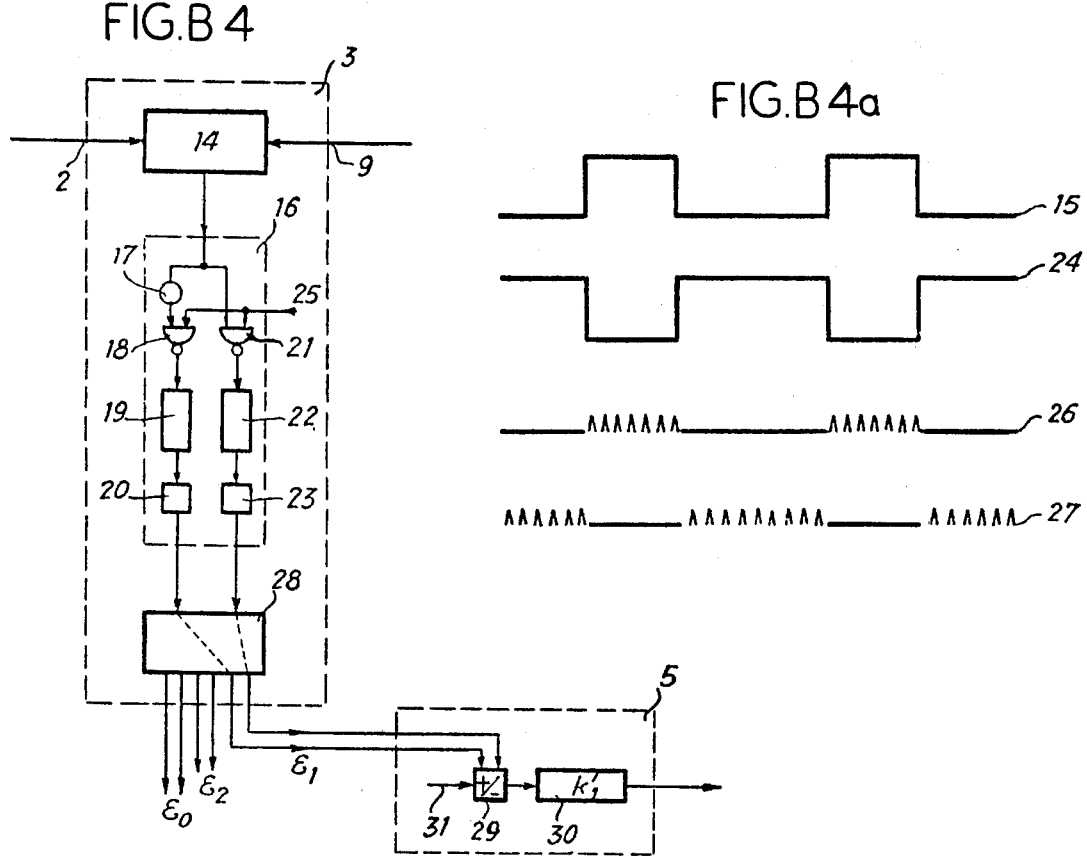
FIG.B 4
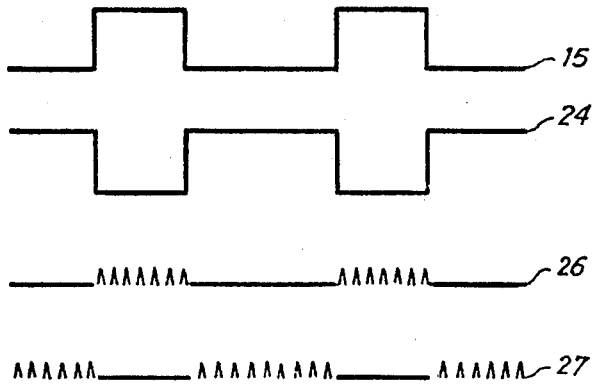
FIG.B 4a
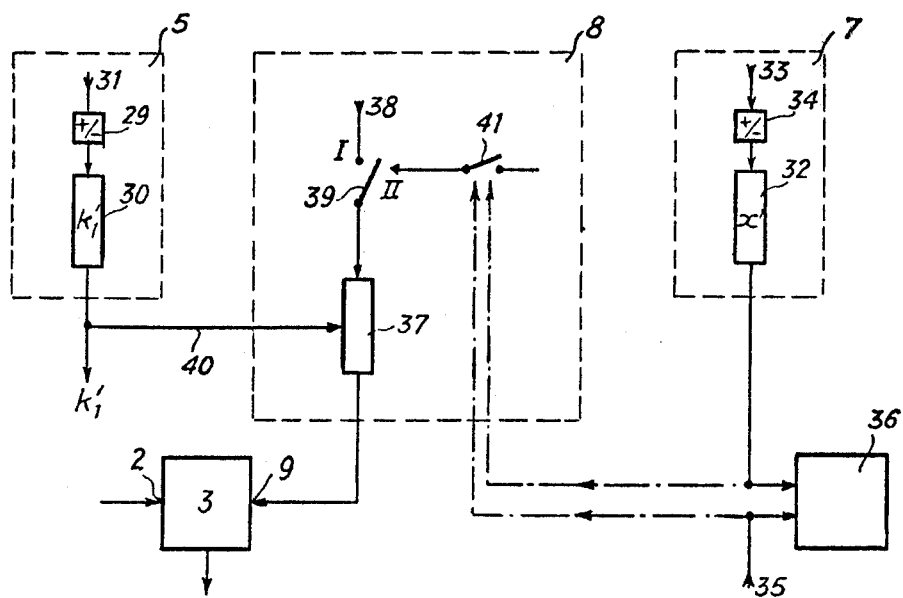
FIG.B 5

FIG.B 6
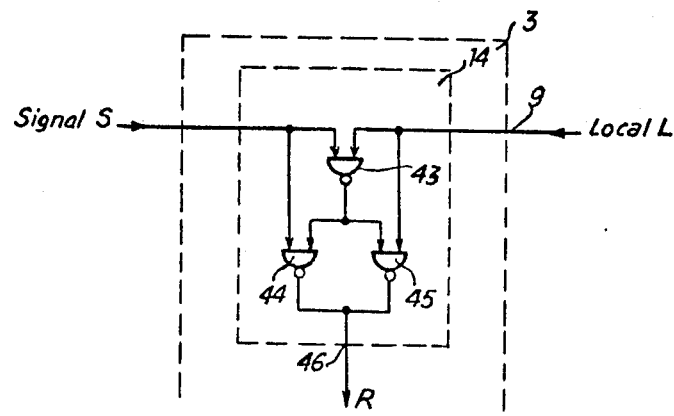
FIG.B 6a
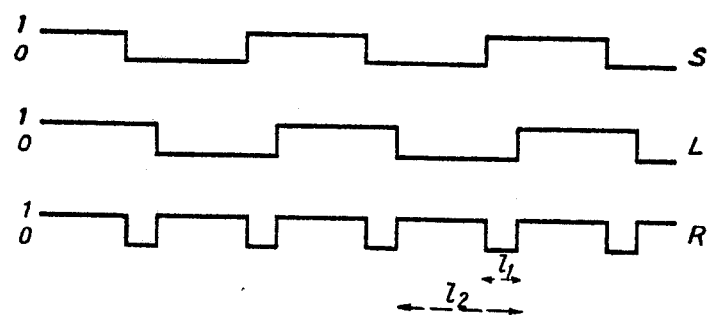
FIG.B 6b
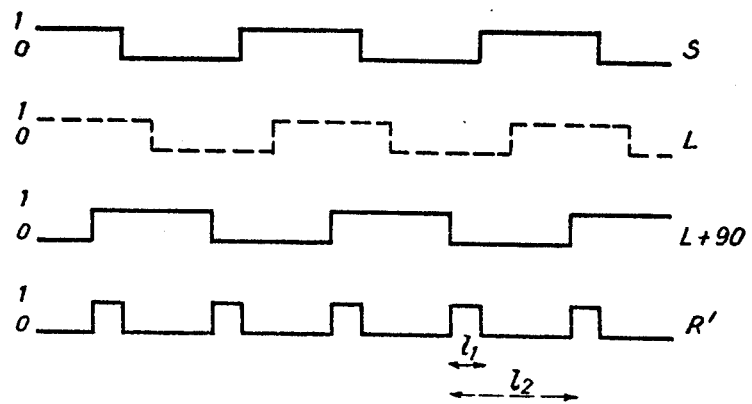

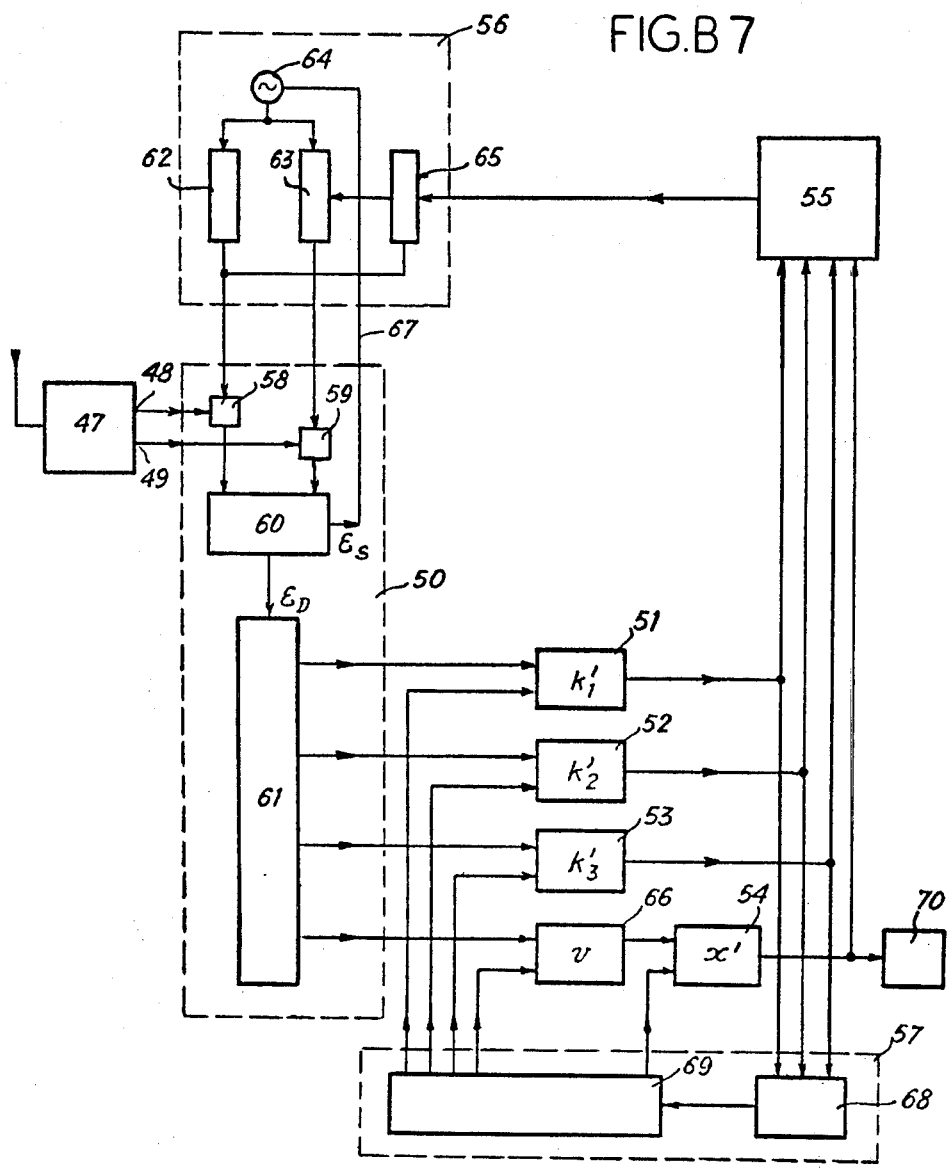
FIG.B 7

FIG.C 1
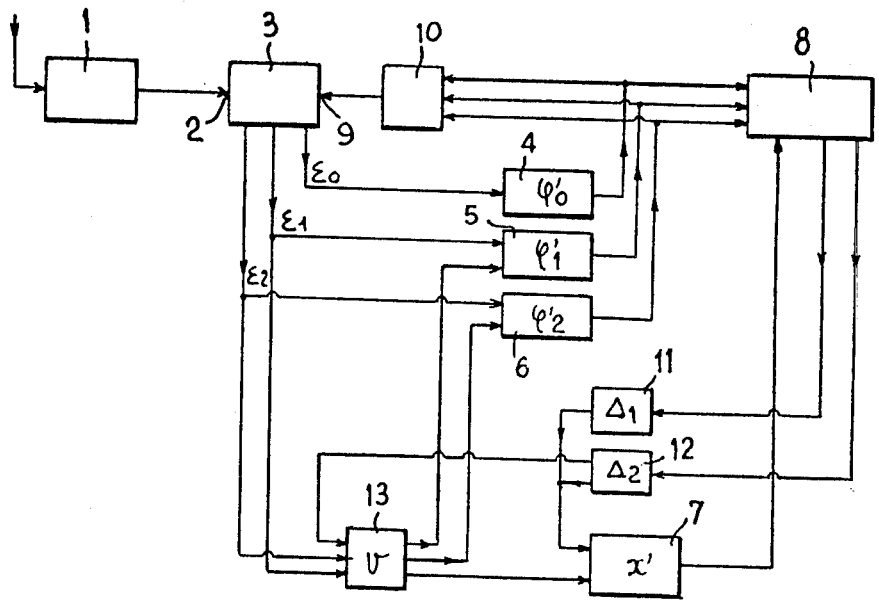
FIG.C 2
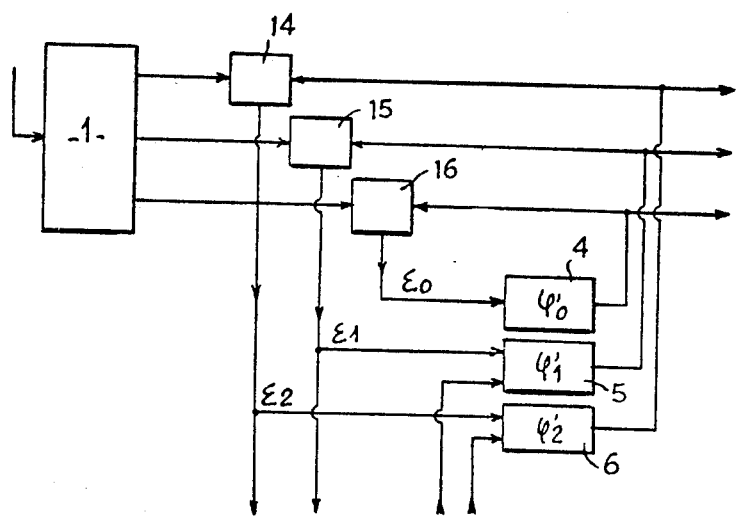

FIG.C 3a
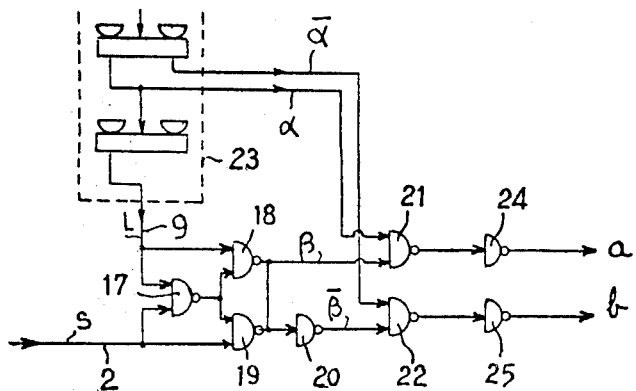
FIG.C 3b
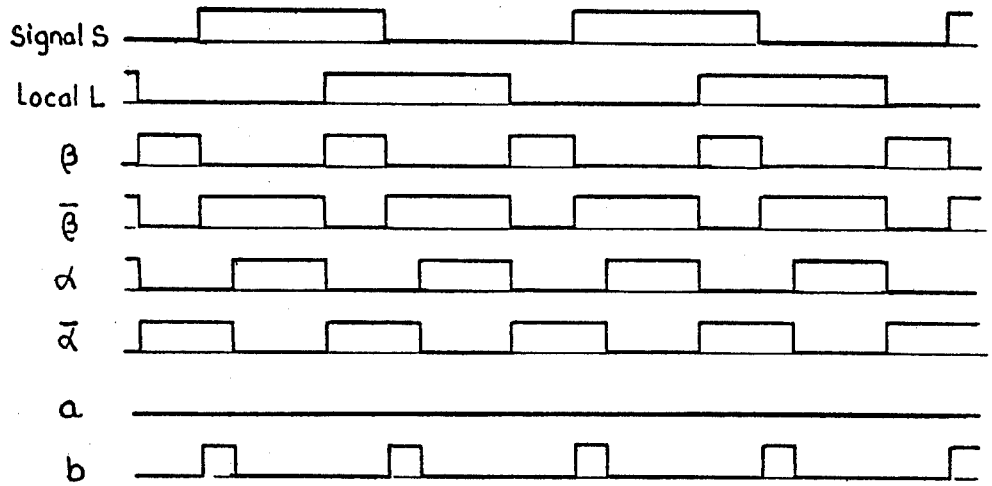
FIG.C 3c
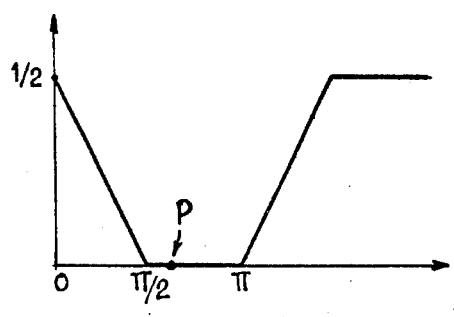
FIG.C 3d
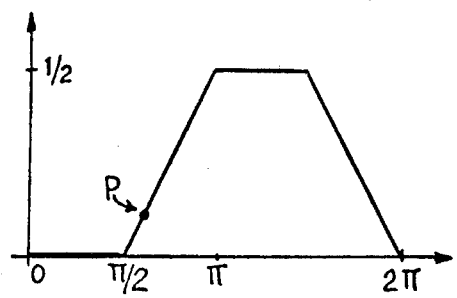

FIG.C 4a
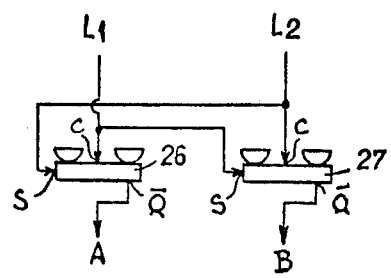
FIG.C 4b
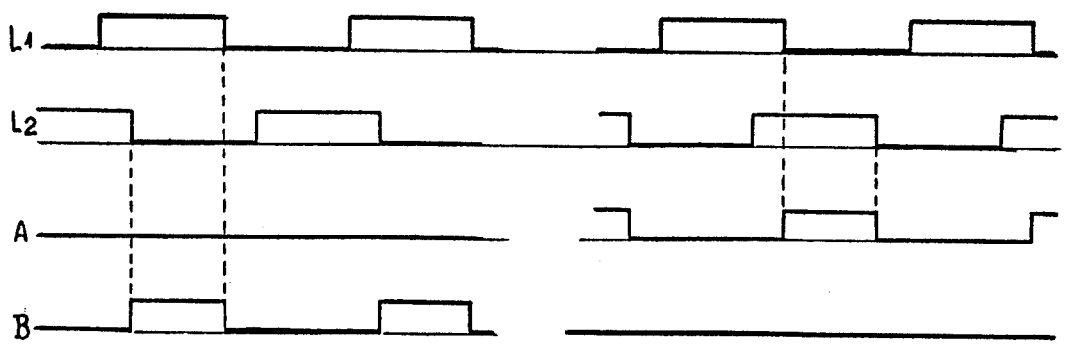
FIG.C 4c
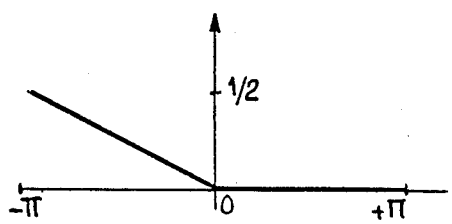
FIG.C 4d
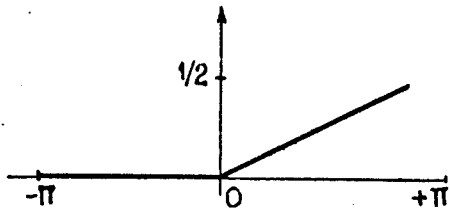

FIG.C 5a
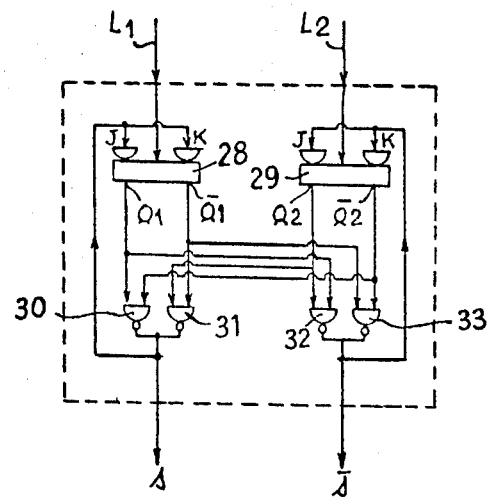
FIG.C 5b
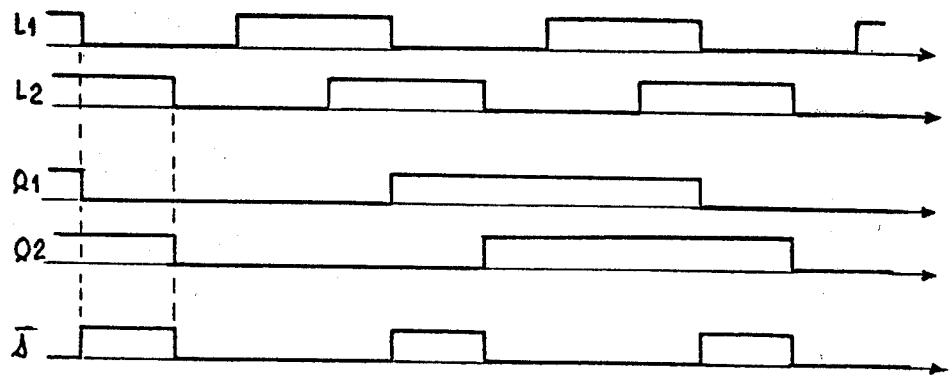
FIG.C 6
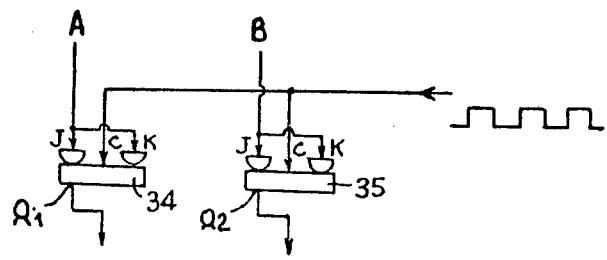

FIG.C 7
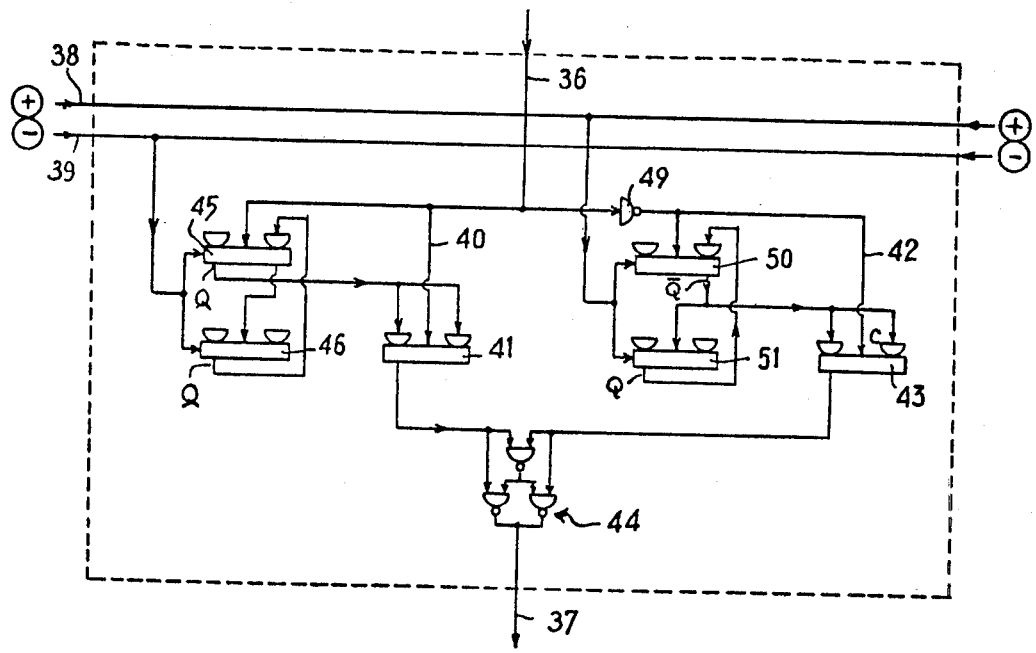
FIG.C 8a
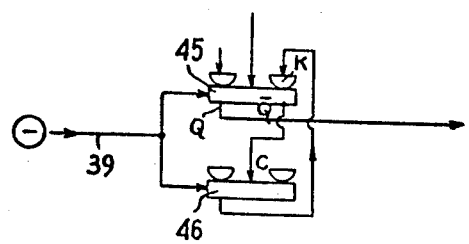
FIG.C 8b
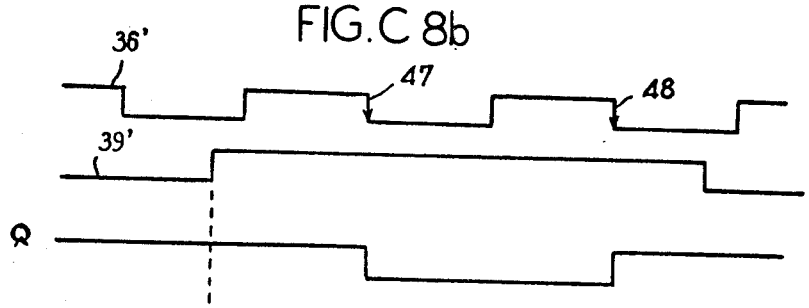

FIG.C 9
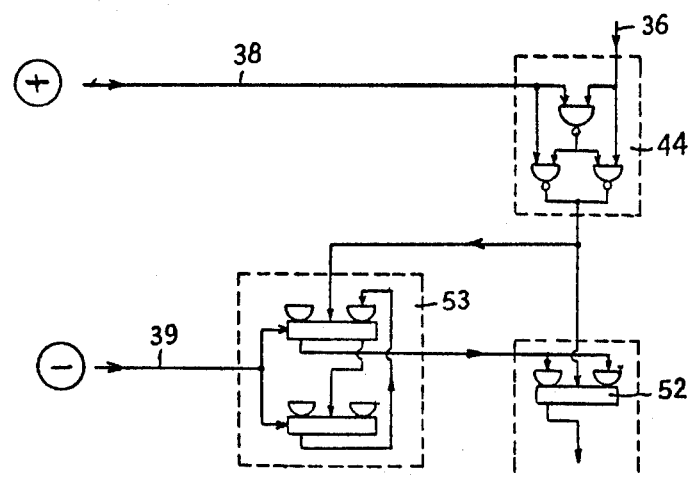
FIG.C 10
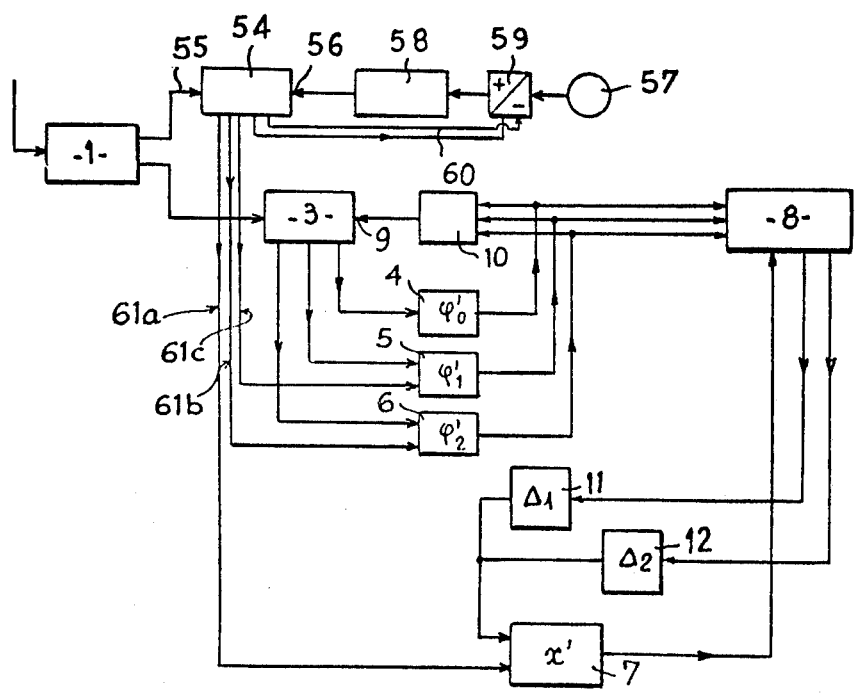

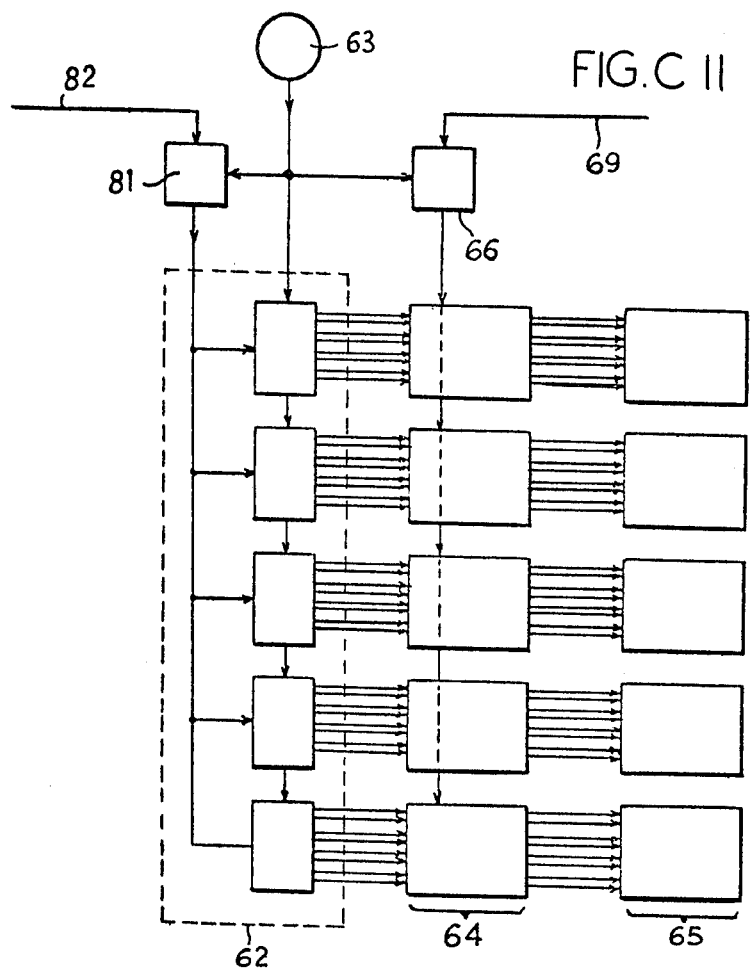
FIG.C 11
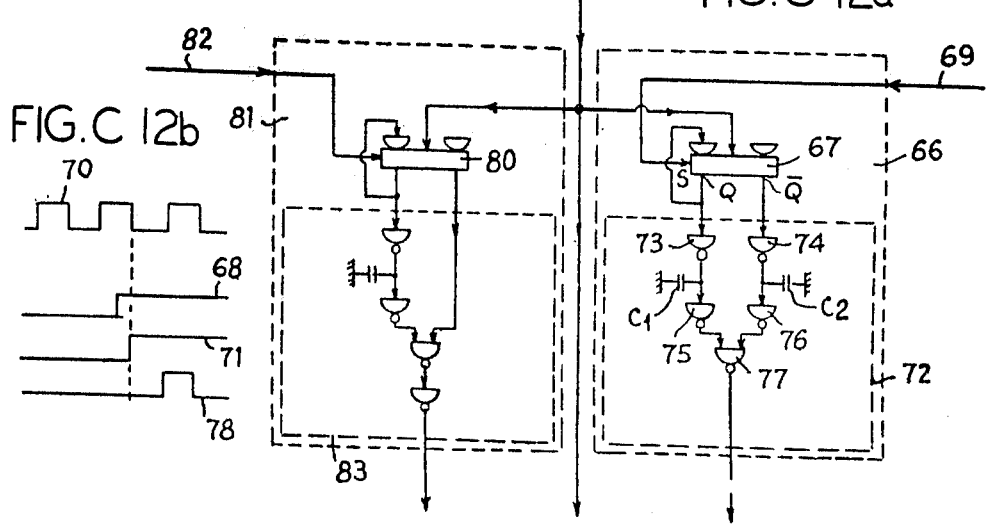
FIG.C 12a
FIG.C 12b

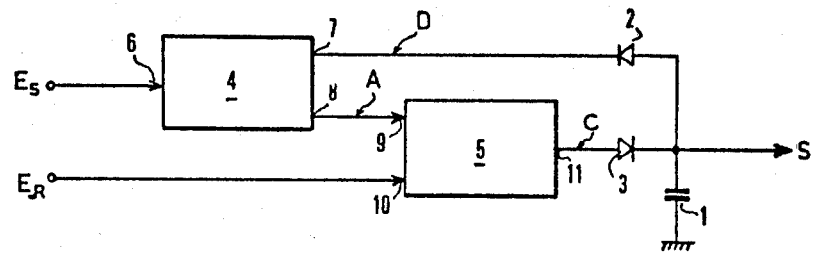
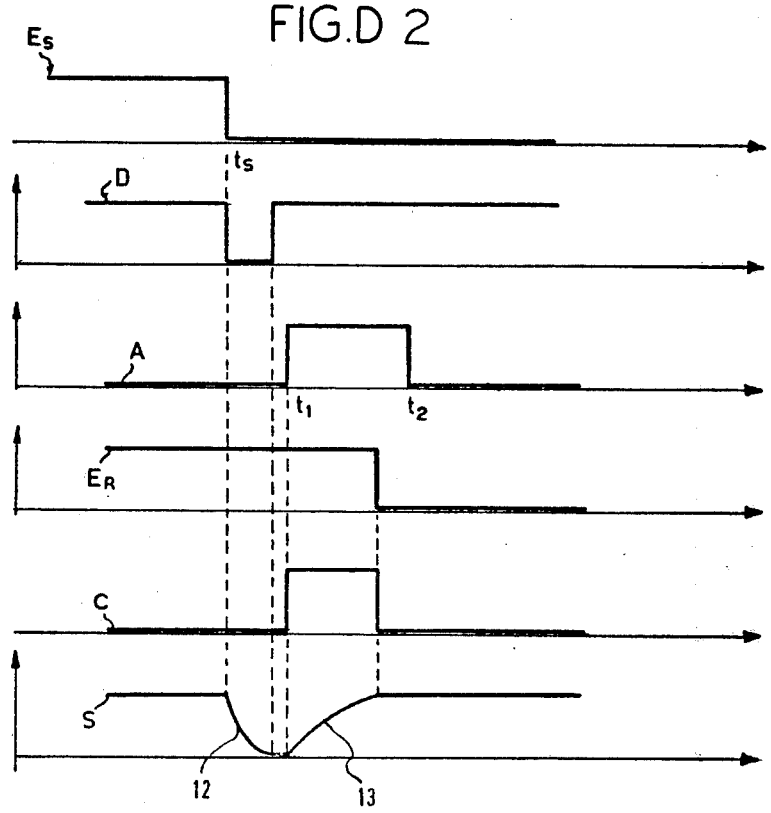

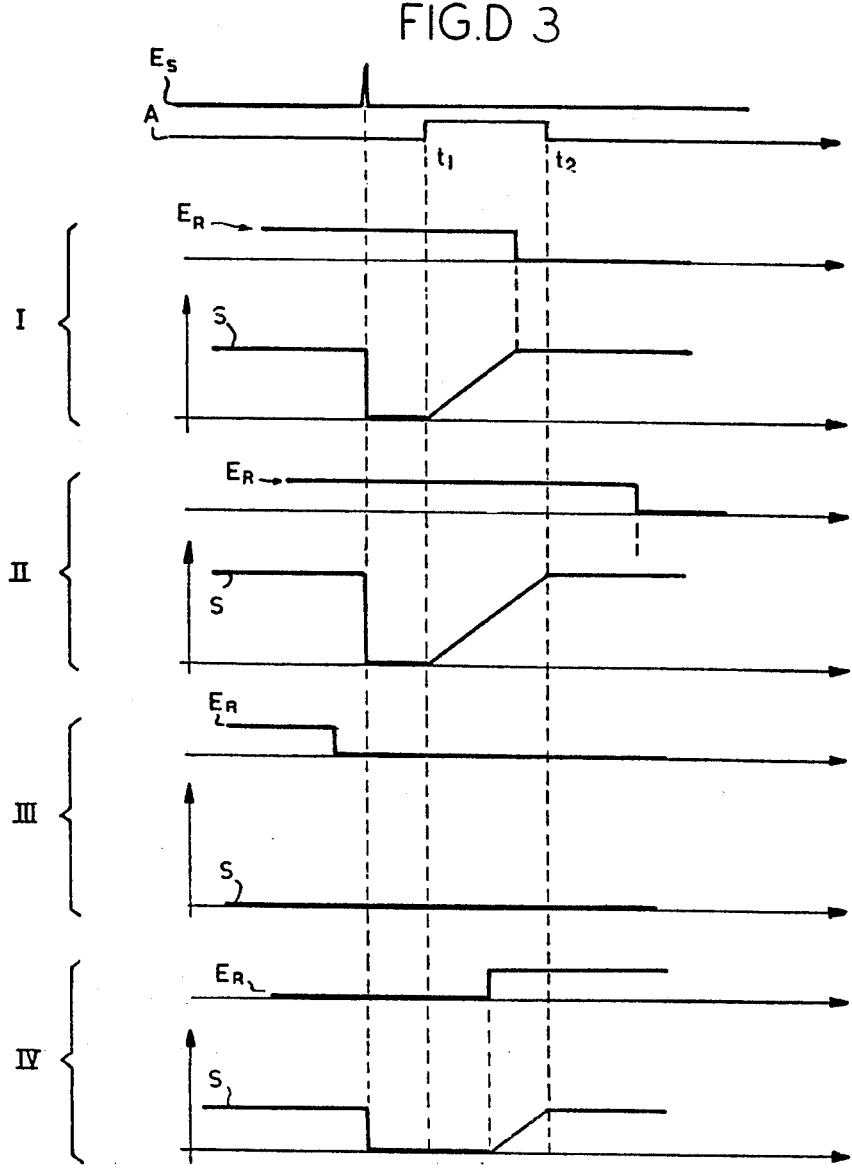
FIG.D 3

FIG.D 4a
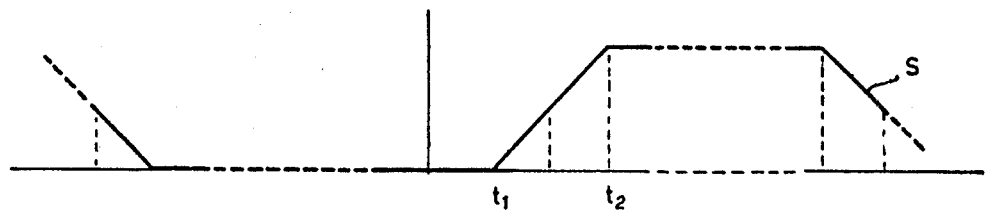
FIG.D 4b
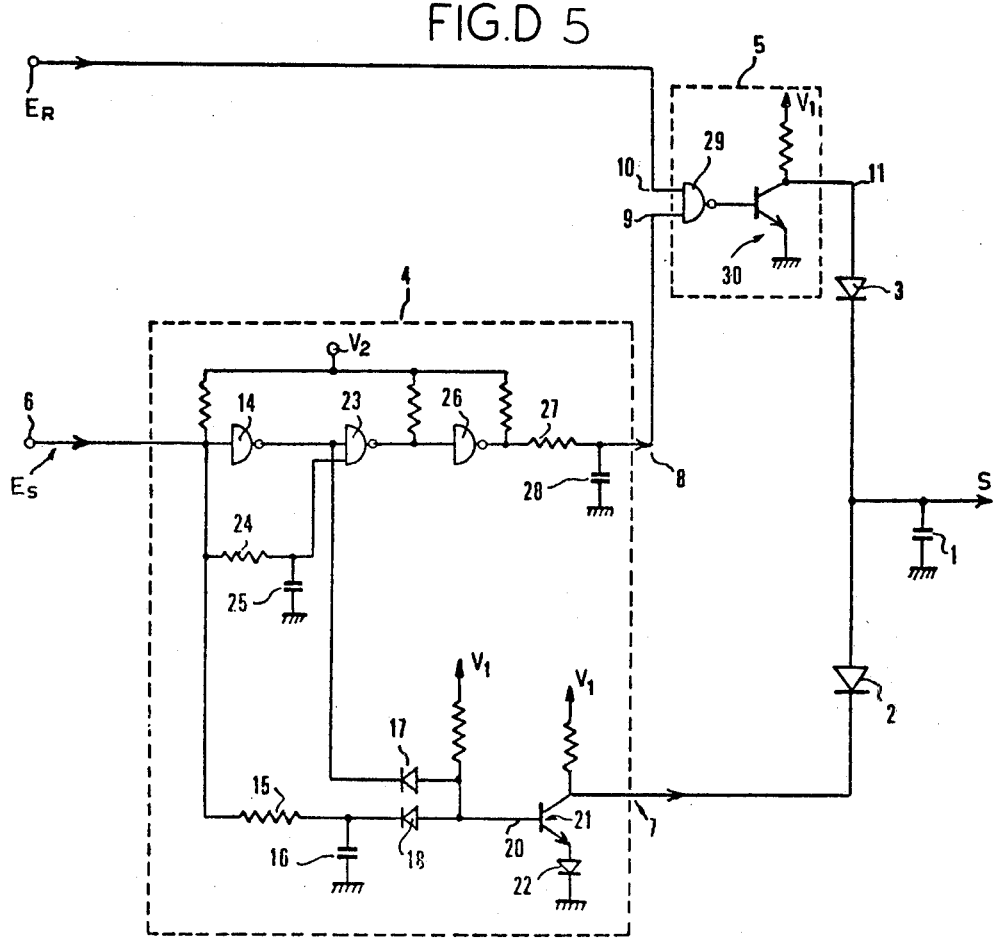
FIG.D 5

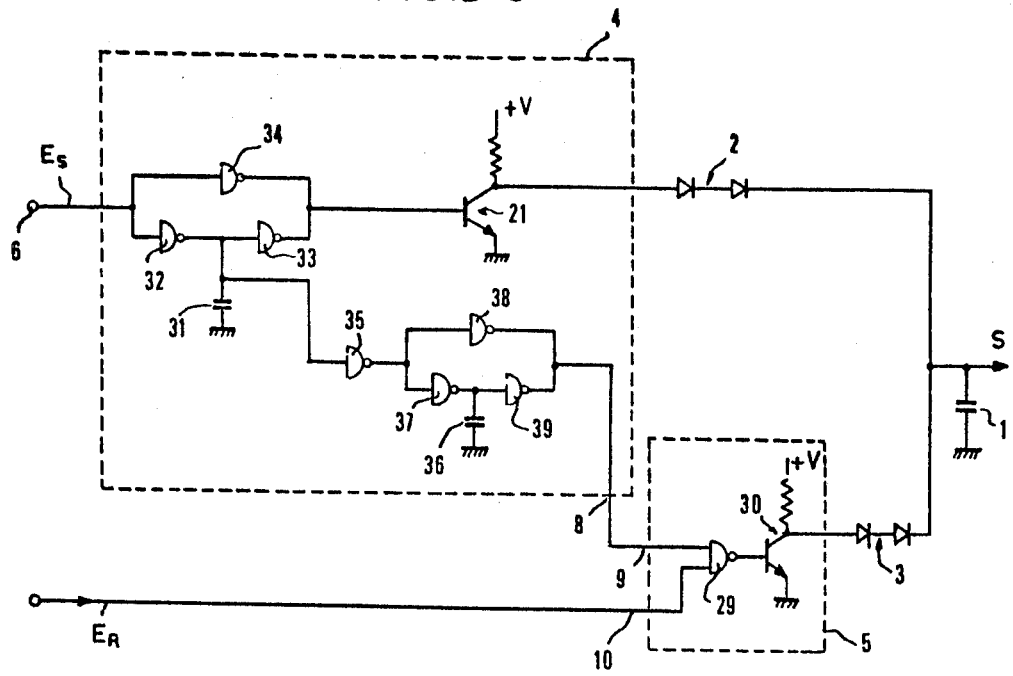
FIG.D 6
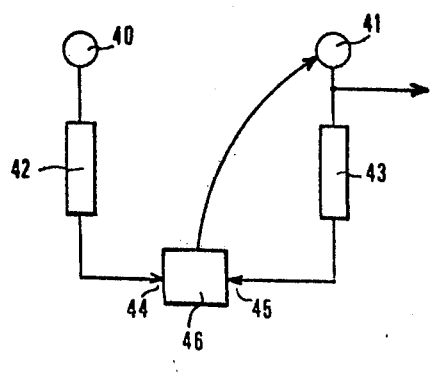
FIG.D 7
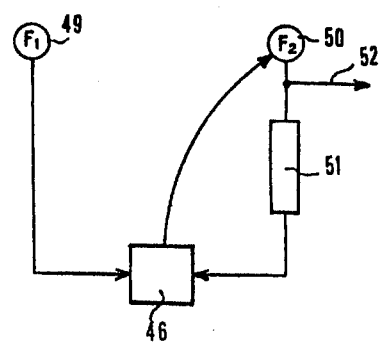
FIG.D 8

FIG.D 9
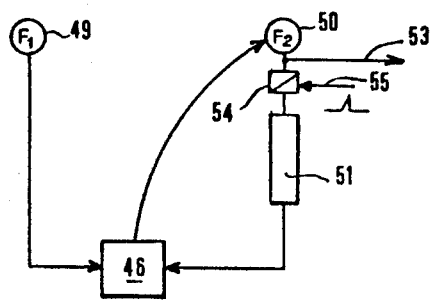
FIG.D 10
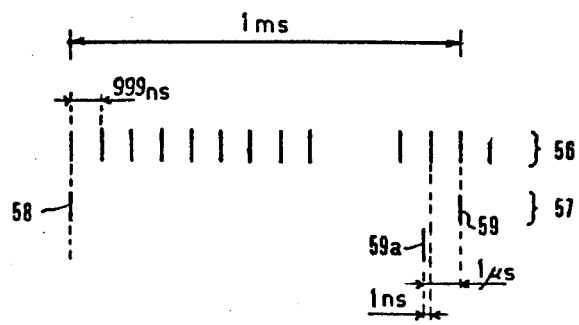
FIG.D 11
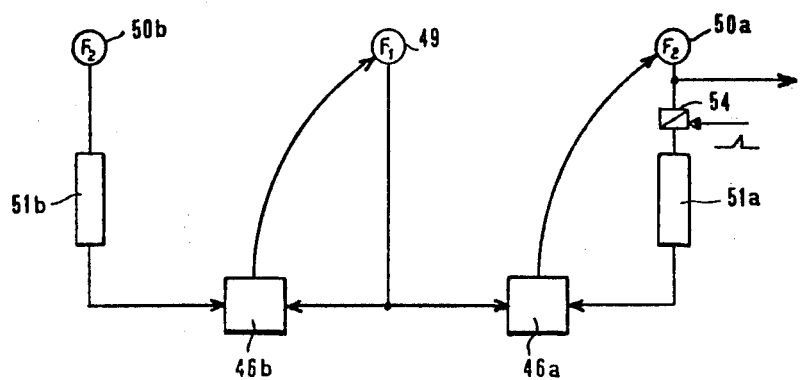

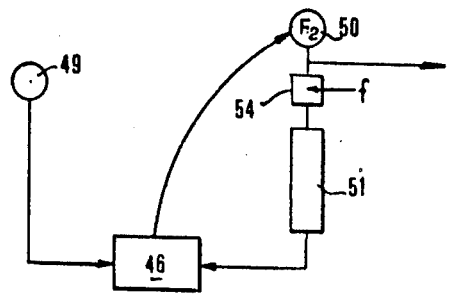
FIG.D12
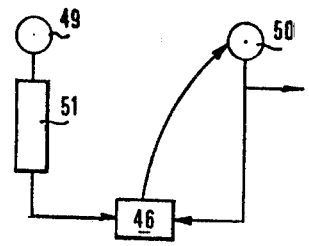
FIG.D 8b
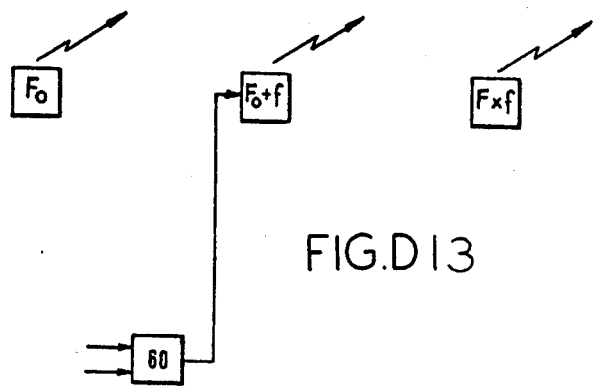
FIG.D 13
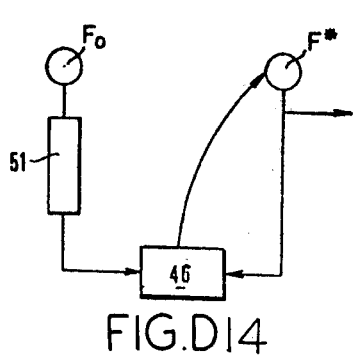
FIG.D14
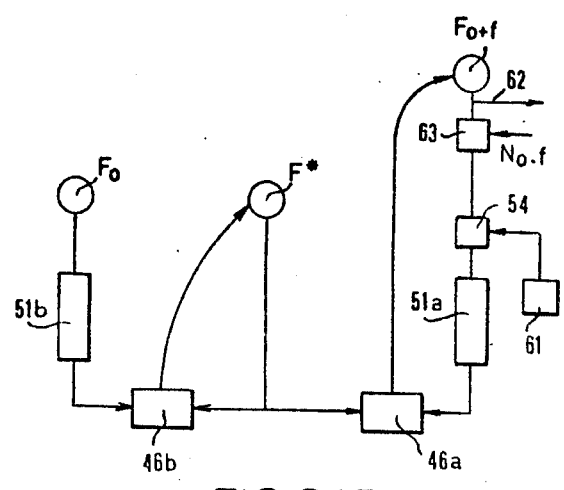
FIG.D15

NOVEL STRUCTURE FOR RADIO POSITION FIXING USING HYPERBOLIC PHASE MEASUREMENT

The present invention concerns radio position-fixing by phase measurement.

It is known that the basic principle of radio position-fixing by phase measurement consists in utilising the propagation phase displacement, which occurs in a pure sinusoidal wave of known frequency, transmitted by a transmitting station, as a function of the propagation distance of the said wave, in order to obtain therefrom information relative to the said propagation distance. Several stations transmitting such waves are necessary for permitting determination of the position of a receiver at a point. Such a system of transmitting stations is commonly called a radio position-fixing chain.

The propagation phase displacement occurring in a wave of known frequency is a function of the propagation distance and also of the said known frequency and the rate of propagation of the electromagnetic waves. The proportionality factor connecting the propagation phase difference expressed in phase rotations and rotation fractions (measured on the known frequency) with the corresponding propagation distance will be called sensitivity factor or more briefly sensitivity. This sensitivity is equal to the quotient of the known frequency of the electromagnetic wave divided by the rate of propagation.

It is also known that the phase of an electrical signal of known frequency is defined except for a whole multiple of $2\pi$, that is to say, except for a number of phase rotations. This is the source of the phenomenon known as ambiguity. In general, the result is that a measured phase value does not correspond to a position-line for the receiver but to a plurality of position-lines. The ambiguity of a phase measurement increases when the sensitivity increases, which corresponds to an improvement in the absolute precision of position-fixing.

The technical implementation of the basic principle of radio position-fixing as just explained is effected in a more complex manner for a certain number of technical reasons.

In fact, the practice of radio position-fixing consists in establishing a phase reference for measuring the aforesaid propagation phase differences. It appears at once that this problem is related to the stability of the sources or oscillators used for generating the waves intended for position-fixing. In this respect, it is necessary to bear in mind that in the theoretical reasoning, the frequency and phase of the transmitted waves are known a priori. In practice, on reception, it is possible to assume that the frequency of the transmitted waves is know without it being necessary to provide connections for this purpose. On the contrary, the phase of the transmitted waves is generally not known absolutely.

Most of the existing solutions are based on the fact that the phase reference mentioned above is established relatively for the various signals transmitted. The radio position-fixing methods thus realised use a measurement of the differences in the propagation phase displacements between the point of reception and two transmitting stations. This supplies a group of hyperbolic lines whose common foci are the two transmitting stations.

French Patent Specification No. 790,386 and its addition 45,780 (HONORE: 1934) describe the first realisable technical solution of the phase measurement problems; this solution may be summarised as follows: Two transmitting stations radiate waves on two respective frequencies differing from each other by a low frequency. This low frequency is picked up at a fixed receiving station and is retransmitted in the form of the amplitude modulation of a carrier wave. It is clear that the two transmitting stations may transmit waves having no pre-established relationship with respect to the same time scale.

Among other approaches made subsequently, there is proposed in British Patent Specification No. 579,346 (MITCHELL and KILVINGTON; 1944) a method of radio position-fixing according to which several transmitting stations radiate waves having the same frequency. Only one of the transmitting stations transmits such a wave at any given instant. It is therefore necessary for a relationship to be established between the transmitting stations so that the frequencies and phases remain fixed at least relatively. This method of radio position-fixing will be denoted hereinafter by the term sequence method, because each measuring frequency is transmitted in sequence by the various transmitting stations.

The problems due to ambiguity form the subject of a general technical solution disclosed in French Patent Specification No. 1,010,811 (HONORE TORCHEUX; 1948). In this specification, it is proposed to cause each transmitting station to radiate at least two waves at near frequencies. The difference in the propagation phase differences obtained on these two near frequencies has a sensitivity factor equal to the difference between the respective sensitivity factors of the two transmitted frequencies, therefore, less than these latter factors. This lesser sensitivity factor makes it possible to remove the ambiguity present in the phase measurements made at one or the other measuring frequencies. This method will be called hereinafter "ambiguity removal by differential sensitivity."

Installations of radio position-fixing using a sequential transmission method have the principal advantage that the frequencies transmitted are identical for all the transmitting stations, which reduces the necessary number of transmission frequencies and consequently makes it easier to obtain frequency allocations.

However, the implementation of this sequential system is subordinate to two contradictory technical conditions.

The first is due to the fact that since the transmissions are interrupted, or momentary, for each transmitting station, it is necessary to await the end of the transient conditions of the filters before using the received signals. The duration of each time period of transmission ought therefore to exceed greatly that of the transient conditions.

The second condition is due to the fact that the receivers are most often situated on moving objects. Since the phase information carried by the waves is valid only at the instant of reception, and a phase difference measurement, for each measuring frequency, must be made on waves which are not transmitted at the same instant, it follows that radio position-fixing by the sequence method supplies utilisable information only if the time interval separating two successive transmissions of the same measuring frequency by the same transmitter is sufficiently small.

Now the period of the sequence of transmissions, that is to say the time interval separating two transmissions of the same frequency by the same transmitter, is proportional to the duration of each momentary transmission according to a factor depending on the greater of the following numbers: Number of measuring frequencies used, number of transmitting stations forming a chain.

Since the total number of transmitting stations only influences the number of exploitation possibilities, the total number of frequencies used is in direct relation to the fact that ambiguity removal is more complete and more certain.

A first disadvantage of sequence radio position-fixing systems is therefore that to reduce the first condition it is necessary to make the transient conditions short by adopting high band widths on reception. This presupposes high transmission powers and results in a considerable congestion of the ether.

A second disadvantage of these systems is that for satisfying at one and the same time the two contradictory conditions, it is necessary in practice to limit the number of transmitting stations and the number of measuring frequencies. The result is in particular the practical impossibility of removing the ambiguity completely and surely at one and the same time, this being truer, the higher are the frequency values.

Another disadvantage of these systems is the necessity of using reception programmes finely synchronised with the transmission programme for limiting the loss of time which would result from lag between the programmes. Special synchronisation signals are therefore most often provided for this purpose. Although the principles of such synchronisation are simple, the use of these signals in practice rises problems of range or power.

The present invention concerns a novel method of radio position-fixing of the hyperbolic type using phase measurement intended to reduce practically completely the aforesaid disadvantages. It concerns also transmission and reception installations for carrying out this method of radio position-fixing.

A first object of the invention is to provide a method of radio position-fixing, in which the band widths necessary for reception are extremely narrow. In addition to better protection from neighbouring transmissions and noise in general, this permits a considerable reduction in transmission power and consequently in the congestion of the ether.

Furthermore, by reason of the small band widths mentioned, it is easy to provide, according to the invention, several chains of transmission installations whose frequencies in respective correspondence are extremely close, and to use such transmissions selectively on reception by very simple switching means.

A second object of the invention is to provide a method of radio position-fixing whereby it is possible to provide a large number of transmitters per radio position-fixing chain. This permits very high flexibility in the geographical location of the transmitting stations, and in their utilisation in reception.

A third object of the invention is to provide a method of radio position-fixing in which the number of measuring frequencies may be large enough for ambiguity removal to be complete and certain. Precision may be increased still further by using a sensitivity provided by all the measuring frequencies, which sensitivity increases with the number of the said frequencies.

A fourth object of the invention is to provide a method of radio position-fixing in which the synchronisation of the transmission and reception programmes admits a tolerance of several seconds, easily available by means of the timing devices currently used, and, a fortiori, by means of time signals.

A fifth object is to provide a radio position-fixing receiver, in which a single device treats successively a number of sequential waves, the local signals being generated sequentially according to requirements.

A sixth object of the invention is to provide a radio position-fixing receiver, in which the ambiguity is removed separately relative to each transmitting station received.

A seventh object of the invention is to provide a radio position-fixing receiver, in which a single device removes the ambiguity sequentially relative to each transmitting station received.

The method of radio position-fixing according to the invention will now be characterised.

It is necessary beforehand to state precisely what is understood by local signal.

In the known acceptance of this word, a local signal is an electrical signal generated locally with negligible noise and representative of a pure sinusoidal signal, and possesses a definite frequency and phase and a definite frequency stability, which are those of the sinusoidal signal. The representative signal in particular may be a rectangular signal or a signal formed of pulses, the ascending (or descending) front of which corresponds to a characteristic instant of a sinusoidal signal, for example to the passage through zero in a definite direction.

In what follows in the present specification and claims, the words local signal or complex local signal are used with a much more general significance. A complex local signal or more briefly local signal comprises one or more representative, locally generated signals as defined above; associated with each of them is a coefficient or weight which may be a real number of any value, but known. Each of these representative signals is a component signal or a component of the complex local signal.

The complex local signal is also representative of a pure sinusoidal signal and has a frequency and phase which are those of the said sinusoidal signal.

The frequency of a complex local signal has as value the algebraic sum of the frequencies of the pure sinusoids represented by each component signal, multiplied respectively by the associated coefficient or weight. Similarly, the phase of a complex local signal has as value the algebraic sum of the phases of the pure sinusoids represented by each component signal multiplied respectively by the same associated coefficient or weight as for the corresponding frequency. The frequency and phase of a complex signal will be called respectively complex frequency and complex phase in the cases which may give the rise to uncertainty.

It should be understood in the present specification and claims that the complex local signals may or may not be truly complex signals, in other words, a complex signal may comprise only one component signal. A complex signal having always a number of component signals will be termed true complex signal.

A group of component signals or simple components of a complex local signal are called complex component. The expression true complex component is also used to denote a complex component always comprising several simple components.

Examples of complex signals are given in FIGS. 9 and 10 and the corresponding description, or again in FIGS. 11 and 12, the coefficients or weights being equal to ± 1.

In FIGS. 9 and 10, the outputs of the divider-counters 7231A to 7231C and 7741 supply the simple components of a complex signal. When the signal $R_5'$ is zero, and assuming that there is no phase displacement in the filters and that the signal $O_5$ is purely sinusoidal, the complex signal in question is representative of the pure sinusoidal signal $O_5$. Taking the components at the inputs of the divider-counters mentioned, they then have assigned to them respectively weights equal to the reciprocal of the division factors.

The method of radio position-fixing according to the invention comprises at transmission a plurality of transmitting stations $E_i$ in number N at least equal to 2 and advantageously fixed. It is known that in two-dimensional radio position-fixing of hyperbolic type, two transmitting stations are sufficient for determining a position-line on which a receiver is situated.

Each transmitting station should be capable of:

\* Generating continuously a first local signal $S_i$ having a frequency $Fs_i$, called specific frequency, different for each of the N transmitting stations, and a number $n$ at least equal to 1 of second local signals $S_{ij}$, each having a respective frequency $F_j$, called measuring frequency, the values of the $n$ measuring frequencies $F_j$ being common to all the transmitting stations;

radiating continuously, from the first local signal $S_i$, a pure wave $O_i$ having the specific frequency $Fs_i$;

radiating in an interrupted and recurrent fashion, i.e., in a sequential fashion, according to a known programme, from each second local signal $S_{ij}$, a pure wave $O_{ij}$ having the measuring frequency $F_j$, the programme being such that for each measuring frequency $F_j$ and at any instant there is at most one transmitting station of the said plurality radiating a wave having this measuring frequency $F_j$.

The permanent waves $O_i$ having the specific frequencies $Fs_i$, different for each of the N transmitting stations, make it possible on reception to obtain continuously a signal representative of the Doppler effect exerted on any wave between each transmitting station and the receiver. The number $n$ of momentary and recurrent waves $O_{ij}$, having the measuring frequencies $F_j$ transmitted by each transmitting station, gives a more or less precise, sure and complete character to the determination of position and to the removal of ambiguity. A single measuring frequency of common value for all the transmitting stations is sufficient for making a position determination, but with considerable ambiguity.

The transmission programme of the interrupted waves $O_{ij}$ having the measuring frequencies should be such that at any moment there is at the most one transmitting station radiating a wave on a given measuring frequency. This being so, each transmitting station $E_i$ may radiate interrupted waves $O_{ij}$ in any manner complying with this condition and which is adapted to each particular case.

According to the invention, reception is possible for an unlimited number of receivers, installed most often on board a moving object, such as a ship.

Each receiver should receive in a selected manner, controlled for example by an operator, the waves from at least two transmitting stations for supplying at least one piece of information of hyperbolic position-line.

Each receiver should, on the one hand, be capable of:

generating continuously for each one of a number N', at least equal to 2, of specific frequencies $Fs_k$ selected from the N specific frequencies $Fs_i$, a first complex local signal $S_k'$ of complex frequency $Fs_k'$ having the same nominal value as the specific frequency $Fs_k$, the real frequencies $Fs_k'$ of each of the first complex signals $S_k'$ being susceptible to independent respective variations in the vicinity of their nominal values.

continuously receiving, for each specific frequency $Fs_k$, the wave $O_k$ continuously radiated on this specific frequency, this reception being effected according to synchronous reception technique, utilising each first complex local signal $S_k'$ and supplying the respective residues $R_k'$, called specific frequency residues, by utilising the specific frequency residue $R_k'$ corresponding to each specific frequency $Fs_k$, continuously compelling the frequency $Fs_k'$ of the corresponding first complex local signal $S_k'$ to be equal to the frequency of the continuous wave $O_k$ as received.

Each local signal $S_k'$ may comprise one or more component signals. Very advantageously, it comprises more than one, the component signals of higher frequencies are the local signals of frequency changing, and the last component signal, which in general has the lowest frequency, serves for synchronous detection. A synchronous detection which may or may not be accompanied by frequency changes is called synchronous reception.

The specific frequency residue $R_k'$, obtained at the output of synchronous detection, is used for reacting on at least one of the component signals of the first local signal $S_k'$, such that the complex frequency $Fs_k'$ is obliged to be equal to the frequency of the corresponding continuous wave $O_k$ as received.

Since the frequencies $Fs_k$ of the permanent waves $O_k$ as received are capable of independent respective variations, particularly because of the Doppler effect consequent on the displacements of the receiver relative to the transmitting stations, it is important that the real values of the respective frequencies $Fs_k'$ of each of the first local signals $S_k'$ can also vary independently.

On the other hand, each receiver should be capable of:

generating continuously for each of the N' specific frequencies $Fs_k$, a number $n'$ between 1 and $n$ of second complex local signals $S_{km}'$ of complex frequencies $F_{km}'$ having respectively the same nominal value as $n'$ measuring frequencies $F_m$ selected from the $n$ measuring frequencies $F_j$, each frequency $F_{km}'$ being conditioned to be proportional to the controlled frequency $Fs_k'$ of the first complex local signal $S_k'$ corresponding to the same specific frequency $Fs_k$, according to a proportionality ratio equal to the ratio of the nominal values of the corresponding measuring frequency $F_m$ and of the specific frequency $Fs_k$, the real phases of each of the complex second signals $S_{km}'$ being capable of independent respective variations;

receiving for each specific frequency $Fs_k$, during the periods in which they are respectively transmitted, the waves $O_{km}$ radiated sequentially by the transmitting station corresponding to the said specific frequency $Fs_k$ and having respectively the $n'$ measuring frequencies $F_m$, this reception being effected according to synchronous reception technique, utilising for each of the $n'$ waves $O_{km}$ the corresponding second complex local signal $S_{km}'$, and supplying respective residues $R_{km}'$ called sequential phase residues;

causing, by using each sequential phase residue $R_{km}'$, the complex phase of the corresponding second complex local signal $S_{km}'$ to be equal to the phase of the momentary wave $O_{km}$ when and as received, except for a constant having the same value for all the second complex local signals $S_{km}'$ corresponding to the same measuring frequency $F_m$.

Thus, each receiver may process measuring frequencies $F_m$ in selected number, according to the degree of the desired removal of ambiguity. The values of the measuring frequencies $F_m$ selected being known, there are no particular difficulties in generating on reception the second complex local signals $S_{km}'$ whose frequencies have the same nominal value as the selected measuring frequencies. It is important that, at any instant, each frequency $F_{km}'$ should be made to be proportional to the controlled frequency $Fs_k'$ of the first complex local signal $S_k'$ corresponding to the same specific frequency $Fs_k$, according to a proportionality ratio equal to the ratio of the nominal values of the corresponding measuring frequency and of the specific frequency $Fs_k$. As will be seen later, this implies that the complex local signals of reception having the same index $k$ are connected in frequency.

The frequencies $F_{km}'$ of these signals $S_{km}'$ are then correct for permitting synchronous reception of the momentary waves $O_{km}$ as and when received. This results in the fact that the pass-band of synchronous reception of the momentary waves $O_{km}$ may be extremely narrow. In fact, a difference between a frequency $F_{km}'$ and the frequency of the corresponding wave $O_{km}$ can appear only because of disturbance in the propagation; this difference is therefore extremely slight in practice.

The output signal of each synchronous detector is therefore a residue of phase $R_{km}'$ used for causing the complex phase of each second complex local signal $S_{km}'$ to be equal to the phase of the interrupted wave $O_{km}$ as and when received. This phase control may comprise a phase constant which should then have the same value for all the second complex local signals $S_{km}'$ corresponding to the same measuring frequency.

The second complex signals $S_{km}'$ are therefore compelled to be the exact image in frequency and phase of the received interrupted waves $O_{km}$ when they are received. Furthermore, outside the time intervals of reception of these interrupted waves $O_{km}$, the second complex local signals $S_{km}'$ supply information practically equivalent to that which each interrupted wave $O_{km}$ would give if it were continuously transmitted, that is to say information taking into account the Doppler effect due to displacement of the moving object, and that by means of frequency setting which intervenes from the continuous wave $O_k$ having the same value of the index $k$.

The phase displacements existing between the second complex local signals $S_{km}'$ of the same index $m$, are representative of ambiguous information of the hyperbolic line of position of the receiver relative to the transmitting stations $E_k$ having the specific frequencies $Fs_k$.

Such ambiguous information representative of the hyperbolic line of position may be used for example in any known manner for obtaining the position non-ambiguously either by an operator or by automatic treatment.

The transmission according to the invention of a continuous wave on a specific frequency by each transmitting station is at the origin of most of the advantages of the new method of radio position-fixing. In fact, at the level of each receiver there is continuously available on this specific frequency information of the variation of the said specific frequency by Doppler effect in relation to the speed of displacement imparted to the receiver. The fact that this information is continuously present renders its utilization possible at any instant, which is not the case with momentary and sequential signals, because of the transitory conditions of the electronic circuits.

This information of frequency variation has the same relation with respect to the phase variations as the speeds of displacement with respect to the positions or lines of position.

An integration of the information of frequency variation from a known position makes it possible in principle to know the position (or more exactly the lines of position) of the receiver at any instant, since this information of frequency variation is available at any instant. It therefore appears clear that in the present invention, the essential part on the radio position-fixing plane is played by the continuous waves having specific frequencies by reason of their permanent character.

The function of each interrupted wave having a measuring frequency is to supply momentarily phase information at recurrent instants. This interrupted phase information is used for correcting more or less rapidly the continuous phase information resulting from the aforesaid integration.

Other features and advantages of the invention will appear from the following detailed description of the invention with reference to the accompanying drawings given solely by way of non-restrictive example. In these drawings:

FIGS. 9 and 10 represent respectively the detailed diagrams of the reception path, or channel, with frequency changes 7271 and synchronous detection path, or channel, 7780 of FIG. 8, FIGS. 9 and 10 being regrouped to show better an example of first local signal on reception;

FIGS. 11 and 12 represent respectively the detailed circuit diagrams of the reception path, or channel, with frequency changes 7274 and of the synchronous detection and phase-control circuit of FIG. 8, these two FIGS. 11 and 12 being regrouped to show better an example of second local signal at reception;

Figure 24:
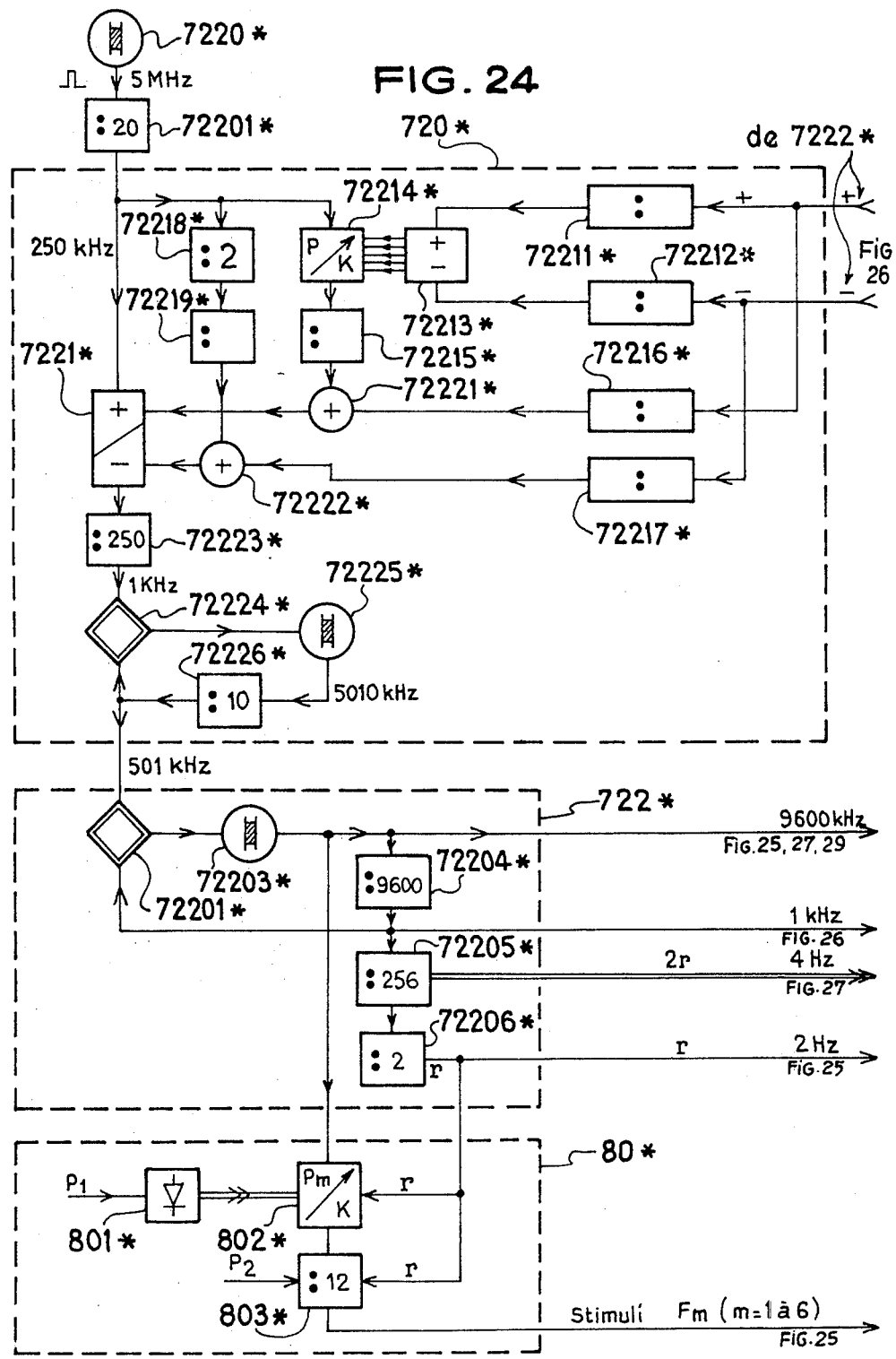
Figure 25:
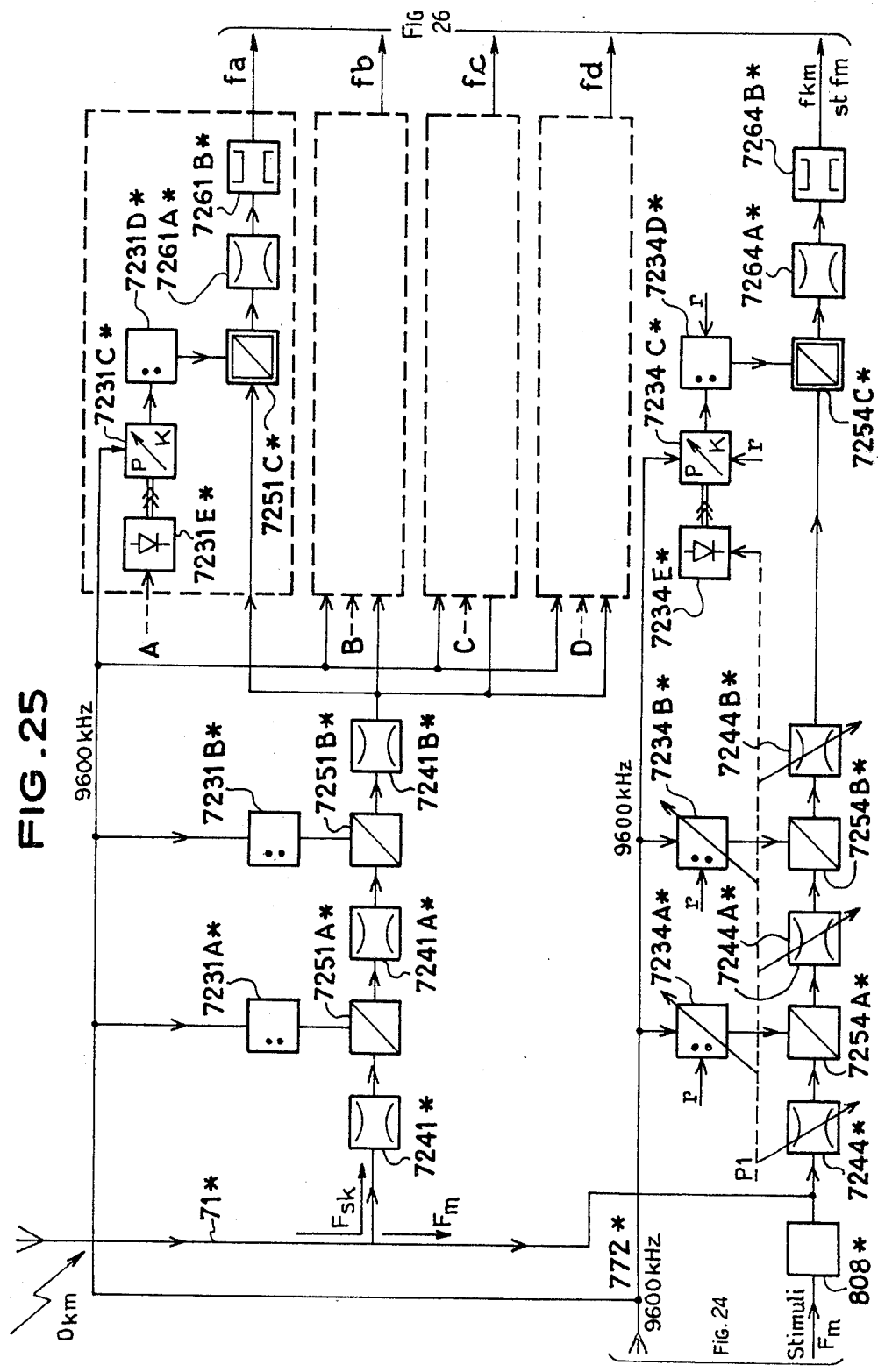
Figure 26:
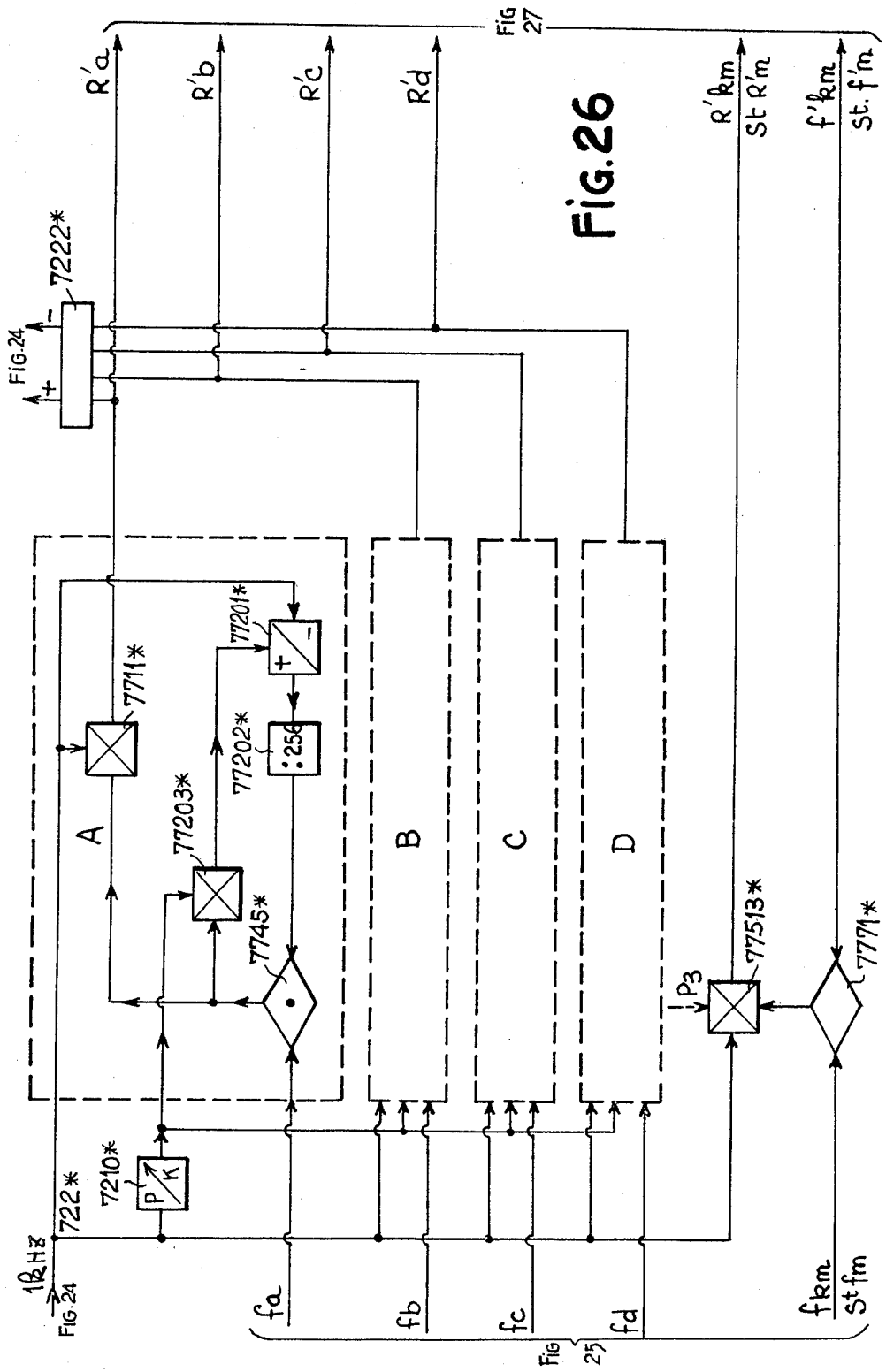
Figure 27:
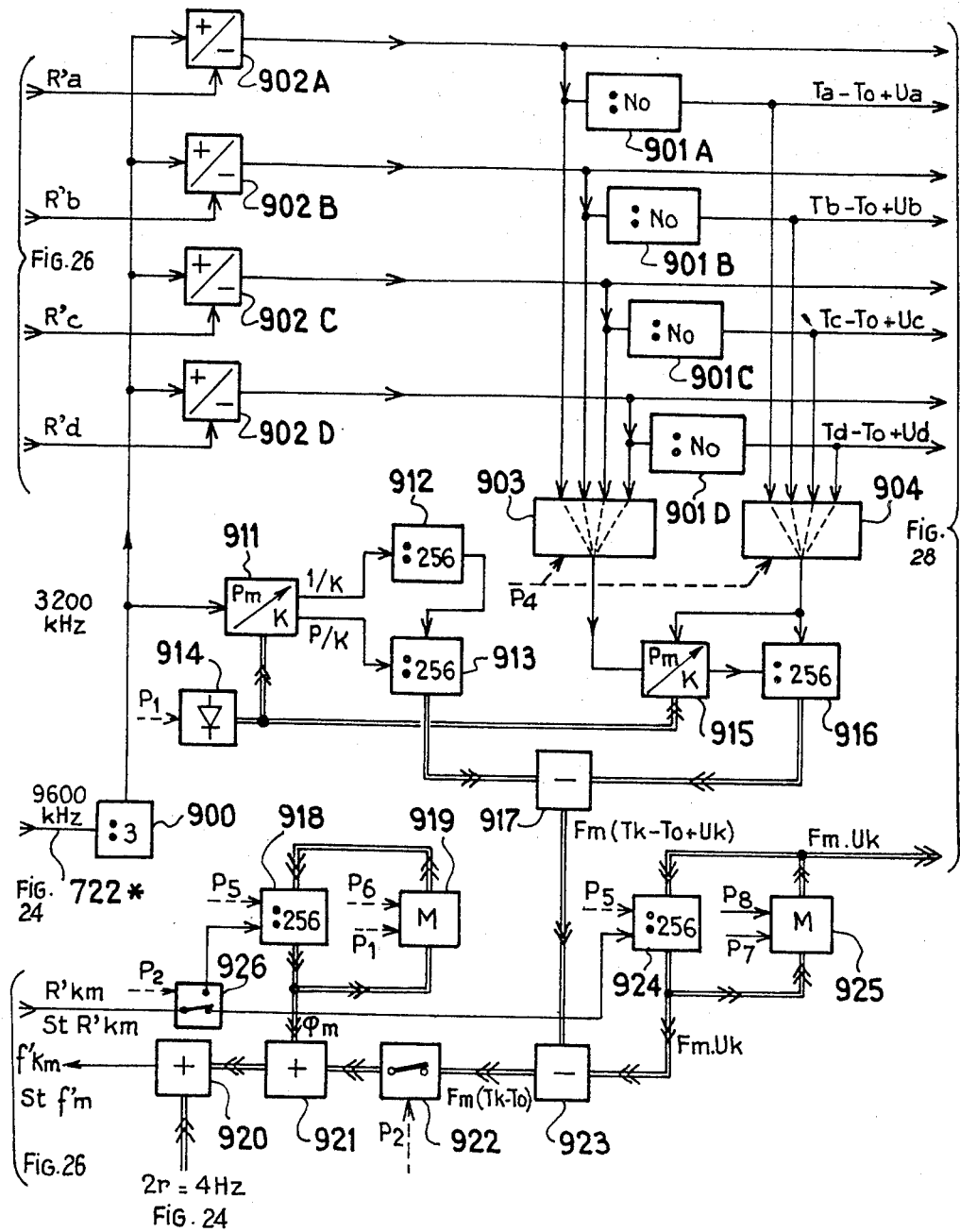
Figure 28:
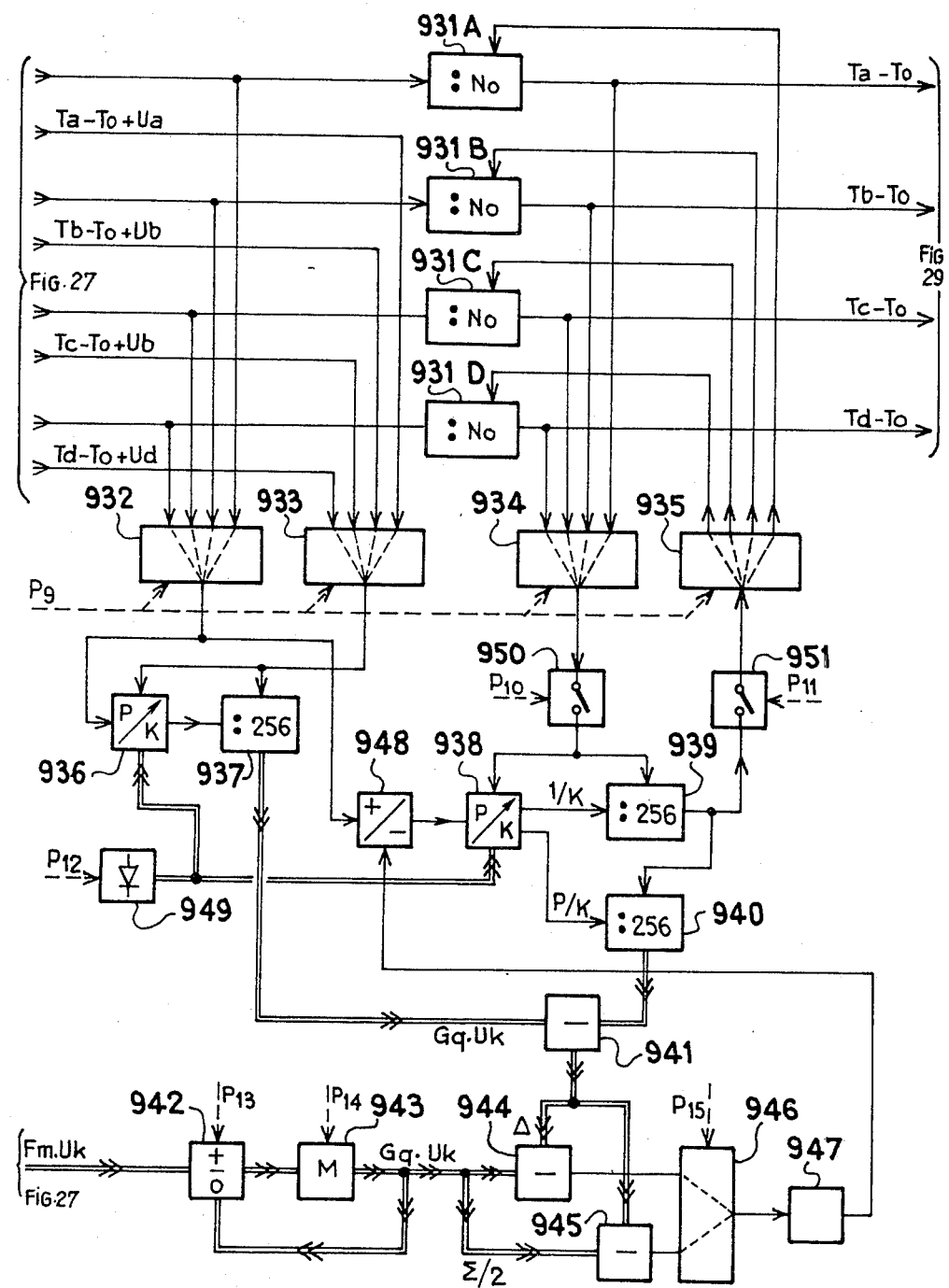
Figure 29:
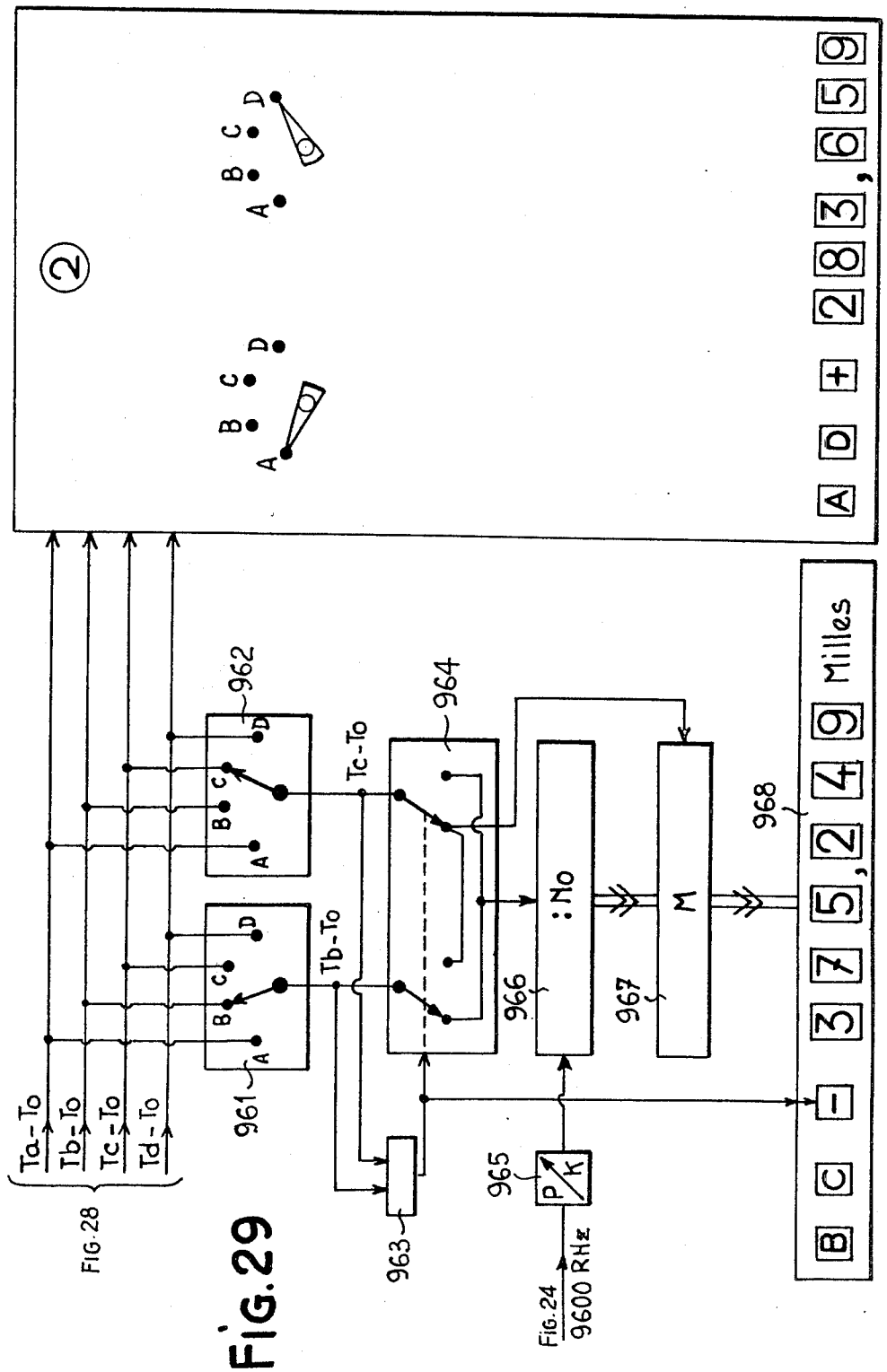
Figure 30:
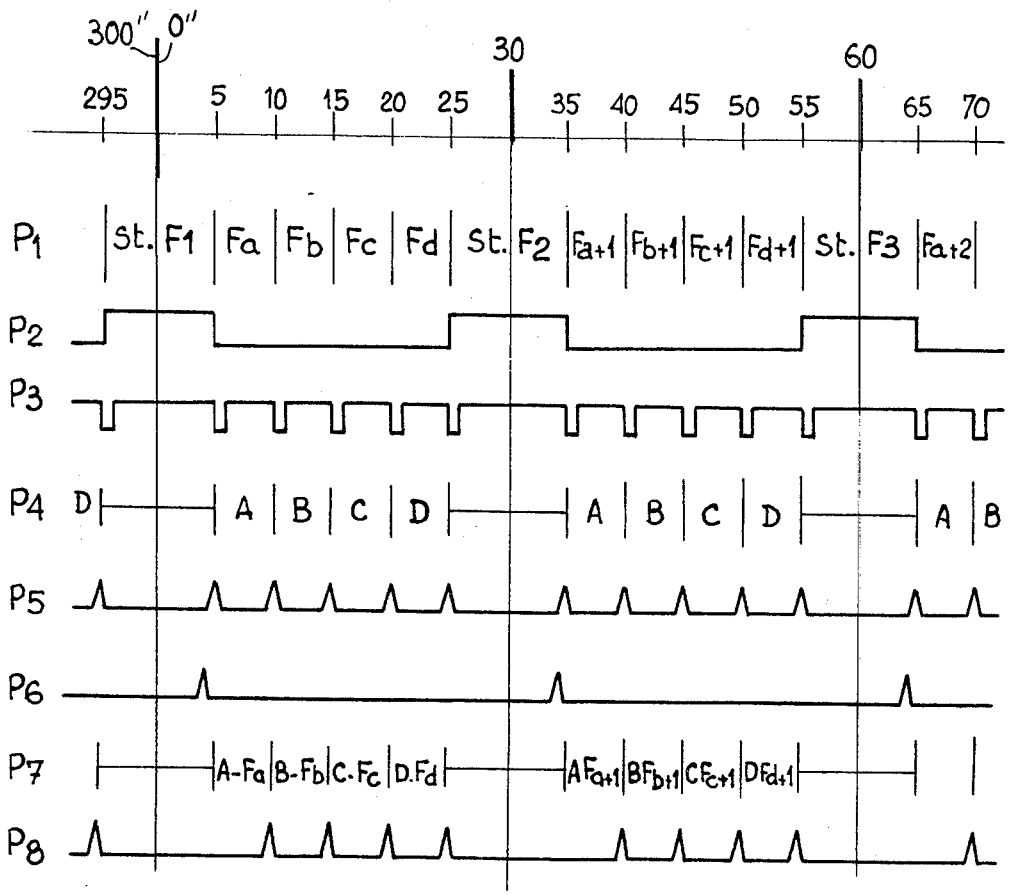
Figure 31:
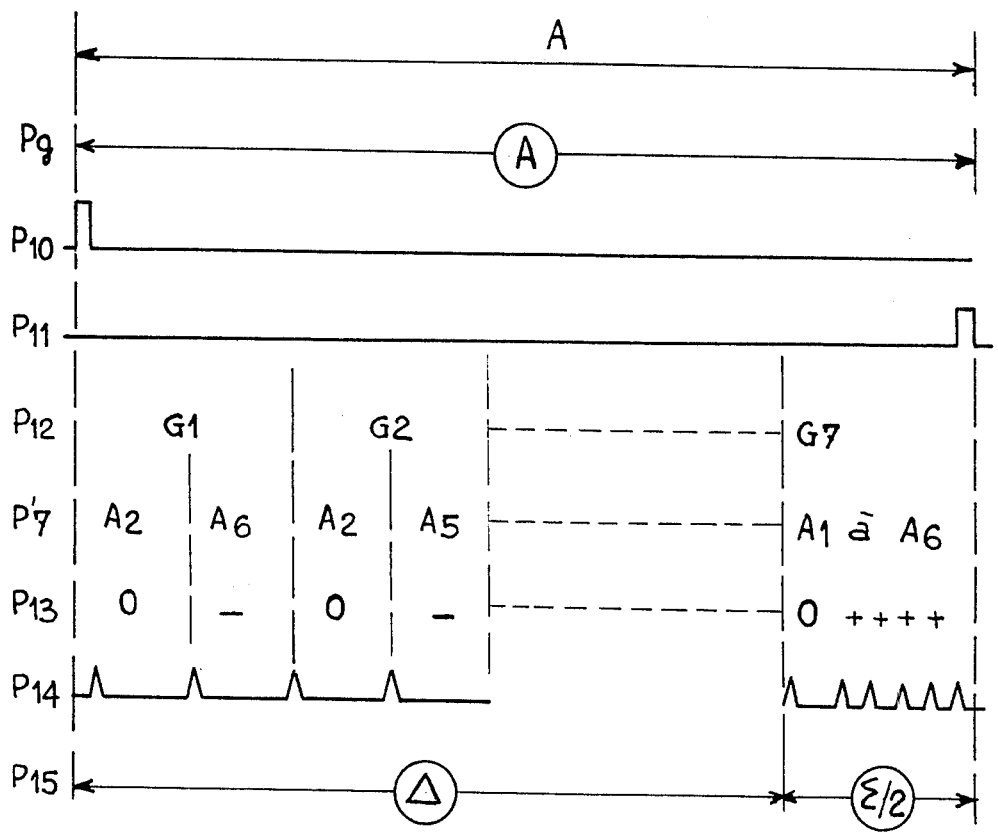

FIGS. 24 to 31 illustrate in detail a greatly preferred modification of the second embodiment of the receiver according to the invention, FIG. 24 concerning the detailed circuit diagram of the frequency generators, FIG. 25 that of the frequency changes, FIG. 26 that of the synchronous detections and frequency controls, FIG. 27 concerning the detailed diagram of the circuits processing the single components of the second local signals and carrying out the phase controls, FIG. 28 concerning the detailed diagram of the ambiguity removing circuits, FIG. 29 the diagram of the output circuits, and FIGS. 30 and 31 being graphs illustrating programme signals respectively for FIGS. 24 to 27 and for FIG. 28.

A particular method of radio position-fixing according to the present invention will now be described more specifically with reference to FIGS. 1 to 3.

Figure 1:
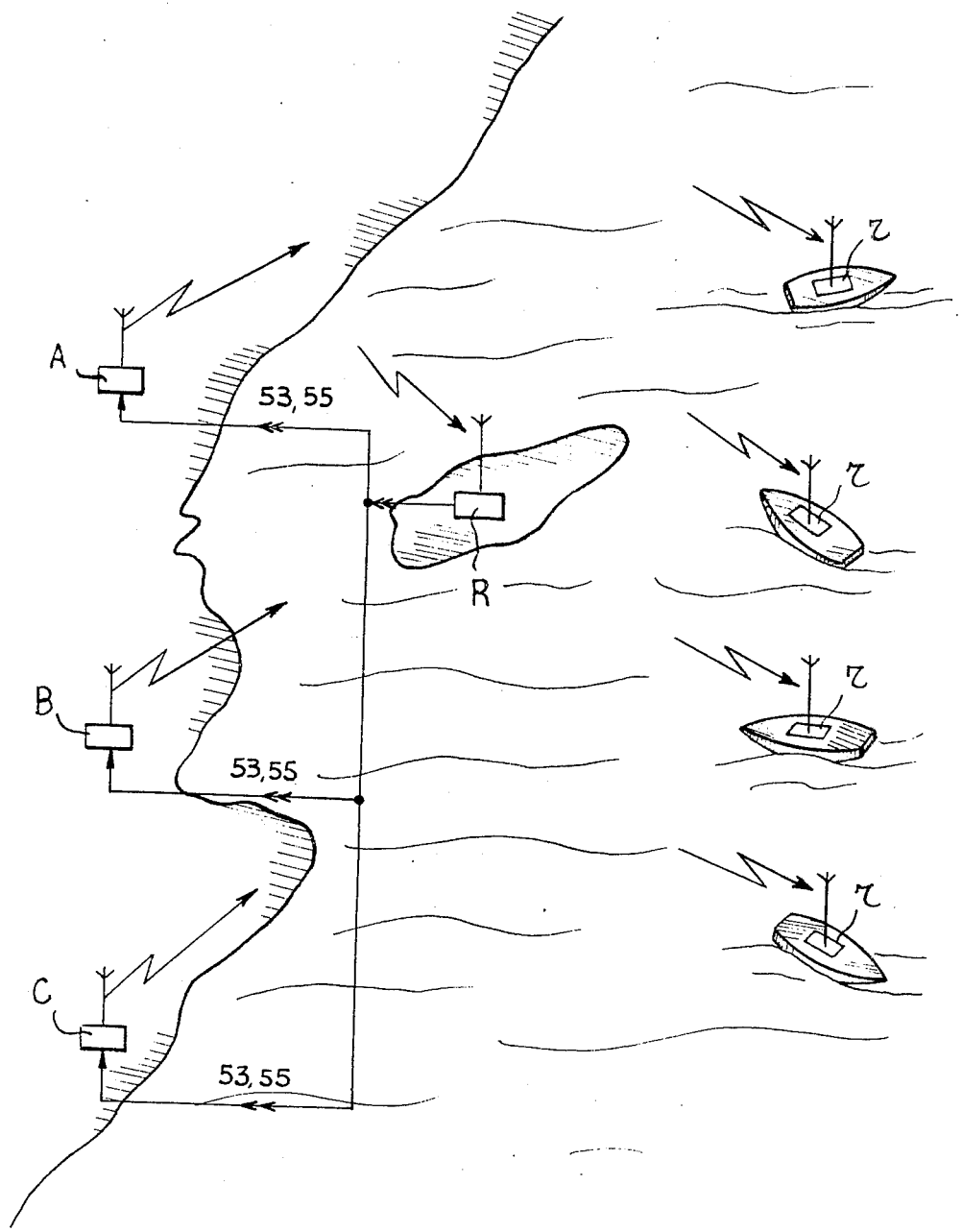
FIG. 1 is a diagrammatic sketch illustrating generally the transmission installations with their interconnections and radio position-fixing receivers.

FIG. 1 shows diagammatically three transmitting stations A, B and C. It is known that two transmitting stations are sufficient in a hyperbolic method of radio position-fixing for defining a position line. Three transmitting stations therefore permit a position to be obtained. It will be noted that if position-fixing is to be carried out with three coordinates, not three but at least four transmitting stations are necessary for determining a position. In what follows in this detailed description, it will be assumed that three transmitting stations permit the determination of a position.

FIG. 1 also shows a listening station R and a plurality of moving receivers r. The number of moving receivers is not limited, which is generally expressed by qualifying a method of radio position-fixing as being "non-saturable."

The listening station R shown is connected by any suitable means to the transmitting stations A to C for maintaining a known phase relationship between the different waves sent out by these stations. In FIG. 1, lines 53 to 55 constitute a diagrammatic representation of these links. Their function according to the present invention will be explained later.

In what follows in this description, the transmission installations are assumed to be fixed. It will be understood that all or some of them could be moving for certain applications. For a non-saturable method of radio position-fixing, it will suffice if their position is known with sufficient precision. The position of the transmission installations should be fully defined, at least relatively to the geographical region in which the receivers are moving.

The transmission installations comprise a chain of transmitting stations at least equal to two in number and having different specific frequencies, for forming a radio position-fixing chain.

It is very advantageous to provide at least one listening station for one chain of transmitting stations.

All the listening stations associated with a chain of transmitting stations are so controlled that each transmitting station of the chain is received by at least one listening station. Each listening station therefore receives the momentary waves of certain transmitting stations. To the extent that the listening station is fixed relative to the transmitting stations, there is no Doppler effect problem for reception at the level of this listening station. Consequently, this listening station may be equipped with a relatively simple receiver of sufficient precision.

In a first type of transmission installation (not shown), the listening stations may re-transmit reference information for all the radio position-fixing receivers, in a region whose range should be substantially equal to that of the transmitting stations to which the retransmission of the reference information relates (bisignal method of radio position-fixing).

In a second type of transmission installation (FIG. 1), the listening stations may be connected to the transmitting stations for transmitting to them control information intended to maintain the sequential waves radiated by the various transmitting stations in known phase relationships, advantageously fixed, for each of the measuring frequencies (monosignal radio position-fixing method).

There will now be described two slightly different examples of particular radio position-fixing chains according to the invention. In both cases, the nominal values of the frequencies transmitted are strictly defined, that is to say they have very precise values. In the first, denoted by I, which corresponds to the first embodiment of receiver described later, the values of the frequencies comprise numerous significant figures, generally different from zero. In the second, denoted by II, which corresponds to the second embodiment of receiver and its highly preferred modification, which will be described later, the nominal values of the frequencies are close to the first but are strictly equal to round values.

In each case, the measuring frequencies $F_j$, that is to say those transmitted sequentially successively for each of the transmitting stations, but only one at a time, are 6 in number and have the values of the following table:

| j | I – $F_j$ (kc/s) | II – $F_j$ (kc/s) |
|---|---|---|
| 1 | 332.015703 | 332 |
| 2 | 406.006566 | 406 |
| 3 | 392.086897 | 392 |
| 4 | 403.130494 | 403 |
| 5 | 405.250357 | 405.250 |
| 6 | 405.846835 | 405.750 |

It should be noted that the above "measuring" frequencies have been given this designation because their values define the sensitivity factors of the phase measurements. However, phase measurements having this sensitivity will be made for the most time on signals of low frequencies less than the measuring frequencies, as will be seen later.

Figure 2:
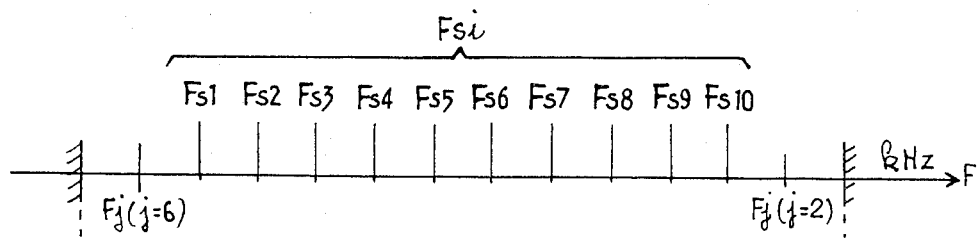
FIG. 2 is a graph illustrating on a part of the frequency axis an example of the distribution of 10 specific frequencies according to the invention.

FIG. 2 illustrates diagrammatically on a selected portion of the frequency axis, the position of the specific frequencies continuously transmitted according to the invention at the rate of one by each transmitting station. These specific frequencies $Fs_i$ have been selected by way of example as 10 in number, and are distributed in the band situated between the measuring frequencies $F_6$ and $F_2$. Of course, there is no need for geographical correspondence between the values of the specific frequencies and the geographical position of the corresponding transmitting stations. The values of the frequencies $Fs_i$, expressed in kilocycles, may be established as follows:

| i | I – $Fs_i$ (kc/s) | II – $Fs_i$ (kc/s) |
|---|---|---|
| 1 | 405.860934 | 405.781250 |
| 2 | 405.875114 | 405.796875 |
| 3 | 405.889377 | 405.812500 |
| 4 | 405.903724 | 405.828125 |
| 5 | 405.918156 | 405.843750 |
| 6 | 405.932673 | 405.859375 |
| 7 | 405.947276 | 405.875000 |
| 8 | 405.961966 | 405.890625 |
| 9 | 405.976744 | 405.906250 |
| 10 | 405.991610 | 405.921875 |

An example will now be described of the distribution in time of the waves transmitted on the measuring frequencies (or transmission programmes) for a radio position-fixing chain having 10 transmitting stations ($i$ varying from 1 to 10).

Each transmitting station $E_i$ radiates repetitively the interrupted waves $O_{ij}$, the index $i$ being the same as that of the transmitting station. Each wave $O_{ij}$ has an index $j$ corresponding to one of the aforesaid measuring frequencies $F_j (j = 1$ to $6)$. Transmission is according to the transmission programme illustrated by FIG. 3. In this FIGURE, the time is shown diagrammatically on a time axis graduated in minutes and half-minutes. The half-minute (30 seconds) is the elementary duration of transmission of the measuring frequencies. The transmission programme shown in FIG. 3 is drawn up for the case where the number of transmitting stations is equal to 10. In the particular embodiment illustrated in this FIGURE, each transmitting station transmits successively the measuring frequencies $F_1$ to $F_6$ during the elementary periods of 30 seconds. The transmission is displaced by an elementary period on passing from one transmitting station to that of the line immediately following in the table of FIG. 3.

A necessary condition for permitting each frequency to be transmitted by only one transmitting station at a time is that the duration of the sequence or transmission cycle is at least 10 times 30 seconds, that is to say 5 minutes. For the programme shown in FIG. 3, this period is effectively equal to 5 minutes.

Figure 3:
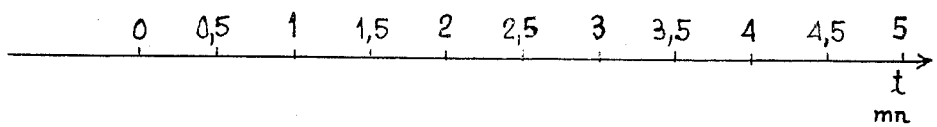
FIG. 3 is a corresponding table with a time axis illustrating a period of a transmission programme of interrupted waves, given as example and for 10 transmitting stations.

It is clear from FIG. 3 that the transmission programme is obtained by carrying out a circular substitution from the first line of the table of this FIGURE. It is obvious that any other distribution permitting each measuring frequency to be transmitted by only one station at a time, that is to say, it should be present in only one square of a column of the said table, comes within the scope of the present invention. If the number of measuring frequencies is very much less than that of the transmitting stations, it may be advantageous for the measuring frequencies not to be transmitted in close succession by each transmitter. This makes it possible in effect to ensure that in a given geographical zone, the interrupted waves of interest to a receiver are received at the rate of one at a time.

Embodiments of transmission installations will now be described with reference to FIGS. 4 to 6.

Figure 4:
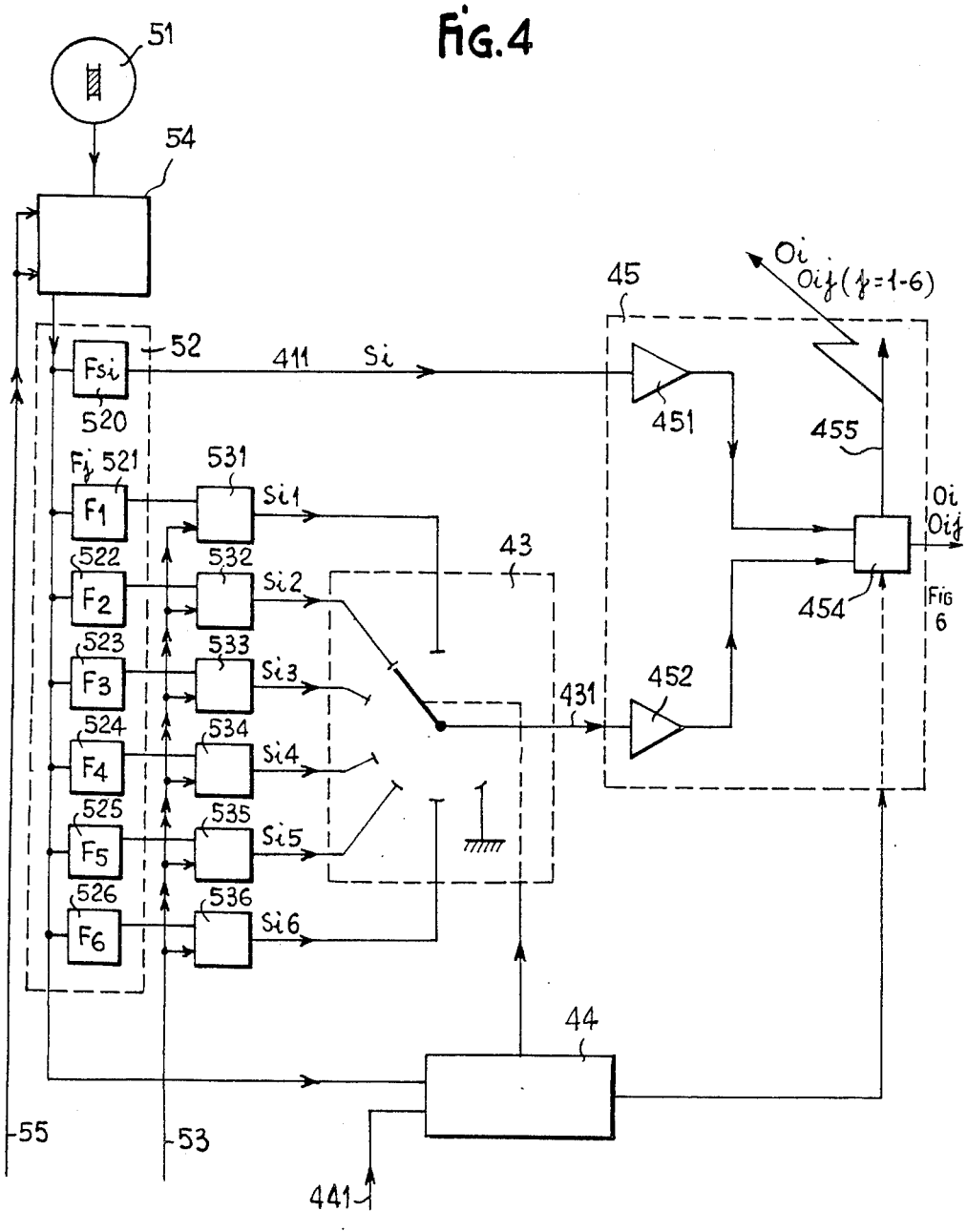
FIG. 4 is the basic circuit diagram of an embodiment of a transmitting station according to the invention.

FIG. 4 shows the basic circuit diagram of one embodiment of a transmitting station according to the invention. It will be recalled that the value of the index $i$ is fixed for a given transmitting station $E_i$.

The transmitting station of FIG. 4 comprises a single source formed by a free oscillator 51, whose output is connected to a frequency setting circuit 54 adapted to modify within predetermined limits the frequency of the signal supplied by the oscillator 51. The output of circuit 54 supplies a frequency setting signal to a frequency supply centre 52 supplying, on the one hand, from a circuit 520 to a line 411 a first local signal $S_i$ having the specific frequency $Fs_i$, and on the other hand from circuits such as 521 to 526 second local signals $S_{ij}$ having the measuring frequencies $F_j$ ($j = 1$ to 6). Phase-shifting circuits such as 531 to 536 are interposed respectively in the outputs of the frequency supply centre 52 supplying the measuring frequencies $F_j$ ($j = 1$ to 6) for adjusting the phase of the second local signals $S_{i1}$ to $S_{i6}$.

The frequency setting circuit 54 is connected to a frequency setting control line 55. Line 55 permits frequency setting to be controlled for all the frequencies, including the specific frequency $Fs_i$ and the measuring frequencies $F_j$ ($j = 1$ to 6). The phase-shifters 531 to 536 permit the adjustment of the phase of the second local signals $S_{ij}$, hence each of the interrupted waves $O_{ij}$ transmitted by the transmitting station, for obtaining between all the transmitting stations the aforesaid known phase relationship, advantageously fixed for each measuring signal (monosignal method of radio position-fixing).

The second local signals $S_{ij}$ ($j = 1$ to 6) present at the outputs of the phase-shifters 531 to 536 are transmitted separately to an electronic switching circuit 43 shown diagrammatically in the dashed line box in FIG. 4. The earthed connection of the switch 43 represents the absence of transmission of any wave $O_{ij}$ on a measuring frequency by the transmitting station. The switch 43 shown is such that its output 431 at any instant is connected to only one of its inputs. The switching operations are controlled by a programme circuit 44, shown diagrammatically in the interior of the switch 43 by a short-dashed line. The programme circuit 44 is capable of effecting, as a function of the time, in the switch 43 the connections corresponding for example to those which are shown in one of the lines of the table of FIG. 3. For this purpose, it receives time information coming from the frequency centre 52, for example, as shown in FIG. 4. This supplies a very stable chronometric standard which, for supplying the time on the macroscopic scale is divided in the manner known per se. The setting of the programme circuit 44 to time, which may be done once and for all, may also be effected or corrected by means of an input 441, for example by manual intervention on a display device or by a time-keeper (not shown) or again from time signals.

The output 411 of the frequency centre 52 and the output 431 of the electronic switch 43 are routed separately to the inputs of a transmission circuit 45 comprising amplification means 451 and 452 respectively for the continuous first local signal $S_i$ from circuit 520, and for the second local signals $S_{ij}$ supplied sequentially by the switch 43. The transmission circuit 45 also comprises a mixing and aerial tuning circuit 454 with an aerial 455 for reuniting the output signals of the amplification means 451 and 452, for thus continuously transmitting a wave $O_i$ having the specific frequency $Fs_i$, and waves $O_{ij}$ ($j = 1$ to 6) having the measuring frequencies in an interrupted and recurrent manner, according to the programme controlled by the circuit 44.

Figure 6:
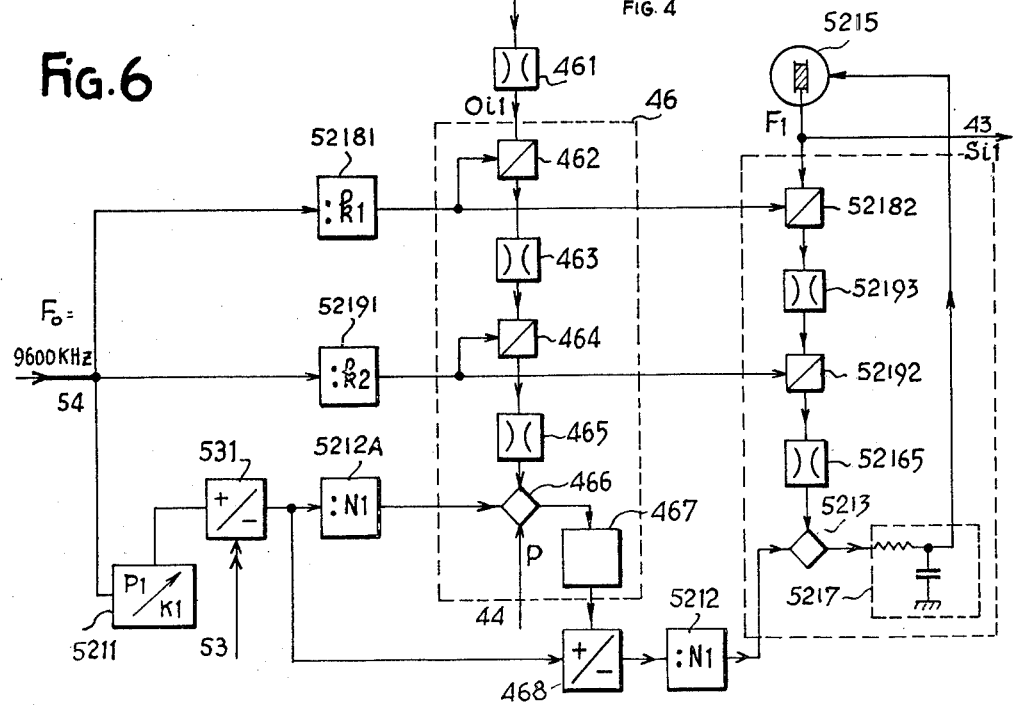
FIG. 6 illustrates the detailed diagram of an embodiment modification of the circuit 521 of FIG. 5.

For the embodiment of FIG. 6, the circuit 454 comprises in addition an output for supplying the signals proportional to the transmitted waves ($O_i$; $O_{ij}$), for example by means of a capacitor of low capacitance connected to the base of the aerial.

In FIG. 4, the switch 43 and the transmission circuit 45 are shown in an arrangement such that at the most a single measuring frequency is transmitted at each instant by a transmitting station. It is obviously also within the scope of the present invention to provide transmitting stations in which a number of measuring frequencies are transmitted at a time. Likewise, it is possible to provide a transmission programme in which, in the time interval separating two transmissions of an interrupted wave on the same measuring frequency by the same transmitting station, only some of the other measuring frequencies form the subject of a transmission of interrupted waves. As previously stated, the fundamental condition is that, for a given chain, there are never two transmitting stations which, at the same time, radiate a interrupted wave on the same measuring frequency.

Furthermore, FIG. 4 shows a transmission circuit 45 comprising only one aerial. In what follows, it should be understood that a modification of the invention consists in using two separate aerials for radiating respectively the continuous waves and the interrupted waves, or more generally, aerials of a number at the most equal to the maximum number of different frequencies capable of being transmitted simultaneously.

An example of a detailed embodiment of the frequency setting device 54 is illustrated in FIG. 24 and will be described later in the context of the receiver. It will merely be noted that it supplies a very stable frequency equal to 9.6 Mc/s for frequency values of group II and 5 Mc/s for frequency values of group I.

Figure 5:
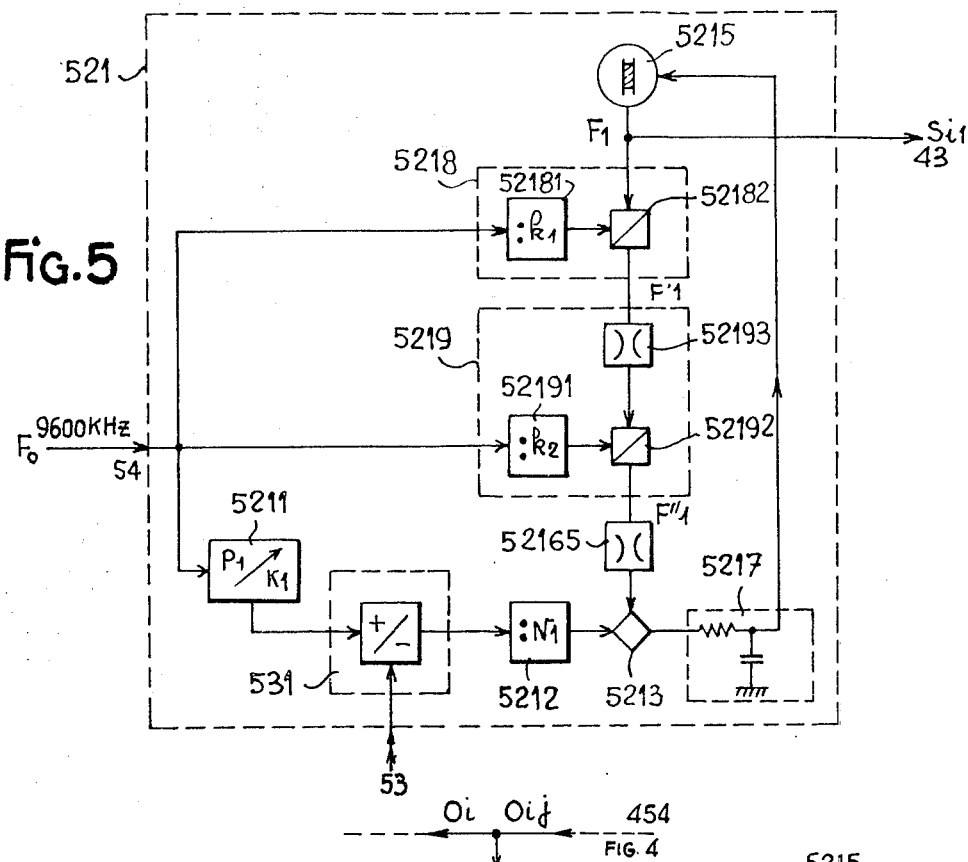
FIG. 5 is a detailed diagram of an embodiment of the circuit 521 of FIG. 4.

A detailed embodiment example of the circuit 521 of the frequency centre is illustrated in FIG. 5 and will be described in the following.

It will first be recalled that to obtain in a frequency centre a frequency of desired value with high stability, it is known to use an oscillator tuned to this desired frequency and to control it relative to a frequency source of high stability.

It is therefore necessary to compare a frequency derived from the oscillator concerned with a frequency derived from the frequency source. Currently, synthesisers are the most flexible means for making such a comparison. However, their output noise, taking into account the limitations on their input frequency, render them practically useless for the frequencies of the particular radio position fixing chain described in the foregoing, which frequencies range from 332 to 406 kc/s.

In appendix A to this specification, frequency-changing means are proposed for use at high frequencies taken from a predetermined range, with heterodyne frequencies derived from a single source of high stability.

In this appendix A of this specification there is described in particular a stage type of frequency changing comprising, on the one hand, means for dividing the frequency of a source of high stability for supplying a heterodyne frequency taken from successive multiples of a frequency value $f$, the value $f$ being associated with the frequency-changing stage, and on the other hand a circuit for mixing the input signal with the selected heterodyne frequency. Filtering means are possibly also provided.

The heterodyne frequency is taken from the said multiples such that the output signal of the mixing circuit has a frequency of between $f/2$ and $f$.

Preferably, the successive multiples of the frequency value $f$ associated with the frequency changing stage are selected from the multiples passing from the order 2 to the order 6; they therefore constitute a sub-group of the group of multiples $2.f$, $3.f$, $4.f$, $5.f$, $6.f$. It will be assumed that such is the case in what follows in the present description.

The equivalent of the frequency source of Appendix A of this specification is formed by the source 51 and the frequency setting circuit 54 of FIG. 4. On the contrary, the oscillators intended to process the frequencies to be transmitted ($Fs_i$ and $F_j$) must be considered as supplying input signals for the frequency changes described in the said Appendix A.

The signal supplied by each oscillator serves to control that oscillator. It is therefore desirable that each signal produced by an oscillator has its own frequency-changing route to avoid mixing two control magnitudes.

On the contrary, the source of the very stable frequency $F_o$ (circuits 51 and 54) is the same for all the signals of the oscillators. Each heterodyne frequency, for a frequency-changing route intended for a transmission frequency amongst $Fs_i$ and $F_j$, is given by a division factor of the frequency F.

The circuits such as 521 (FIGS. 4 and 5) producing the measuring frequency $F_1$ will now be considered again. It will be borne in mind that each transmitting station comprises six circuits of this type for the respective measuring freqencies $F_1$ to $F_6$, and another for a specific frequency $Fs_i$.

The value of the frequency to be transmitted is different for each of these circuits. The application of the teaching of Appendix A becomes clear on taking the whole of these circuits, although only the circuit intended for the measuring frequency $F_1$ will be described in detail with a view to simplification.

The predetermined frequency range containing the frequencies to be transmitted for the particular radio position-fixing chain extends for 332 to 406 kc/s.

It has been assumed that the upper limit of the predetermined frequency range is at the most equal to $6.f_1$, the value of freqency $f_1$ being associated with a first frequency changing stage. It is therefore necessary that the value of frequency $f_1$ should be at least equal to 406: 6 = 67.6 kc/s. By way of example, it will be assumed that the value of frequency $f_1$ is equal to 80 kc/s.

Consequently, multiples of the order of 4, 5 and 6 of the frequency $f_1$, that is to say heterodyne frequencies 320 kc/s, 400 kc/s and 480 kc/s, suffice to produce a first frequency change on any frequency selected from the predetermined range from 332 to 406 kc/s, by obtaining at the output of this first frequency-changing stage an output frequency comprised between 40 and 80 kc/s, the heterodyne frequency being selected from the above-mentioned multiples of $f_1$.

This selection explained in the aforesaid Appendix A is made as follows: the heterodyne frequency is selected to be equal to the multiple of $f_1$ which is the upper limit or lower limit of the interval in which occurs the selected frequency of the input signal of the change of frequency in the predetermined range depending on whether this selected frequency of the input signal is situated in the lower or upper half respectively of the said interval.

In FIG. 5, a first frequency-changing stage 5218 receives an input signal from an oscillator 5215 of the controlled type; this input signal should have a frequency equal to the measuring frequency $F_1$.

The heterodyne frequencies are derived from the frequency $F_o$ supplied by the frequency-setting circuit 54. This frequency $F_o$ is supposed to be equal to 9,600 kc/s. The frequency $F_o$ is applied to a divider-counter 52181 of the frequency changing stage 5218. The output of the divider-counter 52181 provides a heterodyne signal $H_1$ which is applied to a mixer 52182.

In the particular radio position-fixing chain of group II, the frequency $F_1$ applied to the input of the mixer 52182 has the value 332 kc/s. This frequency is situated in the first half of the interval $(4.f_1, 5.f_1)$, that is to say 320 kc/s to 400 kc/s. Consequently, the division factor $k_1$ of the divider-counter 52181 should be such that its output frequency $H_1$ is equal to the lower limit of this interval $(4.f_1, 5.f_1)$, namely 400 kc/s.

It will be immediately seen that for other values of input frequency to be transmitted, i.e. in the circuits such as 520, 522 and others, the heterodyne frequency may be equal to anoter multiple of the value of frequency $f_1$. The division factors $k_1$ of the respective first frequency-changing stages may be different, but the frequency $f_1$ associated with these first stages is always the same.

Consequently, for a freqency $f_1$ equal to 80 kc/s, it is necessary to have available at the output of circuit 54 a frequency $F_o$ making it possible, by frequency division to obtain multiples of the order of 4, 5 and 6 of the frequency $f_1$. The value of the frequency $F_o$ should therefore be equal to or a multiple of 4.8 Mc/s. It will be noted that the value of $F_o$ mentioned above, i.e. 9.6 Mc/s is perfectly suitable.

It will now be understood that whatever may be the frequency to be produced in the frequency group comprising a specific frequency $Fs_i$ (having a predetermined value of $i$) and the measuring frequencies $F_j$ ($j = 1$ to 6), a first frequency-changing stage such as 5218 having a heterodyne frequency selected as indicated in the foregoing from multiples of $f_1$ equal to 320 kc/s, 400 kc/s and 480 kc/s, supplies an output signal whose frequency lies between 40 and 80 kc/s.

Therefore, reverting to the circuit 521 of FIG. 5 concerning the measuring frequency $F_1$, the output frequency of the first frequency-changing stage 5218 is comprised between 40 and 80 kc/s. Of course, it is te same for all the first stages such as 5218 used respectively for processing the other frequencies to be transmitted. In present day technology, a frequency of between 40 and 80 kc/s cannot be supplied with acceptable noise by the output of a synthesiser followed by a frequency divider, that is why the circuit 521 of FIG. 5 comprises a second frequency-changing stage 5219 comprising in the same way as the first a divider-counter 52191, a mixer 52192 with in addition the filter 52193. In manner known per se, the filter 52193 allows the passage to the mixer of stage 52192 of only the useful signal for this frequency-changing stage. It will be noted that there is normally no frequency image problem in the devices of FIG. 5, because the input signal is a pure sinusoidal local signal, contrary to what was the case in Appendix A.

Taking into account the frequency range of 40 to 80 kc/s and the possibilities of the synthesisers, the second frequency-changing stages such as 5219 are associated for example with a frequency value $f_2$ equal to 16 kc/s, that is to say one-fifth of the maximum of the frequency range. Other frequency values $f_2$ for the second stage are given in Appendix A hereto, regarding which it will be remarked that the numerical values defining the frequency ranges of the successive frequency-changing stages are the same as in the present specification.

In the present case, the division factor $k_2$ of the counter-divider 52191 is selected for supplying one of the multiples of the order of 4 and 5 of the frequency $f_2$ equal to 16 kc/s. These multiples are 64 kc/s and 80 kc/s.

It has been previously seen that the frequency $F_1$ is equal to 332 kc/s, and that the heterodyne frequency of the first stage 5218 of FIG. 4 is equal to 400 kc/s. It therefore occurs that the frequency $F_1{'}$ of the useful output signal of the first stage 5218 is equal to 68 kc/s.

The value of frequency $f_2$ associated with the second frequency-changing stage is 16 kc/s; the multiple $4.f_2$ is equal to 64 kc/s, whereas the multiple $5.F_2$ is equal to 80 kc/s. The input frequency of the second stage 5219, which is equal to 68 kc/s, is in the lower half of the interval $(4.f_2, 5.f_2)$. The heterodyne frequency of the second stage 5219 is therefore equal to the upper limit $5.f_2$ of this interval, i.e. 80 kc/s. The division factor $k_2$ of the counter-divider 52191 is then equal to 120, the frequency to be applied to it being 9.6 Mc/s.

Under these conditions, the frequency signal $F_1{''}$ available at the output of stage 5219 (or at the output of the filter 52165 which follows immediately this second stage), has, therefore, a frequency equal to 12 kc/s; generally, the output frequency of the second stages such as 5219 is between 8 and 16 kc/s.

The frequency $F_1'' = 12$ kc/s is applied to a detector 5213, the function of which is frequency difference detection and which is in the form, for example, of a phase detector. The other input of the detector 5213 receives a signal supplied from the frequency $F_o = 9.6$ Mc/s by a synthesiser 5211 followed by a counter-divider 5212.

A synthesiser possesses by constuction a characteristic number K and is capable of supplying at its output a multiple of order $p$ of the sub-multiple of order K of the frequency $F_o$ applied to its input. Such a synthesiser may be used in two ways: either preregulated, in which case the order of the multiple $p$ is fixed by construction of the circuit, or the order of the multiple $p$ is adjustable in a controlled manner, for example in response to numerical information.

The maximum value of the frequency $F''$ capable of being applied to the detector 5213 is 16 kc/s. The division factor of the divider-counter 5212 is therefore advantageously selected equal to 600, such that maximum regulation of the synthesiser 5211 enables a frequency, which is equal to 16 kc/s, to be obtained from the frequency $F_o = 9.6$ Mc/s.

The frequency $F_1''$ is equal to 12,000 c/s. From this value follows the preadjustment of the number $p_1$ of the synthesiser 5211, so that a frequency equal to 12,000 c/s will be available at the output of the divider-counter 5212.

On the contrary, the characteristic number $K_1$ common to synthesisers suc 5211 depends on the resolution with which the frequencies to be transmitted ($Fs_i$ and $F_j$) are defined. Among the frequencies of group II, the measuring frequencies $F_j$ are all multiples of 250/16 c/s. It follows that the number K1 of the synthesisers allotted to the measuring frequencies is equal to $16000/250 = 64$, while the number K1 of the synthesisers allotted to the specific frequencies is equal to $64 \times 16 = 1024$.

For frequencies of group I, the number K1 of the synthesisers is much higher, the values indicated being multiples of 0.001 c/s.

The output of the detector 5213 is applied by means of a time constant circuit 5217 for controlling the oscillator 5215 such that the measuring frequency $F_1$ is connected to the very stable frequency F.

The output signal of the oscillator 5215 is used for supplying the measuring frequency $F_1$. It is furthermore known that each measuring frequency such as $F_1$ is subject to phase displacement in a circuit 531 before transmission. As shown in FIG. 5, the phase-shifting circuit 531 consists simply of a +/− box inserted between the synthesiser and the counter-divider 5212. The phase-shifting operation of the +/− box is due to the division factor N1. The output signal of the oscillator 5215 is transmitted directly to the switching circuit 43 as second complex signal $S_{t1}$.

The control input of the +/− box receives phase control signals transmitted by a line 53. By means of the +/− box, it is possible to add or subtract (by inhibition) pulses to or from those supplied by a frequency source. The +/− box is advantageously constructed as indicated in FIGS. C7 to C9 of Appendix C. The output of the synthesiser of FIG. 5 corresponds to the HORLOGE (TIME) lines of FIGS. C7 and C9 of Appendix C.

A table will now be given summarising the embodiment of the circuits of the frequency centre of a transmitting station with the frequency values of the particular radio position-fixing chain of group II described in the foregoing. For the frequency values of group I, only the numbers $p$ and K, characteristics of the synthesisers, have been modified.

| kc/s | 1st stage $f_1 = 80$ kc/s | | | 2nd stage $f_2 = 16$ kc/s | | 3rd stage synthesiser |
|---|---|---|---|---|---|---|
| | $4f_1$ 320 kc/s | $5f_1$ 400 kc/s | $6f_1$ 480 kc/s | $4f_2$ 64 kc/s | $5f_2$ 80 kc/s | |
| $F_o = 9600$ | :30 | :24 | :20 | :150 | :120 | $N_1 = 600$ |
| $Fs_i (i = 2)$ 405.796875 | | * | | * | | $K_1 = 1024$ $p_1 = 653$ |
| $F_1$ 332 | | * | | | * | $K_1 = 64$ $p_1 = 48$ |
| $F_2$ 406 | | | * | * | | $K_1 = 64$ $p_1 = 40$ |
| $F_3$ 392 | * | | | * | | $K_1 = 64$ $p_1 = 32$ |
| $F_4$ 403 | | | * | * | | $K_1 = 64$ $p_1 = 52$ |
| $F_5$ 405.250 | | | * | * | | $K_1 = 64$ $p_1 = 43$ |
| $F_6$ 405.750 | | | * | * | | $K_1 = 64$ $p_1 = 41$ |

The first column of this table relates on different lines to the frequency values to be transmitted. Only a single specific frequency $Fs_i$ equal to 405.796 875 kc/s ($i=2$) has been considered. The values for the other transmitting stations are easily deduced therefrom (only the number $p$ changes).

The second column illustrates the heterodyne frequency (multiple of the value $f_1 = 80$ kc/s), which is selected from the three possibilities $4.f_1$, $5.f_1$, $6.f_1$ for the first frequency changing stages allocated to the different frequency values to be transmitted. The third column illustrates the heterodyne frequency (multiple of the value $f_2 = 16$ kc/s) which is selected from two possibilities $4.f_2$, $5.f_2$ for the second frequency changing stages allocated to the different frequency values to be transmitted.

The fourth column concerns presetting of the number $p$ of the synthesiser supplying the frequency applied to the detector such as 5213 according to the different frequency values to be transmitted. Each frequency supplied by the synthesiser followed by a divider may be considered as the heterodyne frequency of a last frequency changing stage of the second type according to Appendix A of this specification.

The arrangements of FIG. 5 enable all the frequency changes to be made for the controls of the different oscillators supplying the frequencies to be transmitted, from a single frequency source $F_o$. However, since a phase correction is advantageously effected in addition to the frequency correction in the circuit 54, it may serve for one of the frequencies to be transmitted, advantageously for the specific frequency $Fs_i$. That is why, in FIG. 4, no phase-shifter is shown in line 411, upstream of the circuit 520. In constructing the circuit 520 in accordance with FIG. 5, therefore it is possible in some cases not to use a phase-shifter such as the +/− box 531 of FIG. 5. The table given above illustrates clearly that, in each transmitting station, for seven different frequencies to be transmitted, five frequency dividers suffice for supplying the heterodyne frequencies of all first and second frequency synthesiser-divider assemblies.

With the circuits considered in FIGS. 4 and 5, from the output of the source 51, the signals are in the form of square-wave signals or pulses, whose descending front for example corresponds to a characteristic instant of the period of a sinusoid. The shaping and filtering of these pulsed signals for obtaining square-wave signals, then sinusoidal waves at the aerial level are regarded as known by the person versed in the art, and it should be understood that the circuit 45 is the symbolic diagram or block diagram of the means employed for this purpose.

FIG. 6 illustrates an advantageous modification of a transmitting station according to the invention, in the form of complements to the circuits 521 and 531 of FIG. 5. All the elements of FIG. 5 will be found in FIG. 6 with the same references.

In addition, the output of the +/− box 531 is connected to the divide-by-$N_1$ counter 5212, by means of another +/− box 468. Another divide-by-$N_1$ counter 5212A is connected directly to the output of the +/− box 531. It will also be noted that the divider-counters 52181 and 52191 of FIG. 5 are situated on the left of FIG. 6, while the mixers 52182 and 52192, the filters 52193 and 52165 and the phase detector 5213 are arranged in a dashed-line box on the right of FIG. 6.

The elements identical with those of this latter box are arranged in another box 46 in dashed lines in the middle of the figure, respectively the mixers 462 and 464, the filters 463 and 465, and the phase detector 466.

The signals proportional to the waves $O_i$ and $O_{ij}$, coming from the circuit 454 of FIG. 4, are applied to a filter 461, which isolates the signal $O_{i1}$ having the measuring frequency $F_1$ corresponding to the circuit 521.

The signal $O_{i1}$ at the frequency $F_1$, coming from the aerial, therefore undergoes in the dashed-line box 46 exactly the same treatment as the signal at frequency $F_1$ of the oscillator 5215 in the dashed-line box on the right. However, the phase detector 466 has an inhibition input P connected to the programme circuit 44 and its output is connected to the circuit 467, which responds to the output of the phase detector 466 for controlling the +/− box 468 so as to cancel the detected phase difference.

Of course, for the signal $O_i$ (circuit 520), there is no inhibition of the phase detector such as 466. It is even possible, as a modification, to suppress completely the frequency changes on the source 5205 (such as 5215).

When the wave $O_{i1}$ is not radiated, the programme circuit 45 inhibits the phase detector 466, the +/− box 468 allows an unchanged signal to pass, and the circuit of FIG. 6 functions like that of FIG. 5.

On the contrary, during the transmission of the wave $O_{i1}$ (taking into account the transient conditions), the circuits situated in the box 46 react by means of the +/− box 468 on the oscillator 5215, such that the wave $O_{i1}$ itself is controlled directly by the frequency F from the circuit 54. The condition to be observed is a constant phase difference at the phase detector 466.

The circuitry of FIG. 6 makes it possible to reduce the residual instability of the transmitted frequencies (due in particular to the switching operations), relative to the frequency-setting circuit 54. Th representative signals of the waves $O_i$ and $O_{ij}$ may be obtained in numerous other ways, for example by an auxiliary aerial arranged in the vicinity of the principal aerial of circuit 454.

With reference to FIGS. 4 and 5, a transmitting station was described comprising a frequency setting circuit 54 and phase-shifting circuits 531 and 532. The scope of the present invention also includes the provision of a transmitting station comprising a single free oscillator without frequency setting circuit or phase-shifting circuit. It is also possible to provide a transmitting station with frequency setting circuit 54 and without phase-shifting circuits, such as 531 and 532.

On these different modifications depend on the one hand stability required for the free oscillator 51, and on the other hand, the mode of operation of the listening stations, such as R in FIG. 1, as will now be explained.

In the case (not shown) where there is no frequency setting circuit 54 or phase-shifters 531 to 536, the measuring frequencies are supplied directly from the source 51 through the frequency centre 52. Each listening station receives at least the sequential waves originating from a number of transmitting stations and supplies, preferably by retransmission, information on the relative phases of these sequential waves $O_{ij}$ ($i$ variable) for each of the measuring frequencies $F_j$. To the extent that each listening station is fixed relative to the transmitting stations which it receives, these phase measurements are not affected by any Doppler effect, and serve as reference to take into account the stability of the oscillators of the transmitting stations, and possibly certain propagation disturbances.

The reference information on the relative phases is transmitted in any adequate manner, with a geographical range substantially equal to that of the transmitting stations concerned (bisignal method of radio position-fixing).

Under these conditions, the choice of the intrinsic stability of the free oscillator for each transmitting station depends essentially on the period of the transmission programme of the sequential waves, while taking into account the desired precision for position determination.

In the case (also not shown) where only one frequency setting circuit 54 is used, the stability required for the source 51 is less good to the extent of the possibilities of correcting the frequency of that source. In fact, once the frequency setting of all the transmitting stations has been effected by the circuit 54, the specific and measuring frequencies may be regarded as equivalent to those provided in the preceding case. Each listening station may then still operate in the manner described in the foregoing for phase reference information (bisignal method).

Finally, in the case where the transmitting stations comprise a frequency setting circuit 54 and phase-shifters 531 to 536, the listening stations such as R (FIG. 1) also make frequency measurements or comparisons on the continuous waves $O_i$ having the specific frequencies, in addition to measurement of the difference in phase between the interrupted waves $O_{ij}$ having each measuring frequency $F_j$ supplied by the different transmitting stations $E_i$ (A,B,C in FIG. 1 for example). Very advantageously, the listening stations then comprise a receiver of the present invention hereinafter described.

The frequency-setting control by the lines 55 of FIG. 1 acts on a circuit 54 of each transmitting station. The correction magnitude is evaluated either by comparison of the specific (or measuring) frequencies of the transmitting stations one with another, or with respect to a frequency standard, which may be provided at the level of a listening station, or with respect to the mean of the real frequencies radiated by a certain number of transmitting stations, or by a weighted combination of all or part of these various pieces of information. The frequency setting control is carried out by any known means such that the ratio of the real value to the nominal value of each specific frequency $Fs_i$ is the same for all the transmitting stations of the chain.

From phase difference measurements, the control by lines such as 53 (FIG. 1) of phase-shifters such as 531 to 536 of each transmitting station for obtaining known phase relations, advantageously fixed, may be effected either relative to one of the transmitting stations, taken as master, or relative to an absolute reference standard connected to the listening stations either with respect to a mean of these phase measurements or by a weighted combination of all or part of these various pieces of information.

The advantage of this latter type of transmission (monosignal) is that it is not necessary to transmit phase reference information unless the required stabilities are extremely high.

The Applicants have found that in this latter case a free oscillator 51 having a stability of $10^{-8}$ enables satisfactory results to be obtained.

If the table giving group II of the measuring frequencies is examined again, it appears that the frequencies used, considered from the standpoint of frequency allocations, are in the number of four pure frequencies and a band of 250 c/s between 405 750 and 406 kc/s.

It will later be seen that the use of continuous waves for reception produces a considerable reduction in the bandwidths necessary for the reception of the interrupted signals. If the frequencies selected are of the order of 400 kc/s, the necessary bandwidth is less than 0.1 c/s.

When the transmission frequencies are of the order of 400 kc/s (several hundreds of kc/s), taking into account the extreme narrowness of the bandwidth a radiated power very much less than 1 watt is sufficient to obtain at sea useful ranges of 400 km by night and 800 km by day.

The transmitting stations are advantageously distributed along a coast, the distance between two neighbouring transmitting stations being, for example, between 100 and 300 km.

The lowest sensitivity obtained by difference of the frequencies $F_2$ and $F_6$ corresponds to a frequency of 250 c/s in group II, and therefore to a wavelength of about 1,200 km. It is known to the person skilled in the art that to be able to suppress ambiguity, the wavelength corresponding to the lowest sensitivity should be at least double the distance between two transmitting stations used conjointly. This distance ought therefore to be at the most equal at 600 km. The above-mentioned measuring frequencies thus permit total removal of ambiguity, for example in the manner described later.

Furthermore, a frequency band of about 14 c/s exists between two adjacent specific frequencies. However, the frequency band on reception is less than 0.1 c/s as we have seen above.

Starting from the particular radio position-fixing chain, whose frequency values have been given above, it is possible to construct other different chains by proportionally modifying all the frequencies transmitted to arrive at differences of about 3 c/s for example.

It will be noted that the transmitting equipment may be readily adapted by the circuit 54 of the free oscillator 51, which serves as base for all the frequencies. As will be seen in the following, the same applies to the receiving equipment.

The general structure of the receiver according to the present invention will now be described with reference to FIG. 7.

Generally, this radio position-fixing receiver comprises on the one hand for receiving the continuous waves:

— a first generating circuit 61 for generating continuously N' complex first local signals $S_k'$, whose respective complex frequencies $Fs_k'$ have nominal values equal to those of the selected specific frequencies $Fs_k$, comprising means for the independent modification of the real frequency $Fs_k'$ of each of the complex first local signals in the vicinity of its nominal value, — a first synchronous receiving circuit 62 for the continuous waves $O_k$ having the said specific frequencies $Fs_k$ selected by means of the first corresponding local signals $S_k'$, supplying the respective specific frequency residues $R_k'$, — a first frequency control circuit 63 responding to the specific frequency residues $R_k'$ and connected to means for modification of the frequency of each of the first complex local signals $S_k'$ for causing the real frequencies $Fs_k'$ of the said first complex local signals $S_k'$ to be equal to the frequencies of the corresponding continuous waves $O_k$ as received.

These first circuits concern the continuous waves $O_k$ received on the selected specific frequencies $Fs_k$. It should be understood that each receiver is capable of treating N' specific frequencies $Fs_k$ among the available N specific frequencies $Fs_i$, where the said N' frequencies may be any of the N specific frequencies. In what follows, a receiver capable of treating N' predetermined specific frequencies will first be described.

On the other hand, concerning the reception of the interrupted waves, the receiver according to the invention comprises:

— a second generating circuit 64 connected to the first generating circuit for generating, in correspondence with each first complex local signal $S_k'$, a number n' comprised between 1 and n of second complex local signals $S_{km}'$, whose respective complex local frequencies $F_{km}'$ have nominal values equal to those of n' measuring frequencies $F_m$ selected from the n measuring frequencies $F_j$ each measuring frequency $F_{km}'$ being compelled to be proportional to the controlled frequency $Fs_k'$ corresponding to the same specific frequency $Fs_k$, according to a proportionality ratio equal to the ratio of the nominal values of the corresponding measuring frequency $F_m$ and of the specific frequency $Fs_k$, the second generating circuit comprising means for modifying the phase of each second local signal $S_{km}'$, — a programme circuit 65 capable of supplying utilisation control signals $P_{km}$ of each interrupted wave $O_{km}$ received on a measuring frequency $F_m$ and corresponding to a specific frequency $Fs_k$, such that each utilisation control of a interrupted wave $O_{km}$ is situated temporarily within a transmission time interval of the said interrupted wave, — a second synchronous receiving circuit 66, connected to the programme circuit 65, for the interrupted waves $O_{km}$ having the said selected measuring frequencies $F_m$, capable of effecting synchronous reception of each interrupted wave $O_{km}$, by means of the corresponding second local signal $S_{km}'$, in a manner controlled by the corresponding utilisation control signal $P_{km}$, and of supplying respective interrupted phase residues $R_{km}'$, corresponding to each second local signal $S_{km}'$;

— a second phase control circuit 67 receiving the interrupted phase residues $R_{km}'$, and connected to the means modifying the phase of each of the second complex local signals $S_{km}'$ for compelling the phases of these second complex local signals $S_{km}'$ to be equal to the phase of the interrupted waves $O_{km}$ as received, except for a phase constant, which is the same for all the second local signals $S_{km}'$ corresponding to the same measuring frequencies $F_m$.

The interrupted waves $O_{km}$ each correspond to a transmitting station having a particular specific frequency $Fs_k$. The programme circuit is used for re-establishing on reception the correspondence between each interrupted and repetitive wave $O_{km}$ of frequency $F_m$ and the specific frequency allotted to the station transmitting the said wave.

Advantageously, the receiver comprises a circuit 68 for treating the phases of the second complex local signals $S_{km}'$. In fact, these second local signals have relative phases which are representative of ambiguous information of hyperbolic position-line of the receiver relative to the transmitting stations.

Figure 7:
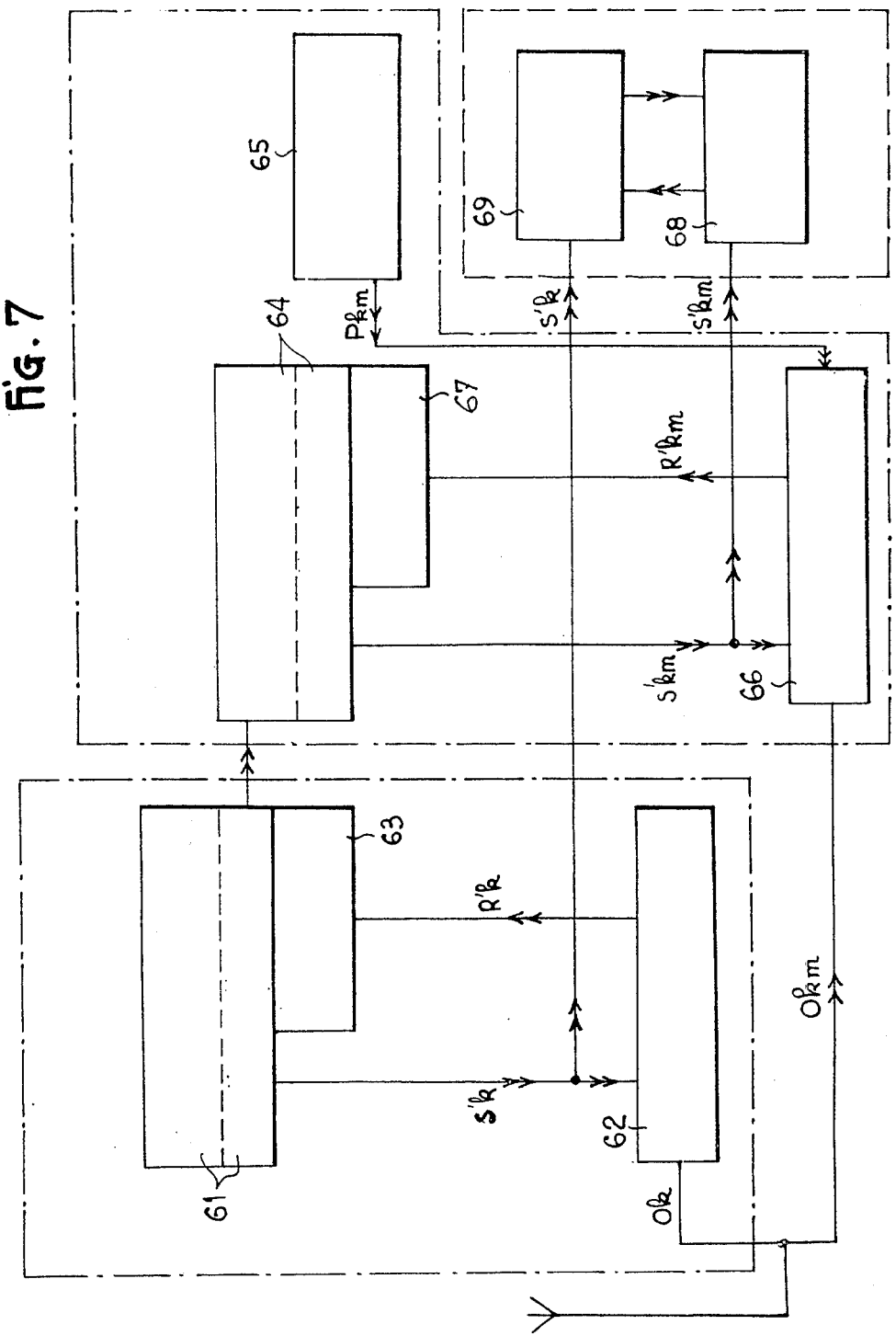
FIG. 7 is the general basic circuit diagram of a radio position-fixing receiver according to the invention.

According to the invention, information on the variations in relative distance is obtained from first local signals $S_k'$ in the circuit 69 of FIG. 7.

Different embodiments will be described further on of the ambiguity suppressing device, which supplies position information calculated from the phases of the second complex local signals, these phases being periodically re-adjusted during a reception of the corresponding interrupted wave.

On its part, the circuit 69 supplies position-line information obtained permanently by integration from the variations extracted from pairs of first local signals $S_k'$. The values of this position-line information of circuit 69 are compared periodically (for example in the circuit 68) with the values calculated from corresponding measured phases. The position-line information of circuit 69, which is output information, is corrected to cancel the deviation given by the comparison, with a time constant of greater or lesser value, depending on the operational needs.

In all the preferred embodiments which will be described in detail in the following, use is made of frequency changes for synchronous reception.

There will now be described a first receiver embodiment, in which the values of the frequencies $Fs_i$ and $F_j$ are those of the first group previously defined.

In this first receiver embodiment, each of the first and second complex signals (S'), whose frequency will be denoted generally by the discrete variable F, comprises a complex component (G') of nominal frequency substantially equal to $(1 - x) F$, and a unique component (g') of nominal frequency substantially equal to $x.F$, the coefficient $x$ being the same for all these signals. It is evident that the complex component G' can comprise only one component signal in the case where only one frequency change is made.

As will be seen in the following, the coefficient $x$ is of low value compared with unity, for example $10^{-5}$. In the relations between frequencies of this description, the word substantially signifies that equalities are realised according to the precision selected for position-fixing, taking into account the technological possibilities of the electronic circuits.

The unique components g (or $xF$) of the first and second complex local signals are therefore between themselves in proportionality relationships which substantially respect the proportionality relationships existing between the complex frequencies themselves, hereinbefore denoted by the generic variable F.

The first particular preferred embodiment of receiver is illustrated by the basic diagram of FIG. 8, to which reference will now be made.

Figure 8:
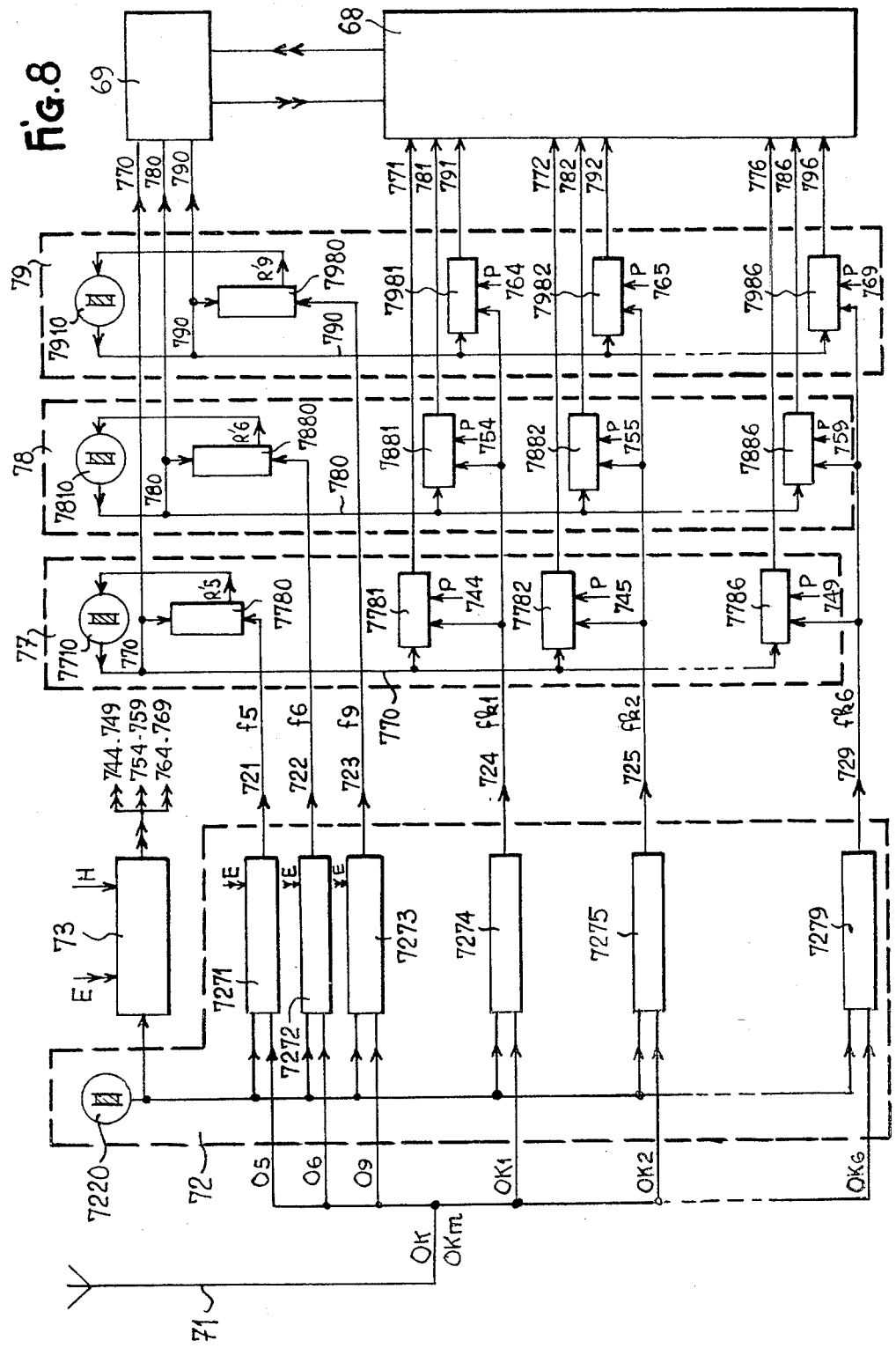
FIG. 8 is the basic circuit diagram of a first embodiment of a receiver according to the invention.

FIG. 8 shows a complete diagram of the receiver which comprises a first frequency source 7220, and three second frequency sources 7710, 7810 and 7910, each consisting for example of a quartz oscillator.

In FIG. 8, the aerial 71 of the receiver is connected to a frequency changing circuit 72. This circuit produces a frequency change of all the frequencies received, that is to say, of the continuous waves $O_k$ having the selected specific frequencies $Fs_k$ and of the interrupted repetitive waves $O_{km}$ having the selected measuring frequencies $F_m$. The heterodynes are the complex components $G_k'$ and $G_{km}'$ respectively associated with the complex local signals.

These components $G_k'$ and $G_{km}'$ are generated from the frequency source 7220 of the frequency changing circuit 72. Three frequency changing channels 7271 to 7273 are used for the continuous waves $O_k$ having the selected specific frequencies $Fs_k$ (in FIG. 8, it is assumed that the indices k have for these channels the respective values 5, 6 and 9 in a manner controlled at the inputs E). The channels 7271 to 7273 therefore receive respectively the waves $O_5$, $O_6$ and $O_9$ from the aerial 71, and also each receive the signal from the source 7220 for producing the corresponding heterodynes $G_k'$ (it should be noted that the selection of these waves $O_5$, $O_6$, $O_9$ from the continuous waves $O_k$ received, is effected by filters in the channels 7271 to 7273). The outputs of the channels 7271 and 7273 are the lines 721 to 723 of FIG. 8. These lines transmit the signals derived from the waves $O_5$, $O_6$ and $O_9$ after frequency changes, the said signals being denoted respectively by the symbols $f_5$, $f_6$ and $f_9$.

The sequential waves $O_{km}$ having the measuring frequencies $F_m$, received by the aerial 71, are not distinguished relative to the specific frequency $Fs_k$ to which they correspond, that is to say to the index $k$ of the transmitting station generating them. The signals picked up by the aerial 71 on the measuring frequencies $F_1$ to $F_6$ will therefore be denoted by the symbols $O_{k1}$ to $O_{k6}$.

The circuit 72 comprises frequency changing channels 7274 to 7279 respectively for the waves $O_{km}$, that is to say $O_{k1}$ to $O_{k6}$, the distinction according to the value of the index $m$ being made in the interior of these channels. Each of these channels receives the signal from the source 7220 for producing the corresponding heterodynes $G_{km}'$. The channels 7274 to 7279 have respective outputs 724 to 729 supplying sequential signals $f_{k1}$ to $f_{k6}$ derived from the sequential waves $O_{km}$ after frequency changes.

FIG. 8 also shows the programme circuit 73 which on the one hand has an input for receiving high-frequency time signals, for example from the source 7220. The programme circuit 73, on the other hand, has an input H for timing the programme and an input E (which may comprise a number of conductors) for selecting the transmission stations, that is to say, the specific frequencies. This programme circuit 73 comprises a plurality of output lines P, one line per output $P_{km}$ associated with both a selected specific frequency $Fs_k$ and a measuring frequency $F_m$. These output lines are connected to individual phase detection circuits each for supplying a signal $P_{km}$ (same reference as the line) for the utilisation control of a sequential wave $O_{km}$ having a measuring frequency $F_m$ coming from a transmitting station $E_k$, therefore associated with a selected specific frequency $Fs_k$.

The outputs 721 to 723 of the circuit 72 transmit the signals $f_5$, $f_6$ and $f_9$ to respective control circuits 77, 78 and 79. Each of these control circuits also receives the signals $f_{km}$ from the output lines 724 to 729 of circuit 72. As mentioned above, these signals $f_{km}$ are available on different lines for the different values of 1 to 6 of the index $m$, without distinction of each line according to the index $k$. On the contrary, each control circuit is associated with a selected specific frequency and effects the first control (in frequency) and the corresponding second controls (in phase).

For that reason, the lines 724 to 729 are sent to each control circuit 77 to 79. On the other hand, the control circuits 77 to 79 receive respectively the lines 721 to 723.

The control circuits 77 to 79 each have the function of carrying out:

— a first frequency control by using the unique components $g_k'$ of the one $S_k'$ of the first local signals for synchronous detection with the continuous signal $f_k$ concerned;

— second phase controls by using the unique components $g_{km}'$ ($k$ fixed; $m$ variable) of the second local signals $S_{km}'$ of the same index $k$ for respective synchronous detections with the corresponding interrupted signals $f_{km}$, correspondence being put into concrete form by the signals $P_{km}$ of the programme circuit.

The programme circuit 73 is so arranged as to supply for each interrupted wave corresponding to a selected specific frequency (which selection is materialised on the input line E of circuit 73) a utilisation control signal $P_{km}$, comprised in the interior of the time interval during which the said interrupted wave $O_{km}$ is transmitted. The transmission programme being periodical, it is easy for the person skilled in the art to produce such a circuit. Each utilisation control signal is advantageously delayed relative to the commencement of the wave $O_{km}$ to take into account the transient conditions occurring at the commencement of the transmission and above all at the commencement of the reception, of the interrupted waves, as well as of the possible programme displacements.

The programme circuit comprises three output pluralities: a plurality 74 of outputs 744 to 749, connected to the control circuit 77, a plurality 75 of outputs 754 to 759, connected to the control circuit 78 and a plurality 76 of output 764 to 769, connected to the control circuit 79.

The circuits 77, 78 and 79 of FIG. 8 each comprise a respective second source 7710, 7810 and 7910. Each of these second sources is associated with a selected specific frequency $Fs_k$, and is used for generating the unique component $g_k'$ (of the nominal frequency $x.Fs_k$) of a first complex local signal $S_k'$ and the unique components of $g_{km}'$ (of nominal frequency $x.F_m$) of the second complex local signals $S_{km}'$ associated with the same specific frequency $Fs_k$. The circuits 77, 78, 79 being furthermore of identical conception, only circuit 77 will be described with reference to FIG. 8.

In the control circuit 77, the second source 7710 supplies on a line 770 a signal which is transmitted more particularly to a synchronous detection channel 7780. In the interior of this channel 7780, the unique component $g_5'$ of the first local signal $S_5'$ corresponding to the specific frequency $Fs_5$ is produced. The synchronous detection channel 7780 receives by the line 721 the aforesaid signal $f_5$, derived after frequency changes from the permanent wave $O_5$ having the specific frequency $Fs_5$. The output of channel 7780 supplies a residue $R_5'$ for reacting on the second source 7710, such that the said unique component $g_5'$ has exactly the same frequency as the signal $f_5$.

In this way, the second source 7710 is continuously controlled in frequency relative to the signal $f_5$.

If we now consider the first complex signal $S_5'$ comprises a complex component $G_5'$ produced in the frequency changing channel 7271 and a unique component $g_5'$ processed in the synchronous detection channel 7780, it appears that the first complex signal $S_5'$ in its entirety is set in frequency relative to the continuous wave $O_5$ as received, by means of the reception channel consisting of the frequency changing channel 7271 and the synchronous detection channel 7780.

The waves $O_{k1}$ to $O_{K6}$ received, having respectively the measuring frequencies $F_1$ to $F_6$ form the subject of frequency changes with the heterodyne frequencies taken from the first source 7220, just like the continuous waves $O_k$ having the specific frequencies $Fs_k$. Consequently, the complex components $G_{km}'$ ($m = 1$ to 6) of the corresponding second complex local signals have frequencies which are in a relation of proportionality, expressed in the form of a rational number, with respect to the frequencies of the complex components $G_k'$ occurring for the continuous waves $O_k$ having the selected specific frequencies $Fs_k$.

As explained in the foregoing, if the same proportionality relation according to the coefficient $x$ is respected in the control circuits 77 to 79 both for the unique components $g_k'$ and for the unique components $g_{km}'$, the unique components $g_{km}'$ of the second complex local signals $S_{km}'$ are set in frequency relative to the sequential waves $O_{km}$ as soon as the second source associated with the specific frequency $Fs_k$ concerned is set in frequency relative to the continuous wave $O_k$ having the said specific frequency $Fs_k$.

We shall now continue the description of the circuit of FIG. 8 in so far as concerns the reception (synchronous detection) of the sequential waves $O_{5m}$ having the measuring frequencies $F_m$ ($m$ varying from 1 to 6), considering first of all the wave $O_{5,1}$.

The second source 7710 is connected by the line 770 to a synchronous detection and phase control channel 7781 associated with the measuring frequency $F_1$, and the sequential wave $O_{5,1}$. The unique component $g_{5,1}'$ is produced in the circuit 7781. The instance at which the sequential wave $O_{5,1}$ is used are controlled by the signal $P_{5,1}$ on the line 744 coming from the programme circuit 73. When the line 744 is activated (for example $P_{5,1}$ is present), the signal $f_{k1}$ present on the line 724 corresponds to the wave $O_{5,1}$, that is to say the signal $f_{5,1}$ is concerned. Therefore, when the line 744 is activated, the circuit 7781 supplies at its output 771 a unique component $g_{5,1}'$ controlled in phase relative to the signal $f_{5,1}$.

Preferably, the duration of activation of the line 744 is less than the duration of the sequential signal $f_{5,1}$, in order to eliminate the influence of transient conditions and possible deviations in the timing of the reception programme circuit.

When the line 744 is not activated, the phase control is blocked at the last value used, and the signal present on the line 771 is then governed only by the second source 7710, and therefore follows the frequency variations of the continuous wave $O_5$ coming from the same transmitting station $E_5$ as the sequential wave $O_{5,1}$.

There is thus obtained on the line 774 a continuous signal having the same quality of radio position-fixing information as that which the sequential wave $O_{5,1}$ would supply if it were transmitted continuously.

It is pointed out that the second complex signal $S_{5,1}'$ is continuously set in frequency from the second source 7710; it is periodically monitored and if necessary adjusted in phase relative to the sequential wave $O_{5,1}$ by means of the reception channel formed by the frequency changing channel 7274 and the synchronous detection channel 7781.

The circuits 7782 and 7786 function in the same way as the circuit 7781, but for the sequential waves $O_{5,2}$ to $O_{5,6}$, in response to the signals of programmes $P_{5,2}$ to $P_{5,6}$ of the lines 745 to 749, respectively. The outputs of these circuits are the lines 772 to 776, respectively.

The control circuits 78 and 79 function in the same way as circuit 77, but they are respectively associated with two other specific frequencies, which in FIG. 8 have the indices $k$ equal to 6 and 9, respectively.

It will be remarked that in the embodiment shown in FIG. 8, the complex components $G_{ki}'$ of the complex local signals $S_{k1}'$ are generated independently of the index $k$. The sequential waves $O_{k1}$ are distinguished with regard to the transmitting station of origin, that is to say the index $k$ only as from the synchronous detection and phase control channels such as the circuit 7781. Since the frequency changes $G_{km}'$ are common for all the sequential waves $O_{km}$ corresponding to the same measuring frequency $F_m$, direct comparison of the phases of the unique components $g_{km}'$ available at the output of the synchronous detection and phase control channels is therefore identical by construction with a phase-difference measurement between the waves $O_{km}$ as they would be received if they were continuous and if it were possible to distinguish them and do this for each value of the index $m$.

It appears that the above-mentioned first and second generating circuits comprise common parts. These common parts comprise more particularly the first source 7220 and the second source such as 7710. Each first local signal $S_k'$ comprises a high-frequency component $G_k'$ (possibly true complex) produced from the first source 7220, and a low-frequency unique component $g_k'$ produced from one of the second sources such as 7710. Each second local signal $S_{km}'$ comprises a high-frequency component $G_{km}'$ (possibly true complex) produced from the frequency source 7210 independently of the specific frequency $Fs_k$, therefore of the value of the index $k$ with which it is associated, and a low-frequency unique component $g_k'$ produced from one of the second frequency sources, such as 7710, according to the selected specific frequency $Fs_k$ with which it is associated.

We shall now describe detailed embodiment diagrams of certain elements of FIG. 8.

FIGS. 9 and 10 illustrate respectively the frequency changing channel 7271 and associated synchronous detection channel 7780. These two figures have been regrouped to bring out better all the components of the first complex local signal $S_5'$ and their use in the reception channel.

The frequency changing circuit 72 comprises the signal source 7220, called first source, advantageously formed by a quartz oscillator, and adapted to supply square-wave or pulsed signals, such that for example their descending front corresponds to a characteristic instant of the sinusoidal period.

In the detailed embodiment of FIG. 9, several frequency changes are employed. The signal of the source 7220 is subject to three frequency divisions in the divider-counter circuits 7231A, 7231B, and 7231C. The output of each of the divider-counters 7231A to 7231C supplies a single component of the high-frequency complex component $G_5'$ of the first complex local signal $S_5'$.

In FIG. 9, the wave $O_5$ is the subject of filtering in circuit 7241, then of a first frequency change by mixing in the circuit 7251A with the single high-frequency component supplied by the divider-counter 7231A, then of a second filtering in the circuit 7241A, then of a second frequency change in the mixing circuit 7251B, utilising the single component supplied by the divider-counter 7231B, then of filtering in the circuit 7241B, then of a third frequency change in the circuit 7251B, using the single component supplied by the divider-counter 7231C, then of a final filtering in the circuit 7261 for supplying the aforesaid signal $f_5$ on the line 721. Very advantageously, the circuit 7261 also produces clipping so that the signal $f_5$ is a square-wave signal.

FIG. 9 shows clearly that the complex component $G_5'$ is formed of simple components supplied respectively by the circuits 7231A to 7231C. The frequency and phase of the complex component $G_5'$ are respectively equal to the algebraic sum of respectively the frequencies and phases of the simple components, each sign depending on the production of the corresponding frequency change.

The shaping of the signals delivered by the divider-counter, such as 7231A to 7231C for their use in the frequency changing circuits is regarded as known to the person versed in the art.

One of the divider-counters modulus controlled by the inputs E of the transmitting station selector. For example, in FIG. 9, the divider-counter 7231C is concerned. The production of this control is regarded as known to the person versed in the art.

The signal $f_5$ is transmitted by the line 721 to the synchronous detection channel 7780 associated with the second source 7710 of the control circuit 77.

The second source 7710 comprises for example a quartz oscillator and is adapted to supply square-wave or pulsed signals in the same way as the first source 7220.

In FIG. 10, the signal of the second source 7710 is divided in a divider-counter 7741 to provide the unique component $g_5'$ of the first local signal $S_5'$. This unique component $g_5'$ and the signal $f_5$ are applied to a synchronous detector 7745, which supplies continuously a specific frequency residue $R_5'$ used for reacting on the frequency of the source 7710 such that the frequency of the signal $g_5'$ is equal to that of the signal $f_5$. When this condition is achieved, the signal supplied by the source 7710 is representative of the component $g_5'$ with a weight equal to the division factor of the counter 7741. This representative signal is sent to the line 770. This signal is thus used on the one hand for generating the unique components $g_{5m}'$ ($m = 1$ to 6) of the second local signals associated with the same specific frequency, on the other hand in the circuit 69 as mentioned previously.

The description of FIGS. 9 and 10 will now be resumed, using precise frequency values.

In group I, the precise value of the specific frequency $Fs_5$ is 405.918156 kilocycles per second.

The first source 7220 has a frequency of 5 Mc/s assumed to be accurate to better than $10^{-9}$; the dividers 7231A, 7231B and 7231C have respective division factors equal to 14, 114 and 1,018; they therefore supply respectively frequencies equal to 357.142857 kc/s, 43.859649 kc/s and 4.911591 kc/s. The sum of these three frequencies is equal to 405.914097 kilocycles per second, which is the frequency of the complex component $G_5'$. The signal $f_5$ therefore has a frequency equal to $405.918156 - 405.914097 = 4.059$ c/s.

The second source 7710 has then a frequency such that frequency division in circuit 7741 supplies a unique component $g_5'$ of frequency equal to 4.059 cycles per second. The aforesaid coefficient $x$ is equal to $10^{-5}$.

The synchronous detector 7745 reacts by the residue $R_5'$ on the source 7710 such that the frequency of this source is modified in order that the signal $f_5$ and the unique component $g_5'$ are strictly synchronous in frequency.

Very advantageously the synchronous detector 7745 is of the phase detector type. Nevertheless, the continuous residue $R_5'$ is used for reacting on the frequency of the second source 7710 such that the whole of the local signal $S_5'$, formed of the complex component $G_5'$ and the unique component $g_5'$, is strictly synchronous in frequency and phase with the continuous wave $O_5$ as received. For that reason, the residue $R_5'$ is called specific frequency residue.

It should be noted that the divider 7231C supplies in a manner controlled by the inputs E a division factor variable according to the discrete values between 1,000 and 1,033 for the choice of the specific frequencies.

Furthermore, each second source such as 7710 should be capable of relative variations of $10^{-3}$ at least in the vicinity of its nominal value, assuming a speed of the receiver of 3 m/sec in the direction of a transmitter. The speed of propagation of electromagnetic waves being $3 \times 10^8$ m/sec, the Doppler effect is then $10^{-8}$ for local signals, and therefore $10^{-3}$ for their unique components, the value of the coefficient $x$ being substantially equal to $10^{-5}$.

Very advantageously, the division factor of the divider-counter 7741 is proportional to the wavelength $Ls_5$ corresponding to the preference specific frequency $Fs_5$ according to a power of 10 of the length measurement unit employed.

The division factor is approximate for technological reasons. Most often, it is adequate if the approximation made is of the order of $10^{-3}$, because for a duration of sequence of 5 minutes, a speed of 3 m/sec involves a movement of about 1,000 meters, and the corresponding error is then of the order of 1 meter.

Under these conditions, it is possible to take the same division factor for all the counters such as 7741, since the specific frequencies have the same value to within $3 \times 10^{-4}$.

FIGS. 11 and 12 illustrate respectively the frequency changing channel 7274 and the synchronous detection and phase control channel 7781. These two figures have been regrouped to show better the assembly of the second complex local signal.

FIG. 11 illustrates channel 7274 comprising three dividers of the frequency of the signal of the first source 7220. This channel 7274 is formed in a manner similar to the frequency-changing channel of FIG. 10. It will not therefore be described in detail. It will merely be pointed out that the divider 7734C does not comprise any transmitting station selection control input, since the frequencies of the sequential waves are the same, irrespective of the transmitting station radiating them.

The measuring frequency $F_1$ common to the sequential waves $O_{k1}$ has the exact value of 322.015703 kc/s. The dividers 7234A to 7234C have division factors respectively equal to 17,152 and 1,000 and therefore supply from the frequency of 5 megacycles per second exactly of the first source 7220 frequencies equal respectively to 294.117647 kc/s, 32.894736 kc/s and 5.000000 kc/s.

The complex component $G_{5,1}'$ of the second local signal $S_{5,1}'$ has therefore a frequency equal to 332.012383 kc/s whence the signals $f_{k1}$ have a frequency substantially equal to 3.320 c/s (which is correct since the coefficient $x$ is equal to $10^{-5}$).

In FIG. 12, the signal from the second source 7710 is applied to the circuit 7751 which produces the unique component $g_{5,1}$ with controlled phase-shifting. The circuit 7751 comprises for this purpose a $+/-$ box 7761, used as controlled phase-shifter, and a divider-counter 7791. Very advantageously and in the same manner as for the counters such as 7741 the division factor of the divider-counter 7791 is proportional to the wavelength $Lm_1$ corresponding to the measuring frequency $F_1$. The output of the divider-counter supplies the said unique component $g_{5,1}'$ to a synchronous detector 7771, of phase detector type, which also receives the signals $f_{k1}$ from the line 724 and is activated by the programme signal $P_{5,1}$ by the line 744.

In the absence of programme signal on the line 744, the synchronous detector 7771 supplies a zero residue $R_{5,1}'$. Consequently, the $+/-$ box 7761 neither adds nor suppresses any pulse of those of the signal of the second source 7710. Consequently also, the phase of the unique component $g_{5,1}'$ is only governed by the signal of the source 7710 in a manner tied to the continuous wave $O_5$ as received.

When a programme signal is present on the line 744, this represents the fact that the signal $f_{k1}$ present on the line 724 is the signal $f_{5,1}$ and that it is necessary to make the synchronous detection of it. At this moment, a phase residue $R_{5,1}'$ may appear, this residue being applied to the $+/-$ box 7761 for adding or suppressing the pulses (or for example descent fronts) in the signal supplied by the source 7710. The result is a durable modification of the phase of the unique component $g_{5,1}'$ such that the latter is synchronous in phase with the signal $f_{5,1}$ (it should be recalled that the frequency synchronism between $g_{5,1}'$ and $f_{5,1}$ is already ensured by synchronisation of the second source 7710 by means of the permanent wave $O_5$).

It will be noted that the phase modification of the component is equal to the phase modification of the signal of the source 7710 divided by the modulus of the counter 7791. The addition or suppression of a pulse modifies by one phase revolution the phase of the signal passing through the $+/-$ box.

Considering now the second local complex signal $S_{5,1}'$ comprising the complex component $G_{k1}'$ (common, irrespective of $k$) and the unique component $g_{5,1}'$ it becomes clear that this signal is continuously governed from the continuous wave $O_5$ by means of the second source 7710 and that, periodically, this signal is controlled in phase to be strictly synchronous in frequency and phase with the sequential wave $O_{5,1}$ as and when received.

The action of governing the second complex signal $S_{5,1}'$ from the continuous wave $O_5$ corresponds to an integration of the phase variations derived from the continuous wave $O_5$, the point of departure of this integration being the last phase value obtained for the second local signal $S_{5,1}'$ from the sequential wave $O_{5,1}$. In fact, according to this governing, there are applied to the second local signal $S_{5,1}'$ frequency and phase variations proportional to those manifested on the continuous wave $O_5$, the proportionality ratio being equal to the ratio of the nominal frequencies.

When the sequential wave $O_{5,1}$ is again received, any possible errors appearing in the integration are corrected such that the second local signal $S_{5,1}'$ is caused (most often with a time constant) to be synchronous with the sequential wave as received.

The errors due to governing or integration are normally very slight and in general due to causes foreign to the propagation of the waves such as for example the limited accuracy of the sources, and the inevitable approximations for the practical realisation of the division factors for example.

An essential advantage of the invention is that the phase control periodically effected on each second complex signal such as $S_{5,1}'$ by means of the corresponding sequential wave such as $O_{5,1}$ ensures the quality of the radio positionfixing information carried by each second local signal, whereas the integration errors would be considerable in the long term relative to the desired precision.

The result is that each local signal such as $S_{5,1}'$ is a continuous signal having substantially the same quality on the radio position-fixing plane as that which the corresponding sequential wave $O_{km}$ would supply if it were continuously transmitted, which of course is impossible to realise, because two continuous waves $O_{km}$ having the same value of the index m could not be distinguished on reception.

The control of the frequencies of the first complex local signals $S_k'$ relative to the specific frequencies $Fs_k$ of the waves $O_k$ as received is carried out only on their unique component $g_k'$. The unique components $g_{km}'$ of the second complex local signals and the component $g_k'$ of the first complex local signal (all corresponding to the same specific frequency $Fs_k$) are taken from the same source while respecting the proportionality ratios $F_m/Fs_k$ above-mentioned.

We thus have the following relations:
— first complex local signals:

$$S_k' = G_k' + g_k'$$

which in fact is valid for the frequencies of these signals:

$$Fs_k' = (1 - x) Fs_k' + x.FS_k'$$

— second complex local signals:

$$S_{km}' = G_{km}' + g_{km}',$$

or:

$$F_{km}' = (1 - x) F_{km}' + x.F_{km}'$$

These relations will now be written, taking into account the nominal values of the frequencies, assuming that the index k has a fixed value.

The complex components $G_k'$ and $G_{km}'$ have nominal frequencies respectively equal to $(1 - x) Fs_k$ and $(1 - x) F_m$, since the nominal values of the frequencies $Fs_k'$ and $F_{km}'$ are respectively $Fs_k$ and $F_m$. These components are taken from the same source for a value of the index k ( or better whatever the index k may be, as illustrated in FIG. 8). If we call G the nominal frequency of this source and $dG$ the instantaneous deviation of the real frequency of this source relative to its nominal value, it follows that the nominal frequencies of the components $G_k'$ and $G_{km}'$ ought to be multiplied by $(1 + dG/G)$ for obtaining the real frequencies.

In the same way, the unique components $g_k'$ and $g_{km}'$ have the respective nominal frequencies $x. Fs_k$ and $x. F_m$ (the index k being fixed and the index m variable). They are taken from the same source of nominal frequency $g_k$, whose instantaneous deviation is $dg_k$ including the frequency control, this being true only for one value of the index k.

The nominal frequencies of the components $g_k'$ and $g_{km}'$ ought therefore to be multiplied by $(1 + dg_k/g_k)$ for obtaining the real frequencies.

Moreover, the frequencies of the received waves are modified relative to the transmission frequencies because of the Doppler effect. Denoting by $v_k$ the speed of the receiver in the direction of the transmitting station $E_k$ (k fixed) transmitting continuously the specific frequency $Fs_k$, and sequentially the measuring frequencies $F_m$ (waves $O_{km}$), and denoting by c the speed of propagation of the waves, the real frequencies received are:

$$F_k (1 + v_k/c)$$

and $$F_m (1 + v_k/c).$$

It will be noted that this assumes that the transmission frequencies are strictly equal to their respective nominal values. This assumption is correct because any deviations take into account the ratios of the nominal values (see above). These deviations are therefore translated by errors in the speeds $v_k$, which disappear since only the differences in the speeds $v_k$ are used for determining the position-lines at the end of the working operation.

The continuous control of frequency applied to the first complex signal $S_k'$ realises the equality:

$$Fs_k (1 + v_k/c) = (1 - x) . Fs_k (1 + dG/G) + x.Fs_k (1 + dg_k/g_k)$$

the first term being the real frequency of the wave $O_k$ received and the second term the real frequency of the first local signal $S_k'$.

This relationship is simplified to give:

$$V_k/c = (1 - x) dG/G + x.dg_k/g_k$$

The continuous control of frequency on the first local signal $S_k'$, which is exercised on the unique component $g_k'$ (source $g_k$) realises this condition continuously.

The second local signals $S_{km}'$ have real respective frequencies (k fixed; m variable) which are written as follows:

$$F_{km}' = (1-x) F_m (1 + dG/G) + x.F_m (1 + dg_k/g_k)$$

The condition for these (continuous) real frequencies $F_{km}'$ to be respectively equal to the frequencies $F_m (1 + v_k/c)$ of the waves $O_{k1}$ as and when received is written as follows:

$$F_m (1 + v_k/c) = (1-x) F_m (1 + dG/G) + x.F_m (1 + dg_k/g_k)$$

which simplifies to give:

$$v_k/c = (1-x) dG/G + x.dg_k/g_k$$

This condition being realised by the continuous frequency control on the first signal $S_k'$, it is clear that the second local signals $S_{km}'$ as generated are already set to frequency for receiving the waves $O_{km}$. It will be noted that the instability of the frequency source $G$ is compensated by the control $dg_k$ of the frequency source $g_k$.

Moreover, the above-mentioned condition may be written:

$$dg_k/g_k = \frac{1}{x} v_k/c - \frac{1-x}{x} dG/G$$

If now two different values, 5 and 6 for example, are given to $k$ and the two corresponding equations are subtracted, and if the source $G$ is common for all the values of $k$:

$$dg_5/g_5 - dg_6/g_6 = \frac{1}{x \cdot c}(v_5 - v_6)$$

Hitherto, $g_5$ and $g_6$ have been considered as (any) nominal values of the frequencies of the sources $g$.

We have seen that the nominal frequencies of the unique components $g_5'$ and $g_6'$ are respectively equal to:

$$x Fs_5 = xc/Ls_5 \text{ and } xFs_6 = xc/Ls_6 ,$$

$Ls_5$ and $Ls_6$ being the respective wavelengths associated with $Fs_5$ and $Fs_6$.

It is advantageous according to the invention to take all the nominal frequencies such as $g_5$ and $g_6$ equal to one another; for example, the frequency $g_5$ is then proportional in a ratio $z$ to $Ls_5.x.Fs_5$, and the frequency $g_6$ is proportional in the same ratio $z$ to $Ls_6.x Fs_6$ ( it will be recalled that products such as $Ls_5. Fs_5$ are all equal to $c$).

It follows directly therefrom that the expression $dg_5/g_5 - dg_6/g_6$ may be written:

$$\frac{dg_5 - dg_6}{z \cdot x \cdot c}$$

Consequently, the above equation becomes $$dg_5 - dg_6 = z(v_5 - v_6)$$

Integration of such a difference as a function of the time therefore furnishes information on the difference of the distances from the receiver to the transmitting stations $E_5$ and $E_6$.

Since the unique component $g_{5,1}'$ has a frequency proportional, according to the aforesaid coefficient $x$, to the measuring frequency $F$ of the sequential wave $O_{5,1}$, which is also that of the second local signal $S_{5,1}'$, it follows that this unique component $g_{5,1}'$ by itself carries the phase information of radio position-fixing, as set forth in the foregoing.

As shown in the foregoing, the unique component $g_{5,1}'$ is already set in frequency relative to the sequential signal $f_{5,1}$ because of the continuous action on the second source 7710 by means of the continuous wave $O_5$. This is why the residue $R_{5,1}'$ is called interrupted residue of phase.

In general manner, in the present specification the word residue is used in a not very common sense. In fact, it is a question of a residual signal resulting from the synchronous reception of a wave and used for causing a local signal to be strictly synchronous (in frequency and/or phase) with the received wave. The residue is therefore an error signal supplied by synchronous detection and used in synchronous reception. The nature or shape of this error signal depends essentially on the conception of the synchronous detection circuit and the means employed for controlling the local signal.

It should be understood that the controls called frequency controls, which employ the specific frequency residues as error signals are advantageously second order controls. Furthermore, all the controls more often comprise time constants (several seconds) which are advantageously obtained by means of divider-counters when the residues are in the form of pulse trains.

With regard to the controls called phase controls, it should be pointed out that these controls may be first order controls. In fact, assuming that the receiver is moving at constant speed, and regardless of the order of the controls called frequency controls, the phase controls are unaffected by any delay whatever time constant is used.

Figure 13:
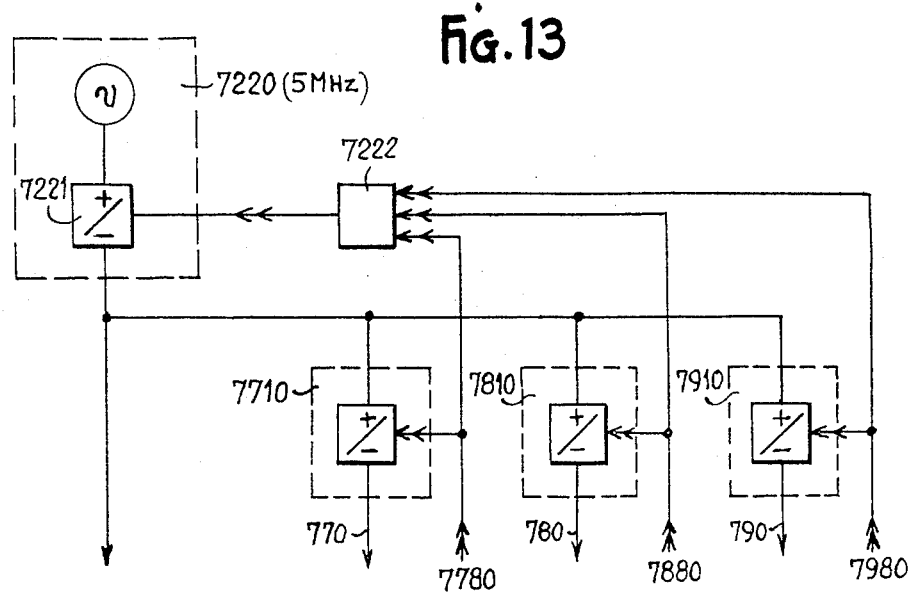
FIG. 13 illustrates a modification of the first embodiment of the receiver of the invention, in which the second sources 7710, 7810, 7910 of FIG. 8 are taken from the first source 7220 of FIG. 8 by means of frequency modification circuits (or boxes +/−) respectively.

FIG. 13 illustrates a preferred embodiment of the second sources 7710, 7810 and 7910.

The first source 7220 supplies signals having for example a frequency of 5 Mc/s. These signals are sent, possibly by means of a +/− box 7221, towards respective second sources 7710, 7810 and 7910. Each of these second sources is itself formed by a +/− box controlled by the respectively associated frequency control circuit, namely 7780, 7880 and 7980. In this way, the second sources are drawn directly from the first sources by means of respective frequency modification circuits formed by the +/− boxes.

If the +/− box 7221 is suppressed, the frequency variations of the first source 7220 should be compensated completely by the frequency controls acting on the second sources 7710, 7810 and 7910, with the coefficient multiplier $1/x$ of the order of $10^5$. The source 7220 ought therefore to have excellent stability.

For that reason, according to the embodiment as shown in FIG. 13, it is very advantageous to combine all or part of the frequency modification information supplied by the circuits 7780, 7880 and 7980 in a circuit 7222, which supplies a control signal for the +/− box 7221. In this way, the source 7220 is governed by the mean of all or part of the frequencies of the continuous waves received, which reduces the stability required for this first source 7220, and renders the functioning of the entire receiver more sure, taking parasitic and other noise sources into account.

An interesting modification of the lay-out as shown in FIG. 13 is to cause only one of the signals supplied by the circuits 7780, 7880 and 7980 to set on the +/− box 7221 in suitable proportions and with a suitable time constant. If, for example, the signal of circuit 7780 is thus used, the +/− box of the associated source 7710 may be suppressed; in fact the signal of the first source is then itself set in frequency relative to the continuous wave corresponding to the circuit 7780 (wave $O_5$ in the example selected). The other frequency controls are effected as before.

The modifications described with reference to FIG. 13 also have the advantage that all the local signals for reception are drawn from the same sources 7220. In the description of one example of the method of radio position-fixing of the invention, it was stated that the necessary bandwidths are extremely narrow, and consequently a number of different radio position-fixing chains may be obtained by slightly modifying in the same proportion all the values of the transmission frequency. With the modifications described with reference to FIG. 13, it is merely necessary at the receiver to correspondingly modify slightly the frequency of the first source 7220 for receiving at choice one of the radio position-fixing chains. This enables second sources having the same nominal frequency to be readily obtained.

Embodiments of +/− boxes are described and illustrated in FIGS. 7C and 9C of Appendix C. FIGS. C3a, C4a and C5a of Appendix C show embodiments of phase detectors which could be advantageously used in this invention. FIG. B6 of Appendix B illustrates embodiments of phase detectors. With regard to the transformation of the herein discussed residues from such phase detectors in the form of pulse trains for controlling the +/− units, circuits and time diagrams are shown in FIGS. B4, B4a, and B10 of U.S. Pat. No. 3,689,926 of Appendix B and FIG. 6 of Appendix C. In each case, reference will be made to the description made with reference to the figures mentioned.

The utilisation of the signals supplied on the lines 770 to 776, 780 to 786 and 790 to 796 of FIG. 8 will now be described. It should be borne in mind that these signals are in logical form, that is to say, in the form of square-wave or pulsed signals, the descending front (for example) being representative of a characteristic instant of the period of a sinusoid.

For supplying position-line information, the signals available on the conductor lines, whose last reference numbers are identical with 1 to 6, may be subject of phase measurements, for example by using the information of Patent 69 08 755 already mentioned. As previously stated, the values of the various measuring frequencies are selected for supplying "differential sensitivities" of desired values. It will also be noted that the sum of all the measuring frequency values supplies a value sensitivity well above the sensitivity of each of them.

This phase difference information available in numerical form is processed in a computer assembly. It is necessary that this information should be sampled before each processing by the computer.

Very advantageously, the computer operates on the principle described in Appendices B and C.

The information of these appendices will now be briefly recalled.

Most of the known methods of suppressing ambiguity use signals having among them well established frequency and phase relations. The differential sensitivities drawn from such signals permit the passage from radio position-fixing information of great precision to radio position-fixing information which is both less precise and less ambiguous, the latter not being, however, independent of the former: in fact, the sensitivities of less precise measurements should be sub-multiples of sensitivities of precise measurements.

According to the information of these appendices, a different process is advantageously employed, which also makes use of differential sensitivities but following a "progressive refinement" by successive approximations permitting the passage from less precise measurements to those which are more precise. The principle advantage of this progressive refinement is that it enables the ambiguity of a radio position-fixing measurement to be caused partly to disappear by means of another measurement made on a lower sensitivity, having some mathematical relation with that of the first measurement, provided that the sensitivities are all known.

A distinction will be made between the bisignal method of these patents, which corresponds in the present invention to the case where the listening stations retransmit reference phase information for all the receivers, and the monosignal method, which in the present invention corresponds to the case where the listening stations are used for reacting on the transmitting stations to provide a known phase relationship between the sequential waves radiated by these stations.

To apply the method of Appendices B and C, it is necessary to distinguish totally the function of the local signals used in these two documents (which will be called computed local signals in the present description), and the function of the local signals called complex of the present invention. The computed local signals and the complex local signals have in common only the designation "local," because they are generated locally for comparison with the received signals.

It has previously been stated that the second complex local signals of the present invention are the exact image of what the sequential waves having measuring frequencies would be if they were continuously transmitted.

According to the method of Appendices B and C, use is made of computed local signals carrying position-line information expressed by a quantity $x$, these computed local signals having phase differences of the form $k + kx$ relative to a phase reference.

According to the present invention, each measured phase difference, for a measuring frequency, between two corresponding second complex local signals, is also of the form $K + kx$, adopting the notation of Appendices B and C.

It is therefore possible to compute each quantity $x$ defining a hyperbolic position-line according to the teaching of Appendices B and C.

Moreover, the present invention makes it possible to provide total suppression of ambiguity. In this case, the initial estimated value of each quantity $x$ is supplied direct by the computer.

In the description of the cited appendices, the computed values of the quantities $x$ are displayed directly. According to the present invention, these computed values are subjected to subsequent processing before display.

There will now be described with reference to FIG. 14 the general operation of the circuit 68 and an embodiment according to the invention of circuit 69.

For this purpose, the circuit 68 is in addition adapted to compare the position-line information x obtained by processing phase-difference measurements made on complex second signals (lines 771 to 776; 781 to 786; 791 to 796) with position-line information available at its inputs 681, coming from circuit 69, and to supply at outputs 685 correction information according to the result of this comparison.

As previously mentioned, the phase information available at the inputs 771 to 776; 781 to 786; 791 to 796 from second complex local signals is periodically sampled, the position-line information supplied by circuit 69 is sampled at the same time.

In the computer 68, the above-mentioned phase information is processed to remove all or part of the ambiguity and supply position-line information. This position-line information is compared with that supplied by the circuit 69.

These comparisons supply differences between the position-line information of the circuit 69 and position-line information computed from phase information in the circuit 68. These differences are used in any suitable manner for correcting more or less rapidly the position-line information supplied by the circuit 69.

Very advantageously and as previously pointed out, circuit 69 continuously receives the first local signals $S_k'$ or at least their unique components $g_k'$, with a suitable weighting. Preferably, the respective second sources have the same nominal frequency and the signals of these second sources are applied respectively by the lines 770, 780 and 790 to the circuit 69.

To simplify the description, it will be considered that the transmitting station corresponding to line 780 is common to the two measurements made of difference in distance.

Figure 14:
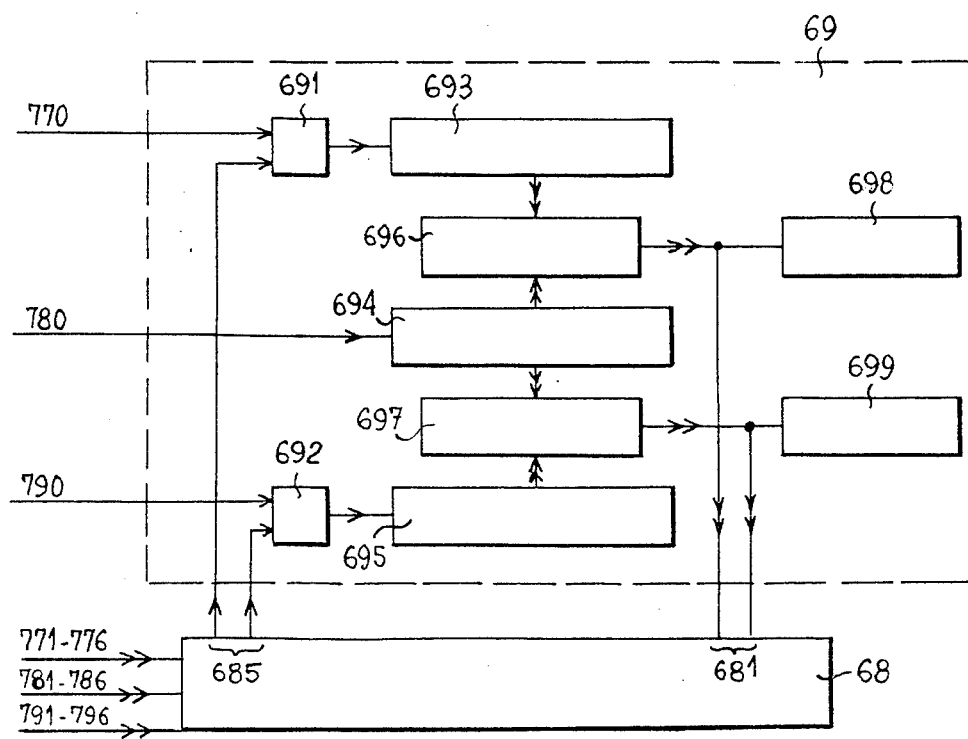
FIG. 14 illustrates for the first embodiment of the receiver, circuit 68, not detailed, of phase difference measurement and determination of position lines, and circuit 69, detailed, of position information display by using signals taken on the reception of specific frequencies.

Ignoring for the present the existence of circuits 691 and 692 in FIG. 14, each of the signals of the second sources is transmitted from lines 770, 780 and 790, respectively, to integrator-counters 693, 694 and 695; these counters count the number of descending fronts (for example) in the signals from the second sources, that is to say the number of periods of these signals, or again form an integration of the frequency of these signals.

Each integrator counter has separate outputs for all its stages. The outputs of counters 693 and 694 are connected respectively in correspondence to the inputs of a parallel subtractor 696. Likewise, the outputs of counters 695 and 694 are connected to inputs of a parallel subtracter 697.

The subtracters 696 and 697 each supply a difference between the contents of the counters to which it is connected.

The difference in the contents of two counters such as 693 and 694 is (still ignoring circuit 691) equal to a difference in number of periods in the signals from the line 770 and from the line 780 having the same nominal frequency.

The effect of the nominal frequencies on these differences therefore disappears, since they imply the subtraction of two equal numbers of periods.

The variations of the differences contained in the subtracters 696 and 697 are therefore related to the differences of the real frequencies of the second sources which bring in their stability and the Doppler effect.

It has been shown in the foregoing that the effect of instabilities disappears by difference owing to the first controls referred to as frequency controls and because the first source G is common.

There remains therefore the Doppler effect which has been expressed by the relationship hereinbefore stated:

$$dg_5 - dg_6 = z(v_5 - v_6)$$

The subtracter 696 supplies a difference between the integrations $(g_5 + dg_5)$ and $(g_6 + dg_6)$ respectively in the counters 693 and 694. The nominal frequencies of the sources $g_5$ and $g_6$ are equal; there remains, therefore:

$$\int(dg_5 - dg_6) = \int z(v_5 - v_6)\,dt = z(D_5 - D_6) + Q,$$

$D_5$ and $D_6$ being the distances from the receiver to the transmitting stations $E_5$ and $E_6$, and $Q$ being an integration constant. The difference of the distances $D_5 - D_6$ is a piece of position-line information x supplied by the subtracter 696 except for a constant.

This position-line information is applied to the inputs 681 of the circuit 68, which applies adequate correction signals to the circuits 691 and 692, adapted to add or suppress descending fronts in the signals of the second sources. The time constants with which the correction signals are produced depend on the operating conditions in each particular case.

When the receiver is started, the circuit 68 first acts in correcting by the circuits 691 and 692 (preferably very rapidly) the position-line information supplied by the subtractors 696 and 697, so as to bring the integration constant Q to a value selected for the hyperbola group considered.

The position-line information is displayed in display circuits 698 and 699. As previously stated the divider-counters such as 7741 have a division factor proportional according to a power of 10 to a wavelength with the desired unit of measurement. In this case, the differences of distance are displayed directly with this unit of measurement.

Afterwards the receiver functions "in step", the corrections made by the circuit 68 being then possibly much slower and therefore more elaborate.

As stated in the foregoing, the receiver just described is advantageously used in the listening stations, with the exception of the operational circuits 68 and 69 which in that case have a different function. This is of interest principally when the information on the specific frequencies has to be processed.

In a second embodiment of the radio position-fixing receiver of the invention, each of the first and second complex signals $(S_k'; S_{km}')$, whose frequency is denoted generally by F comprises a complex component H and a unique component $f'$ having a frequency of value substantially equal to $f$. The value of the frequency $f$ is common to all the complex local signals, and for example is equal to 4 c/s. The frequencies F − $f$ of each complex component, on the contrary, are different from each other.

The values of the above-mentioned frequencies are termed substantially equal in the sense that the electronic circuits employed for generating the local signals have limited possibilities in regard to precision in frequency production.

Figure 15:
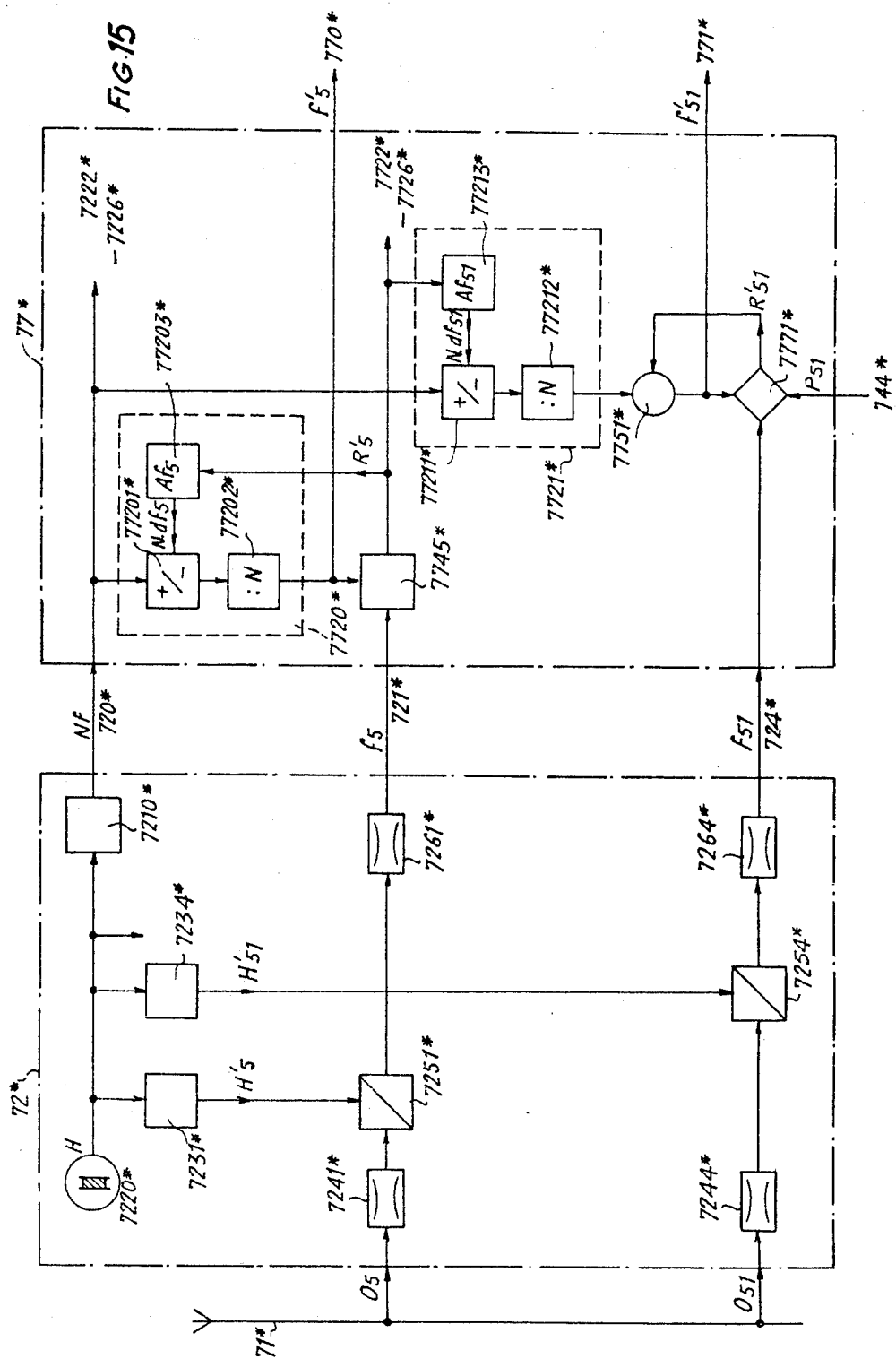
FIG. 15 illustrates partly a second embodiment of the receiver according to the present invention in a form showing the operation of the control circuits 77\* by comparison with FIGS. 9 to 12.

FIG. 15 is a general part diagram of a receiver comprising frequency changes made by means of a frequency changing circuit 72*, in which a unique frequency source serves to supply not only the complex components, but also the unique components of the complex first and second local signals. In FIG. 15, this unique source bears the reference 7220*.

In particular, the frequency centre comprises a supplementary stage 7210* intended to supply a frequency U, being a multiple of the frequency $f$ common to all the unique components, on a line 720* in the direction of the control circuits 77*, 78*, 79*. Generally, the frequency U may be merely tied to the frequency $f$ common to all the unique components, and is not necessarily multiple.

To facilitate distinction from the first receiver embodiment, all the numerical references of this second embodiment will be followed by an asterisk *, while as far as possible the same numerical references denote the same circuits.

In addition, the complex components and the unique components are different from those of the first embodiment; for that reason, H' will now denote the complex components ($H_k'$; $H_{km}'$) and $f'$ the unique components ($f_k'$; $f_{km}'$).

Of course, the resulting change in the complex components has an influence on the frequencies of the signals $f_k$ and $f_{km}$, which are derived from the received waves, after frequency change with, as heterodyne frequencies, the complex components of the first and second complex local signals. The symbols $f_k$ and $f_{km}$, however, are retained, because the value of the frequencies changes, but the intrinsic definition remains the same.

FIG. 15 shows the frequency changing in circuit 72* and the control circuit 77*, limited to the parts concerning the continuous wave $O_5$ and the sequential wave $O_{5,1}$.

FIG. 15 shows that the signal $O_5$ is the subject first of all of one or more frequency changes by means of the complex component $H_5'$, derived from the unique source 7220* by means of a circuit 7231* which is advantageously a frequency divider.

Another circuit 7210*, advantageously of the frequency divider type, supplies from the source 7220* a frequency $U = N.f$ on the line 720*. The frequency $N.f$ is the multiple of N order of the frequency $f$ common to all the unique components.

The frequency $U = N.f$ is applied to a frequency modification and division circuit 7720* having an input for receiving the specific frequency residue $R_5'$.

The output signal of the circuit 7720* is applied to a frequency difference detector 7745* which receives at another input the signal $f_5$ of the line 721*, derived from the continuous wave $O_5$ after frequency changes by means of the complex component $H_5'$. The output of the frequency difference detector 7745* supplies the specific frequency residue $R_5'$, which on the one hand is applied to the frequency modification and division circuit 7720* and, on the other hand to other frequency modification and division circuits 7721* to 7726*, relative to the signals $f_{5m}$ derived, after frequency changes, from the sequential waves $O_{5m}$.

The output signal of circuit 7720* is the unique component $f_5'$ of the first local signal $S_5'$. Its nominal frequency is $f$, close to 4 c/s, and its real frequency depends on the specific frequency residue $R_5'$. When control has been effected, we have $f_5 = f_5' = f + df_5$ (these symbols representing the frequencies in the equality).

To simplify the account, in block 77* only the part is considered which relates to the measuring frequency $F_1$, and to the sequential wave $O_{5,1}$, which after frequency changing by the complex component $H_{5,1}'$ becomes a low frequency signal $f_{5,1}$, present on the line 724*. A programme signal $P_{5,1}$ present on the line 744* coming from the programme circuit 74*, indicates for example the moments at which the sequential wave $O_{5,1}$ is normally received.

The frequency modification and division circuit 7721* receives the specific frequency residue $R_5'$ for supplying at its output, in a manner described hereinafter, a signal of frequency close to $f$ and already set in frequency for receiving the signal $f_{5,1}$. This signal is applied to a controlled phase-shifter 7751* which may be of the mechanical of phase-shifter. The output of the controlled phase-shifter 7751* is connected to a phase input of a phase detector 7771*, whose other phase input receives the signal $f_{5,1}$. The phase detector 7771* functions only when a programme signal $P_{5,1}$ is present on the line 744*. Under these conditions, it supplies a sequential phase residue $R_{5,1}'$, which is applied to the controlled phase-shifter 7751*, to be in phase, except for a phase constant, with the signal $f_{5,1}$ derived from the sequential wave $O_{5,1}$.

In the control circuit 77*, the circuit 7720*, already mentioned, comprises a +/- box 77201* followed by a divide-by-N counter 77202*, the output of the latter being applied to the detector 7745*.

The frequency residue $R_5'$ supplied by the output of the detector 745* is applied to a circuit 77203*, called circuit $Af_5$ (control for $f_5$), which controls the +/- box 77201* and the structure of which will be described later.

The frequency residue $R_5'$ is also applied to a circuit 77213*, called $Af_{5,1}$ (control for $f_{5,1}$) and forming part of the circuit 7721*. The output of this circuit $Af_{5,1}$ is used for the control of a +/- box 77211*, which receives the signal $N.f$ from the line 720* for transmitting it by means of a divide-by-N frequency divider 77212* to the already mentioned phase-shifter 7751*.

As in the first receiver embodiment, the +/- boxes permit the modification of a frequency, and are advantageously constructed in the manner described in Appendices B and C to this specification.

In the absence of a frequency modification control by the circuit $Af_5$ or 77203* of FIG. 15, the detector 7745* receives a frequency of value $f$. The residue $R_5'$ is used by the circuit $Af_5$ to order a frequency modification $N.df_5$ which tends to cancel the said frequency residue $R_5'$. The frequency $f_5'$ applied by the circuit 7720* to the detector 7745* is therefore equal to $f + df_5$. It is clear that the magnitude of frequency control $N.df_5$ has the function of compensating the instability of the frequency $f$, due to that of the unique source 7720*, at the same time as causing the local frequency $f_5'$ to be equal to the frequency $f_5$ derived from the wave $O_5$ received.

As will be seen later, the circuit $Af_{5,1}$ of the block 7721* deducts from the residue $R_5'$ a frequency $N.df_{5,1}$ such that:

$$\frac{df_{5,1}}{df_5} = \frac{F_1}{Fs_5}.$$

Figure 16:
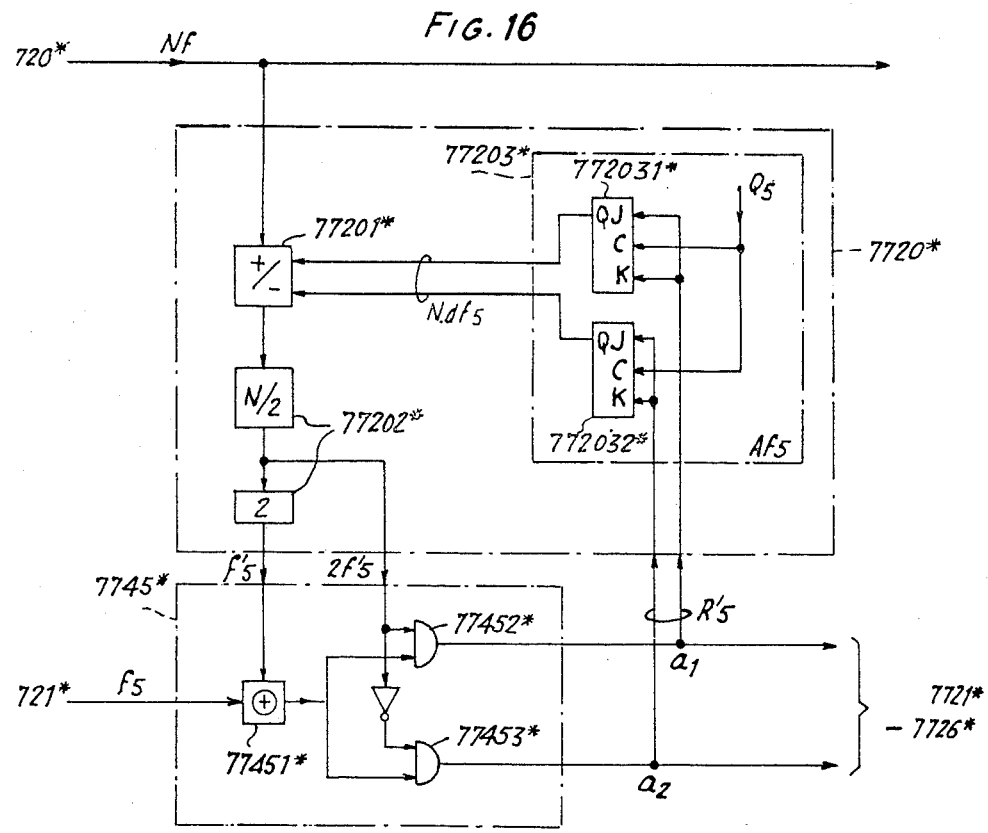
FIG. 16 is the detailed electric circuit of the blocks 7720\* and 7745\* of the control circuits 77\* of FIG. 5.

FIG. 16 illustrates a particular embodiment example of the circuits $Af_5$ and 7745*.

The frequency difference detector 7745* comprises a logical exclusive OR circuit 77451*, which receives on the one hand the signal $f_5$ derived from the wave $O_5$ after frequency changes, and on the other hand the unique component $f_5'$ which are both assumed to be in the form of square-wave signals.

The output of the last stage but one of the counter 77202* supplies a frequency signal $2.f_5'$, which is applied directly to an AND gate and after inversion to an AND gate 77543*. These two AND gates receive as other input the output of the exclusive OR circuit 77451*. The outputs of the AND gates 77452* and 77453* supply respectively the signals $a_1$ and $a_2$.

The person versed in the art will understand that only one of the signals $a_1$ and $a_2$ can be at the TRUE level at a given instant. Furthermore, considering the phase difference between the signal $f_5'$ and the signal $f_5$, only the signal $a_1$ is at the true level during each interval when this phase difference is positive, while it is the signal $a_2$ when this phase difference is negative, provided the phase difference remains in absolute value below a quarter cycle.

The circuit 7745* of FIG. 16 is called frequency difference detector. The person versed in the art will understand that a frequency control may be very well produced with, for magnitude of error, a phase difference whose mathematical derivative relative to time represents a frequency difference.

The signals $a_1$ and $a_2$ constituting the residue $R_5'$ are applied, in FIG. 16, in parallel to the two inputs J and K of the multivibrator circuits J-K 772031* and 772032*, respectively. The clock inputs C of these two multivibrator circuits receive an auxiliary frequency $Q_5$.

One or the other of these two multivibrator circuits therefore applies to the +input or to the —input of the +/— box 77201* trains of square-wave signals of frequency $Q_{5/2}$. The duration of each train depends solely on that of the logical level 1 of the signal $a_1$ or of the signal $a_2$. This modifies the frequency $f_5'$ for producing the control of the unique component $f_5'$ relative to the signal $f_5$.

Figure 17:
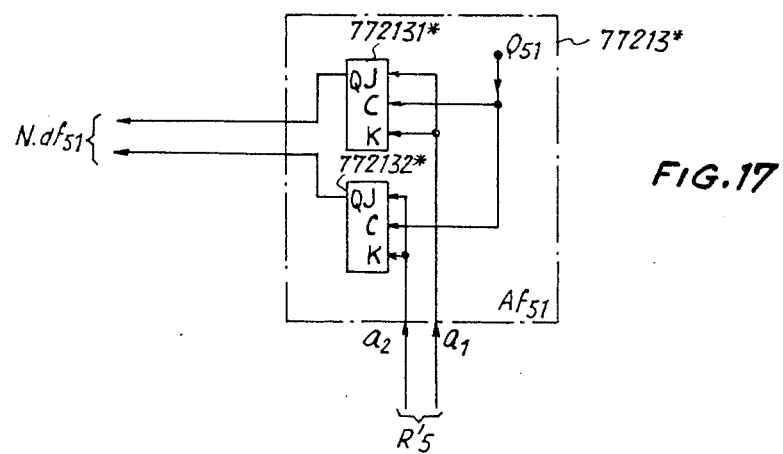
FIG. 17 is the detailed diagram of the frequency setting circuit Af51 of FIG. 5, which receives the frequency residue $R_5'$ from the detector 7745\*.

As shown in FIG. 17, the circuit $Af_{5,1}$ or 77213* comprises similarly two miltivibrators JK 772131* and 772132* receiving in the same way the signals $a_1$ and $a_2$. These multivibrators receive, on the contrary, a different auxiliary frequency $Q_{5,1}$ at their clock inputs C.

With this two-multivibrator circuit lay-out, the mean value of the frequency correction $N.df_5$ is equal to the product of the residue $R_5'$ (difference between the mean values of $a_1$ and $a_2$) multiplied by half the auxiliary frequency Q:

$$N.df_5 = R_5' \cdot (Q_5/2).$$

If the phase difference $\Delta\phi$ is expressed as a fraction of a phase rotation, it will be understood that, for the device 7745*, the residue $R_5'$ is equal to $-2.\Delta\phi$, which implies:

$$N.df_5 = - Q_5 \cdot \Delta\phi.$$

The sign — indicates that there has certainly been a control and the value of $Q_5$ conditions the frequency gain of this control, because the phase difference $\Delta\phi$ is non-dimensional.

In FIG. 17 also, a frequency modification is produced by the circuit $Af_{5,1}$ or 77213* from the same residue $R_5'$. However, this time the gain is defined by the value of the auxiliary frequency $Q_{5,1}$.

According to the invention, it is necessary to produce the conditions:

$$\frac{Q_{5,1}}{Q_5} = \frac{F_1}{F_{S_5}} \text{ whence } \frac{df_{5,1}}{df_5} = \frac{F_1}{F_{S_5}}.$$

Furthermore, although only one bistable multivibrator such as 772131* (FIG. 17) has been shown, it is often necessary to connect in series with each multivibrator a binary counter of modulus Z, or better to employ a reversible counter of modulus Z, of which the two + and — inputs are connected respectively to the outputs of a circuit such as 77213* (FIG. 17). In this case the control relationship becomes $$N \cdot df_5 = R_5' \cdot \frac{Q_5}{2 \cdot Z}$$

There will now be described with reference to FIG. 18 an embodiment of the phase control constituted by the phase detector 7771* and the phase-shifter 7751*.

Figure 18:
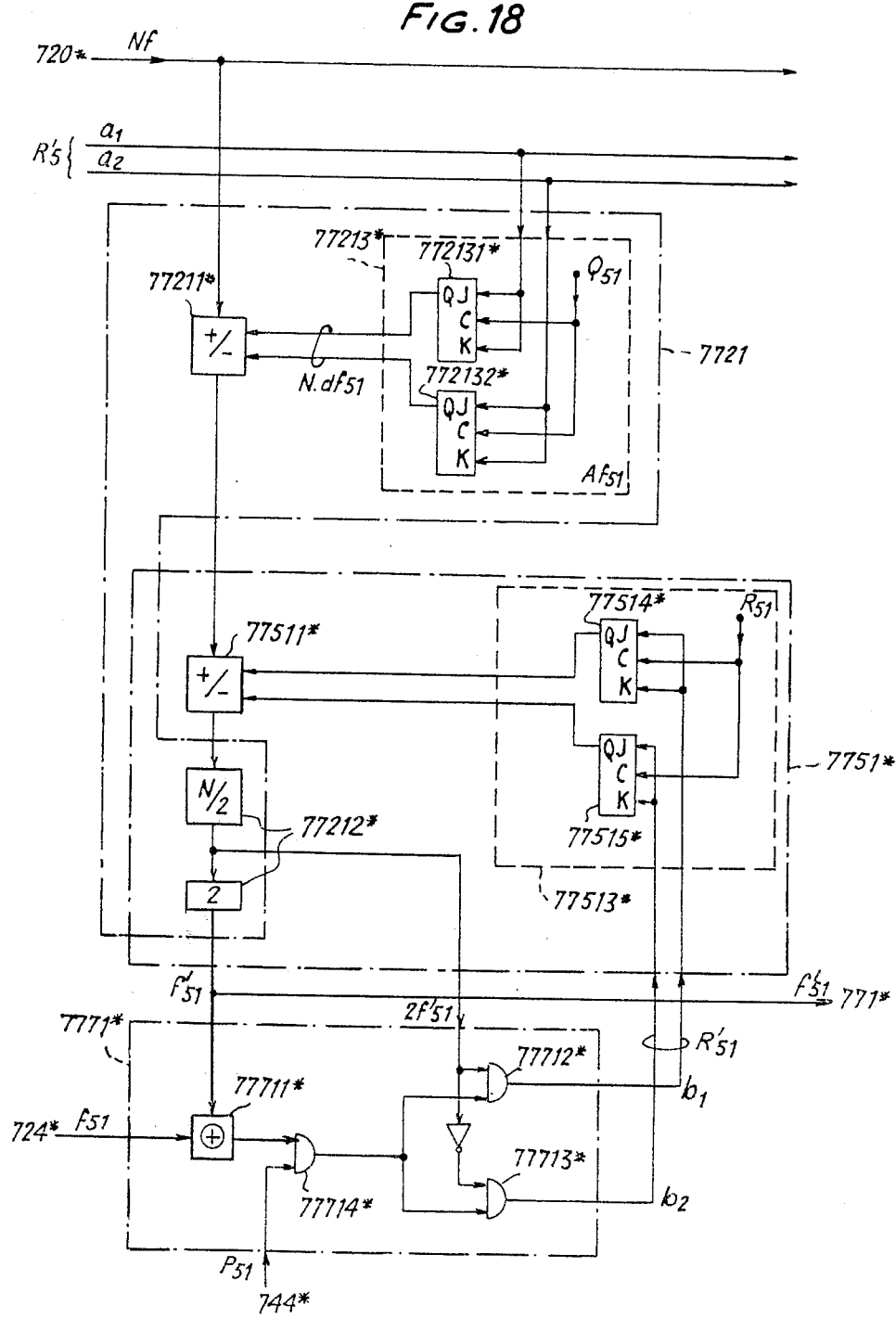
FIG. 18 illustrates the detailed circuit diagram of another part (blocks 7721\*, 7751\* and 7771\*) of the control circuits 77\* of FIG. 15.

In FIG. 18, it is evident that this phase control is constituted in the same way as the frequency control of FIG. 16, except that the exclusive OR circuit 77711* is followed by an AND gate 77714* receiving the activation command signal $P_{5,1}$ on the line 774*.

When the signal $P_{5,1}$ is at the level 1, the phase detector functions normally. When, on the contrary, the signal $P_{5,1}$ is at zero level, the outputs $b_1$ and $b_2$ (analogous to $a_1$ and $a_2$) of the detector 7771* remain permanently at zero. The multivibrators JK 77514* and 77515* of the circuit $A\phi_{51}$ 77513* are then blocked. No correction is therefore applied to the +/— box 77511 and the signal $f_{5,1}'$ retains the phase acquired in the course of the preceding control period.

It will be noted that the divide-by-N circuit 77212* of FIG. 18 is common to the frequency modification circuit 7721* and to the phase-shifting circuit 7751*.

The frequency $R_{5,1}$ applied to the bistable multivibrators 77514* and 77515* defines the value of the time constant applied to the phase control thus obtained.

If, for example, the phase difference between the signals $f_{5,1}'$ and $f_{5,1}$ is $+ ¼$ cycle ($+\pi/2$), the frequency applied to the +/— box 77511* is $$-R_{5,1} \cdot \Delta\phi = R_{5,1}/4.$$

The resulting variation in frequency for $f_{5,1}'$ is equal to $$-R_{5,1}/4N.$$

The time constant $\tau$ of the control is the time necessary to take up the phase difference of ¼ cycle with a frequency modification $$-R_{5,1}/4N,$$

either:

$$\tau \cdot \frac{R_{5,1}}{4N} = \frac{1}{4}$$

or:

$$\tau = \frac{N}{R_{5,1}}.$$

The time constants of the phase controls are selected more particularly as a function of the duration of transmission of the sequential waves, and of the quality of the frequency setting by means of the frequency controls.

The person versed in the art will understand that for such a control to function correctly, the frequency $R_{51}$ should normally be selected higher than $N.f_{51}'$, that is to say 4N c/s. This shows the usefulness of connecting the counters (not shown) in series with the bistable multivibrators such as 77514* and 77515*, in the manner described in the foregoing for $Af_{51}$. These counters enable the time constant to be diminished while retaining a frequency $R_{51}$ higher than $N.f_{51}'$.

Figure 19:
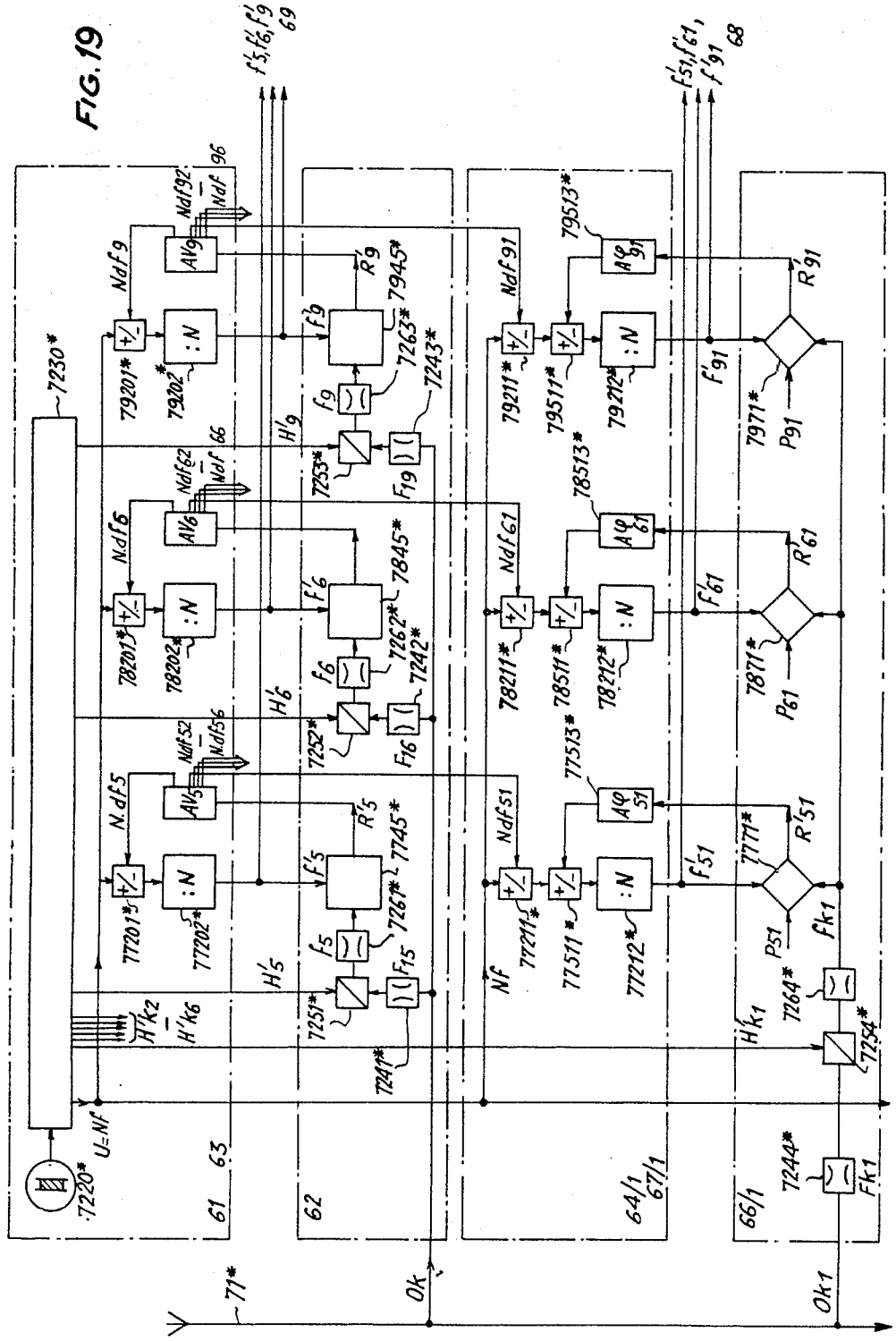
FIG. 19 is the general electric circuit diagram of the second embodiment of the receiver according to the invention.

FIG. 19 illustrates the general circuit diagram of a receiver according to FIGS. 15 to 18.

The different elements have been regrouped according to the general structure of the receiver of FIG. 7. However, the programme circuit 65 and the operational circuits 68 and 69 have been omitted to simplify the figure. In addition, the first control circuit 63 has been included in the first generating circuit 61, and the second control circuit 67 has been included in the second generating circuit 64. The frequency supply centre 7230* supplies the heterodyne frequencies serving on the one hand the first synchronous reception circuit 62, and on the other hand the second synchronous reception circuit 66. To clarify the figure, the heterodyne frequencies are all supplied by the frequency supply centre 7230* of the first generating circuit 61, whereas in FIG. 7 it is implicitly assumed that they are in part supplied by the second generating circuit 64 for the second complex local signals. This is not of importance to the extent where only the unique components of the first complex local signals (circuit 61) and of the second complex local signals (circuit 64) are subjected respectively to the first (frequency) control and the first and second (frequency and phase) controls.

Finally, the index 1 shown in FIG. 19 for the circuits 64/1 and 67/1, as well as the circuit 66/1 indicates that only the circuits relating to the sequential waves $O_{k1}$ having the measuring frequencies $F_1$ are shown, it being understood the circuits relating to the other frequencies are analogous.

In FIG. 19, it has been assumed that the three transmitting stations received are $E_5$, $E_6$ and $E_9$ and have the specific frequencies $Fs_5$, $Fs_6$ and $Fs_9$, as in the first embodiment.

The three circuits $AV_5$, $AV_6$ and $AV_9$ each comprise a control circuit such as $Af_5$ (77203* in FIG. 15), and as many circuits $Af_{5,1}$ (77213* in FIG. 15) as there are measuring frequencies processed by the receiver.

The circuits $A\phi_{km}$, such as the circuit $A\phi_{5,1}$, or 77513* shown in FIG. 19 are all of a constitution identical with that of circuit 77513* of FIG. 18.

If we consider the continuous wave $O_5$ arriving at the circuit 62 of FIG. 19, it is filtered in circuit 7241*, is the subject of one or more frequency changes illustrated by the circuit 7251* by means of the complex component $H'_5$ (it is in fact simple for one frequency change and truly complex for a number of frequency changes), then filtered again in the circuit 7261* to supply the signal $f_5$ derived after frequency changing of the wave $O_5$. From the frequency $U = N.f$ supplied by the frequency centre 7230*, the +/− box 77201* followed by the divide-by-N counter 77202* supplies the unique component $f_5'$, which is applied to the detector 7745* at the same time as the signal $f_5$. The frequency residue $R_5'$ supplied by this detector 7745* is applied to the circuit $AV_5$ which, by its part $Af_5$ or 77203* (FIG. 16) controls the +/− box 77201*, and by its part, such as $Af_{5,1}$ or 77213* (FIGS. 17 and 18) controls the +/− box 77211* of the circuit 64/1 and 67/1 of FIG. 19, and analogous +/− boxes (not shown) for the other momentary waves $O_{5m}$.

The sequential wave $O_{5,1}$ applied to the circuit 66/1 of FIG. 19 is filtered by a circuit 7244*, is then subjected to one or more frequency changes, illustrated by the circuit 7254*, by the complex component $H_{k1}'$ (which is then respectively simple or truly complex), and is filtered again by the circuits 7264* to supply the signal $f_{5,1}$ derived after frequency change of the sequential wave $O_{5,1}$. It will be seen that up to now the reception of the wave $O_{5,1}$ has not been separated from that of the other waves $O_{k1}$.

The phase detector circuit 7771* receives the signal $f_{5,1}$ among all the signals $f_{k1}$ by selecting them in a manner controlled by the programme signal $P_{5,1}$.

The +/− box 77211* receives the signal $U = N.f$ from the frequency centre 7230* and sets it in frequency relative to the continuous wave $O_5$ by means of the signal $N.df_{5,1}$ supplied as described in the foregoing by the circuit $AV_5$ in its part $Af_{5,1}$ or 77213*. The output of the +/− box 77211* is applied to another +/− box 77511*, followed by a divide-by-N counter 77212*, whose output supplies the unique component $f_{5,1}'$ (of the second complex local signal $S_{5,1}'$), which is applied to the other input of the phase detector 7771*. The latter supplies the phase residue $R_{5,1}'$, which is applied to the circuit $A\phi_{5,1}$ or 77513* for controlling the +/− box 77511* such that unique component $f_{5,1}'$ will be in phase, except for a phase constant with the signal $f_{5,1}$ derived from the sequential wave $O_{5,1}$ as and when received.

In FIG. 19, the continuous waves $O_6$, $O_9$ and the corresponding sequential waves $O_{6,1}$ and $O_{9,1}$ are treated in the same way, it being understood that the phase constant for control on the unique components $f_{5,1}'$, $f_{6,1}'$ and $f_{9,1}'$ should be the same for the signals relating to the same measuring frequency (same value of the second index). This phase constant may correspond for example to a phase shift in the filtering and frequency changing circuits, which are common to all the sequential waves having the same measuring frequency.

Figure 20:
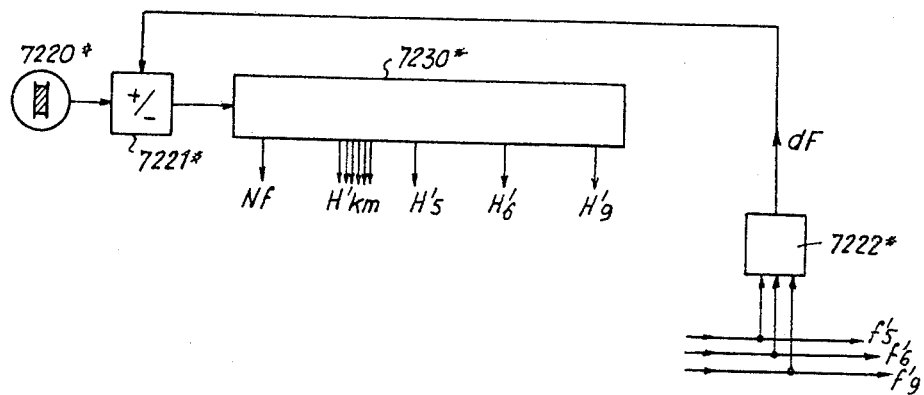
FIG. 20 is a partial electric circuit diagram of a modification of FIG. 19, in which the frequency of the single source 7220\* is the subject of a frequency correction before being applied to the frequency centre 7230\*.

FIG. 20 illustrates diagrammatically and partly a modification of the receiver of FIG. 9, in which the unique components $f_5'$, $f_6'$ and $f_9'$ are combined in a block 7222* for modifying means of a +/− box 7221* the frequencies applied by the source 7220* to the frequency centre 7230*. This effects a modification of all the frequencies supplied by the frequency centre while retaining their relationship. The stability required for the source 7220* is then less. Of course, it is possible to utilise only some of the signals such as $f_5'$, $f_6'$ and $f_9'$. If only one of them is used, an interesting modification of the receiver is obtained which will be described hereinafter with reference to FIG. 22.

The general operation of a receiver of the second embodiment will now be explained.

In the first control circuit 63, the control of the frequencies $Fs_k'$ of the first complex local signals $S_k'$ relative to the specific frequencies $Fs_k$ of waves $O_k$ as received is effected from frequency residues $R_k'$ supplied by the output of synchronous detection effected on the unique components $f_k'$.

These controls have the effect of applying a frequency correction $df_k$ to the frequency of each complex first signal $S_k'$, and this frequency correction may relate to the unique component or in an embodiment modification to the complex component. The frequency $Fs_k'$ of each first complex local signal is therefore:

$$Fs_k' = H_k' + f + df_k.$$

The second complex local signals $S_{km}'$ receive, for each specific frequency $Fs_k$, a frequency modification $df_{km}$ which is proportional to $df_k$ in the ratio of the nominal value of the measuring frequency $F_m$ to the nominal value of the specific frequency $Fs_k$:

$$df_{km} = \frac{F_m}{Fs_k} \cdot df_k.$$

Consequently, for each second complex local signal $S_{km}'$ we have $$F'_{km} = H'_{km} + f + \frac{F_m}{Fs_k} \cdot df_k.$$

All the frequencies of the complex components ($H_k'$; $H_{km}'$) and unique components ($f$) are drawn from the same source, irrespective of the value of the indices $k$ and $m$. Since H denotes the nominal frequency of the said source and $dH$ the instantaneous difference of the real frequency of the source relative to its nominal value, it follows that the nominal frequencies of the components $H_k'$, $H_{km}'$ and $f$ should be multiplied by $(1 + (dH/H))$ to obtain the real frequencies. In addition, it will be noted that the complex components $H_k'$ and $H_{km}'$ have, as nominal frequency, respectively $Fs_k - f$ and $F_m - f$; each unique component has a nominal frequency equal to $f$.

Considering now the frequencies of the received waves, they are modified by Doppler effect according to the speed $v_k$ of the receiver in the direction of the corresponding transmitting station $E_k$, for each value of the index $k$.

The specific frequencies received are therefore:

$$Fs_k (1 + \frac{v_k}{c})$$

and the measuring frequencies received are $$F_m (1 + \frac{v_k}{c}).$$

The symbol $c$ denotes the rate of propagation of the waves considered, assumed to be the same for all of them. It appears clearly from the second equation that the real frequency of a received sequential wave $0_{km}$ differs in general according to the value of the index $k$ as soon as the receiver moves relatively to the transmitting stations. That is why the signals $S_{km}'$ are different for the same value of the index $m$ and when the index $k$ varies.

The continuous frequency control applied to each complex first local signal $S_k'$ effects the following equality between the real received frequency and the real frequency of the local signal:

$$Fs_k (1 + \frac{v_k}{c}) = (Fs_k - f)(1 + \frac{dH}{H}) + f(1 + \frac{dH}{H}) + df_k,$$

this relationship is simplified to provide:

$$\frac{v_k}{c} = \frac{dH}{H} + \frac{1}{Fs_k} \cdot df_k;$$

this condition is therefore realised continuously by the first control circuit 63.

The real frequencies of the complex second local signals $S_{km}'$ are written, for each value of the indices $k$ and $m$, according to the second term of the following equation, where the first term is the real frequency of the wave $O_{km}$ as received (and when it is received):

$$F_m (1 + \frac{v_k}{c}) = (F_m - f)(1 + \frac{dH}{H}) + f(1 + \frac{dH}{H}) + \frac{F_m}{Fs_k} \cdot df_k.$$

This relationship expresses the condition for the real frequency $F_{km}$ of each second complex local signal to be equal to the frequency:

$$F_m (1 + \frac{v_k}{c})$$

of the wave $O_{km}$. The relationship is simplified to become:

$$\frac{v_k}{c} = \frac{dH}{H} + \frac{1}{Fs_k} \cdot df_k.$$

It appears that this condition is already realised by the permanent frequency control on the first local signal $S_k'$. Consequently, the second local signals $S_{km}'$ as generated are already set to frequency for receiving the waves $O_{km}$. The instability $dH$ of the frequency source H is compensated by each frequency correction $df_k$.

In a first embodiment, the frequency corrections $df_k$ and $df_{km}$ are applied to the unique components for the first and second complex signals. In a second embodiment, the frequency corrections are applied to the complex components, and preferably only to one of the simple components of each complex component, as will be seen later.

Advantageously, the receivers also use frequency corrections $df_k$ for obtaining information on the difference of the distances from the receiver to two transmitting stations.

Indeed, the control conditions set forth in the foregoing may be written:

$$\frac{df_k}{Fs_k} = \frac{v_k}{c} - \frac{dH}{H}.$$

Giving now to $k$ two different values, for example 5 and 6 corresponding to the transmitting stations $E_5$ and $E_6$, subtraction of the two corresponding equations gives:

$$\frac{df_5}{Fs_5} - \frac{df_6}{Fs_6} = \frac{1}{c}(v_5 - v_6).$$

Integration of such a difference as a function of time therefore provides information on the difference in the distances from the receiver to the transmitting stations $E_5$ and $E_6$.

In the examples of particular radio position-fixing chains, the values of the frequencies $Fs_k$ are very close and their relative difference never exceeds 1 thousandth. Consequently, by integrating directly the difference $df_5 - df_6$, the relative error does not exceed the thousandth. This error is corrected from time to time before it becomes appreciable by means of information supplied from the measuring frequencies.

The rate of repetition of this correction obviously depends on the speed of the moving object; by way of example, for a moving object travelling at 6 knots on the base line of a hyperbolic network, the error would be at the most of the order of a meter at the end of 5 minutes.

In addition, when the frequency corrections are made on the unique components $f_k'$ of the first complex signals, it is clear that the difference of the frequencies of two of them, $f_5' - f_6'$ for example, is identical with the difference $df_5 - df_6$; it may therefore form the subject of an integration for supplying information on difference in distances.

Figure 21:
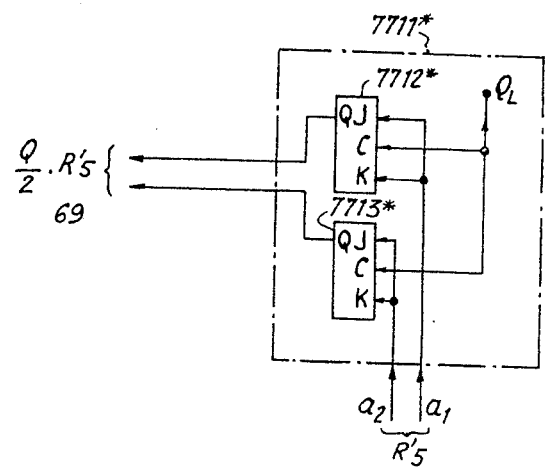
FIG. 21 illustrates the detailed diagram of a device of the second embodiment of the receiver for transforming the specific frequency residues such as $R_5'$ with a view to their use for supplying information on the difference of the distances from the receiver to two transmitting stations.

As a modification, the device of FIG. 21 is used. This figure shows a circuit 7711\* of similar construction to that of the circuit 77203\* of FIG. 16, and in which the two multivibrators J-K 7712\* and 7713\* also receive the signals $a_1$ and $a_2$ forming the specific frequency residue $R_5'$. The frequency applied to the time inputs of the two multivibrators J-K of FIG. 21 is a frequency $Q_L$. In the manner previously described, the output signals of the two multivibrators have the mean value $$(Q_L/2) \cdot R_5'.$$

This result corresponds in fact to the analogous relationship described in the foregoing for the circuit 77203\* which supplies a mean value of frequency correction $N.df_5$ satisfying the relationship:

$$N.df_5 = R_5' \cdot (Q/2).$$

The modification permitted by the device of FIG. 21 consists in integrating specific frequency residues for use in operation instead of integrating frequency differences of unique components, such as $f_5' - f_6'$.

Furthermore, it is recalled that according to the present invention it is advantageous that the frequency $Q_5$ is proportional to the specific frequency $Fs_5$ according to a factor $q$, i.e. $Q_5 = q.Fs_5$, and that likewise $Q_{5,1} = q.F_1$, the factor $q$ being the same for all the frequencies received. This then satisfies the condition stated in the foregoing:

$$\frac{Q_{5,1}}{Q_5} = \frac{F_1}{Fs_5} \quad \text{because} \quad \frac{Q_{5,1}}{F_1} = \frac{Q_5}{Fs_5} = q.$$

Reverting now to the relationship:

$$\frac{df_5}{Fs_5} - \frac{df_6}{Fs_6} = \frac{1}{c}(v_5 - v_6),$$

taking what has gone before into consideration, this relationship may be written:

$$\frac{q}{2 \cdot N}(R_5' - R_6') = \frac{1}{c}(v_5 - v_6).$$

The integration of the difference of the residues $R_5'$ and $R_6'$ as a function of time therefore also makes it possible to obtain information on the difference of the distances from the receiver to the transmitting stations $E_5$ and $E_6$.

For this reason, a circuit such as 7711\* of FIG. 21 enables the residue $R_5'$ to be weighted by means of a frequency $Q_L$ before integration which supplies differences in the distances to the transmitting stations.

The frequency $Q_L$ has the same value regardless of the index $k$ of the transmitting station concerned. It is selected in accordance with the measuring unit desired for the said integration.

Furthermore, the approximation already mentioned in the foregoing and consisting in assuming that the frequencies $Fs_k$ are extremely close and in neglecting the difference between them, is expressed by the fact that the frequencies $Q_k$ (such as $Q_5$) are all the same.

As already mentioned, an error occurs in the information of differences in distance obtained by integration of the difference $R_5' - R_6'$ after weighting by $Q_L$. This error is slight enough to be able to be corrected from time to time, every 5 minutes for example by means of phase information supplied by the second complex local signals of the receiver.

Figure 22:
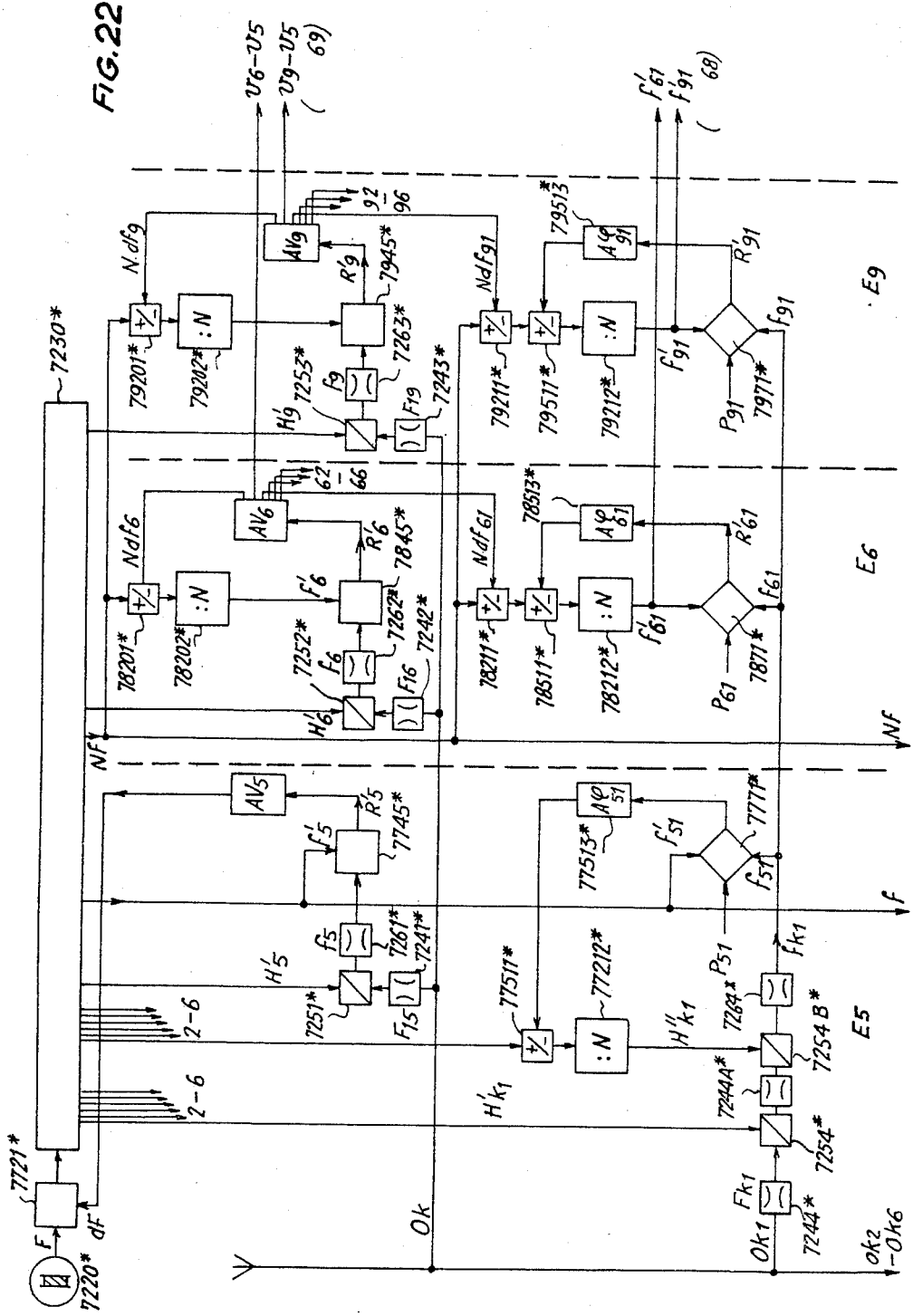
FIG. 22 is the general electric circuit diagram of a modification of the second embodiment of receiver according to the invention, in which the frequency of the single source is modified according to the control effected on one of the first complex signals.

FIG. 22 will now be described. In this figure, the residue $R_5'$ is used in the circuit $AV_5$ for controlling directly the +/− box 7721\* arranged between the unique source 7220\* and the frequency centre 7230\*. In this case the circuit $AV_5$ comprises only a circuit of the type $Af_5$ (77203\* in FIG. 6), the frequency $Q_5$ having a suitable value in relation to the value of the frequency to be corrected.

In FIG. 22, the residue $R_5'$ relating to the transmitting station $E_5$ therefore produces an overall modification of all the frequencies forming the first and second complex signals and supplied by the frequency centre 7230\*.

The right-hand part of FIG. 22, relating to the transmitting stations $0_6$ and $0_9$ is identical with the corresponding part of FIG. 19 except that the signals intended for the circuit 69 (not shown) are extracted from the circuits $AV_6$ and $AV_9$, which for this purpose each comprise a circuit such as 7711\* of FIG. 21.

The action of the residue $R_5'$ on the +/− box 7721\* has the effect of not only modifying the signal $f_5'$ (in fact strictly identical with $f$), applied to the detector 7245\*, but also of modifying the complex components $H_5'$ and $H_{km}'$. In FIG. 22, it will be observed that the sequential waves are subject to two frequency changes, and therefore that the second complex local signals have a complex component which is truly complex and which, for the measuring frequency $F_1$, comprises for example two simple components denoted in FIG. 22 by $H_{k1}'$ and $H_{kl}''$.

It may consequently be considered that the whole of the complex local signals are set in frequency relative to the continuous wave $0_5$ emanating from the transmitting station $E_5$. The frequency and phase setting circuits relating to the transmitting stations $0_6$ and $0_9$ therefore operate relative to the frequency-setting relating to the transmitting station $E_5$.

In FIG. 22 phase setting relative to the sequential wave $0_{5,1}$ is effected not on the unique component $f_{5,1}'$ but on the simple component $H_{k1}''$, which forms part of the complex component common to the second local signals $S_{k1}'$ regardless of the value of the index $k$, hence of the transmitting station concerned.

For this purpose, the circuits $A\phi_{5,1}$ have a suitable time constant while the +/− box and the divide-by-N counter 77512* are adapted to act on the simple component $H_{k1}''$, instead of acting as in FIG. 19 on the unique component $f_{5,1}'$. Consequently, the frequency difference detector 7745* and the phase detector 7771* both receive directly and at the same time a frequency $f$, a divide-by-N divider being assumed to be incorporated in the frequency centre 7230*.

The effect of this arrangement is that the phase correction relative to the transmitting station $E_5$ and obtained for the measuring frequency $F_1$ by means of the sequential wave $0_{5,1}$, is applied to a heterodyne frequency $H_{k1}''$. The result is that this phase correction is also applied to the other sequential waves $0_{k1}$ at the moment of this frequency change. Consequently, the signals $f_{6,1}'$ and $F_{9,1}'$ are representative of the phase difference between the sequential wave $0_{5,1}$ and the sequential waves $0_{6,1}$ and $0_{9,1}$.

All the signals supplied to the operational circuit are therefore expressed in relation to the permanent and sequential waves coming from the transmitting station $E_5$ serving in fact as reference. In this case, the hyperbolic networks have the transmitting station $E_5$ in common, and operational information is obtained directly in relation to the transmitting station $E_5$.

The relationships given in the foregoing remain valid. However, the frequency correction $dF$ plays a special part, this being that of compensating the instability $dH$ of the source. These equations read better by replacing $dH/H$ by $$\frac{dF}{F} = \frac{df_s}{Fs_5},$$

which causes the term:

$- df_5/Fs_5$ to appear in the equations concerning the stations $E_6$ and $E_9$, thus verifying the fact that the transmitting station $E_5$ serves as reference.

Figure 23:
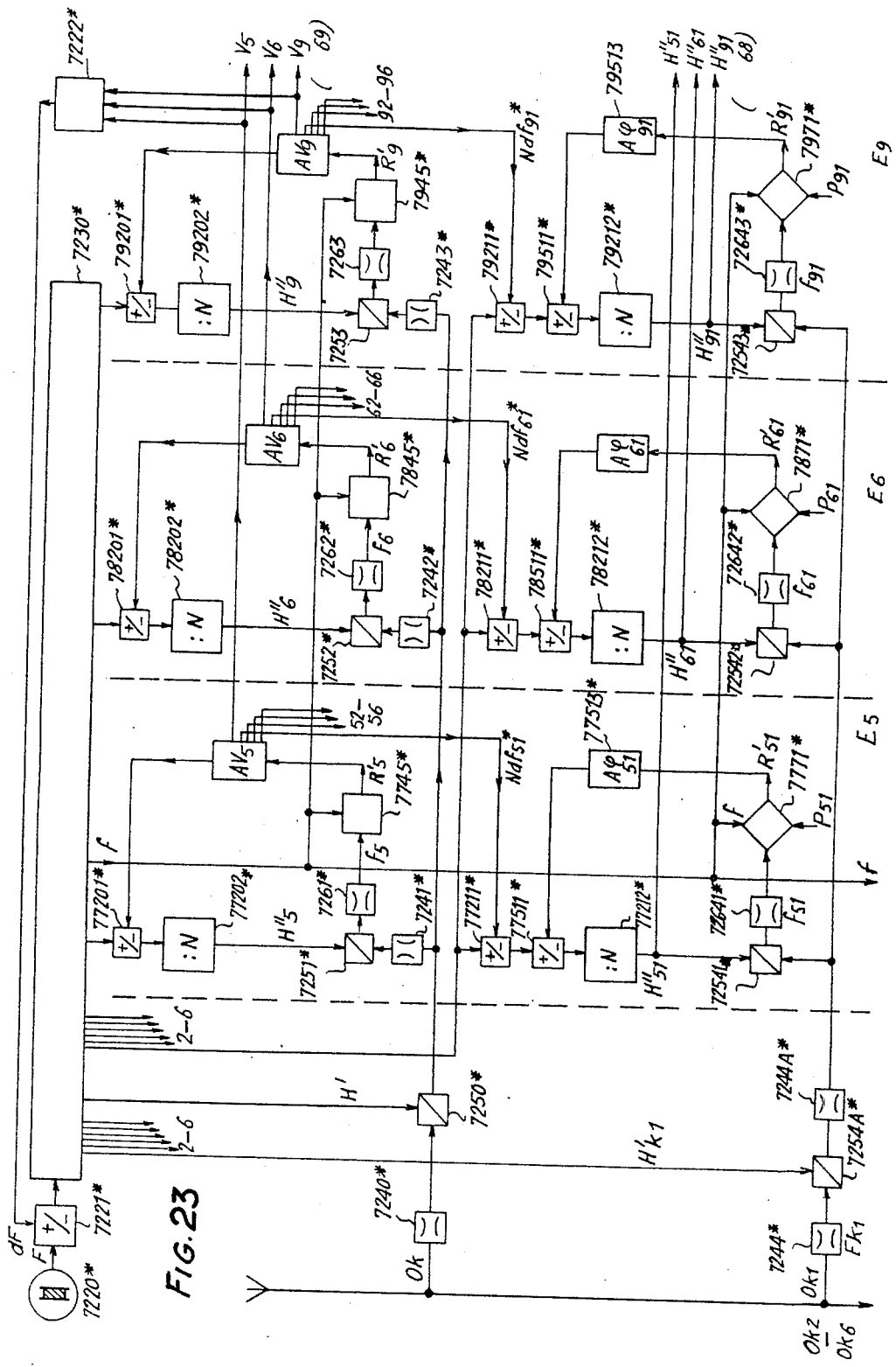
FIG. 23 is the general electric circuit diagram of another modification of the second embodiment of receiver, in which the frequency and phase controls relate to complex components of the first and second complex local signals.

FIG. 23 shows the general circuit diagram of another modification of the second embodiment of receiver, advantageous for moving objects having a high speed.

All the complex components of the first and second complex signals carry two simple components, one of which (H'; $H_{k1}'$) is common regardless of the index $k$ and therefore of the transmitting station concerned, and the other (for example H''; $H_{5,1}''$) depends on the transmitting station.

The frequency and phase corrections are applied in this embodiment to the said simple component which depends on the transmitting station, while the unique component is not modified by the first and second controls.

Thus, in FIG. 23, the component $H_5''$ applied as second heterodyne frequency to the wave $0_5$ is subjected to a frequency modification controlled by the circuit $AV_5$ in response to the residue $R_5'$ supplied by the detector 7745*, frequency modulation being effected by the +/− box 77201* followed by the divide-by-N counter 77202*, the output of the divider-counter 77202* being applied to the mixer 7251*.

The circuit $AV_5$ also controls frequency setting of the component $H_{5,1}''$ by the +/− box 77211*, while phase setting is controlled by the $A\phi_{5,1}$ circuit 77513* in response to the residue $R_{5,1}'$, phase setting being effected by the +/− box 77511* followed by the divide-by-N counter 77212*, whose output is applied to the mixer 72541*.

To sum up, detections are always made on unique components at the level of the frequency difference detector circuit 7745* and phase detector circuit 7771*, while frequency modifications are carried out respectively on the heterodyne frequencies $H_5''$ and $H_{5,1}''$, the latter also undergoing a phase modification.

The use of a common mixer 7250* for all the continuous waves is justified particularly because the specific frequencies are very close to one another. There is, on the contrary, no problem in using a common mixer denoted by 7254A for all the sequential waves having the same measuring frequency, specifically $F_1$.

In FIG. 23, the circuits $AV_5$, $AV_6$ and $AV_9$ comprise a weighting circuit such as the circuit 7711* of FIG. 21, for supplying speed information $V_5$, $V_6$ and $V_9$ to the circuit 69 (not shown).

This information $V_5$, $V_6$ and $V_9$ is respectively proportional to the frequency residues $R_5'$, $R_6'$ and $R_9'$ and, in a manner similar to what is shown in FIG. 20, they are combined in a circuit 7222* to be applied to the +/− box 7221* for total correction of the frequency of source 7220* before application to the frequency centre 7230*.

The simple components $H_{5,1}''$, $H_{6,1}''$ and $H_{9,1}''$ represent by their relative phases the phase differences between the sequential waves $0_{5,1}$, $0_{6,1}$ or $0_{9,1}$, but the said components are continuous. They are sent to the phase exploitation circuit 68 (not shown).

The signals H'' such as $H_{5,1}''$, $H_{5,2}''$ (not shown), etc. may or may not have the same frequency.

If they have the same frequency, the result is a very considerable complication for the production of the other simple components of the complex components, and in particular the impossibility of making frequency changes in the manner indicated hereinafter.

If they do not have the same frequency, there is then no major problem in producing the heterodyne frequencies; the difficulty is transferred back to the treatment of signals such as $H_{5,1}''$, $H_{5,2}''$, etc. by the circuit 68 (not shown). In this circuit, however, it is much easier to accommodate signals having different frequencies.

It will be observed in addition that if the mixer 7250* is common for the continuous waves as shown in FIG. 23, the frequencies $H_5''$, $H_6''$ and $H_9''$ have necessarily different nominal values when the unique component $f$ is also common, regardless of the index $k$ and thus of the transmitting station concerned. If they are equal, it is possible as a modification to use them for obtaining, by integration, information of distance differences.

Hitherto, in the description of the second receiver embodiment, the embodiment of the frequency changes and the frequency centre 7230* has not been discussed in detail.

A point common to all the embodiments of the invention is that the unique component of each complex local signal has a very low nominal frequency (a few c/s), and requires a very narrow pass band of the order to 0.5 c/s.

The teachings of Appendix A, hereinafter called the aforesaid patent, will be applied, it being pointed out that the frequencies mentioned therein have values agreeing with the values indicated in the first example of radio position-fixing chain set forth in the foregoing.

For a better understanding of the conditions of applying these frequency changes to the embodiment of the receiver according to the present invention, and the resulting advantages, reference will be made to the description of the transmission installations which has been made in the foregoing.

Since the number of heterodyne signals to be supplied by the frequency centre is then fairly high, it is advantageous to utilise for their production the devices described with reference to FIG. A3 of the aforesaid Appendix A.

Since the reception of the specific frequencies is to be continuous, it is evident that the constituent elements of the corresponding reception channels will have characteristics fixed in the sense of the aforesaid patent specification, several stages of frequency changes being possibly common.

The reception of the sequential waves having the measuring frequencies is on the contrary interrupted. It is then sufficient to use a reception channel for each measuring frequency, with fixed characteristics and possibly common elements, according to FIG. A7 of the aforesaid Appendix A. At the limit, a single reception channel is used for all the sequential waves and all the measuring frequencies, the characteristics of the elements constituting this reception channel being then modifiable by switching, in the sense of the aforesaid Appendix A, according to a predetermined programme dependent on the reception programme of the sequential waves.

Of course, the arrangements illustrated in FIGS. A4 and A6 of the said Appendix A are also advantageously applicable to the embodiment of receivers according to the invention.

The importance of the use of frequency changes according to Appendix A and the resulting economy will be better understood by referring to the description of the transmission installations. It is of course not essential to use circuits strictly identical with those of the transmitting stations for using them in the receivers.

Of course, numerous embodiment modifications of a receiver may be considered, at the level of general composition and also at the level of individual circuits. In particular, certain general or detail modifications of the first embodiment of receiver apply to the second embodiment just described, particularly with regard to the operating circuits.

There will now be described with reference to FIGS. 24 to 31 a highly advantageous modification of receiver according to the second embodiment as illustrated in FIG. 19, comprising a number of important improvements, whose interest will appear particularly at the level of the utilisation of the signals.

In this modification, the receiver receives four different transmitting stations for forming two independent hyperbolic networks. The four transmitting stations received are denoted hereinafter by the letters A, B, C and D in a general manner. For abbreviation, the index $k$ is given the values $a$, $b$, $c$, $d$ respectively for each of the reception channels A, B, C, D, without the values $a$, $b$, $c$, $d$ being specified precisely.

Comparing now the contents of FIG. 24 with those of FIG. 19, it appears that the unique frequency source 7220* is followed in FIG. 24 by a circuit 720* which is a frequency and phase corrector responding to information coming from a circuit such as 7222* (FIG. 23 or FIG. 26, discussed in the following).

According to FIG. 23, the circuit 7222* supplies an output similar to a linear combination of the specific frequency residues such as $R_s'$. In FIG. 21, we have seen that a residue such as $R_s'$ comprises two signals on two separate, respective lines, one of the signals corresponding to a positive difference and the other to a negative difference.

In FIG. 24, the corrector 720* therefore likewise receives two separate control signals, one positive on a + line and the other negative on a − line, these signals being for example of the same type as those supplied by the circuit of FIG. 21. In any case, it is assumed that the signals are of logical type such as rectangular signals or pulses.

In the first place, the + and − lines are applied respectively to divider-counters 72211* and 72212*, having the same modulus, for supplying a time constant, and the respective outputs of these two counters are applied to the + and − inputs of a reversible counter 72213*. In manner known per se, this reversible counter is coupled stage by stage to a synthesiser 72214*. This synthesiser has an output frequency equal to $p/K$ times its input frequency, $p$ being variable from 0 to $K - 1$ in a manner controlled by the reversible counter. It is understood that the reversible counter 72213* responds to the difference between two numbers of ascending fronts (for example), arriving respectively on the + line and − line, while controlling a variation in the output frequency of the synthesiser. The frequency of 5 Mc/s supplied by the source 7220* is applied to a divide-by-20 counter 72201*, which therefore supplies 250 kc/s. This latter frequency is applied on the one hand to the synthesiser 72214*, and on the other hand to a divide-by-2 counter 72218*, which are followed respectively by the counters 72215* and 72219* of the same modulus.

In the second place, the + and − lines coming from circuit 7222* are also applied to divider-counters 72216* and 72217* having the same modulus, respectively.

Assuming that the synthesiser 72214* supplies an increasing frequency when the counting of the reversible counter 72213* increases, the output of the divider 72215* supplies rectangular signals which are combined with those of the output of the counter 72216* in an exclusive OR circuit 72221*. The output of the counter 72219* is combined in the same way with the output of the counter 72217* in an exclusive OR circuit 72222*. Finally, the respective outputs of the circuits 72221* and 72222* are applied to a +/− box 7221*.

The synthesiser 72214* and the counter 72218* supply frequencies in the form of rectangular signals. Half the range of frequency correction permitted by the synthesiser is permanently applied to the − input of the +/− box 7221*, from the output of the counter 72219*. This forms a sort of negative frequency polarisation. The synthesiser 72214* may then be used for obtaining a positive or negative frequency correction.

Furthermore, the outputs of the counters 72216\* and 72217\* supply rectangular signals individually producing a phase correction. It is advantageous to provide a reversible counter at the input of the +/− box 7221\*, reducing by so much the moduli of the counters 72215\*, 72216\*, 72217\*, and 72219\*.

The output of the +/− box 7221\* is then used in a circuit called "coincidence detector" of the type described in Appendix D. By means of such a circuit it is possible to bring into step the frequencies of two different sources with a very high precision. Care will be taken to distinguish this coincidence detector from conventional coincidence detectors. The lay-out comprises a divide-by-250 frequency divider formed of a counter 72223\*, connected to the output of the +/− box 7221\*, and connected to a first input of the coincidence detector 72224\* properly so-called, illustrated by a double lozenge. The detector 72224\* is constructed for example as illustrated in FIGS. D5 and D6. Its second input receives the signal of a frequency source 72225\* by means of a divide-by-10 counter 72226\*, while the output of the coincidence detector 72224\* controls the frequency of the frequency source 72225\*, which has a nominal frequency of 5,010 kc/s. The output of the frequency and phase corrector is formed by the signal of 501 kc/s supplied at the output of the divider-counter 72226\*. Finally, this 501 kc/s signal is governed by the unique source 7220\*, while undergoing in the circuit 720\* the phase and frequency corrections controlled by the + and − lines coming from the circuit 7222\*.

This 501 kc/s signal is applied to a second coincidence detector 72201\* having its output connected to a frequency source 72203\* of 9,600 kc/s, whose output is connected more particularly to a divide-by-9,600 counter 72204\*, the output of the latter being connected to the other input of the coincidence detector 72201\*.

These circuits form a frequency centre 722\*, which therefore supplies a signal of 9,600 kc/s coming from the frequency source 72203\*, a signal of 1 kc/s coming from the output of the divider-counter 72204\*, a 4 c/s signal, denoted by $2r$ and supplied in the form of an assembly of different outputs of binary stages of a divide-by-256 counter 72205\*, connected to the output of the counter 72204\*, and a signal of 2 c/s, denoted by $r$, supplied by the output of a divide-by-2 counter 72206\*, connected to the output 72205\*. (Unless stated otherwise, the output of a counter will refer to its division output.)

It is advantageous that the signals supplied by the frequency centre 722\* have a common time origin so that they have a "passage through zero" in a definite direction. It will be said that these signals have the same phase reference. In other words, the ascending fronts (or descending fronts in modification) are simultaneous with those of the 9,600 kc/s signal. In addition, the ascending fronts of the signal $r$ are simultaneous with the ascending fronts of the other signals. The signal $r$ consequently gives the phase reference.

Finally, FIG. 24 comprises a circuit 80\* which is called "stimuli" generator. The word "stimulus" is used here to denote a signal generated locally at the level of the receiver, having one of the measuring frequencies $F_m$ and intended to be processed exactly like the received momentary waves $O_{km}$, which have the measuring frequencies $F_m$.

The circuit 80\* comprises a synthesiser 802\*, whose control inputs are coupled to a fixed store 801\*, such as a diode matrix. The synthesiser 802\* receives the frequency of 9,600 kc/s and its output is applied to a circuit 803\* dividing the frequency by 12. The diode matrix 801\* is adapted to control the synthesiser 802\* such that the output of the divider 803\* can supply each of the measuring frequencies according to a programme signal $P_1$.

The synthesiser 802\* has, for example, a factor K equal to 6,400, and a number $p_m$, which depends on the measuring frequency $F_m$ controlled by the programme signal $P_1$, with $p_m = F_m/125$ c/s.

The signal $P_1$ is properly speaking the reception programme signal. It is illustrated in FIG. 30, to which reference will now be made, at the same time as to FIG. 3, which is the transmission programme. FIG. 30 concerns only the first minute of the transmission programme, that is to say the first two boxes on the left of the table of FIG. 3.

For five seconds before and after each switching of the transmission programme of FIG. 3, therefore for 10 seconds in all, the reception programme controls the production of a stimulus on one of the measuring frequencies. During the time interval of 20 seconds, which passes from the fifth to the twenty-fifth seconds of each transmission programme box, the reception programme comprises four reception boxes successively for the momentary wave which is being transmitted at that moment by each of the selected transmission stations A, B, C, D. The frequency measuring values are to be sure defined by the transmission programme of FIG. 3 and the real choice of the transmitting stations is denoted generally by A, B, C, D. In FIG. 30, this measuring frequency is denoted by $F_a$, $F_b$, $F_c$, $F_d$.

With regard to the reception of the sequential waves having the measuring frequencies, the reception programme is defined as soon as the reception time intervals of A, B, C, D are fixed, because the values of the frequencies follow therefrom immediately according to FIG. 3. On the other hand, for putting into operation the stimuli, the choice of the frequencies remains free after the intervals of time of putting the stimuli into operation have been fixed. It will be assumed that the choice is made as shown in FIG. 30: measuring frequency $F_1$ about zero second, $F_2$ about 30 seconds, frequency $F_3$ about 60 seconds, etc.

It will therefore be understood that the diode store 801\* is adapted to respond to the programme signal $P_1$ by controlling at any instant the measuring frequency (if it exists) corresponding to the output of divider 803\*. It will be noted, however, that in the programme circuit $P_1$, the measuring frequencies are not distinguished as to whether it is a matter of the reception of sequential waves or of the use of stimuli. A programme signal $P_2$ is therefore used to represent the presence of stimuli, with the shape indicated in FIG. 30. This signal $P_2$ is applied for the forced and durable resetting to zero of the divider-counter 803\*. The latter, therefore, can provide a stimulus as its output only when the signal $P_2$ is at the upper level in FIG. 30. Therefore, the signal $P_2$ alone gives the time intervals for putting into operation the stimuli, in a manner independent of the reception of the sequential waves. It is assumed that the power level of the stimuli is sufficiently higher than the power level of reception of the waves for the waves received to be negligible when stimulus is applied to the reception channels by the output of counter 803\*.

Finally, it is known that a synthesiser followed by a divider-counter, such as 802* and 803*, respectively, make it possible to act on the frequency of a signal. However, the phase of the signal leaving the divider is in principle not strictly defined.

The Applicants have found that the states of the different stages of the counter 803* and also of the synthesiser 802* constituted a form of representation of the phase of the output signal of counter 803*, and that by using the 2 c/s signal r coming from the circuit 72206* for resetting to zero all the stages of counter 803* and advantageously of the synthesiser 802* at the moment of the ascent front (or of descent in a modification) of the signal r, each ascent front of the signal r is simultaneous with an ascent front of the signal supplied by the stimuli generating circuit 80*. Whereas the phase of the latter signal is not defined on departure, it may be written that the signal r serves as reference for "reconstituting" the phase of the output signals of counter 803*.

Of course, it is useful to transform the signal r, which leaves the counter 72206* in rectangular form, into pulses at the moment of ascent (or in a modification, of descent) of the rectangular signal, for returning to zero all the stages of circuits 802* and 803* at the moment of the ascent front. This transformation into pulses is considered as being accessible to the person versed in the art. In what follows, the circuits producing this transformation will not be illustrated or mentioned, it being understood that they may exist whenever resetting to zero at a given moment is described.

When, on the contrary, as for the signal $P_2$ applied to the counter 803*, resetting to zero is effected in a durable manner, it is clear that no transformation into pulses is carried out.

Hereinafter, numerous structures will be found analogous to those of circuit 80*, on the one hand with regard to the control of a synthesiser by means of a diode store (illustrated in the Figures by a square block containing a vertical diode), on the other hand concerning the reconstitution of a phase by the 2 kc signal r. In fact, the signal r may serve to reconstituted the phase of any signal derived from the 9,600 kc/s signal and having a frequency which is a multiple of 2 kc/s.

In FIG. 25, circuits of FIG. 19 will be found again for the most part. In addition, the frequency centre 230* of the said FIG. 19 is split up to show its different elements. Finally, in a manner similar to that shown for the transmitting stations (FIGS. 5 and 6) for each reception channel there are two frequency changes, in which the heterodyne frequency is supplied by division of the 9,600 kc/s frequency, and a third frequency change of which the heterodyne frequency is supplied by a synthesiser followed by a frequency divider.

In FIG. 25, the first two frequency-changing stages are common in so far as concerns the reception of the specific frequencies of the four selected transmitting stations A, B, C, D. They have the same structure as the first two stages of FIG. 9.

By way of example, only the third frequency-changing stage will be described, this stage relating to the transmitting station A. It comprises a synthesiser 7231C*, controlled by a diode store 7231E*, which responds to a selected value of the index $k = a$ of the transmitting station A. The synthesiser 7231C* is followed by a divider-counter 7231D*, whose circuit supplies the heterodyne frequency of a mixing circuit 7251C*. The mixing circuit 7251C* is represented by a double square block, indicating that it is advantageously adapted for eliminating the image wave, for example as described in Appendix A in conjunction with FIG. A4 thereof.

The final frequency-changing stages allocated to the transmitting stations A, B, C, D therefore supply respectively signals denoted by $f_a$, $f_b$, $f_c$, $f_d$. These rectangular signals have a nominal frequency whose value is defined by the circuits downstream, as described hereinafter, regulation of the synthesisers, such as 7231C* being effected in consequence.

With regard to the measuring frequencies, they arrive on the one hand from the aerial 71*, and on the other hand by the stimuli generator 80* by means of a matching circuit 808*, adapted to have known phase displacement at the different measuring frequencies and comprising for example a very low capacitance.

Reception of the measuring frequencies is effected like that of the specific frequencies, except that the filters of the first frequency changes (all the references 7244*), frequency dividers 7234A* and 7234B*, and the synthesiser 7234C* coupled to the diode store 7234E* are variable in response to the programme signal $P_1$. A synthesiser may be variable in the manner hereinbefore described. For the divider-counters and filters, variability is obtained by change-over switching. This variability in fact permits a saving of means and is described more particularly in Appendix A.

In addition, the divider-counters 7234A*, 7234B*, 7234D* and advantageously the synthesiser 7234C* all receive the signal r which effects phase resetting of all the components of the second complex local signals, in the manner described with regard to circuit 80* of FIG. 24.

The output of the mixer 7254C* is applied to a filter 7264A* and a clipper 7264B*, whose output supplies a signal $f_{km}$, where the index $k$ is limited to the values $a$, $b$, $c$, $d$ which are effectively selected for the transmitting stations A, B, C, D. These signals are derived from the momentary waves received. The output 7264B* supplies in addition "stimuli $f_m$" or "St.$f_m$" signals, derived from the stimulus $F_m$ after frequency changes.

The values of the division factors of the table, given in the course of the description of the frequency changes in the transmitting stations, remain valid for the receiver. All the synthesisers of FIG. 25 have a number K equal to $4096 = 2^{12}$, and the adjustment of the factors $p$ is different; it is necessary in fact to take into account the common nominal value of the frequencies $f_k$ and $f_{km}$, say about 4 c/s, as will now be seen.

FIG. 26 illustrates the embodiment of the synchronous detectors supplying the frequency residues $R_k{}'$ and the phase residues $R_{km}{}'$ ($k = a,b,c,d$).

We shall first of all consider synchronous detection of the signal $f_a$ obtained by frequency changing from the permanent wave received by the channel A. It is assumed for example that the specific frequency of this wave is $Fs_5$.

The circuits shown in FIG. 26 are identical with those of FIG. 16, the frequency $Q_5$ applied to the block 77203* being in addition derived by a synthesiser 7210* from the frequency 1 c/s which comes from the circuit 62*, as indicated in the foregoing. It is possible to make the synthesiser 7210* common to the channels A, B, C, D if it is adjusted by construction to a value corresponding to the specific mean (for example K = 6,4000, and $p =$ the nearest whole number to the mean of the specific frequencies divided by 250 c/s; $p$ being as large as possible between 3,200 and 6,400, if necessary the circuit 77203* being given a greater division factor than that of the circuit 7711*.)

The frequency applied to the +/− box 77201* is the 1 kc/s coming from the circuit 722*. The modulus of the counter 77202* being equal to 256, it follows that the nominal value common to the low frequencies $f$ is equal to 1,000 : 256 = 3.906 c/s approximately, as already indicated.

In addition, in FIG. 26, a circuit 7711*, of the type shown in FIG. 21, is used for weighting the frequency residue $R_s'$ supplied by the frequency difference detector circuit 7745*, the frequency $Q_L$ of FIG. 21 being the 1 kc/s coming from the circuit 722*.

With regard to the measuring frequency, FIG. 26 comprises only one phase detector 7771* and one circuit 77513*. However, instead of being done in the detector 7771* as in FIG. 18, inhibition of phase control is effected in circuit 77513*, for example by forcing to zero the bistable multivibrators or blocking the weighting signal $R_{s,1}$.

Furthermore, there is an important difference between the modification of FIG. 26 and the embodiment of FIG. 18. The result of this difference is more particularly the fact that the circuit 77513* receives directly the frequency of 1 kc/s supplied by the circuit 7711*. In fact, this circuit 77513* plays the same part as the circuit 7711*; it supplies weighting of the phase residues $R_{km}'$ and St.$R_m'$ supplied by the phase detector 7771*, respectively for the signals $f_{km}$ obtained from the received momentary waves and for the signals St.$f_m$ obtained from the stimuli. It will be recalled in this connection that the reception channel of the measuring frequencies of FIGS. 25 and 26 is distinguished only by the frequency values, the distinctions between the waves, according to the original transmitting station and also with the stimuli, being made by the programme signals. For these programme signals, only their form is given, their production being considered to be within the capacity of the person versed in the art.

The essential difference between this modification and the previously described receivers is the following:
— in the first embodiment, FIGS. 10 and 12 for example, the frequency and phase residues are integrated separately; the continuous residue of specific frequency $R_s'$ is integrated in the computer 7741, at the same time that it acts on the frequency source 7710*, which continuously distributes this frequency difference to counters such as 7791*. Each of the counters integrates in turn individually the differences thus obtained, proportionally to the respective measuring frequencies $F_m$. A readjustment is made by the +/− box 7761* when a sequential phase residue $R_{s1}$ appears;
— in the second embodiment, FIGS. 16 and 18, the mode of operation is the same but the frequency residues themselves, such as $R_s'$, are used for feeding each counter, such as 77212*, by the +/− box 77211* and the weighting circuit 77213*;
— in the present modification only the specific frequency residues $R_k'$ are integrated, and a phase multiplier is used for deriving from these integrated values the corresponding phases, reduced to the measuring frequencies.

In FIG. 27, the 9,600 kc/s signal coming from circuit 7722* is applied to a divide-by-3 counter 900, which therefor supplies a signal having a frequency of 3,200 kc/s. This signal is applied to four +/− boxes, respectively 902A to 902D, which receive as control signals the residues R$a'$, R$b'$, R$c'$ and R$d'$ from the synchronous detection circuits A, B, C, D, of FIG. 26.

The outputs of the +/− boxes 902A to 902D are applied respectively to counters 901A to 901D, as in FIG. 28 to corresponding identical counters 931A to 931D.

If we now consider once more FIG. 26, the sensitivity factor at the inputs of the detector 775* is given by the frequency Fa (although, because of frequency changes, the frequency therein is about 4 c/s). At the output of the +/− box 77201*, the sensitivity factor is given by the frequency Fa.256.

Concerning the residue weighting circuits 7711* and 77203*, it will be recalled that they receive the respective frequencies 1 kc/s, and 1 kc/s multiplied by 6,400 (because of the synthesiser 7210*). In fact, these circuits each comprise not only a pair of bistable multivibrators J-K but also a pair of counters, the respective division factors being different from one pair to the other.

These two circuits are so adapted that the sensitivity factor at the output of the counters 901A to 901D is equal to 250 c/s, taking the division factor $N_o$ into account.

In FIG. 27, the inputs of counters 901 are applied to a change-over switch 903, and their outputs are applied to a change-over switch 904, these two switches being controlled simultaneously by the programme signal $P_4$ of FIG. 30. Outside the stimuli, this programme signal $P_4$ selects one of the received transmitting stations (A to D) for using the information derived from the specific frequency residue associated with the said transmitting station in the rest of the circuits of FIG. 27. It will now be assumed that programme signal $P_4$ is on the channel A.

In FIG. 27, the circuits 911 to 917 form a unit possessing the function of phase multiplier, and this will now be so designated. It comprises two identical synthesisers 911 to 915, controlled simultaneously by a diode store 914 according to the programme signal $P_1$. The phase multiplier also comprises three identical counters 912, 913 and 916, all dividers by 256. Finally the divider-counters 913 and 916 have the outputs of all their stages coupled respectively to the inputs of a subtractor 917, in the order of the corresponding weights.

In FIG. 27, the synthesiser 911 has two materialised outputs, the output $p/K$ which alone has been considered up to the present in the synthesisers and does not bear any distinctive mark in the drawings, and an output $1/K$ (pure and simple division by K) which is applied to the counter 912, while the said output $p/K$ is applied to the counter 913.

The output of the counter 912 is a phase reference similar to that supplied by the aforesaid signal $r$. It is applied to reset the counter 913 to zero.

Furthermore, the stages of the synthesiser 915 and of the counter 916 are reset to zero by the output of the switch 904 which is that of the counter 901A. This zero resetting is therefore effected according to the phase of the output signal of counter 901A.

The division factor $N_o$ of all the counters 901 is selected equal to the product of the number K, common to the synthesisers 911 and 915, multiplied by the division factor 256, common to the counters 912, 913 and 916. The result is that the output of the counter 912 has the same frequency as that of counters 901.

Furthermore, the two synthesisers 911 to 915 being fed by the same frequency 5,200 kc/s and having the same coefficient $p_m$, the divided output frequencies (not shown) of counters 913 and 916 are equal to one another and equal to the product of the output frequency of counter 912 (and of counters 901 multiplied by the coefficient $p_m$.

On the other hand, the phase of the output signal of counter 901A comprises a phase difference relative to the reference phase supplied by the output signal of counter 912; the phase difference is due to the action of the +/− box 902A.

In fact, the input signal of counter 901A is the signal coming from counter 900 whose frequency is 3,200 kc/s, modified by the +/− box 902A. It will be recalled that a +/− box adds or suppresses the ascent fronts in the signal passing through it (or descent fronts or pulses, according to the nature of the signal passing through it). The person versed in the art will understand that each ascent front added or suppressed corresponds to a period more or less, respectively, in the 3,200 kc/s signal. The modification of a period is thus obtained is equal to one phase rotation. Returned to the output of a counter such as 901A, this phase rotation is divided by $N_o$ and becomes a modification of $1/N_o$ of one rotation of the phase of the output signal of this counter.

It has been seen above that the frequencies of the divided outputs (not shown) of counters 913 and 916 are equal to one another and to the product of the output frequency of counter 912 and counter 901A multiplied by the coefficient $p_m$.

Due to the fact that resetting to zero of counters 913 and 916 is effected according to the phases of the respective output signals of counters 912 and 901A, the phase difference between the output signals of counters 913 and 916 is equal (except for a whole number of rotation) to the product of the phase difference existing between the output signals of counters 912 and 901A multiplied by the same coefficient $p_m$.

It should be noted that the fact of applying to the synthesiser 915 the 3,200 kc/s signal coming from the circuit 900 and having passes through the +/− box 902A results in the permanent realisation of the above relationship once the first zero resetting of counters 913 and 916 has been carried out.

As has already been explained, the different sorts of stages of counters 913 and 916 are representative of the phases of the output signals divided by these counters.

These stage outputs are applied in the order of the corresponding weights to the inputs of a numerical subtractor 917.

The output of the numerical subtractor 917 is therefore representative of the phase difference between the output of counter 901A and the output of counter 912 multiplied by the number $p_m$. For that reason, the device just described is called "phase multiplier." For synthesisers 911 and 915, the values of $p_m$ are controlled by the diode store 914 as a function of the programme signal $p_1$, according to the relationship:

$$p_m = (F_m/250 \text{ c/s}).$$

We have seen in fact that the phase at the output of counters 901 has a selected sensitivity factor equal to 250 c/s.

In the foregoing, it has been assumed that:

$$N_o = K.256.$$

It will be observed that the same mode of operation is obtained when $N_o$ is a multiple of the product K.256.

It has previously been stated that the sensitivity factor of the output of counters 901 was equal to 250 c/s. This means that a variation of 1 phase rotation difference between the output signal of a counter 901 and a reference signal of the same frequency corresponds to a variation in the propagation distance of $$300,000/250 = 1,200 \text{ km}$$

(making the approximation that the speed of propagation is equal to 300,000 km/s).

It will be noted that the output frequency of the counter 901A is about 2 c/s. Nevertheless, the output phase of the counter 901A has a sensitivity of 250 c/s with regard to its proportionality relationship with the propagation time of the waves coming from the transmitting station A.

Considering now the propagation time, the output of counter 901A is $$Ta - To + Ua,$$

$Ta - To$ being the time given by integration of the difference between the Doppler effect on the continuous wave coming from the transmitting station A and the instabilities of the unique frequency source, and Ua being an integration constant, unknown hitherto, which depends on the initial situation of counter 901A.

The outputs of the other counters 901B to 901D have the same form.

The circuits of FIG. 27, which will not be described, produce the control of the phases of the second local signals relative to those of the sequential waves received, and permit the constants such as Ua to be determined.

In FIG. 27, we shall now consider the reversible counter 918, whose modulus is 256, and the writing-reading store 919, which has a capacity of 48 bits; 8 bits (for 246) for each of the 6 measuring frequencies.

These two circuits allow the phase difference $qm$ in the reception channels to be stored by utilising the stimuli on the measuring frequencies $F_m$.

Referring to the programme of FIG. 30, the switch 922, normally closed, is opened by the signal $P_2$. At the same time, the signal $P_1$ addresses the writing-reading store at the place allotted to the measuring frequency $F_1$. Assuming that the store 919 may be read at any moment at the store positions addressed, the reversible counter 918 is pre-positioned at the value previously stored, in response to the programme signal $P_5$. Switch 922 being open, it only applies 0 bits to the adder 921 (it is preferable actually to manufacture these zero bits in response to the programme signal $P_2$). The adder 920 adds the phase $\phi_m$ contained in the reversible counter 918 to the 4 c/s signal supplied by counter 72205* of FIG. 24. Only the bit of greater weight from the addition is retained as constituting the signal $St.f'_m$. This signal $St.f'_m$, in the phase detector 7771* of FIG. 26, is opposed to the stimulus coming from circuit 80* after frequency changing. This comparison produces a phase residue $St.R'_m$ which is weighted by circuit 77513*. As was seen previously with reference to FIG.

21, such a residue comprises a + signal and a − signal. The residues are applied to a switch 926 which sends them to the reversible counter 918 in the presence of the stimuli indicating programme signal $P_2$ or to a reversible counter, described later, in the contrary case. In the prosence of the programme signal $P_2$, the + signal and the − signal of the phase residue $St.R'_m$ are applied respectively to the + and − inputs of the reversible counter 918 for correcting its value until the phase difference detected by the phase detector 7771* is zero. This is normally true at the end of the stimulus. The value $\phi_m$, thus corrected and contained in the reversible counter 918, is then recorded in the store 919 by the action of the signal $P_6$ of FIG. 30. It is thus possible to record in the store 919 six quantities representative respectively of the phase differences $\phi_m$ in the receiving circuits for the six measuring frequencies Fm.

The circuit consisting of the reversible counter 924 and the writing-reading store 915 functions in the same way, but the store 915 contains four times more information than the store 919 (as much as the store 919 for each of the four transmitting stations A, B, C, D received).

This store 925 contains information of the form $Fm.Uk$, with $k = a, b, c,$ or $d$ and $m$ variable from 1 to 6 for each of the measuring frequencies; that is to say, products of the constants U multiplied by the different measuring frequencies.

The store 925 receives, as address signal, the programme signal $P_7$ of FIG. 30, resulting from the combination of the programme signal $P_1$ with the programme signal $P_4$ by removing the stimuli time intervals, given by the signal $P_2$.

Assuming arbitrarily that the measuring frequency $F_1$ is received from the transmitting station A, the reversible counter 924 receives the value $F_1.Ua$ previously stored in the store 925, according to the address of the programme signal $P_7$. At the same time, the programme signal $P_1$ acts on the synthesisers 911 and 915 in order that the output of the subtractor 917 will be a phase $F_1$ $(Ta − To + Ua)$. The output of the subtractor 917 is subtracted from the contents of the reversible counter 924 in a subtractor 923, which gives $F_1$ $(Ta − To)$. The multiple switch 922 being closed, the output $F_1$ $(Ta − To)$ of the subtractor 923 is applied to the adder 921 together with the phase difference $\phi_1$ contained in the reversible counter 918; finally, the output of adder 921 is added in adder 920 to the signal 4 c/s coming from the counter 72205* of FIG. 24. The bit of greater weight forms a signal $Fa1'$ which in the phase detector 7771* is opposed to the signal $Fa1$ derived from the wave $Oa1$ after frequency changing. The residue $Ra1'$ then acts, after weighting in 77513*, on the reversible counter 924 to obtain zero phase difference at the terminals of the circuit 7771* of FIG. 26. At the end of this operation, which is materialised by the signal $P_8$ of FIG. 27, the new value of $F1.Ua$ contained in the reversible counter 924 is transferred to the store 925.

In a general manner, the values thus obtained are corrections $Fm.Uk$ to be applied to the phase $Fm$ $(Tk − To + Uk)$ supplied by the phase multiplier from counters 901 so that the phase of the second local signal $f_{km}'$ supplied by the output of adder 920 will be equal to that of the signal $f_{km}$ derived from the corresponding momentary wave $O_{km}$. This correction does not comprise the reception phase differences $qm$, which are contained in the store and are applied separately by the adder 921. It will be observed further that the stores 919 and 925 may be regrouped to form one and the same store block.

Consequently, the information contained in the store 925 corresponds to the phase constants U existing in each of counters 901. As will be seen later, the operation of ambiguity removal consists in using the information contained in the store 925 for eliminating the phase constants U from each of the counters 901. This operation is effected by means of the counters 931 of FIG. 28.

It will be observed that hitherto, the programme signals (FIG. 30) have been connected to the transmission programme; the programme signals which will be used now (FIG. 31), on the contrary, are independent thereof.

In FIG. 28, the inputs of counters 931A to 931D are connected to a switch 932, while the outputs of counters 901A to 901D are applied to a switch 933. The outputs of counters 931A to 931D are applied to a switch 934; finally the counters 931A to 931D have each an instantaneous zero re-setting input connected to a switch 935. The four switches 932 to 935 are controlled by the programme signal $P_9$ which selects successively one of the positions A to D for the removal of ambiguity. In FIG. 31, the programme has been limited to the removal of ambiguity for the transmitting station A, the programme being analogous for the other transmitting stations B, C, D received.

Switches 932 to 935 are connected on the other hand to a phase multiplier, similar to that shown in FIG. 27. The phase multiplier comprises a synthesiser 936 and a counter 937 connected to the output of the synthesiser, the synthesiser receiving by means of switch 932 the input frequency of counter 931A, which is the same as that of counter 901A. By means of the switch 933, the output signal of counter 901A is applied for zero re-setting of synthesiser 936 and of counter 937.

Furthermore, the output signal of switch 932 is applied by means of a +/− box 948 to a synthesiser 938, whose output 1/K is connected to a counter 939, and whose output p/K is connected to a counter 940. The output of counter 939 is used for zero re-setting of counter 940 and is at the same time applied, by means of a switch 951, controlled by a programme signal $P_{11}$, to the switch 936 for zero re-setting of one of the counters 931, the duration of closure of switch 951 being made long enough to ensure that a change of state will appear at the output of counter 939 during the closure.

In a similar manner, but in the reverse sense, the switch 934 receives the output of counter 931A which is applied by means of a switch 950 controlled by a programme signal $P_{10}$ for zero re-setting of the synthesiser 938 and counter 939.

As in FIG. 27, the moduli of counters 937, 939 and 940 are equal to 256, and the numbers K of synthesisers 936 and 938 are both equal to 6,400 while their numbers $p$ are controlled by a diode store 949 which responds to a programme signal $P_{12}$ to be commented on later.

The outputs of stages of counters 937 and 940 are subtracted in a subtractor 941, whose output is therefore representative of the phase difference between the output of counter 901A and that of counter 931A, multiplied by a coefficient which depends on the number p common to synthesisers 936 and 938, and controlled by the diode store 949 in response to the programme signal $P_{12}$.

It will now be recalled that the output signal of counters 901 and 931 has a sensitivity factor of 250 c/s. The values of the numbers p of synthesisers 936 and 938 are then defined by the quotient of the differential ambiguity removal frequencies $G_q$ by 250 c/s.

These differential ambiguity removal frequencies $G_q$ are for example obtained in the manner illustrated in the following table with $q = 1$ to 7.

$$G_1 = F_2 - F_6 = 250 \text{ c/s}$$
$$G_2 = F_2 - F_5 = 750 \text{ c/s}$$
$$G_3 = F_2 - F_4 = 3 \text{ kc/s}$$
$$G_4 = F_2 - F_3 = 14 \text{ kc/s}$$
$$G_5 = F_2 - F_1 = 74 \text{ kc/s } G_6 = F_2 = 400 \text{ kc/s}$$
$$G_7 = \Sigma F_m/2 = 1172 \text{ kc/s}$$

To obtain the phases of these differential frequencies from the information contained in the store 925 of FIG. 27, use is made of an adder-subtractor 942 and a writing-reading store 943, which serves as accumulator. The address signal $P_7'$ of FIG. 31 is applied to the store 925, taking care to avoid interferences between addresses for signal $P_7'$ and signal $P_7$ of FIG. 30. Signal $P_{13}$ controls either a simple transfer or an addition or a subtraction in the circuit 942 and signal $P_{14}$ controls storing in the store 943. This store 943 is of the type capable of supplying at its output its old signal simultaneously with the writing in of the new signal.

While the signal $P_{12}$ is on the differential frequency G1, the output of the subtractor 941 supplies the phase difference between the outputs of counters 931A and 901A multiplied by G1.

During this time interval, in response to the signals $P_{13}$ and $P_7'$ the adder first of all receives the phase information $F_2.Ua$ coming from store 925 (transmitting station A, measuring frequency $F_2$). This information is transferred directly to store 943 where it is stored. Adder 942 is then controlled for subtracting the phase information $F_6.Ua.$ from the phase information $F_2.Ua$, the result $(F_6 - F_2).Ua$ being again written into the store 943.

After this operation, the result is transmitted by channel $\Delta$ to subtractor 944, which combines the phase information thus obtained with that which leaves subtractor 941. The sign bit of the result is retained to be applied by means of switch 946 to a routing circuit 947 which produces a frequency and sends it to the + input or − input of the +/− box 948, for example by coupling the bits of significant figures of subtractor 944 to the control inputs of a synthesiser (not shown), intended to supply the frequency to be applied to the +/− box.

In consequence, the divergence $G_q.U_k$ between the phase information contained in the store 925 is compared with the divergence $G_q.U_k$ obtained from the phase difference between the outputs of counters 901 and 931, the phase of counter 940 being modified by the +/− box 948, such that the difference between the divergences is zero.

As illustrated by the programme of FIG. 31, the operations are repeated with progressively increasing differential frequencies. As the differential frequency increases, the phase contained in the various stages of counter 939 is adjusted with increasing accuracy.

In the example considered, the final sensitivity is obtained with the half-sum $\Sigma/2$ of all the measuring frequencies $F_m$. This half-sum is made with the channel $\Sigma/2$ and the subtractor 945, switch 946 being in the other position. The usefulness of the separate channel $\Sigma/2$ consists solely in shifting all the binary weights in order thus to effect division by two.

Ambiguity removal is achieved after utilisation of the sensitivity $\Sigma/2$. At this moment, the switch 951 is closed by the programme signal $P_{11}$, and the counter 931A is re-set to zero by the output of counter 931A. The phase of the output of counter 931A is then adjusted very accurately, taking into account the phases of the sequential waves as received from the transmitting station A, all these phases having a common reference which is defined by the zero re-setting signal of counter 913 of FIG. 27, this signal itself being defined by the 3,200 kc/s output of counter 900. In other words, the output of counter 931A is the signal $Ta - To$.

The outputs of counters 931A to 931D are applied to the output circuits of FIG. 29. Two switches 961 and 962 permit choice of the two transmitting stations defining a first hyperbolic network. These outputs are rectangular signals evolving in time, one with a certain advance over the other. A circuit 963 detects the first signal arriving, for example by logical comparison. It then controls the signal of a display device 968, as well as a double inverter 964 for the two signals concerned. The first signal arriving controls the re-setting to zero of a divider-counter 966 in binary decimal code, which receives the frequency 9,600 kc/s across a synthesiser 965, permitting regulation of the unit of measurement of the displayed difference in distances. The different stages of counter 966 are coupled to a store 967 whose writing control depends on the second arrival of the two aforesaid signals, supplied by the double inverter 964. The value thus recorded in the store 967 is therefore the difference in the distances from the receiver to the two transmitting stations B and C. This value is transmitted periodically to a display circuit 968. The block 2 of FIG. 29 illustrates diagrammatically the external appearance of the corresponding display circuit for the second hyperbolic network.

In the foregoing description of FIGS. 27 and 28, no distinction has been made between transient conditions and steady conditions.

Regarding FIG. 27, transient conditions occur when the values contained in the stores 919 and 925 are completely false, on the departure of the moving object carrying the receiver, for example. The person versed in the art will understand that after reception of a period of the transmission programme, that is to say, at the end of 5 minutes, the values stored are already good enough to serve for the removal of ambiguity. It is, however, often advantageous during the start of the receiver to commence by a systematic utilisation of the stimuli on the different measuring frequencies $F_m$ with a view to determining the phase differences of the reception channels before proceeding to the reception of the sequential waves $O_{km}$ having the measuring frequencies.

As previously pointed out, the programme relative to FIG. 28 is independent of the programme of transmission of the waves. It is therefore possible to conduct as desired the ambiguity removal operations.

One method to be used on starting the receiver consists in removing the ambiguity completely for each transmitting station by utilizing all the sensitivities in the order giving an increasing precision (it is recalled if the coarsest frequency is 250 c/s it is possible to remove the ambiguity completely when the transmitting stations used are less than about 600 km distant). Once the removal of ambiguity has been effected up to the maximum accuracy for the transmitting stations used, it is then possible to use solely the finest information supplied by the channel Σ/2 and the subtractor 945 of FIG. 28. If subsequently the information becomes manifestly false in durable manner for one or the other of the transmitting stations, it is possible to repeat a complete operation of ambiguity removal with regard to the said station. In this respect, it may be advantageous to duplicate each of the counters 931A to 931D, the ambiguity removal function being separated from the display function.

It appears from the foregoing that the present invention provides a new method of radio position finding whose principal advantages are of the small number of allocations of required radio-electric frequencies and an excellent ratio of the precision obtained relative to the performances of the technological means employed. As specified in the foregoing (frequency values, transmission programme), the method of radio position finding is particularly adapted to maritime navigation and particularly to fishing applications.

Of course, the present invention is by no means limited to the applications, frequency values and embodiments described, and numerous modifications may be effected by the person versed in the art in regard to both transmission installations and receivers. It is necessary also to include in the invention modifications of the method of radio position fixing which more particularly may result in an adaptation in terms of other applications and/or other frequency values.

Up to the present, it has been explained that each transmitting station radiates only one continuous wave having a specific frequency. It also comes within the scope of the invention of course for each transmitting station to radiate a number of such waves, more particularly for increasing the safety and accuracy of the results. The different specific frequencies then allotted to each transmitting station may, on reception, be used more particularly either simultaneously while taking the mean of the information which they make it possible to obtain, or alternatively by selecting the frequency found to be the best, for example as a function of time and distance. It may be particularly advantageous for the various specific frequencies associated with each transmitting station to belong to several distinctly different frequency ranges (for example 300 kc/s and about 27 Mc/s).

In the same way, the same radio position fixing chain may use measuring frequencies belonging to several very different ranges.

Thus, for example, for reducing the ambiguity due to a frequency of the order of 300 kc/s, it is possible to utilise not two frequencies such as 332 and 406 kc/s, as described, which belong to the same frequency range and have a difference of the order of 100 kc/s, but rather to employ purely and simply one frequency of the order of 100 kc/s.

More generally, it may be advantageous to use in the same installation several measuring frequencies belonging to a first frequency range, and several others belonging to a second frequency range.

Thus, an installation may comprise two parts, of which the first functions for example in the 300 kc/s range with complete removal of ambiguity, and the second functions in the 80 Mc/s range.

This provides the advantage that the ambiguity is removed completely by the first part to a sensitivity factor corresponding to 300 kc/s (or more), and the measurements may then be refined to a sensitivity factor corresponding to 80 Mc/s by the second part.

It is otherwise clear that when a large number of different sensitivity factors with low ratios (less than 3 for example) between two adjacent sensitivity factors are available, the ambiguity may be removed, even when each phase measurement is very inaccurate ($\pm \frac{1}{4}$ of a rotation, for example).

It follows that even when the sky waves have an electromagnetic field much greater than the direct waves, these sky waves may possibly be used for carrying out all the operations usually effected on the direct waves, and for finally obtaining radio position fixing free from ambiguity and whose accuracy depends practically only on the knowledge one may have on the characteristics of the reflecting layers producing the said sky waves.

Finally, it should be mentioned that the other navigation aids (compass, inertia log), enable one, from a knowledge of the speeds and particularly the accelerations of the moving object carrying the receiver, to know at any instant the approximate value of the Doppler effect, and consequently the very accurate frequencies of the waves necessary for receiving them; it is then possible to reduce considerably the pass-bands of the reception channels of the continuous waves (at least) and consequently to increase the safety and accuracy of the results.

APPENDIX A

The present invention relates to frequency changing. Its object is not to provide novel means for performing the operation of frequency changing in general, but to suggest frequency changing arrangements intended for a particular application.

In the first place, it will be recalled that the performance of a change of frequency necessitates a circuit furnishing a heterodyne frequency, a mixer circuit, and generally means for filtering in terms of frequency. An input signal is combined with the heterodyne signal in the mixer circuit so as to obtain an output signal which is as full of information as the input signal but is of lower frequency. The filtering means if any have a double function; on the one hand an upstream function which consists in eliminating, if necessary, input signals known as image or phantom signals, that is to say signals capable of furnishing the same output signal frequency as that which corresponds to the useful input signals, and on the other hand a downstream function which consists in preventing the transmission onward of the input signal and the heterodyne signal. In most cases the second function is performed at least partially by the input of the following circuit.

More precisely, the present invention relates to frequency changing of input signals carrying information, each defined by a known frequency associated with the identity of the information transmitted.

It is known that each input signal also includes a band of frequencies around this known frequency. This frequency band may be fairly wide, for example for single sideband reception. In an application of the invention to radio location the frequency band is extremely narrow.

The width of this frequency band has no basic influence on the performance of the invention. However, it is more difficult to design systems of extremely narrow passband. This is why the present specification is directed to this latter case; the input signals are defined by a known frequency, by effecting removal of the adjacent band of frequencies, which is assumed to be extremely narrow.

The present invention is particularly applicable to use in the selection of at least one of the pieces of information carried respectively by input signals of the type defined above, each having a frequency selected from a predetermined range of high frequencies. By a frequency selected from a predetermined range of high frequencies is meant a frequency capable of varying within the said range, this variation corresponding to a change of identity of the required information.

In accordance with one known technique for this purpose, which does not include frequency changing, a suitable quartz filter is used for each high frequency of each input signal capable of being utilized. This arrangement is of a complexity which increases rapidly with the number of useful high input frequencies, which very quickly makes it difficult to use and even unusable.

In accordance with the invention it is proposed to subject the various input signals carrying different pieces of information to a reduction of frequency so as to bring them into the same condition for the use of this information. In other words, the frequency of the input signals is lowered, and they are fed to the same processing circuit whatever their initial frequency in the predetermined range. Independently of the nature of the processing to be applied to the pieces of information, the input of a processing circuit may be regarded as having a fixed passband. Consequently it is necessary for each input signal that is to be used to undergo a reduction of frequency such that its frequency may be included in a predetermined fixed passband. Any signal obtained by reduction of the frequency of an input signal, the frequency of which is selected from the predetermind range, will be termed "useful signal" in the course of the present specification and claims. Also the words "useful input signal" will be used to denote a distinction from parasitic input signals (for example image frequencies).

Two difficulties emerge. The first results from the fact that the output signal from each frequency change must be as full of information as the input signal. The second is connected with the large number of different frequencies that the various useful input signals may have.

The first difficulty, in technical terms, is that the heterodyne frequency or frequencies has or have to be of sufficiently good stability for the useful signal, after heterodyning, (possibly with its band width) to be able to pass into the fixed bandpass filter constituted by the utilisation circuit. The input signals being of very narrow band width, the stability of the heterodyne frequencies depends on the ratio of the band width of the fixed bandpass filter to the weakest high frequency capable of being used in the said predetermined range.

It is evident that the stability necessary is very high. When it is required to use a high frequency selected from the predetermined range, the need for this high stability prevents the heterodyne frequencies from being obtained by continuous variation of frequency, as is the case for example in television receivers.

There is a technical solution for furnishing frequencies of high stability with high resolution as required and in discrete manner. This technical solution involves the use of circuits known in the art as synthesisers. It will be recalled that a synthesiser may be controlled so as to furnish, starting from a frequency F, a frequency $F_n$ such that $$F_n = F \times (n/k)$$

where $K$ is a whole number characteristic of the synthesiser, and $n$ is a whole number which is predetermined or is variable in a controlled manner between zero and $K - 1$.

However, synthesisers have an inherent disadvantage in the manner in which they furnish a given frequency. This disadvantage is due to the fact that their output signal includes not only a fundamental frequency and harmonics of this fundamental frequency, but also spectral lines of frequencies adjacent the fundamental frequency, which are also called 'sidebands'. In order practically to eliminate this undesirable effect a frequency divider circuit (digital dividing computer) is connected in known manner to the output of the synthesiser, the division factor being as high as possible.

Now, it is evident that the input frequency applicable to a synthesiser is limited for technological reasons (at present about 30 MHz). The output frequency of a synthesiser associated for example with a circuit which divides by 1000 is therefore limited upwardly to 30 kiloHertz. Such a frequency is insufficient to serve as a heterodyne frequency for input signals of high frequency.

The particular object of the present invention is a frequency changing stage of special construction intended to serve as a component in frequency changing devices in which the heterodyne frequencies have sufficient stability in the sense defined above, whilst permitting change of frequency of an input signal selected from a predetermined range of high frequencies. This frequency changing stage is called 'of the first type'.

In accordance with another aspect of the invention, an electronic frequency changing device includes one or more frequency changing stages of the first type such as defined above, and a final frequency changing stage of the second type comprising a synthesiser-divider circuit for furnishing the heterodyne frequency. The combination of these frequency changes permits reduction of the frequency of input signals selected from a predetermined range of high frequencies to a signal of low frequency included in a fixed passband, which may be extemely narrow. The frequency changing stage of the first type in accordance with the invention utilises a high stability source of frequencies for generating the heterodyne frequency, and it comprises:
— a circuit for dividing the frequency of the said source, capable of furnishing a heterodyne signal the frequency of which is taken from a plurality of successive multiples of a predetermined frequency $f$,
— a circuit for mixing the input signal with the heterodyne signal,
—the frequency of the heterodyne signal being taken so that the useful output signal of the mixer circuit has a frequency included between $f/2$ and $f$.

With great advantage, a frequency changing stage of the first type includes a bandpass filter preceding the mixer circuit so as to transmit its useful input signal to it, the bandpass filter being adapted to allow the passage of the selected high frequency of the input signal whilst eliminating its image frequency.

The electronic frequency changing devices according to the invention are intended to reduce the frequency of an input signal having a high frequency selected from a predetermined range of high frequencies, such that the signal obtained is within a fixed low frequency passband of a utilisation circuit, using a frequency source of high stability. A frequency changing device includes, connected in series from the point of view of the useful signal:

— at least one frequency changing stage of the first type, using the high stability frequency source for producing the heterodyne frequencies,
— a final frequency changing stage of a second type comprising:
— a synthesiser-frequency divider circuit which receives a signal derived from the frequency source,
— a final circuit for mixing the useful signal coming from the preceding frequency changing stage and the heterodyne signal from the output of the synthesiser-frequency divider circuit.
— the synthesiser-divider circuit being controlled so that the heterodyne frequency that it furnishes is such that the output signal of the mixer circuit is within the fixed passband of the low frequency filter.

In the specification and claims, the term "synthesiser-frequency divider circuit" will be used for a circuit which includes at least one synthesiser followed by a frequency divider and capable of furnishing at least one frequency which is a multiple of a step in frequency equal to the quotient of the input frequency of the synthesiser-divider circuit by the product of a number which is characteristic of the synthesiser and of the division factor of the frequency divider, the order of the said multiple frequency being lower than the said characteristic number of the synthesiser.

In accordance with a first practical form of frequency changing device, the step in frequency at the output of the synthesiser-divider circuit is at most equal to the width of the fixed passband of the low frequency filter. The synthesiser-divider circuit then includes a controlled synthesiser followed by a frequency divider, the synthesiser being capable of being controlled so that the synthesiser-divider circuit furnishes as desired one or other of the multiples of the step in frequency from the zero order to the order equal to the characteristic number of the synthesiser, itself excluded. In the following, such a synthesiser-divider circuit which includes a controlled synthesiser will be called a controlled synthesiser-divider circuit. This enables the selection as desired of a high input frequency of the frequency changing device anywhere in the predetermined range.

In accordance with a second particular practical form, in which the high frequency of the input signal of the device is selected from a plurality of discrete values in the predetermined range, the step in frequency of the synthesiser-divider circuit is related to the difference between the discrete values of the said plurality. In this case, it is also very advantageous to use a controlled synthesiser-divider circuit in the final frequency changing stage.

Other features and advantages of the invention will appear from reading the detailed description that follows, made with reference to the accompanying drawings, given solely by way of non-limitative examples and in which:

FIG. A1 illustrates the electrical arrangement in principle of a frequency changing stage of the first type in accordance with the present invention;

FIG. A2 is a graph comprising as abscissae the predetermined range of input frequencies and as ordinates the output frequencies for various values of the heterodyne frequency of FIG. A1;

FIG. A3 illustrates the electrical arrangement in principle of a frequency changing device according to the invention including two frequency changing stages of the first type and a final frequency changing stage of the second type;

FIG. A4 is the partially detailed electrical arrangement of a modification of the final frequency changing stage of FIG. A3, permitting the elimination of the image wave from this change of frequency;

FIG. A5 is a time diagram showing wave forms at points in the arrangement of FIG. A4;

FIG. A6 illustrates the electrical arrangement of another modification of the design of the final stage of a frequency changing device in accordance with the invention, associated with synchronous detection circuits, and FIG. A7 illustrates another practical form of frequency changing device in accordance with the invention, for use in particular when it is desired to receive simultaneously a plurality of input signals having frequencies in the predetermined range.

In the present patent application the word frequency is in constant use. It is known that at any given instant a sinusoidal signal has one frequency and one phase. As it is necessarily a question of a frequency in the physical meaning of the term, it is clear that the expression of the numerical value of this frequency, hence the significance of the word frequency, depend on the stability of this frequency.

In the present specification it is assumed that the high frequency of the input signal is very stable. It is therefore desirable to use it with an extremely narrow passband. The heterodyne frequencies must therefore be of very high stability.

Furthermore, it is known that information of frequency (and/or of phase) may be carried not only by sinusoidal signals but also by any periodic signal having at any instant the same fundamental frequency (and the same stability) as the sinusoidal signal. Of course, the periodic signal also includes harmonics, which are not troublesome to the extent that they correspond to frequencies which are very much higher, which may easily be eliminated.

At the present time numerous ways are known of generating signals representative of sinusoidal signals, for example by means of signals constituted by pulses, or square signals. It will be understood that the signals considered in the present specification and claims may be any signals whatever of this type.

For example, in the course of the detailed description there will be considered a frequency source of very high stability capable of furnishing pulses the repetition rate of which is equal to this frequency with a very high precision.

In FIG. A1 there is illustrated a practical form of frequency changing stage of the first type in accordance with the present invention. This frequency changing stage includes a frequency source 1 of high stability, the frequency of which is assumed to be 4.8 MHz.

The source 1 is connected to a frequency divider circuit which includes a plurality of frequency dividers 2, 3, 4, 5 having respectively division factors 20, 15, 12 and 10. These frequency dividers are advantageously digital dividing computers.

The frequency changing stage in FIG. A1 also includes a mixer circuit comprising a mixer of known type capable of receiving square signals as heterodyne frequency. These square heterodyne signals are furnished by the output of one of the dividing computers 2 to 5 by means of a switch 6 illustrated diagrammatically in the form of a mechanical switch. In a general manner, the heterodyne frequencies are designated by the letter H.

In an application to the reception of high frequency waves, illustrated in FIG. A1 by an antenna 9, a bandpass filter 8 is provided for transmitting the received high frequency signals to the input of the mixer circuit 7. In the case in which the input signals are practically pure, the use of the bandpass filter 8 at the input of the first frequency changing stage is unnecessary.

The heterodyne frequencies furnished at the output of the dividing computers 2 to 5 have the respective values 240 kHz, 320 kHz, 400 kHz and 480 kHz. These frequencies are respectively the multiples of order 3, 4, 5 and 6 of a frequency $f_1 = 80$ kHz. This frequency $f_1$ is called the frequency associated with the frequency changing stage of the first type.

The frequency changing stage in FIG. A1 enables the reduction, in accordance with the invention, of the frequency of an input signal included in the range 240 to 480 kHz, so as to furnish an output frequency included between 40 and 80 kHz, that is to say between $f_1/2$ and $f_1$.

FIG. A2 illustrates diagrammatically the selection of the heterodyne frequency, taking into account the value of the input frequency, so as to obtain an output frequency included between $f_1/2$ and $f_1$.

In this Figure, the frequency of the input signal, marked as abscissa, is represented by $F_e$ and the frequency of the output signal, marked as ordinate, is represented by $F_{st}$.

As may be seen in FIG. A2, the predetermined range of input frequencies, which is from $3f_1$ to $6f_1$, may be regarded as being divided into a plurality of intervals by each of the multiples of the frequency $f_1$ that correspond to a heterodyne frequency.

The heterodyne frequency applied to the mixer 7 in FIG. A1 is selected by means of the switch 6 so as to be equal to that of the heterodyne frequencies, being a multiple of the frequency $f_1$, which is the upper limit or the lower limit of the interval in which the selected high frequency of the input signal is located, according to whether this selected high frequency of the input signal is located in the lower half or the upper half of the said interval respectively.

For example, if the selected high frequency of the input signal is 256 kHz, that is to say $3.2f_1$, this frequency is located in the first half of the interval ($3f_1$, $4f_1$). Consequently, the heterodyne frequency is taken as equal to the upper limit of the interval, that is to say $4f_1$. In the graph, this is illustrated by the fact that for the first half of the interval ($3f_1$, $4f_1$) the output frequency is defined by the straight portion the equation of which is $F_{st} = 4f_1 - F_e$. The heterodyne frequency is therefore $4f_1$, and it is clear that the output frequency is included between $f_1/2$ and $f_1$, that is to say between 40 and 80 kHz.

The four values of heterodyne frequency available at the outputs of the dividing computers 2 to 5 in FIG. A1 therefore enable the frequency $F_e$ of an input signal selected from the range 240 to 480 kHz to be changed so as to obtain an output signal the frequency $F_{st}$ of which is included between 40 and 80 kHz.

The frequency applied to the dividing computers 2 to 5 of FIG. A1 cannot have just any value in relation to the value of the frequency $f_1$. In fact, this frequency must be equal to or a multiple of the product of the value $f_1$ and the lowest common multiple (in the mathematical sense) of the whole numbers representing the orders of multiples of $f_1$ furnished by the dividing computers such as 2 to 5. For the practical forms described, the multiples are of the orders 3, 4, 5 and 6. The lowest common multiple of these four whole numbers is 60. Consequently it is necessary for the frequency applied to the dividing computers to be equal to $60 \times 80$ kHz = 4.8 MHz. In the case in which the frequency of the high stability source is a multiple of the order $p$ of this value, the division factors of the dividing computers are multiplied by $p$, or better, a common dividing computer is provided for furnishing the frequency of 4.8 MHz to be applied to the individual dividing computers 2 to 5.

The general case of a frequency changing stage of the first type associated with a frequency $f$ will now be considered.

The Applicants have observed that since the lowest common multiple of the whole numbers representing the successive multiples of the frequency $f$ increases rapidly when the largest of these whole numbers is increased, it is preferable not to use a heterodyne frequency the value of which is greater than $6f_1$.

However, the ratio of the input frequency to the output frequency is high when the heterodyne frequency corresponding to the highest of the multiples is raised; this implies that it is then more difficult to eliminate the image frequency of the input frequency by filtering. In fact, these latter frequencies are the closer, the higher the ratio of the input frequency to the output frequency of a frequency changing stage.

The Applicants have also observed that the lowest of the multiples of f must be at least equal to $2f$, since a heterodyne frequency equal to $f$ could furnish an output signal of the same frequency $f$, which is impracticable.

Under these conditions it is possible to take only the multiples $2f$ and $3f$. However, the Applicants have observed that it is advantageous to take, for preference, a frequency $f' = f/2$ associated with an interval ($4f'$, $6f'$), which enables a greater reduction of frequency to be obtained in the frequency changer. Hence, the highest multiple of f is advantageously at least equal to 4.

It will clearly be seen that a frequency changing stage of the first type enables a considerable change of frequency of high frequency signals to be made whilst considerably reducing the frequency excursion. For example, in the case of the frequency changing stage in FIG. A1 the input frequency may vary by 240 kHz whereas the output frequency varies only by 40 kHz. This is obtained by means of frequency divider circuits furnishing a plurality of successive multiples of a frequency $f$. According to the value of the high input frequency to be used, one of the heterodyne frequencies is selected by means of the switch 6 in FIG. Al. The switch 6 may be a mechanical switch actuated manually; it may also be actuated automatically in response to means for selecting the high frequency to be received. The design of such automatic means, which are incorporated in logical electronic circuits, is regarded as being within the ability of a person skilled in the art.

An essential advantage of the arrangements according to the invention to be described is that the stability of the heterodyne frequencies depends only on the stability of the frequency source 1. The association of dividing counters capable of furnishing these whole multiples of a frequency f with a mixer circuit, with the object of furnishing an output frequency included between $f/2$ and $f$, is for this reason regarded as an essential feature of the invention.

In FIG. A1 there has been described a practical form including a single mixer that receives a heterodyne frequency selected by means of the switch 6. In another practical form, not illustrated, the mixer circuit includes a plurality of mixers each receiving a respective one of the heterodyne frequencies furnished by the dividing counters 2 to 5. In this case the selection of the heterodyne frequency consists simply in selecting the output from one of the mixers of the mixer circuit 7.

As will be seen hereinafter with reference to FIG. A7, this arrangement also permits the selection of two or more of the outputs of the mixers of the mixer circuit. This is of particular interest when it is desired to use simultaneously several input signals having several respective high frequencies selected from the predetermined range.

FIG. A3 illustrates diagrammatically a practical form of a frequency changing device in accordance with the present invention. This frequency changing device is intended to receive an input signal of high frequency selected from the predetermined range of 240 to 480 kHz. It includes a frequency source 1 of high stability, an antenna 9 for receiving the high frequency signals, a first frequency changing stage 10 of the first type, a second frequency changing stage 20 of the first type, and a final frequency changing stage 30 of the second type with a controlled dividing synthesiser comprising a controlled synthesiser 31 and a dividing computer 32 for furnishing the heterodyne signal.

The first frequency changing stage 10 is exactly that which has been described above with reference to FIG. A1. For the purpose of illustration the plurality of dividing computers are shown in the form of a divider circuit 11 having a division factor k, which is variable by discrete values to furnish a plurality of successive multiples of the frequency $f_1$ associated with the first frequency changing stage 10. In the present case these successive multiples are $3f_1$, $4f_1$, $5f_1$ and $6f_1$ as in the case of FIG. A1, with $f_1 = 80$ kHz.

The first frequency changing stage 10 also includes a mixer circuit 12. It also includes upstream filtering means 13. In FIG. A3 these filtering means 13 are shown as being variable. In fact, for certain applications it is possible to perform the invention with fixed filtering means. However, it is often advantageous to shift the passband of the filter 13 according to the selected high frequency of the input signal. Preferably the passband of the filter 13 is shifted in a discrete manner at the same time as the division factor of the divider circuit 11.

The input frequency $F_{e2}$ applied to the second frequency changing stage 20 is equal to $F_{st}$, hence it is included between 40 and 80 kHz. Such frequencies are too high to be the subject of a frequency change with the aid of a heterodyne frequency furnished by a synthesiser followed by a dividing computer. This is why the output signals $F_{st}$ of the first frequency changing stage 10 of the first type are applied to a second frequency changing stage 20 of the first type, which therefore includes a frequency divider circuit 21, a mixer circuit 22 and a filter circuit 23 preceding the mixer circuit 22.

The frequency $f_2$ associated with the second frequency changing stage must be sufficiently low for the following stage to be a stage that includes a synthesiser. In accordance with the invention it is advantageously a sub-multiple of the maximum output frequency of the preceding frequency changing stage, which is equal to $f_1$.

In a practical form of the second frequency changing stage 20 the associated frequency $f_2$ is 16 kHz (that is to say $f_1/5$), and the frequency divider circuits furnish the multiples $2f_2$, $3f_2$, $4f_2$ and $5f_2$, that is to say 32 kHz, 48 kHz, 64 kHz and 80 kHz respectively. It is seen that the range 40 to 80 kHz is included between the smallest and the largest of these multiples.

In this case, the divider circuit 21 in FIG. A3 comprises 4 digital dividing computers having the respective division factors 150, 100, 75 and 60 and fed with the frequency 4.8 MHz from the source 1.

The heterodyne frequency of the second stage 20 is selected from the frequencies available at the output of the divider circuit 21 according to the position of the input frequency of the second stage 20 relative to the intervals constituted by the heterodyne frequencies which are multiples of $f_2$, in the same manner as was indicated during the description of the frequency changing stage in FIG. A1 with reference to the graph in FIG. A2.

It should be noted that it is possible to design the second frequency changing stage 20 differently, by taking an associated frequency $f_2$ of 20 kHz ($f_1/4$), with multiples 40, 60 and 80 kHz furnished by the circuit 21, or $f_2 = 13\frac{1}{3}$ kHz ($f_1/6$), with multiples of order 3 to 6 of this latter value.

In general, after a first frequency change of the first type has been effected, the range of variation of the input frequency of the frequency changers of the first type that follow is well defined, since it is from $f_1/2$ to $f_1$. The frequency associated with the frequency change that follows is in general then selected from the sub-multiples of order 4, 5 and 6 of the frequency $f_1$, accepting for the reasons indicated above that the highest multiple of $f_2$ is of an order between 4 and 6.

The filter 23 of the second frequency changing stage is advantageously variable, as has been indicated for the filter 13.

These filters have essentially the function of eliminating the image frequency from the frequency changer of the first type which immediately follows. It has been explained above that for these changes of frequency the ratio of the input frequency to the output frequency remains relatively small (lower than 12 if the order of the largest multiple is 6). These filters may be designed in a simple manner, for example in the form of a filter of conventional type with inductance and capacitance having 2 to 3 circuits. Variation may be obtained by using cage condensers in a manner known in itself. It will be noted, moreover, that the need for a high stability of the heterodyne frequencies does not involve the need for a correlative precision of filtering.

The output signal of the second stage 20 of the first type therefore varies between 8 kHz and 16 kHz. This signal is applied as input signal $f_e$ to the final frequency changing stage 30 of the second type the heterodyne frequency of which is furnished by a controlled dividing synthesiser circuit which includes a controlled synthesiser 31 receiving the frequency 4.8 MHz from the source 1, followed by a dividing computer 32.

The output signal of the second stage 20 is applied through the intermediary of a variable filter 33 to the input of the mixer circuit 34 of the final frequency changing stage 30, which receives the heterodyne frequency available at the output of the dividing computer 32.

Preferably, the output signal of the mixer 34 is applied to an output filter 50 having a fixed low frequency passband. As previously indicated, the filter 50 defines the input conditions of the utilisation means. It will be assumed by way of example that this filter is centered on the frequency 4Hz and has a passband of 0.5 Hz. This passband of 0.5 Hz referred to the maximum value of high input frequency (480 kHz) corresponds to a stability of $10^{-6}$, which is very high.

The controlled synthesiser 31 is capable of delivering, starting from the frequency $F = 4.8$ MHz from the source 1, a frequency $(n/K_1).F$, where $K_1$ is a whole number characteristic of the synthesiser and $n$ is a whole number selected in a controlled manner between zero and $K_1 - 1$. The dividing computer 32 has a division factor $K_2$.

When the synthesiser 31 is controlled in such manner that $n = K_1 - 1$, the frequency available at the output of the dividing computer 32 has its maximum value, which is practically equal to $F/K_2$.

Since the maximum input value of the final frequency changing stage 30 is 16 kHz, it is necessary for the division factor $K_2$ of the dividing computer 32 to be 300 in order that the output frequency $f_s$ of the stage 30 may in this case be close to 4 Hz. The value of the number $K_1$ which is characteristic of the synthesiser 31 depends on the value of the output frequency $f_s$ of the final stage 30, as well as on the passband of the filter 50, on the step of the high frequency selected in the high frequency range, and possibly on the fact that this step may be reduced by some switching of the heterodyne frequencies in the frequency changers of the first type.

If it be assumed that the step in input frequency $F_2$ in the predetermined range is 1 Hz, that is to say the different values of the high frequencies capable of being selected from the predetermined range differ between themselves by 1 Hz or by a multiple of this value, then it is necessary for the step in frequency at the output of the dividing computer 32, viz. $F/K_1.K_2$, to be 1 Hz, which implies that the number $K_1$ is 16,000.

The step in input frequency is subject, like that at the input of the final stage 30, to the condition that the input frequency $f_e$ of the final stage 30 is a multiple of this step. In the contrary case, this step may be found to be sub-divided by reason of the discontinuities introduced by the changes of heterodyne frequency in each stage, particularly at the angular points of the graph in FIG. A2.

When the value of the step in input frequency $F_e$ is greater than the value of the output frequency $f_s$, in the event 4 Hz, it is the value of $f_s$ which determines the choice of the number $K_1$ which is characteristic of the synthesiser. Of course, in this case the value of $f_s$ must be a sub-multiple of the step in input frequency.

When it is desirable to receive in a continuous manner any frequency whatever in the predetermined range of high input frequencies, it is the passband of the output filter 50 that determines the choice of the number $K_1$ which is characteristic of the synthesiser 31. In this manner it is possible, by controlling the synthesiser 31 and the division factors of the circuits 11 and 21, to reduce the frequency of any high frequency signal selected from the predetermined range in order finally to obtain at the output of the mixer 34 a signal which is included in the passband of the filter 50.

A practical form of the filter 50, with the transfer characteristics mentioned above, consists of four successive cells each constituted by a condenser of 1 microFarad and a resistor of 40 kilohms. Under these conditions the filter is centred on 3.9 Hz and has a passband of about 0.55 Hz at −3 dB.

In the frequency changing device described with reference to FIG. A3 the synthesiser 31 is fed directly from the high stability frequency source 1. It may be advantageous to feed the synthesiser 31 with a frequency of a value different from the frequency of the source 1, provided that the said frequency of different value is piloted by the source 1, that is to say at any instant it has the same stability as the frequency delivered by the source 1. In French patent 69 08 755 there are described means for producing a frequency $F'$ having the same stability as a frequency $F$ furnished by a very stable frequency source and which enables the synthesiser 31 to be fed with this frequency $F'$.

It has been seen above that the division factor $K_2$ of the dividing computer 32 is the greater, the lower is the maximum frequency applied to the input of the final stage 30. This is important since the filtering of the sidebands of the output signal of the synthesiser 31 is the better, the higher the division factor $K_2$. Hence there is often an advantage in seeking a reduction of the maximum frequency by means of frequency changing stages of the first type in accordance with the present invention.

Furthermore, when the range of input frequency of the final stage 30 is made very narrow, by effecting in advance the greatest possible reduction of frequency, the ratio of the step of the synthesiser to the maximum frequency of this range of input to the final stage 30 is a maximum, and this enables a synthesiser 31 to be used the characteristic number $K_1$ of which has the lowest possible value.

For the final frequency changing stage 30 the ratio of the input frequency to the output frequency is very high. The image frequency that enters into this latter change of frequency is therefore very close to the useful frequency. In the example selected, the spacing is of the order of 8Hz. Consequently, it is very difficult to eliminate this image frequency by means of the filter 33 without the filter becoming very complex.

For certain applications it is not necessary for to provide for the elimination of the image frequency from the final frequency changing stage.

When this elimination is necessary, it may be effected by using a final frequency changing stage 30 in accordance with the modification in FIG. A4. In this Figure the frequency changer includes two mixers 34A and 34B utilizing two heterodyne signals which are in quadrature relative to one another.

In the practical form described, the quadrature is obtained by using the dividing computer 32, which is separated into two parts, one part 32A having a division factor $K_2/2$ and the other part 32B having a division factor 2.

The output of the divider 32B is equivalent to the output of division by $K_2$ and furnishes a heterodyne signal which will be represented by $H_3$. The shape of this square heterodyne signal $H_3$ is shown in FIG. A5. The output from the dividing computer 32A furnishes a signal the frequency of which is double and is in phase with the signal $H_3$ which is denoted in FIG. A5 by $2H_3$.

The signals $2H_3$ and $H_3$ are combined in an exclusive OR circuit 37 to furnish a signal $H'_3$ represented in FIG. A5, in which it is clear that the signal $H'_3$ is in quadrature relative to the signal $H_3$.

In known manner, the mixers 34A and 34B have their current outputs added, one through the intermediary of a resistor R and other through the intermediary of a condenser C. The common point of the resistor R and condenser C then constitutes the output, and is connected for this purpose to the fixed passband filter 50. A person skilled in the art will easily verify that if the condition $2\pi RC f_s = 1$ is satisfied, the image frequency input of the stage 30 is eliminated. In this way there is obtained practically an attenuation of 40 dB of the image frequency.

In FIG. A6 is shown another practical form of the final frequency changing stage 30 associated with utilisation circuits which permit synchronous detection.

The modification in FIG. A6 is applicable in particular when the input frequency $F_e$ of the frequency changing device may be selected from a plurality of multiples of the same frequency of low value (for example 250 Hz), this value being high in relation to the frequency $f_s$. It is also applicable to the case (illustrated in FIG. A6) in which synchronous detection of the output signal of the final frequency changing stage 30 is effected, leading to the generation of a signal of the same frequency as the signal $f_s$.

According to the modification in FIG. A6 the final frequency changing stage 30 is of the type described with reference to FIG. A3, in that it includes a frequency substracting device or "box" 38 incorporated between the synthesiser 31 and the divider 32, and the synthesiser 31 furnishes a frequency $K_2 f_e$.

According to the modification in FIG. A6 a circuit 61 is utilised in order to generate, starting from the frequency F furnished by the source 1, a frequency of value $K_2 f_s$. The circuit 61 includes any known means for this purpose, for example those known in the art of synchronous detection.

The output of the circuit 61, which has a frequency of value $K_2 f_s$, is applied on the one hand to the subtraction input of the frequency subtracting device 38, and on the other hand to a dividing computer 62 which has a division factor $K_2$ and which consequently furnishes a frequency $f_s$.

The signal available at the output of the dividing computer 32 therefore has a frequency $f_e - f_s$. Consequently, the output signal of the final stage 30 is of frequency $f_s$. A synchronous detector 63 receives the output signal of the final frequency changing stage 30 and the output signal of the dividing computer 62, so as to effect synchronous detection in known manner.

The modification in FIG. A6 has the advantage that the step of the synthesiser does not depend on the input frequency $f_e$. This enables the step of the synthesiser to be selected independently of the value of the output frequency $f_s$. The high input frequencies that can be selected in the predetermined range all being multiples of 250 Hz, the step of the synthesiser may be selected to be $K_2$ times 250 Hz, the frequencies associated with the frequency changer of the first type being equal to multiples of 250 Hz.

In a practical form precisely adapted to the above-stated values, the number $K_1$ characteristic of the synthesiser is equal to 64, the division factor $K_2$ is equal to 300, and the circuit 61 is a dividing computer the division factor of which is 4,096.

Under these conditions, the step in frequency at the output of the dividing computer 32 is 4.8 Hz divided by the product $K_1 . K_2$, viz. $300 \times 64 = 19{,}200$. This step in frequency is therefore 250 Hz.

The frequency available at the output of the dividing computer 62 is 4.8 MHz divided by the product of 4,096 (division factor of the computer 61) and 300 (division factor of the computer 62). The frequency applied to the synchronous detector 63 is therefore 3.9 Hz.

In the above-described frequency changing devices, the variable division factors furnish the heterodyne frequencies of the frequency changing stages of the first type, the controlled synthesiser furnishes the heterodyne frequency of the frequency changing stage of the second type, and the various filters, which may if desired be variable, enable the high frequency input signal $F_e$ selected from a predetermined range of high frequency to be dealt with in a frequency changing channel whatever may be the selected frequency.

In the description of a frequency changing stage with reference to FIG. A1, it was mentioned that this stage could also be designed with a plurality of channels, that is to say a plurality of mixers each associated with a heterodyne frequency of fixed value.

This arrangement may be generalised for the frequency changing devices in accordance with the present invention. In this case, each frequency changing stage of the first type includes a mixer circuit constituted by a plurality of mixers each associated with a dividing computer having a fixed division factor, the assembly of dividing computers forming the frequency divider circuit. The final frequency changing stage of the second type also includes a mixer circuit constituted by a plurality of mixers each associated with an uncontrolled synthesiser, that is to say having a fixed value of the coefficient $n$, each synthesiser being followed by a dividing computer. The assembly of uncontrolled synthesisers each followed by a frequency divider then forms the frequency divider-synthesiser circuit.

It will be understood that it is also possible for a part of the frequency changing stages to be designed with a single mixer and a variable heterodyne frequency in accordance with the invention, when another part of the frequency changing stages includes a plurality of mixers receiving respectively heterodyne frequencies of fixed value.

This is of particular interest when the number of input signal high frequencies which can be selected from the predetermined range is small. FIG. A7 illustrates by way of example a practical form of a frequency changing device similar to that of FIG. A3 but in which each frequency to be received has its own frequency changing channel, the division factors being fixed and being selected in accordance with the value of the associated frequency in the same way as the fixed number $n$ defining the precontrol of the synthesiser. The reference numerals used in FIG. A7 are the same as in FIG. A3, except that the circuits associated with a first frequency $F_{1e}$ to be received have a hundreds number equal to unity, whereas the circuits associated with a second high frequency $F_{2e}$ to be received have a hundreds number equal to 2.

In this case, the switching means for selecting a high frequency from the predetermined range merely include interrupters 160 and 260 associated respectively with the input frequencies $F_{1e}$ and $F_{2e}$, and arranged at the outputs of the final frequency changing stages of the second type 130 and 230, for example following fixed bandpass filters 150 and 250. Of course, the outputs from the switches such as 160 and 260 are connected together to permit the further utilisation of a frequency selected from $F_{1e}$, $F_{2e}$, etc.

The invention is also applicable when it is desirable to receive simultaneously a plurality of frequencies selected from the predetermined range. In this case, there is of course a channel for each of these frequencies, that is to say there are at least as many frequency changing stages of the second type as there are different frequencies to be received simultaneously. More precisely, from one end to the other of the frequency changing device there are at least as many distinct frequency changing channels as there are frequencies to be received simultaneously, unless the high frequencies to be received simultaneously are in a relation such that at least the first frequency changing stage of the first type may be used for all these frequencies with the same division factor.

It is clear that the frequency changing devices according to the present invention, in which there are a plurality of different frequency changing channels, may be constituted by series-parallel combinations of frequency changing stages of the first type with a single mixer and a variable heterodyne frequency or with a plurality of mixers having respective fixed heterodyne frequencies, and that some elements may be common to a plurality of frequency changing channels, regardless of the fact that one or more high frequencies selected from the predetermined range are to be used simultaneously.

A practical form of frequency changing device suitable for dealing with a plurality of frequencies simultaneously is obtained from further consideration of FIG. A7, omitting the switches 160 and 260 and the output line $f_s$. There are then obtained two totally separated frequency changing channels suitable for furnishing simultaneously the low frequencies $f_{1s}$ and $f_{2s}$. If for example the division factors $k_{11}$ and $k_{12}$ are equal, it is advantageous to unite the first frequency changing stages 110 and 210.

The present invention relates to a method of radio-direction finding and to a device for implementing said method.

Those skilled in the art will appreciate that radio-diection finding is a system of obtaining a navigational fix by means of which a vehicle, in particular a ship, can determine its position by means of radio signals received by the equipment which it carries. This method of obtaining a fix thus requires the installation of a transmitter system (fixed transmitters) for said signals, as well as the installation of a receiver system (receiver apparatus) on board the vehicle, the combination of the system of the transmitted signals and the positions of the respective transmitters being such that the receiver apparatus can deduce the position of the vehicle from the signals which it receives.

In one known radio-direction finding method, the phases of the received signals are employed in order to deduce the position information (French Patent 790.386).

In the following, the term "total phase" of a sinusoidal signal varying with time $t$ in accordance with the law A sin $(2\pi ft - \epsilon_o)$, where $f$ is the frequency of the signal and $\epsilon_o$ the phase at an instant of origin ($t=o$) will be used to designate the value $$\int_o^t (2\pi ft)dt$$

The total phase can be split into any whole number of revolutions of $2\pi$ (whose phase) and into a fraction of $2\pi$ (partial phase):

Total phase = whole phase + partial phase

In the case where $\epsilon_o = o$, the partial phase is equal to the instantaneous phase $(2\pi ft - \epsilon_o)$.

We shall also introduce the concept of "total phase-shift" between two sinusoidal signals of identical frequency; the total phase-shift will designate the difference between the total phases of the two signals considered from the same time origin.

Similarly, the total phase-shift can be split into a whole part (multiple of $2\pi$) and a fractional part (partial phase-shift).

In Patent Specification No: 790.386 hereinbefore cited, the system of electrical signals forming a transmission chain, is made up of two groups of three signals each. Each group comprises two high-frequency radio signals each produced by a different transmitter and having closely adjacent frequencies differing from one another by a value which corresponds to an audio frequency, and an HF radio frequency of different value, this being referred to as the reference frequency and being modulated by said audio frequency.

These three signals are received on board the vehicle where they are processed in the receiver. In this receiver, the two first high-frequency radio signals are mixed in order to produce an audio frequency direction-finding signal, and the reference radio signal is demodulated in order to obtain an audio frequency reference signal, the total phase-shift between the two audio signals being proportional to the difference between the distances from the vehicle to the two transmitters producing the two first high-frequency signals with the consequence that the location of the locus of the total phase-shift points associated with a group of signals is constituted by a hyperbola of which the two transmitters form the foci, the locus associated with the other group being a similar hyperbola; the point of intersection between these two hyperbolae thus defines the position of the vehicle.

In one embodiment, the radio reference signal is produced by ione of the two transmitters which furnish the first HF radio signals. The HF frequency of the direction-finding signal produced by the other transmitter is thus termed the "characteristic frequency".

In this known technique, the total phase-shift between the audio frequency direction-finding and reference signals is likewise proportional to the characteristic frequency in each of the groups of signals. Since this characteristic frequency is fairly high, the total phase-shift expressed in radians exceeds $2\pi$ and therefore comprises a whole part and a fractional part. However, those skilled in the art will appreciate that phase meters only indicate the partial phase-shift of course, that is to say the fractional part of the total phase-shift, so that there is a certain indeterminacy in the position of the vehicle; in other words, knowledge of the partial phase-shift does not simply define one hyperbola but rather a family of hyperbolae, the vehicle being located upon just one of them. Similarly, the other group of signals likewise produces another family of hyperbolae. The vehicle is thus located at one of the intersections between the hyperbolae of these families. In other words, there is "ambiguity" in the position of the vehicle. A "channel" corresponds to the distance between two successive hyperbolae of one and the same family between which the phase undergoes a shift of $2\pi$, and the width of such a channel is inversely proportional to the characteristic frequency of the family.

This ambiguity can be overcome in a simple manner by providing, upon a chart depicting the direction-finding zone, at least one point where the whole part of the total phase-shift is known through a direct determination. All that is necessary then is for the vehicle to pass through this point and for the navigator to record at that instant, on a counter, the known value of the whole part of the total phase-shift. This counter will then count from said instant, either counting up or counting off (adding or subtracting), the number of times that the partial phase-shift reaches the value $2\pi$. The counter will there fore always record the real value of the whole part of the total phase-shift. This is referred to as "coupled" operation. This system means that the vehicle or vessel etc., must pass through a determinate point before it is possible to obtain a fix. Moreover, any accidental interruption in radio reception (transmitter or receiver breakdown) or fault in the operation of the computer, will falsify the recorded value so that it will be necessary to retun to the known point.

In practice, in order to overcome the ambiguity, a second family of hyperbolae is used, these hyperbolae having the same foci as the first and having a different characteristic frequency, that is to say channels of different width. Advantageously, said width will be slightly different from that of the first family of hyperbolae so that the pieces of information supplied by these two familes of curves can be used in the same manner as a vernier. The result is that, by combination of the pieces of information which the two families of curves supply a third family of curves can be defined the channels of which have a width proportional to the difference between the characteristic frequencies. It is true that this does not totally overcome the ambiguity, however the characteristic frequencies of the two first families of curves are so selected that the channels of the third family are sufficiently wide to make it possible by a measurement of another type (for example an astronomical sight) to position the vehicle definitely in a precise channel. Once this operation has been carried out, the pieces of information supplied by one of the first families of curves taken on its own, are used to obtain a "fine measurement."

In the prior art technique, gear mechanisms were employed to combine the pieces of information supplied by the two families. These mechanisms present two major drawbacks: their characteristic frequencies have to be in determinate ratios and it is necessary to change sets of gears when it is required to operate within an area covered by families of different characteristic frequencies. As far as the first drawback is concerned, it is well known that the allocation of wavelengths in the high-frequency band is strictly controlled and it is becoming more and more difficult, so that it is now virtually out of the question to obtain the precise frequencies required.

The present invention overcomes these drawbacks by providing a radio direction-finding method in which the design of the device used to implement it, combined with the exploitation of purely electronic means, makes it possible to utilise any frequency and to achieve fully automatic exploitation of the system of pieces of information supplied by the radio direction-finding signals, thus enabling direct recording and display to be effected without any ambiguity in terms of the location of the vehicle.

In order to provide a better understanding of how the invention may be put into effect, a description will now be given, in the form of non-limitative examples, of several embodiments of devices for implementing the method of the invention, said description relating to the attached drawings in which:

FIG. B1 illustrates a transmitter system of the single signal kind;

FIG. B2 illustrates a transmitter system of the single signal kind, with a reference facility;

FIG. B3 illustrates the block diagram of a receiver in accordance with the invention for receiving a single signal transmission;

FIG. B4 illustrates a detail of part of the receiver of FIG. B3, and FIG. B4a illustrates the wave forms of the signals occurring in this part of the receiver;

FIG. B5 illustrates the detail of another part of the receiver of FIG. B3;

FIG. B6 illustrates the detail of a third part of the receiver of FIG. B3 and FIGS. B6a and B6b illustrate the wave forms of the signals appearing in this part of the receiver, respectively in the case of a theoretical embodiment and in that of a practical embodiment; and FIG. B7 illustrates the block diagram of a receiver in accordance with the invention, for receiving a two-signal transmission.

In the following, the invention will be explained in terms of two types of transmission:
transmission using the "single signal principle" and transmission using the "two-signal principle." The chief difference between these types of transmission resides in the fact that the audio frequency direction-finding signals obtained in the "single signal" system, are stable in frequency and phase which makes it possible to process them successively; however, in the case of the "two-signal" system, it is necessary to process the signals in pairs since they are unstable. In order to provide an explanation of these two types of transmission, we will consider the case in which a reference signal is being transmitted but it will be seen at a later point in this dissertation that the present invention is equally capable of handling the types of transmission referred to, without any necessity for a reference transmission.

Transmission of the "Single Signal" Type, with a Reference Signal, FIG. B1

The transmitter arrangement corresponding to a group of signals, comprises three transmitters A, B, and C. Transmit A produces a high-frequency signal of frequency $F_o$ modulated by a low frequency reference signal $f_o$, whilst transmitter B produces a high-frequency signal of frequency $F_1$ and transmitter C produces a high-frequency signal of frequency $F_1 + f_o$. The signals are received at a known fixed point D. At this point, the HF signal produced by A is demodulated in order to obtain an audio frequency for reference purpose, and the doublet system $F_1$, $F_1 + f_o$ is mixed in order to obtain an audio frequency referred to as a direction-finding signal. At D, the audio frequency reference and direction-finding signals are compared with one another and as a result one of the transmitters B, C is controlled in order to keep said two audio frequency signals in phase. The result is that the frequency interval $f_o$ of the doublet system of high-freuqency signals produced by the transmitters B and C, will always be strictly equal to the frequency $f_o$ of the audio frequency signal modulating the high-frequency signal produced by A. If, in transmitter A, in order to create the audio frequency reference signal which is designed to modulate the carrier produced by A, a high-stability (for example $10^{-6}$) crystal is used, then the audio frequency reference signal and the audio frequency direction-finding signal will both have the same frequency stability ($= 10^{-6}$). If $f_o = 80$ Hz, then the possible variation in $f_o$ will be given by:

$$\Delta f_o = f_o \cdot 10^{-6} = 8.10^{-5} \text{ Hz}.$$

Transmission of the "Two Signal" Type, with a Reference Signal, FIG. B2

In respect of each group of signals, likewise three transmitters A', B' and C', are used. The transmitters B', C' produce a doublet of signals, of frequency $F_1 + f_o$ and $F_1$, which is received at a known fixed location D' close to A'. The doublet $F_1$, $F_1 + f_o$ is mixed in order to obtain an audio frequency $f_o$ which is transmitted to the transmitter A' where it is employed to modulate an HF carrier of frequency $F_o$, the audio frequency signal thus transmitted being the reference signal. It will be seen that in this fashion the audio frequency reference signal always has the same frequency $f_o$ as the audio frequency direction-finding signal, but the stability of this frequency is poorer than in the case of the single signal system. If $F_1$ is equal to 1.700 kHz and if high-stability crystals are used to generate the frequencies $F_1$ and $F_1 + f_o$, then it will be seen that the variation in the frequency $F_1$ can aount to $\Delta F_1 = F_1.10^{-6} = 1.7$ Hz. Thus, if $F_1$ can vary by 1.7 Hz and $F_1 + f_o$ by the same amount in the opposite sense, it will be appreciated that the value $f_o$ may vary by 3.4 Hz, which, assuming that $f_o = 80$ Hz corresponds to a stability factor in the order of $5.10^{-2}$. The generation of the instantaneous phase of the audio frequency direction-finding and reference signals is thus not a regular function of time and the measurement of their phase-shift is pointless unless these two audio frequency signals are processed simultaneously.

Reception

The vehicle M whose position is to be determined, picks up the various signals transmitted and processes them in order to obtain the corresponding audio frequency direction-finding and reference signals. In a general manner, at the location of the vehicle the instantaneous phase of an audio frequency signal transmitted in the above manner, can be written as $2\pi f_o t + \epsilon$ where $\epsilon - k - Kx$ in which $k$ is a known coefficient having a value between 0 and $2\pi$ and representing the partial value of the phase $\epsilon$ at a fixed location where X = $o$; K is likewise a known coefficient representing the signal sensitivity and $x$ is a quantity characterising the position of the vehicle. Thus, using the type of transmission system which employs a reference signal, if $\epsilon_{o1}$ is the phase of the audio frequency reference signal and $\epsilon_1$ is the phase of the audio frequency direction-finding signal, then we can put:

$$\epsilon_{o1} = k_{o1}$$

($K_o = o$ for a reference)

$$\epsilon_1 = k_1 + K_1 x$$

Each of these phases can be determined only in terms of its partial value, that is to say somewhere between 0 and $2\pi$; there is thus a certain undetermined factor. Moreover, the coefficients $k_1$ cannot be determined except for a certain constant (this is in addition to the indeterminacy of the number of complete revolutions or cycles), because of the arbitrary choice of the time margin. The constant $K_1$ is proportional to the frequency $F_1$ or $F_1 + f_o$, in accordance with the transmission characteristics, as a detailed calculation will illustrate.

It will be assumed that the coefficient $K_o$ corresponding to the audio frequency reference signal, has the value zero. In fact $\epsilon_{o1}$ will vary a little as the distance of the vehicle from the transmitter producing the reference signal varies, but this variation would have to reach a value of 3.750 km (in the case where $f_o = 80$ Hz) in order for $\epsilon_o$ to vary by $2\pi$. It can therefore be assumed that in the geographical range envisaged, the phase $\epsilon_{o1}$ of the reference signal does not vary, hence the term "reference". Accordingly, the reference signal can be transmitted from any point, for example from one of the transmitter B or C (in other words, in the case of FIG. B1, A coincides with B or C), since its phase does not depend upon the location of the transmitter.

If the reference signal is transmitted from B, then the characteristic frequency of the group will be that of the HF signal produced by transmiter C ($F_1 + f_o$) and $K_1$ will be proportional to $F_1 + f_o$. If the reference signal is transmitted from C, then the characteristic frequency of the group will be $F_1$.

In the case where the reference signal is transmitted from a point A, distinct from B and C, then the characteristic frequency of the group may be made equal to $F_1$ or $F_1 + f_o$, it being understood of course that one is then neglecting the variations in a difference between the correcting terms applied to $k_{o1}$ and $k_1$, these terms respectively taking the form:

$$\frac{2\pi f_o D_A}{C} \text{ for } k_{o1}$$

and $$\frac{2\pi f_o D_B}{C} \text{ or } \frac{2\pi f_o D_C}{C} \text{ for } k_1$$

in which:
— $D_A$, $D_B$, $D_C$ represent the respective distances of the vehicle from the points A, B and C;
— C represents the velocity of light.
By taking the difference $\epsilon_{o1} - \epsilon_1$, we obtain $$\epsilon_{o1} - \epsilon_1 = k_{o1} - k_1 - K_1 x$$

We know $k_{o1} - k_1$, that is to say the partial phase-shift between the two audio frequency signals at the known fixed point hereinbefore defined. Calculation shows that $x$, with the exception of a constant, represents the difference in the trajectories between, M and the two transmitters of the doublet system. The quantity $x$ can be expressed in any desired unit and all that is necessary is that the element which records or displays it shall be able to do so in a manner which indicates its total possible variation. Its total possible variation is equivalent to its variation between the two transmitters of the doublet system.

It will be seen that the phase difference $\epsilon_{o1} - \epsilon_1$ is constant when $x$ is constant, that is to say that the phase difference is constant around a hyperbola having the two transmitters of the doublet as its foci. If $\epsilon_{o1} - \epsilon_1$ is known, it is therefore possible to situate the vehicle on such a hyperbola; if there are three other signals available, transmitted by two other transmitters in order to establish another hyperbola, then the point of intersection between the two hyperbolae will represent the position of the vehicle.

It will be observed, however, that a variation of $2\pi$ in the phase-shift $\epsilon_{o1} - \epsilon_1$, due to a variation in $x$, leads us back to the same partial value for $\epsilon_o - \epsilon_1$. If the characteristic frequency of the group is 300 kHz, the variation in $x$ which is produced by a variation of $2\pi$ in the quantity $\epsilon_o - \epsilon_1$, will correspond to a variation in the difference between the distances from the vehicle to the transmitters, of 1 km.

As long as this difference between the distances varies by 1 km, therefore, the same value of partial phase-shift will be obtained. This means that there is ambiguity. In order to characterise this ambiguity, the "channel" concept is introduced, this being the space separating two hyperbolae and corresponding to said variation in the distances; the channel is characterised by its width on the base line between the antennas; in the case considered above, its width is 500 meters.

In order to remove this ambiguity, a second group of three signals is employed; an HF signal modulated by an audio frequency signal $f_{o2}$, and two HF signals of frequency $F_2$ and $F_2 + f_{o2}$, transmitted by the same transmitters. In the same way we obtain $$\epsilon_{o2} = k_{o2}$$

$$\epsilon_2 = k_2 + K_2 x$$

$x$ in all cases being defined in the manner used earlier, since the signals are transmitted by the same transmitters and the constant $K_2$ being proportional to $F_2$ (or $F_2 + f_{o2}$), so that we have:

$$\epsilon_{o2} - \epsilon_2 = (k_{o2} - k_2) - K_2 x$$

In this way, a new family of hyperbolae is established. For reasons associated with propagation and for technological reasons, the frequencies $F_2$ and $F_1$ are in the same order of magnitude. $F_2$ is chosen to be close to $F_1$ in order to obtain a family of hyperbolae exhibiting channels of slightly different width to the width of the channels associated with the earlier family. For example, $F_2$ is chosen at 310 kHz so that a channel corresponds to a variation of about 970 meters in $x$. By combining these two families, a new family is obtained in which the width of the channels corresponds to a variation of around 30 km in $x$. In other words, if we take the difference of the two phase-shifts:

$$(\epsilon_{o1} - \epsilon_1) - (\epsilon_{o2} - \epsilon_2) = \text{known constant} + (K_2 - K_1) x$$

here, the sensitivity is $K_2 - K_1$ and thus proportional to the difference $F_2 - F_1$ ($-$ 10 kHz) between the frequencies.

This difference between the phase-shifts is itself a phase-shift and will not amount to a full revolution or cycle until $x$ has undergone a variation of 30 km. There is still an ambiguity but this can be removed by a different measurement, for example by taking a sight with a sextant.

It is possible to use still other, similar families in order to obtain intermediate sensitivities.

In accordance with the present invention, the different signals are processes in a sequential manner. The result is two different types of variations depending upon whether the transmission is of the single signal or two-signal type. Since it is purely the phase-shift $\epsilon_{ol} - \epsilon_1$ or $\epsilon_{o2} - \epsilon_2$ which provides any useful information (because it is only the difference $k_{o1} - k_1$ or $k_{o2} - k_2$ which conveys any sense, given the arbitrary nature of the time origin used to define the $k_i$ values), it is not possible to receive and successively process the various audio frequency direction-finding and reference signals on board the vehicle, unless the frequencies of these audio frequency signals are stable as in the case of the single signal system. On the other hand, in the case of the two-signal system, the apparatus in accordance with the present invention processes the two audio frequency direction-finding and reference signals of one and the same group, simultaneously, in other words, it handles them as an inseparable pair; in other words, the $k_i$ values are then variables as a function of time and this means that the phase $\epsilon$ of the signal taken on its own, conveys no sense. It is only the phase-shift between the two signals of the same pair when considered simultaneously, that conveys any sense since the coefficients $k_i$ of the two signals are rigidly linked with one another In the two-signal case, therefore, it is exclusively the measurement of the phase-shift between the audio frequency direction-finding and reference signals, which provides any useful information.

The same kind of expression for this phase-shift will be used in the two-signal case, as is used to describe the phase of a signal in the single signal case. Thus the phase-shift between the audio frequency reference and direction-finding signal of one and the same pair, can be written:

$$\epsilon = k - K.x$$

where $\epsilon$ represents the phase-shift at the vehicle, k the magnitude of this phase-shift at a known location and K the sensitivity of the group in question.

In the single signal case, there is quite obviously an immediate simplification to be made due to the fact that the reference signals can be combined into one reference signal, and consequently, for all the groups transmitted by the same two transmitters, a single unique reference signal will be obtained:

$$\epsilon_{o2} = \phi_{o1}$$

It is even possible to provide a single, unique reference signal in respect of a complete system, that is to say an arrangement providing at least two "families" of hyperbolae (in the broad sense of the term) having different foci, since the phase of the reference signal does not depend upon the unknown x.

It is important at this juncture to make a further general comment with relation to the reference signal. The examples which have been taken here have been of transmissions using a reference signal, however the present invention applies equally to the case where no such reference signal is used, instead the doublet signals alone. In this case, it is necessary to combine at least two audio frequency signals obtained from these doublet systems, in order to produce any useful information.

In the following, two embodiments of a sequential receiver in accordance with the invention will be described in relation to the single signal and two signal cases.

Single Signal Type Receiver (FIG. B3)

This receiver essentially comprises a receiver unit 1 which collects the HF signals, derives from these the audio frequency reference and direction-finding signals, and delivers the latter in a determinate but arbitrarily selectable order, to the input 2 of an interval detector 3: memories 4, 5 and 6 for coefficients $k_0'$, $k_1'$ and $k_2'$; a memory 7 for a quantity $x'$; a control unit which supplies a local signal of the same audio frequency as the signals applied to the input 2, and which is applied to the second input 9 of the interval detector 3; and units 10 and 11 for producing a quantity $y$ and a memory 12 for storing same.

It will be assumed, for example, that a transmission is such that the three following audio frequency signals are received successively and in the order mentioned:

the audio frequency reference signal of phase $\epsilon_0 = k_0$;

the first audio frequency direction-finding signal of phase and characteristic frequency $\epsilon_1 = k_1 + k_1 x$; $F_1 = 300$ kHz;

the second audio frequency direction-finding signal of phase and characteristic frequency $\epsilon_2 = k_2 + K_2 x$; $F_2 = 310$ kHz.

The processing of these signals is obviously a periodic operation; the term "sequence" will be employed to designate the time interval devoted to the processing of each signal: each cycle of the receiving programme obviously contains a certain number of sequences and at least as many as there are signals to be processed.

Let us assume, first of all, that the vehicle is at a standstill, so that $x$ does not change.

Stored in its memory 4, the receiver contains a coefficient $k_0'$ representative of a phase. When the audio frequency reference signal is applied to the input 2 of the interval detector 3, the control unit applies to the other input 9 of the same detector a local reference signal of phase $\phi_0 = k_0'$ and frequency identical to the reference frequency (for example 80 Hz). The interval detector 3 compares the phases of the audio frequency reference and local signals. If a phase difference $\epsilon_0$ is detected, the latter is then used to more or less completely correct the value of $k_0'$ stored in the memory 4. Then, during a new sequence in the next cycle, the control unit establishes a new local signal of phase $\phi_0$ which is equal to the corrected value of $k_0'$, and this indeed until $\epsilon_0 = o$, viz:

$$\phi_0 = \phi_0$$

in other words $$k_0' = k_0$$

Similarly, when the first radio frequency direction-finding signal is applied to the input 2 of the interval detector 3, the control unit applies to the other input 9 of this detector a local signal of phase $\phi_1 = k_1' + K_1 x'$ ($k_1'$ being the coefficient which represents a phase and which is stored in the memory 5) and of the same frequency as the first audio frequency direction-finding signal (e.g. 80 Hz). The interval detector 3 conpares the phases of the audio frequency direction-finding and local signals. If it determines a phase difference of $\epsilon_1$, then the latter is used to more or less completely correct the value of $k_1'$ in the memory 5. Then, during a new sequence in the next cycle, the control unit will establish a new local signal on the basis of this corrected $k_1'$ value, and indeed until $$\phi_1 = \phi_1$$

in other words $$k_1 + Kx = k_1' + K_1 x'$$

The same procedure is gone through during each reception cycle, in respect of the second audio frequency direction-finding signal, so that if $k_2'$ is the coefficient representing a phase and stored in the memory 6, ultimately the following will result:

$$k_2 + K_2 x = k_2 + K_2 x'$$

We shall call $\delta_0$ the difference between the coefficient $k_0'$ stored in the store 4 and its real value $k_0$ $$\delta_0 = k_0' - k_0$$

from which, when $$\epsilon_0 = o$$

we have $$\delta_0 = o$$

Similarly, we shall call $\delta_1$ the difference between the coefficient $k_1'$ stored in the store 5 and its real value $k_1$ $$\delta_1 = k_1' - k_1$$

from which, when $$\epsilon_1 = o$$

we have
$$\delta_1 = K_1 (x - x')$$

In other words, the error made by storing $k_1'$ instead of $k_1$ provides us with information on the error made by storing $x'$ instead of $x$. This arises from the fact that the stored $k_1'$ and $x'$ values are used to produce a local signal which is in phase with the audio frequency direction-finding signal, and that an error in one of the elements effects the other element.

Similarly, we shall use the symbol $\delta_2$ to designate the difference $k_2' - k_2$ and, when $$\epsilon_2 = o$$

we have $$\delta_2 = K_2 (x - x')$$

The quantities $\delta_i$ thus produce information on the interval $x - x'$. If one could know the values of these quantities $\delta_i$, exactly, any one of them could be used in order to modify $x'$ in the desired direction in order to completely cancel out the relevant $\delta_i$ value and thus reduce the interval $x - x'$ to zero, this operation being carried out with a sensitivity of $K_i$.

However, the value of the $\delta_i$ quantities cannot be completely known:

— on the other hand, the values of the quantities $k_i$ are known with the exception of a constant which is a function of the arbitrarily chosen time origin. The same applies to the quantities $k_i'$ and, since it is not possible to have the same time origin at the transmitting and receiving ends of a system, the result is that the quantities $\delta_i$ are known except for an unknown constant;

— on the other hand, since the coefficients $k_i$ and $k_i'$ represent phases and are consequently located somewhere between 0 and $2\pi$, the same applies to the $\delta_i$ values.

However, if the interval $x - x'$ is substantial and if the coefficient $K_i$ has a high value, the product $K_i (x - x')$ which is homogenous at a phase and therefore at an angle, may be substantially greater than $2\pi$ and comprise a certain number of full revolutions so that the equation:

$$\delta_i = K_i (x - x')$$

should be written $\delta_i$ = fractional part of $K_i (x - x')$, the term "fractional part" being intended to convey a fractional part of a revolution thus, if $\delta_i$ is expressed in radians, a quantity between 0 and $2\pi$.

It will not suffice, therefore, to reduce $\delta_i$ to 0 in order to make $x'$ equal to $x$; this result is only obtained if the product $K_i (x - x')$ is less than $\pi$ in obsolute value.

In the general case, therefore, these is an ambiguity in the value of the unknown $x$.

For all these reasons, it is impossible, at least within the framework of the single signal system, to directly employ the $\delta_i$ quantities in order to effect the $x'$ value.

In order to eliminate the above difficulties, $\Delta_j$ quantities are used which are obtained by the linear combination with whole number coefficients, of the $\delta_i$ quantities:

$$\Delta_j = \epsilon_i \alpha_{ij} \delta_i$$

$\alpha_{ij}$ should be constituted by whole number integers in order that the ambiguity in $\Delta_j$ shall be no greater than that in $\delta_i$.

These coefficients should be simple ones (more often than not they will be equal to $+1$, 0, or $-1$) in order not to excessively increase the value of the probable interval in the final result, they are fixed by design considerations.

In addition, for a given $\Delta_j$ value, the coefficients $\alpha_{ij}$ should be selected in such fashion that the unknown constant affecting each $\delta_i$ value is eliminated and that $\Delta_j$ is known without any uncertainty than that of the whole number of $2\pi$ values (ambiguity).

We then have:

$$\Delta_j = \epsilon_i \alpha_{ij} K_i (x - x')$$

It appears, therefore, that if we know a top limit on the interval $x - x'$ ($x'$ being determined roughly by an astronimical sight for example), we can select the coefficients $\alpha_{ij}$, abiding by the conditions set out hereinbefore, so that $$\epsilon_i \alpha_{ij} K_i (x - x')$$

is always somewhere between 0 and $\pi$ in absolute value.

It will then be possible to employ the quantity $\Delta_j$ in order to modify $x'$ in the direction required to cancel out $\Delta_j$ and, therefore, to cancel out the interval $x - x'$ without any ambiguity.

This operation is affected with a sensitivity $\epsilon_i \alpha_{ij} K_i$ which is the weaker the larger the interval $x - x'$ can be made; thus, a rough position for $x'$ will be obtained, making it possible to considerably reduce the value of the interval $x - x'$.

The operation will be repeated by selecting other coefficients $\alpha_{ij}$ in order to improve the sensitivity $\epsilon_i \alpha_{ij} K_i$ and thus obtain a more accurate position for $x'$.

This procedure is continued until the probable interval of the result thus obtained for the value of $x'$ has become uniform with the errors which are due to causes outside the process.

In the light of the definition of the quantities $\delta_i$, the $\Delta_j$ values can be regarded as linear cobinations with whole number coefficients, of the $k_i'$ values and, in practice, the quantities $\Delta_j$ will be produced directly from the coefficients $k_i'$.

These various points are illustrated in FIG. B3.

In FIG. B3 a unit 10 has been illustrated, in which a quantity $\Delta_1$ is generated such that $$\Delta_1 = \delta_2 - \delta_1 = (K_2 - K_1)(x - x')$$

from which $$\Delta_1 = (k_2' - k_2) - (k_1' - k_1) = (k_2' - k_1') - (k_2 - k_1)$$

The differences $k_2' - k_1'$ and $k_2 - k_1$ are completely determined since a common time origin is taken for the $k_1'$ values and likewise for the $k_i$ values (taking into account these differences, brings about the elimination of the unknown constants involved in the determination of the $k_i$ and $k_1'$ values).

In addition, it can be contrived that at transmission $k_o = k_1 = k_2$ so that we obtain $$\Delta_1 = k_2' - k_1'$$

In other words $\Delta_1$ represents the difference between the two coefficients $k_1'$ and $k_2'$ stored in the memories 5 and 6.

$\Delta_1$ is used to influence $x'$ in such a way as to reduce $\Delta_1$ to zero and thus to cancel out the difference $x - x'$. Simultaneously, $k_1'$ and $k_2'$ are influenced in proportions such that the $\phi_i$ functions determined by the control, are not modified; in other words, it has been assumed that the vahicle is at a standstill (therefore $\epsilon_i$ = constants) so that at all times we have $\epsilon_i = \phi_i$ and therefore $\epsilon_i = 0$. Because of the fact that $x'$ tends towards $x$, the $\delta_i$ quantities tend towards zero, or, in other words, the $k_i'$ coefficients tend towards their real value $k_i$.

It will be seen that the sensitivity of this correction of $x'$ is $(K_2 - K_1)$ this corresponding to correction channels having a width of 15 km (on the base line) starting from the hypothesis made earlier in which $F_1 = 300$ kHz and $F_2 = 310$ kHz.

It is sufficient, therefore, to have been able to determine $x'$ in such a manner that $x - x'$ is less than 7.5 km, in order for the expression $(K_2 - K_1)(x - x')$ always to be less than $\pi$ and that, consequently, the above process makes it possible to determine a value of $x'$ which is substantially equivalent to $x$ which value, although possibly not very accurate, is nevertheless not ambiguous.

In order to improve the accuracy of this determination, in the unit 11 another combination of $\delta_i$ values is produced, namely, $$\Delta_2 = \delta_1 - \delta_0 = K_1(x - x')$$

or $$\Delta_2 = (k_1' - k_1) - (k_0' - k_0) = (k_0' - k_0') - (k_1 - k_0)$$

since it has been assumed that $$k_0 = k_1$$

so that we are left with $$\Delta_2 = k_1' - k_0'$$

In the same way as before, $\Delta_2$ will be employed to influence $x'$ in a way which tends to reduce $\Delta_2$ to zero and thus to more precisely cancel out the interval $x - x'$. At the same time, $k_1'$ and $k_2'$ (although $k_2'$ is not involved in the definition of $\Delta_2$) will be influenced in proportions such that the operation of the control is not disturbed.

In a general way, at the same that a $\Delta_j$ quantity is employed to modify the value of $x'$, it is used equally to modify the values of all the $k_i'$ coefficients which correspond to $K_i$ coefficients which are other than zero, and this in proportions such that the operation of the control is not modified.

The sensitivity of this new correction is $K_1$, corresponding to channels having a width of 500 meters (on the base line) and always based on the hypothesis that $F_1 = 300$ kHz; the determination is thus a much more accurate one that the foregoing one.

If required, the receiver may also be arranged to process other HF signals (for example $F_3 = 350$ lHZ) enabling a third audio frequency direction-finding signal to be produced and thus making it possible to obtain a quantity $\Delta_3$, ergo $$\Delta_3 = \delta_3 - \delta_1 = (K_3 - K_1)(x - x'),$$

which would enable an intermediate mean sensitivity correction $(K_3 - K_1)$ to be effected, corresponding to channel widths freak of 3 km (on the base line).

The above formulae are simplified by the fact that there is a reference signal, but it will be obvious that the same means could be employed in the case where no reference signal is transmitted, since the said formulae are general ones anyway.

It will be abundantly clear from the foregoing description that no more than one $\Delta_j$ value is used at any one time; the various $\Delta_j$ values are operated successively.

Thus far, it has been assumed that $x$ does not change, but of course in practice the vehicle will be moving and therefore $x$ will change and it is required that $x'$ shall follow the variations in $x$; it is therefore necessary to continue to effect corrections of $x'$ by means of the finest $\Delta_j$ quantity compatible with the speed of displacement of the vehicle.

However, since the data are processed in a sequential manner, the corrections in question cannot be effected in a continuous way and $x'$ will vary in a discrete manner.

In order to overcome this drawback, advantageously the system described hereinafter and illustrated in FIG. B3, will be used.

The receiver comprises, additionally, a velocity memory or store 12, the content $v$ of which represents in magnitude and sign the velocity of the variation in the unknown $x$, which variation is due to the movement of the vehicle. This velocity information is supplied to the store through the medium of the intervals $\Delta_i$ coming from the phase comparitor 3. For a given value of $v$, the store 12 produces a continuous variation in the content $x'$ of the store 7. It is obvious, of course, that the interval $_0$ corresponding to the reference signal, cannot, since it is not due to a variation in $x$, affect the velocity memory 12.

If the value $v$ stored in the store 12 truly corresponds to the real velocity of the vehicle, then the variation in $x'$ will follow that in $x$ and consequently the differences $x - x'$, and therefore the quantities $\delta_i$ and $\Delta_i$, will remain zero.

However, it may happen that the content of the velocity store 12 does not precisely correspond (amongst other things because of its discrete nature) with the real velocity of the vehicle, and the variation in $x'$ will not exactly follow that in $x$, so that corrections to $x'$ will take place in a discrete manner. In order to overcome this drawback a $\Delta$ value will be used, preferably that corresponding to the highest sensitivity ($\Delta_2$ in the case of FIG. B3), in order to influence not $x'$ but the $v$ value stored in the velocity store 12, this through the agency of the link 13. In other words, as soon as $x'$ commences to diverge from $x$, the quantity $\Delta$ taken will adopt a value other than zero. It will then immediately influence the content of the velocity memory in the desired sense, so that $x'$ varies more rapidly or more slowly, as the case may be.

The mode of operation of the receiver is as follows:

By a previous determination (for example by taking an astronomical site), a sufficiently close approximation to the value of $x$ is obtained in order to position the vehicle in a channel corresponding to the coarsest sensitivity $K_2 - K_1$. This "estimated" value is fed into the store 7 (quantity $x'$). The receiver then receives the high-frequency signals, derives from them the audio frequency direction finding and reference signals, and stores the corresponding coefficients $k_i'$. Then, the $\Delta$ value corresponding to the coarse regulating function ($\Delta_1$) is produced and this is used to correct the estimated $x'$ value stored. Subsequently, the $\Delta$ value of the fine regulating system ($\Delta_2$) is employed to more accurately determine the $x'$ value thus produced, $x'$ then being furnished in the form of a number; a determinate and unambiguous hyperbola (the hyperbola on which the vehicle is located). During the whole of its correcting phase, the value $v$ stored in the velocity memory is zeroes. Subsequently, the intervals $\epsilon$ are used to determine said $v$ value (velocity set). In order to determine the other hyperbola (defined by the transmission of other HF signals by other transmitters), the intersection of which with the first determines the position of the vehicle, it is of course possible to employ a second receiver identical to the one just described. However, because of the design of the receiver in accordance with the invention and of the sequential nature of the process employed, it is possible to effect dual exploitation of numerous of its elements in order to determine said second hyperbola. Amongst other things, it is quite sufficient to provide the receiver with supplementary stores for the coefficients $k_i$, the value $x'$ and the velocity $v$ which are characteristic of the second hyperbola. In particular when a reference signal is transmitted, since the coefficient $k_o'$ is independent of the unknowns $x$, one and the same reference signal and thus the same $k_o'$ value stored in the store 4, can be used for the determination of the two hyperbolae.

Once position and velocity have been set for an unknown $x$, the $\Delta_j$ quantity corresponding to the finest sensitivity is switched to cooperate with the velocity store and the receiver then operates in the locked-on condition.

Another mode of operation is equally possible:

It is possible to commence by utilising the $\Delta_j$ value corresponding to the finest sensitivity, and to set the velocity of the receiver in such fashion as to "engage" $x'$ with $x$ with quite close accuracy but ambiguously, and then to use the $\Delta_j$ values corresponding to the coarsest sensitivity, assisted if required by the recording of the estimated value in order to overcome this ambiguity. This mode of operation is only economical if the coarsest measurements do not affect the results of the fine measurements.

All these operations are of course carried out in an automatic manner in accordance with a predetermined programme, both insofar as the processing of the signals is concerned and as concerns the execution of the various operations of control, correction, and so on.

In the whole of the foregoing, no hypothesis has been developed regarding the time characteristics of the transmission.

The signals may equally well:

— either all be permanently transmitted, meaning that the receiving programme is then a matter of arbitrary choice;

— or be transmitted in a sequential way, meaning amongst other things that one and the same frequency can be employed to transmit several pieces of different information (thus providing an economy of the number of frequencies used), and it will be obvious, too, that in this instance the receiver programme will have to be adapted to the transmitter programme and sychronised therewith by some known artifice.

In the following, a description will be given of means which are used to carry into effect the various operations which have so far been described;

The receiver comprises a time-base constituted by a frequency generator supplying a counter-divider made up of series-connected trigger stages. The generator comprises a very high stability crystal such that the frequencies produced at each level are extremely stable.

This timebase serves, amongst other things, to define the receiver programme and to define the time origin to which the various quantities $k_o'$, $k_1'$, $k_2'$, $z'$, $v$ stored in the receiver are related.

The stores likewise take the form of counter-dividers supplied with a fixed frequency) preferably derived from the timebase). The signal produced at the output of a counter of this kind is a squarewave signal of a given frequency. The phase-shift exhibited by this signal in relation to a square-wave signal of the same frequency coming from the timebase, characterises the content of this counter. This phase-shift is represented by the stagger between the signals (in other words it takes the form of a time interval). The content of this store, in other words the phase of the output signal from the counter, can be modified by the momentary modification of the supply frequency to the counter. By way of example, there now follows a description of the operation of the interval detector 3 and of the associated memory $k_1'$ (FIG. B4).

The phase comparator detects the difference in phase between the audio frequency signal applied as 2 and the local signal applied at 9. Ir produces at its output a symmetrical signal 15 when the detected phase difference is zero. This signal deviates progressively further from this symmetrical form the more the detected phase difference increases. The signal is applied to a converter arrangement 16. The arrangement 16 comprises two parallel channels:

One channel contains the series arrangement of a signal polarity inverter 17, a NOT-AND gate 18, a counter 19 and a converter 20; the other channel comprises in series a NOT-AND gate 21, a counter-divider 22 and a converter 23. The polarity inverter 17 produces a signal 24. The gates 18 and 21 are only open during the positive peaks of the signals 15 and 24. Fixed frequency pulses, advantageously derived from the time-base, are applied to the input 25, supplying in parallel the second inputs of the gates 18 and 21 respectively. At the outputs of these gates, the respective signals 26 and 27 are obtained, each gate only allowing the pulses to pass during the positive peaks of the signal applied to its first input (signals 15 and 24 respectively). These pulses are fed into the counter-dividers 19 and 22, each of the latter having the same capacity as the other, at the outputs of which the rectangular waveform signals appear.

The frequency of these signals depends, of course, on the one hand on the number of pulses applied to the input, that is to say the relative width of the positive peaks of the corresponding signal 15 or 24, and on the other hand upon the division factor of the counters 19 and 22.

It will be understood that the frequencies of the output signals from the counters 19 and 22, will be equal when the phase difference detected is zero, and that they will differ progressively more from one another as this phase difference increases.

The counters 19 and 22 have the effect of averaging pieces of information received; the pulses appearing at the outputs of the gates 18 and 21 are supplied in bunches and the number of pulses in a bunch is directly related to the noise component in the audio frequency direction finding signal; the counters 19 and 22 are of the intergrating kind.

The result of this is, amongst other things, that at the end of the processing of each signal, it is necessary to reset the counters 19 and 22 to zero before processing the next signal.

The output signals are converted into pulses in the converters 20 and 23, these units being for example designed so that a pulse is produced at their output when the input signal has a decaying front.

These pulses, and more precisely their difference, define the phase difference in magnitude and sign, which is detected by the interval detector 3. These pulses are fed to a selector device 28 which directs them to the points of application which correspond to the signal in question.

Considering FIG. B4, we will assume that it is $\epsilon_1$ which is involved, this influencing the store 5 ($k_1'$) amongst other things.

To this end, these pulses are applied to the two inputs of a "+/− unit" 29 which is included in the store 5.

This store 5 comprises, in addition, like all the other stores, a counter-divider 30 which is supplied across the +/− unit 29, with a fixed frequency 31 in the manner hereinbefore described. The unit 29 has an input + and and input −, the output of the unit 20 being connected for example to the + input and the output of the unit 23 to the − input. The pulses applied to the + input are added to those coming from 31, whilst those applied to the − input are subtracted from same. If the phase difference detected by 3 is zero, then as many pulses are supplied to the + input as are supplied to the − input, so that the phase of the output signal from the counter 30 is unaffected, in other words the value $k_1'$ stored in the store 5 is left unmodified. By contrast, if there is a phase difference, then the number of + pulses will differ from the number of − pulses so that the frequency of the input pulses to the counter 30 is modified and therefore the phase of the output signal from said counter 30 likewise, and this in turn means that the value $k_1'$ stored in the store is modified.

It should be pointed out that the comparison between the audio frequency direction-finding signal and the corresponding local signal, and the correction of the corresponding $k_1'$ coefficient ($k_1'$ in the base of FIG. 4) is effected throughout the time of a sequency, without effecting the local signal. It is only during the course of the corresponding sequency in the following cycle, that the phase of the local signal is corrected on the basis of the corrected $k_1'$ value.

It is possible to effect 100% correction of $k_1'$ directly, so that as soon as the following cycle arrives, $\epsilon_1 = \phi_1$. It is equally possible to effect only a partial correction of $k_1'$, by 50% for example, so that when the following cycle arrives, the interval $\epsilon_1 = \epsilon_1 - \phi_1$ will have been reduced by half; proceeding in this way, and progressively closing the gap, the final result $\epsilon_1 = \phi_1$ ($\epsilon_1 = 0$) is obtained.

The reasoning stated above, is based on the implicit assumption that $x$ does not change, however a similar kind of reasoning could be evolved for the case where $\nu$ varies.

No case arises, however, where the correction of $k_1'$ has to exceed 100% and, consequently, the time of application of the pulses to the unit 29 during each sequence, is at the most equal to a value (the maximum) corresponding to said 100% correction; this maximum value is of course a function of the frequency of the pulses applied to the input 25, of the division factors of the counters 19 and 22 and of the capacity of the counter 30.

By way of example, the production of the local signal may be effected in the manner shown in FIG. B5. Let us assume that it is desired to produce the local signal corresponding to the first audio frequency direction-finding signal, and thus to give said local signal a phase $\phi_1 = k_1' + K_1 x'$. The quantity $x'$ is stored in 7, the latter device essentially comprising a counter 32 supplied with a fixed frequency at 33 across a +/− unit 34 which serves, additionally, to correct $x'$ using the same procedure outlined in relation to $k_1'$ in the case of FIG. B4. The stagger between the output signal from the counter 32 and the signal of identical frequency coming from the timebase, is represented by $x'$. This stagger is determined by the time interval separating a decaying front in the output signal from the counter 32, and the decaying front of the identical frequency signal coming from the timebase and applied immediately afterwards at 35. The reading off of the quantity $x'$ is effected by conventional means at 36.

In order to generate the local signal, there is a counter 37 supplied at 38 with a fixed frequency advantageously coming from the timebase and having a value such that the frequency of the output signal from the counter 37 is equal to the frequency of the AF direction-finding signal applied at the input 2 of the interval dector 3.

The requirement now is to contrive that the phase $\phi_1$ of the output signal from the counter 37 is equal to $$\phi_1 = k_1' + K_1 x'$$

We can commence with $k_1'$ or $K_1 x'$. If we commence with $k_1'$, the first phase of the control operation consists in setting the counter 37 to the count reached by the counter 30 of the store 5. To do this, assuming for example that the output signal from the counter 30 has the same frequency as the output signal from the counter 37 (this is advantageous but by no means compulsory), the counter 37 being supplied at 38 (switch 39 in position I), the counter 37 is zeroed through the medium of the line 40 at the instant that the output signal from the counter 30 presents a decaying front.

During the second phase of the operation of control, the supply to the counter 37 by 38 is interrupted (switch 39 in position II) and it should be pointed out that this interruption lasts for a time exactly equal to a whole number of cycles of the local signal, the initial setting of the counter 37 by $k_1'$, not being affected. Still during said second phase, the contact-breaker 41 is closed for a time equivalent to the stagger between the output signal from the counter 32 and the fixed frequency signal applied at 35, so that the counter 37 is supplied with a fixed frequency at 42 which is proportional to $F_1$, the proportionality coefficient being such that during the closing of the contact-breaker 41 the phase of the output signal from the counter 37 varies by $K_1 x'$.

All that is then necessary is to reset the switch 39 to position I, bearing in mind the above condition relating to the operation of said switch in order not to disturb the initial setting of the counter 37, and at the output of the counter 37 there is then obtained a local signal the phase $\phi_1$ of which is equal to the partial value $$k_1' + K_1 x'.$$

In FIG. B5, the switching means required to produce the local signal have been illustrated symbolically in the form of the switch 39 and the contact-breaker 41. In practice, taking account in particular of the precision with which they must operate, these devices will advantageously be purely electronic in nature.

In a general way, in accordance with the invention, the receiver may contain a local generator which is separate from the control device, said generator essentially comprising a counter-divider supplied with a fixed frequency such that the output signal of said counter-divider has the same frequency as the audio frequency direction-finding signal.

In this case, the control device 8 operates in the manner indicated hereinbefore, but it is entirely free to produce the quantity $\phi_1$ whilst the receiver processes another signal, then, as soon as the sequence devoted to the processing of the first audio frequency direction-finding signal has started, the counter of the local signal generator is set to the count reached by the counter 37 of the control device, in other words the phase of the local signal is given the value $\phi_1$.

This arrangement is advantageous where it is desired to create some time in the control operations, for the production of the local signal; in the embodiment described in FIG. B5, the choice has been made of combining the two operations of production and application of the local signal, with a view to economy, the output from the counter 37 being employed directly as the local signal.

In FIG. B6, a preferred embodiment of the phase comparator 14 has been illustrated. It comprises three NOT-AND gates 43, 44 and 45 connected in order to exercise an "OR-EXCLUSIVE" logic function. In FIG. B6a, the direction-finding signal S is shown applied at 2, the local signal L at 9, and the resultant signal R as the output from 46. If we use a logic "1" to designate the positive level and a logic "0" to designate the negative or zero, then we can construct the following Table:

| S | L | R |
|---|---|---|
| 1 | 1 | 1 |
| 1 | 0 | 0 |
| 0 | 1 | 0 |
| 0 | 0 | 1 |

It will be apparent from a consideration of FIG. 6a that the signal R has twice the frequency of the signals S and L, and the relative width $l_1/l_2$ of a "0" peak of the R signal is proportional to the phase-shift or to the stagger between the signals S and L.

It will be realised immediately, from an examination of FIG. B6a, that the mode of operation which has been analysed does not satisfy the characteristics of the signal 15 of FIG. B4a, and in particular does not make it possible to achieve a condition of symmetry when the detected phase difference is zero.

It will be observed that in the case of the device illustrated in FIG. B6, symmetry in the output signal is obtained when the phase difference between this signal and the local signal is $\pi/2$.

Thus, it is merely necessary to shift one of the signals S or L in phase by $\pi/2$, in order to regain the above characteristic, this being illustrated in FIG. B6b; there, L is in a condition of phase quadrature.

An examination of FIG. B6b will show that the new output signal R' thus obtained still has twice the frequency of the signals S and L and that the difference between the relative widths, $l_1/l_2$ and $(l_2 - l_1)/l_2$ of the "1" and "20" peaks of the signal R', in other words $(l_2 - l_1) / 2\, l_2 = 1-2\, l_2$, is proportional in magnitude and sign to the phase-shift (or to the stagger) between the signals S and L, this at any rate as long as said phase-shift remains between $-\pi/2$ and $+\pi/2$.

When the phase-shift varies between $+\pi/2$ and $+\pi$, the expression $1-2\, l_1/l_2$ varies between $+1$ and $0$; similarly, when said phase-shift varies between $-\pi/2$ and $-\pi$, the expression $1-2\, l_1/l_2$ varies between $-1$ and $0$.

The result of this is that the device shown in FIG. 6 does not correctly detect the differences in phases, except in the range $(-\pi/2, +\pi/2, )$, and outside this range it detects the sign correctly enough but not the amplitude so that consequently the corrections which result from this will be effected with the correct sign but a reduced gain, the latter being the more marked the closer the difference in detected phase is to $+/- \pi$.

This peculiarity does not constitute any nuisance where normal locked-on operation is concerned, because, fundamentally the tected phase differences should be small.

It may, however, be more of a nuisance at the time of setting into operation of the receiver, the stored $k_i'$ values then being absolutely arbitrary and, if special precautions are not taken, the locking-on times (steering of the $k_i'$ efficients to their proper values so that $\epsilon_i = 0$) may be lengthened as a consequence.

In FIG. B3, devices 10 and 11 have been illustrated, which, from the coefficients $k_o'$, $k_1'$, $k_2'$ stored in the stores, produce quantities $\Delta_1 = k_2' - k_1'$ and $\Delta_2 = k_1' = k_o'$.

These quantities $\Delta_j$, being designed to correct the values $k_o'$, $k_1'$, $k_2'$, $x'$, $v$ stored in the receiver, will advantageously take the form of two pulse trains the difference between which represents the $\Delta_j$ value in magnitude and sign, in accordance with the arrangement described in FIG. B4, which is required for the production of the intervals $\epsilon_i$.

Each quantity $\Delta_j$ corresponds, in the case of FIG. 3, to a difference between two $k_i'$ coefficients, and thus represents the phase-shift (or stagger) between the two output signals from the stores corresponding to the $k_i'$ values considered.

It is worth noting at this point that if it is desired to be able to exploit in respect of each $\Delta_j$ quantity the whole of the range $(-\pi, +\pi)$, it is not possible in the devices 10 and 11 to employ phase comparators of the kind shown in FIG. B6 in order to detect the phase-shift between the two output signals from the relevant $k_i'$ stores.

Nevertheless, since the signals concerned are pure ones (no noise component), the use of a simple bistable trigger stage placed in one condition by the decaying front of the first signal (corresponding to $k_2'$ for example) and in the other position by the rising front of the second signal (corresponding to $k_1'$) makes it possible to obtain symmetrical rectangular waveform signal when the difference $k_2' - k_1'$ is zero, the signal departing progressively further from said symmetrical form as the difference $k_2' - k_1'$ becomes larger.

This signal is subsequently processed in the same way as the signal 15 of FIG. B4, but, in certain instances, it must act simultaneously upon several quantities and in very precisely defined proportions in order not to falsify the control operations; this effect can be achieved, for example, by employing for the effecting of each correction, an arrangement such as that 16 in FIG. B4, the choice of the fixed frequency injected at 25 making it possible to take into account the proportions between the different corrections.

The above arrangements are associated with a predetermined quantity, and thus with the corresponding store, and one and the same arrangement can be used to process several $\Delta_j$ values, its input then being switched to the corresponding rectangular waveform signal.

It goes without saying, likewise, that in certain special instances one and the same element can be used to make several corrections.

It has been seen, in the foregoing, that the $\Delta_j$ quantities, being linear combinations of the $k_i'$ coefficients, can be more complex combinations then a simple difference between two quantities. If we consider the definition of the $\Delta_j$ values as based on the intermediate quantities $\delta_i$, then it will be seen that each $\Delta_j$ quantity can always be reduced to a sum of phase-shifts between different signals taken two by two. In order to produce this sum in a concrete form, all that is necessary, for example, is to employ as the input signal for the above arrangements a signal which has been produced by successively taking the rectangular waveform signal corresponding to each phase-shift considered individually.

Thus, for example, in the case of FIG. B3 and in order to influence the velocity store 12, it is possible to use not the quantity $\Delta_2$ produced by the device 11, but a quantity $\Delta_4$ such that $$\Delta_4 = \delta_1 = \delta_2 = (k_1' - k_1) + (k_2' - k_2)$$

and, since $$k_1 = k_2 = k_o = k_o'$$
$$\Delta_4 = (k_1' - k_o') + (k_2' - k_o').$$

The production of $\Delta_4$ can for example be effected by taking two bistable trigger stages respectively controlled by $k_1'$ and $k_o'$, on the one hand, and by $k_2'$ and $k_o'$, on the other, the output signals being alternately supplied (each during a whole number of cycles of the output signals of the $k_i'$ values) to the input of a device 16.

This kind of arrangement is advantageous in that the quantity $\Delta_4$, being sensitive to the information carried by the two audio frequency direction-finding signals, will be "notified" two times more often of a change in the velocity of the cehicle, than the quantity $\Delta_2$, because of the sequential nature of the reception process.

It should be pointed out, where the operation of the $\Delta_j$ values is concerned, that they simultaneously correct the quantities $x'$ and $k_i'$, whilst where the operation of control as defined in relation to FIG. B5 is concerned, the values $k_i'$ and $x'$ are considered in succession. In order to avoid falsifying the production of the value $\phi_i$, it is therefore a convenient artifice to interrupt the correcting effect of the $\Delta_j$ values on $x'$ and $k_i'$ during the time interval devoted to the production of each $\phi_i$ quantity.

The device 12 of FIG. B3, referred to in the course of the description as the velocity store, can in practice and by way of example, comprise:

— a store device designed to store the value $v$, in the same way as the device 5 referred to in FIG. B4, the inputs of the corresponding +/− unit being supplied with the phase differences $\epsilon_1$ and $\epsilon_2$;

— a bistable trigger stage which is placed in a given position by the decaying front of the output signal from the above store and in the opposite position by the rising front of a signal of the same frequency produced by the timebase, so that it thus furnishes a symmetrical rectangular waveform signal when $v = 0$ and deviates progressively further from this symmetrical form as $v$ becomes larger;

— a device such as the device 16 described in FIG. B4, which processes the signal coming from the above bistable trigger stage in order, from it, to derive two pulse trains for injection at the respective two inputs of the +/− unit 34 for the $x'$ store 7.

TWO-SIGNAL TYPE OF RECEIVER (FIG. B7)

As explained in the paragraph entitled "Reception", the expression $k + Kx$ is employed here to express the phase-shift between two simultaneously received signals. This means two major signals and the other the production of the $\Delta_j$ quantities, the corresponding linear combinations of the $k_i'$ values being then limited to a single $k_i'$ value by virtue of the definition of these coefficients.

Moreover, in the example which now follows, the receiver will be described in the context of the general case of the implementation of control operations, that is to say that the control device produces a signal representative of the value of the expression $k_i' + k_i\,x'$ obtained from the stored $x'$ and $k_i'$ values, which value is used to influence the unit producing the local signals separately from the control device.

The receiver shown in FIG. B7 comprises a receiver unit 46 which receives the high frequency signals, derives from these pairs of audio frequency signals which it supplies in a predetermined and arbitrary order to the outputs 48 and 49, and thence applies them to the input of an interval detector 50; stores 51, 52, 53 for coefficients $k_1'$, $k_2'$ and $k_3'$; a store 54 for the quantity $x'$; a control unit 55 which produces a signal representing the phase-shift $k_i' + K_i\,x'$; a unit 56 generating local signals of the same audio frequency as the signals produced by 47; and a unit 57 for producing quantities.

The interval detector 50 comprises, in fact, two phase comparators 58, 59 similar to the one described in FIG. 6, the unit 60 which receives the intervals detected by the comparators 58 and 59 and combines them, for example by processing each of them through a device such as the device 16 of FIG. B4, and by connecting in parallel, two by two, the outputs of said two devices in the requisite direction to obtain the sum or difference of the relevant intervals, and a selector device 61 which receives one of these combinations and directs it towards the points of application corresponding to the pair of processed signals.

The local signal generator unit 56 comprises two counters 62, 63 supplied with a fixed frequency from a source 64, and also contains a device 65 which, at the commencement of each sequence, influences the counter 63, for example resets it to zero, so that the phase-shift of the local signals produced by the counters 62 and 63, is equal to the function $\phi_i = k_i' + K_i\,x'$ previously produced by the control device 55 and corresponding to the pair of signals processed during the sequence in question.

The device 65 can be made to operate by the following means:

The device comprises a counter supplied with a fixed frequency across switching elements, the value of this frequency being such that the output frequency from the counter is advantageously equal to that of the output signal from the device 55 and of the frequency of the local signals produced by 56.

During a first time, the counter is supplied normally and its output is brought into phase with the output signal from 55, for example by resetting the counter to zero when said output signal exhibits a decaying front;

During a second time, the supply to the counter is interrupted at the time that the signal produced by the timebase, which signal has the same frequency as the output signal from 55 (thus defining the origin where the determination of $\phi_i$ is concerned), exhibits a decaying front;

In a third time, the normal supply to the counter is re-established at the instant that the output signal from the counter 62 exhibits a rise in front;

In a fourth time, a decaying front in the output signal from the counter 65 is used to reset the counter 63 to zero.

Advantageously, the receiver will likewise comprise a velocity store 66 identical to the device 12 of FIG. B3, which is supplied with the intervals $\epsilon_D$ produced by 60 and controlling a continuous variation in the content $x'$ of the store 54.

It will be assumed that the transmission is such that the following three pairs of audio frequency signals are received successively in the order listed:

| First pair | | |
|---|---|---|
| 1st audio frequency reference signal | phase-shift: | |
| 1st audio-frequency direction-finding signal ($K_1$ corresponding to $F_1 = 300$ kHz) | $k_1 + K_1 x$ | |
| 2nd pair | | |
| 2nd audio frequency reference signal | phase-shift: | |
| 2nd audio frequency direction-finding signal ($K_2$ corresponding to $F_2 = 310$ kHz) | $k_2 + K_2 x$ | |
| 3rd pair | | |
| 3rd audio frequency reference signal | phase-shift: | |
| 3rd audio frequency direction-finding signal ($K_3$ corresponding to $F_3 = 350$ kHz) | $k_3 + K_3 x$ | |

Just prior to the commencement of the sequence devoted to the reception of the first pair of signals, the control device 55 produces from the values $k_1'$ and $x'$ stored in 51 and 54, a signal representing the phase-shift $\phi_1 = k_1' + K_1 x'$ which it applies to an input of the device 65. At the commencement of the sequence, this device influences the counter 63, for example in the manner just described, so that the phase-shift between the local signals produced by the counters 62 and 63, is given by $\phi_1 = k_1' + K_1 x'$. The two local signals are each applied to an input of the comparators 58 and 59 and are there compared with the audio frequency direction-finding signals of the first pair. Each comparator 58 and 59 produces an interval. The two intervals are subtracted in 60 and the difference $\epsilon_D$ is applied to the selector device 61 which directs it to the store 51 in order to modify the value of the coefficient $k_1'$ stored there, so that during the later sequence the phase-shift $\phi_1 = k_1' + K_1 x'$ produced on the basis of the modified $k_1'$ value is more or less fully identical to the phase-shift between the two audio frequency direction-finding signals of the first pair (at least 100% correction), and this until such time as the condition $\epsilon_D = o$ is achieved.

When $\epsilon_D = o$, the intervals detected by the comparators 58 and 59 are not necessarily zero; the condition $\epsilon_D = o$ simply means that they are equal. Preferably, in order to operate the phase comparators 58 and 59 in their linear ranges (corresponding to intervals extending between $-\pi/2$ and $+\pi/2$), the two local signals will be staggered simultaneously by the same value by allowing the sum $\epsilon_S$ to influence the source 64 through the link 67 in order to instantaneously modify the input frequency to the counters 62 and 63 and thus modify the phase of the local signals in the desired direction in order to cancel out the mean of the intervals detected by the comparators 58 and 59. In practice, the source 64 may, for example, be constituted by a fixed frequency derived from the timebase and feeding the counters 62 and 63 through a $+/-$ unit which, in addition, through the link 67, is supplied with two pulse trains produced by the device 60 and constituting the tangible form of the quantity $\epsilon_S$.

During the course of the ensuing sequences, the same procedure is adopted in respect of the signals of the second and third pairs.

Finally, there are respectively stored in the stores 51, 52 and 53, the phase-shifts $k_1'$, $k_2'$ and $k_3'$, e.g.:

$$k_1' + K_1 x' = k_1 + K_1 x$$

$$k_2' + K_2 x' = k_2 + K_2 x$$

$$k_3' + K_3 x' = k_3 + K_3 x.$$

The symbol $\delta_i$ is used to designate the difference between the phase-shift $k_i'$ and its real value $k_i$, and, when all the $\epsilon_{Di}$ values are zero, we have:

$$\delta_1 = k_1' - k_1 = K_1 (x - x')$$

$$\delta_2 = k_2' - k_2 = K_2 (x - x')$$

$$\delta_3 = k_3' - k_3 = K_3 (x - x').$$

It will be appreciated that the quantities $k_1$, $k_2$ and $k_3$ represent the value of the phase-shifts between predetermined signals at known locations, i.e. they are known and are fully defined within the relevant range $(0, 2\pi)$. From the transmission point of view, therefore, it can be arranged that $k_1 = k_2 = k_3 = o$, from which we get $$\delta_1 = k_1' = K_1 (x - x')$$

$$\delta_2 = k_2' = K_2 (x - x')$$

$$\delta_3 = k_3' = K_3 (x - x').$$

As in the case of single signal reception, linear combinations $\Delta_j$ with whole number coefficients of the quantities $\delta_1$, thus of the $k_i'$ quantities, are used.

However, it should be pointed out that in the case of two-signal reception, the quantities $k_1'$, $k_2'$, $k_3'$ representing the phase-shifts, are fully defined within the range $(0, 2\pi)$ there being no unknown constant.

The result is, therefore, that these linear combinations, can sometimes be reduced to a single $\delta_i$ value, and thus to a single $k_i'$ value.

In the same way as in the single signal case, we can consider two quantities:

$$\Delta_1 = \delta_2 - \delta_1 = k_2' - k_1' = (K_2 - K_1)(x - x')$$

giving a rough position of:

$$\Delta_2 = \delta_3 - \delta_1 = k_3' - k_1' = (K_3 - K_1)(x - x')$$

giving a mean position of:

$$\Delta_3 = \delta_1 \text{ or } \delta_2 \text{ or } \delta_3 - k_1' \text{ or } k_2' \text{ or } k_3' = (K_1 \text{ or } K_2 \text{ or } K_3)(x - x')$$

giving the fine position ($K_1$, $K_2$ and $K_3$ have virtually the same values).

Finally, for "locked-on" operation and in order to influence the $v$ value stored in the device 66, we can consider a more complex quantity such that $$\Delta_4 = \delta_1 = \delta_2 + \delta_3 = k_1' + k_2' + k_3'$$

this for the same reasons explained hereinbefore in relation to the single signal case.

These $\Delta_j$ quantities are produced in the device 68 which contains a certain number of systems identical in design to those of the devices 10 and 11 in FIG. B3.

In the case where the quantity $\Delta_j$ is reduced to a single $k_i'$ value, the second input of the bistable trigger stage used in the embodiment hereinbefore described for the production of the $\Delta_j$ value, is supplied with a fixed frequency having the same value as the frequency of the output signal from the store $k_1'$, said fixed frequency being derived from the timebase.

The corrections which result from the processing of the $\Delta_j$ quantities are supplied in convenient proportions and directed to their different points of application by the device 69.

As in the single signal case, these $\Delta_j$ quantities are successively employed in each case to simultaneously correct all the $k_i'$ values stored, as well as the quantity $x'$, so that the value of the phase-shifts $\phi_i = k_i' + K_i x'$ is not modified.

The mode of operation of the receiver in FIG. 7 is functionally the same as that of the monosignal receiver described in FIG. B3.

Finally, the value of the unknown $x$ is read at 70 when $x'$ has been rendered equal to $x$.

As far as the characteristics of the transmission side of the system are concerned, the same can be said as has already been said in respect of the single signal situation.

It will be observed that in the case of the method of transmission described in relation to FIG. B2, there is necessarily a different reference signal for each pair of signals considered.

However, a method of transmission not involving the production of a reference signal, is conceivable, the value of the audio frequency $f_o$ common to the various direction-finding signals being determined by the beat frequency between the two HF signals of a doublet.

In this case, in all instances it is one HF signal of each of the other doublets which is influenced in order to maintain the different audio frequency signals produced by the doublets in phase at the known location. However, the value $f_o$ lacks the stability obtained with the method of transmission used in FIG. B2, and it therefore becomes necessary to provide an arrangement such as that of FIG. B7 for the receiving end of the system, that is to say it is necessary to process the signals in pairs, but one and the same signal can be a participant in several pairs involved in the production of the same family of hyperbolae, this in the wider sense of the term.

SUMMARY

The present invention relates, in particular, to:

1. A radio-direction finding method of the kind in which the position of a moving body is determined by the intersection of one of a family of radio-direction finding hyperbolae with one of another family of such hyperbolae, and in which, in characteristic fashion, there are successively received in respect of each family of hyperbolae, at least three AF direction-finding signals of different sensitivities the phases of which are represented by the expression $k_i + K_i x$, $k_i$ being a coefficient illustrating the phase at a known location, $K_i$ being the sensitivity of the signal and $x$ the quantity which is to be determined and which characterizes a hyperbola upon which the moving body is located; a quantity $x'$ constituting an estimate of $x$, is stored, and, for each AF signal, a partial fictive phase $k_i'$ is also stored; the three signals are successively processed by creating in respect of each of them a local signal having the same audio-frequency and the phase $k_i' + K_i x'$, the direction-finding signal being compared with the local signal and the coefficient $k_i'$ stored in the store being corrected so that the local signal produced from the corrected coefficient $k_i'$ is in phase with the direction-finding signal, the coefficients $k_i'$ being used to produce at least two signals $\Delta$ representative of linear combinations of the intervals $k_i' - k_i$; and, additionally, correction of the quantity $x'$ and simultaneously of each of the coefficients $k_i'$, is effected, these corrections being carried out in proportions such that the phases of the local signals are not modified, and being furthermore effected in a sense which tends to successively cancel the $\Delta$ values, with the result that the stored values $x'$ and $k_i'$ are made substantial equivalent to the real quantities $x$ and $k_i$ and thus constitute a precise radio-direction finding measurement.

2. A radio-direction finding method of the kind in which the position of a body is determined by the intersection between one of a family of radio-direction finding hyperbolae and another such hyperbola of another family, in which, in characteristic fashion, there are successively received in respect of each family of hypermolae at least two pairs of AF direction-finding signals of differing sensitivities, the phase-shift between these two signals in each pair being represented by the linear expression $k_i + K_i x$, $k_i$ being a coefficient representing the phase-shift at a known location, $K_i$ the sensitivity of the pair of signals and $x$ the quantity which is to be determined and which characterises the hyperbola upon which the body is located; a quantity $x'$ representing an estimate of $x$ is stored, and, in respect of each pair of direction-finding signals, a partial fictive phase-shift $k_i'$; the pairs of direction-finding signals are successively processed by producing in respect of each of the pairs two local signals of the same frequency as the direction-finding signals and whose mutual phase-shift is $k'_i + K_i x'$, by simultaneously comparing each local signal with each direction-finding signal of the same pair, and by correcting the stored coefficient $k_i'$ in such fashion that the phase-shift between the two local signals produced from the corrected coefficient $k_i$, is equal to the phase-shift between the two direction-finding signals of the pair in question; the coefficients $k_i'$ are used to obtain at least two signals $\Delta$ representative of linear combinations of intervals $k_i' - k_i$; correction of the quantity $x'$ and simultaneously of each of the coefficients $k_i'$ is carried out, these corrections being effected in proportions such that the phase-shift between local signals of a pair is not modified, and the correction being carried out in the sense tending to successively cancel out the Δ values with the result that the values $x'$ and $k_i'$ contained in the store are effectively made equal to the real quantities $x$ and $k_i$ and thus constitute an accurate radio-direction finding measurement.

3. A radio-direction finding apparatus designed for installation on board a vehicle in order to enable detection of its position by the implementation of the methods set out in items 1) or 2), comprising a memory in respect of each of the coefficients $k_i'$; a memory for recording $x'$; a device for producing the local signals from $k_i'$ and $x'$; a phase comparator for comparing the local signal and the corresponding direction-finding signal; means for producing Δ from the phase coefficients $k_i'$ as well as means for controlling and effecting the necessary switching operations for sequential operation.

4. Embodiments of the apparatus set out in item 3), characterised by the following features considered separately or in accordance with the various possible combinations;

a. the apparatus includes a timebase;

b. each memory is constituted by a counter-divider supplied with pulses of fixed frequency, the phase of the output signal from said counter-divider, considered in relation to that of another signal coming from the timebase, being characteristic of the stored quantity;

c. the phase comparator is constituted by three NAND-gates connected in order to form the exclusive-OR-function, the signal resulting from the comparison being a rectangular waveform signal the relative width of a peak or block in which signal is proportional to the phase-shift between the local signal and the DF signal;

d. the phase comparator comprises a 90° phase-shift element in order to shift the phase of the direction-finding signal or the local signal so that the sign of the peaks of the resultant signal, is characteristic of the direction of phase-shift between the compared signals;

e. a correcting unit is associated with each memory and is connected in series up-circuit of the counter-divider, said unit comprising three inputs and an output, one input for the pulses which supply the counter, a + input and a − input, the pulses applied to the + input being added to the supply pulses and the pulses applied to the − input being subtracted by inhibition of the supply pulses so that the frequency of the output pulses from the unit is only modified if there is dissymmetry between the numbers of pulses applied to the + and − inputs, this dissymmetry then modifying the supply frequency to the counter and therefore the phase of the latter's output signal;

f. the receiver comprises dosing and distribution devices for transforming the signals representative of intervals which are to be reduced to zero (in particular in respect of the signals coming from the phase comparators and in respect of the Δ values), into signals which can be used for the correction of the stores, and for switching these transformed signals to the appropriate ones of the stores;

g. the dosing and distribution device comprises two parallel circuits with a common input to which there is applied the signal the relative width of the peaks in which is characteristic of the quantity of an interval, a first circuit comprising in a series arrangement a NAND-gate, a counter-divider and a shunt arrangement, and a second circuit comprising, in a series arrangement, an inverter, a NAND-gate, a counter-divider and a shunt-arrangement, fixed-frequency chopping pulses being supplied to each gate so that there appear at the output of each circuit pulses the relative frequency of which depends upon the amplitude of the interval and upon its direction, said pulses being applied to the correcting unit or units of a memory or of a number of memories;

h. the device comprises a memory for recording the speed of the vehicle, which controls the memory storing the $x'$ value in order to modify the content of said memory in accordance with the displacement of the vehicle;

i. the content of the speed or velocity memory is deduced from the intervals between the direction-finding signals and the local signals;

j. the content of the velocity memory is controlled by a Δ value, preferentially the one combining the most coefficients $k_i'$;

k. in order to compare the phase-shifts between two local signals and two DF signals of the corresponding pair, the device comprises two phase comparators, each comparator detecting the phase interval between a local signal and a DF signal, and a unit being provided to supply the difference between the intervals, this difference being employed to correct the $k_i'$ values;

l. in order to produce the two local signals the phase-shift of which is designed to be compared with that of the two direction-finding signals of one and the same pair, the device comprises two counters supplied with pulses of fixed frequency means for producing the quantity $k_i' + K_i x'$; and means for acting on one of the counters in such fashion as to tend to reduce the interval between the phase-shifts of the local signals and the quantity $k_i' + K_i x'$;

m. the device comprises means for producing the sum of the respective phase intervals between a local signal and a DF signal of a pair, said sum being used in order to modify the fixed frequency supplying the two counters which produce the local signals;

n. the control of monitoring device comprises a counter-divider producing at its output the local signal, and switching means for first of all bringing the local signal into phase with the output signal from the corresponding $k_i'$ counter, for subsequently halting the supply to the monitoring counter during the whole number of cycles of the local signal, and for supplying the counter, during its inhibit phase, with a fixed frequency proportional to the sensitivity of the signal in question, this for an interval of time equal to the stagger between the $x'$ counter and the timebase.

5. A method of transmitting signals processed in the device set out in items 1) or 2), in which the signals are transmitted in continuous fashion.

6. A method of transmitting the signals processed in the device set out in items 1) or 2), in which the signals, are transmitted sequentially in accordance with a programme, the signals being processed in the device in accordance with a receiving programme synchronised with the transmission programme.

APPENDIX C

In the present patent a radio direction-finding method has been described, intended to determine the position of a vehicle, and a device for implementing said method.

In the radio direction-finding method disclosed in the parent patent, this being of the kind in which the position of a vehicle is determined by the intersection between a radio direction-finding hyperbola belonging to a family of such hyperbolae, with a radio direction-finding hyperbola belonging to another family, there are successively received in respect of each family of hyperbolae at least three LF direction-finding signals of different sensitivities whose phases are represented by the expression $k_i + K_i x$, where $k_i$ is a coefficient representing the phase at a known location, $K_i$ is the sensitivity of the signal and $x$ is the quantity which is to be determined and characterises a hyperbola upon which the vehicle is located; a quantity $x'$ representing an estimate of $x$ is stored and, in respect of each LF signal, a partial fictive phase $k_i'$; the three signals are then processed by producing in respect of each of them a local signal having the same LF and phase $k_i' + K_i x'$, by comparing the direction-finding signal with the local signal and by correcting the coefficient $k_i'$ which has been stored, so that the new local signal generated from the corrected coefficient $k_i'$ is in phase with the direction finding signal, the coefficients $k_i'$ being used to produce at least two signals $\Delta$ representing linear combinations of the differences $k_i' - k_i$; the quantity $x'$, and simultaneously each of the coefficients $k_i'$, is corrected and these corrections are carried out in proportions such that the phase of the local signals is not modified, and in a direction tending to successively cancel the $\Delta$ values, the effect of this being to make the values $x'$ and $k_i'$ which have been stored, effectively equal to the two quantities $x$ and $k_i$, and thus to constitute an accurate radio direction-finding measurement.

In this method, in order to obtain the values of the coefficients $k_i'$ which represent the phases of the directon-finding signals at a known location, taking the hypothesis that $x'$ represents the true position of the vehicle (therefore that $x' = x$), local signals having the phases $\phi_i' = k_i' + K_i x'$ are "manufactured" by combining the quantities $k'_i$ and $x'$ contained in the store, in accordance with the indicated formula, these phases $\phi_i'$ are compared with the phases $\phi_i$ of the direction-finding signals and the $k_i'$ values are corrected until the phases $\phi_i$ and $\phi_i'$ are identical.

In the variant embodiment of the present invention, the phases $\phi_i'$ are stored directly through the agency of a loop copying the phases $\phi_i$ of the LF direction-finding signals, and the quantities $k_i'$ are then subsequently manufactured from the stored quantities $\phi_i'$ and $x'$.

In the following, a detailed description will be given of how the present invention may be put into effect, this with the help of the attached drawings in which:

FIG. C1 illustrates a diagram of the receiver in accordance with the invention designed for a single signal emission mode;

FIG. C2 illustrates the receiver of FIG. C1 in the case corresponding to permanent LF signal reception;

FIGS. C3a and C3b respectively illustrate a variant embodiment of the diagram of the phase detector detecting the phase between the direction-finding signals and the local signals, and the shape of the signals employed in this variant embodiment;

FIGS. C3c and C3d respectively illustrate the mean values of the two output signals from the detectors of FIG. C3a, as a function of the phase-shift between the input signals;

FIGS. C4a and C4b respectively illustrate a diagram of a phase comparator for generating the differences $\Delta$, and the signals at various points in the diagram, for two operating situations;

FIGS. C4c and C4d illustrate the mean values of the two output signals from the comparator of FIG. C4a, as a function of the detected phase-shift;

FIGS. C5a and C5b respectively illustrate another diagram of a phase comparator for generating the differences $\Delta$, and the signals at various points in the diagram;

FIG. C6 illustrates a device for quantising signals which represent phase differences;

FIG. C7 illustrates an embodiment of a +/− unit;

FIGS. C8a and C8b respectively illustrate a device controlling the +/− unit of FIG. C7, and signals at various points in said device;

FIG. C9 illustrates a simplified embodiment of the +/− unit of FIG. C7;

FIG. C10 illustrates a device for producing the vehicle speed information;

FIG. C11 illustrates a device for reading out the value $x'$ representing the position of the vehicle;

FIGS. C12a and C12b respectively illustrate devices for timing reset and sampling signals, and the signals at various points in these devices.

Let us assume, for example, that the receiver in FIG. C1 is processing the same signals as the receiver disclosed in the parent patent (FIG. C3).

This receiver actually comprises a receiver unit 1 which receives the HF signals, derives from these latter the LF reference and direction-finding signals and furnishes these in a given but arbitrary order to the input 2 of a difference detector 3; stores 4, 5 and 6 which store the phases $\phi_0'$, $\phi_1'$ and $\phi_2'$; a store 7 for the storage of a quantity $x'$; a control unit 8; a selector device 10; devices 11 and 12 for furnishing the differences $\Delta_1$ and $\Delta_2$ in concrete form; and a store 13 for the vehicle speed information.

In this description, the same symbols will be used in notation, as in the parent patent.

To analyse the operation of this circuit, we will consider the same conditions which were used to explain the device shown in FIG. B3.

Amongst other things, it will be assumed that there are successively received, in the given order, the following three LF signals:
— an LF reference signal of phase $\phi_0 = k_0$
— a first LF direction-finding signal of phase $\phi_1 = k_1 + K_1 x$
— a second LF direction-finding signal of phase $\phi_2 = k_2 + K_2 x$.

The processing of these signals is obviously carried out in a periodic fashion and the terms "sequence" and "period" retain the same meaning.

It will be assumed, first of all, that the vehicle must not move and therefore that $x$ does not vary.

Stored in the store C4, the receiver contains a coefficient $\phi_0'$ representing a phase. When the LF reference signal is applied to the input 2 of the difference detector 3, the device 10 directs to the other input 9 of this detector, the output signal from the store 4, which signal has the same frequency as the LF reference signal (80 Hz for example). The difference detector 3 compares the phase of the LF reference signal and the output signal from the store 4 (which plays the part of the local signal). If it detects a phase difference $\phi_0$, this latter is used to correct the value of $\phi_0'$.

It should be pointed out that in this case the correction is carried out in closed-loop fashion and $\phi_0'$ 40 tends asymptotically towards $\phi_0$.

If this correction has not been completed during the course of this first sequence, it will have been completed during the course of a new sequence of the following period, with the effect that $\epsilon_0 = 0$ or in other words $$\phi_0' = \phi_0.$$

Similarly, when the first direction-finding signal is applied to the input 2 of the difference detector 3, the device 20 applies to the input 9 of this detector the output signal from the store 5, which also has the same frequency as the direction-finding signal (80 Hz). The detector 3 compares the phase of the LF direction-finding signal with that of the output signal from the store 5. If it detects a phase difference $\epsilon_1$, then this is used to correct (still in closed-loop fashion) the value $\phi_1'$ stored in 5.

This correction will be continued during the course of fresh sequences of the following periods, this until:

$$\epsilon_1 = 0$$

or in other words $$\phi_1' = \phi_1.$$

The same procedure takes place during the course of each reception period, in respect of the second LF signal received, so that we have $$\epsilon_2 = 0$$

or in other words $$\phi_2' = \phi_2.$$

It should be pointed out that the output signals from the stores 4, 5 and 6 form functions of "local" signals.

In effect, therefore, at this stage we have produced in the receiver as many local signals as there are received signals. This is achieved by a closed-loop copying process. The control unit 8 receives:
— on the one hand, the coefficients $\phi_0'$, $\phi_1'$, $\phi_2'$
— on the other hand the value $x'$ stored in 7.

If we put $$\phi_0' = k_0'$$
$$\phi_1' = k_1' + K_1 x'$$
$$\phi_2' = k_2' + K_2 x'$$

which makes it possible to define the coefficients $k_0'$, $k_1'$ and $k_2'$ knowing $\phi_0'$, $\phi_1'$, $\phi_2'$ and $x'$ and if, as in Appendix B, we use $\delta_0$, $\delta_1$, $\delta_2$ designate the differences $k_0' - k_0$, $k_1' - k_1$, $k_2' - k_2$, then it will be seen that the conditions $$\epsilon_0 = \epsilon_1 = \epsilon_2 = 0$$

means that $$\delta_0 = 0$$
$$\delta_1 = K_1 (x - x')$$
$$\delta_2 = K_2 (x - x')$$

We are therefore confronted with the same problem as faced us with the previous organisation, and it will therefore be necessary to reduce the quantities $$\Delta_j = \epsilon_i \, \alpha_{ij} \, \delta_i$$

under the same conditions.

However, we have seen from the parent patent that the quantities $\Delta_j$ were produced directly from the coefficients $k_i'$. Consequently, the control unit 8, having all the elements $\phi_0'$, $\phi_1'$, $\phi_2'$ and $x'$ to determine the coefficients $k_0'$, $k_1'$, $k_2'$, can directly determine the quantities $\Delta_1$ and $\Delta_2$.

$$\Delta_1 = k_2' - k_1'$$
$$\Delta_2 = k_1' - k_2'.$$

The values of these quantities $\Delta_1$ and $\Delta_2$ are subsequently transferred to the stores 11 and 12 and utilised (still one at a time) as before.

The design and consequently the operation of this control unit can take numerous variant forms. In particular, the generation of the quantities $\Delta_j$ may be more or less sequential in nature.

In addition, since at all times only one quantity $\Delta_j$ is used, it is advantageous to utilise directly that which is generated by the control unit and thus to economise on the stores 22 and 23.

From the design point of view, it is readily possible to conceive diagrams utilising the same principles as those already explained in the context of the description of FIG. B5.

It should be noted that in contrast to what happened with the previous organisation, the quantities $\Delta_1$ and $\Delta_2$ no longer react on the values stored in the stores 5 and 6.

This is due to the fact that in the new organisation, it is "complete local signals" which are stored in 5 and 6 and that consequently the modifications in $x'$ have no repercussion upon the determination of the differences $\epsilon_i$.

Instead, modifications in $x'$ affect, through the medium of the control system, the values $k_i'$ and therefore the quantities $\Delta_j$.

In all the foregoing, it has been assumed that $x$ has not varied although in practice the vehicle can displace and therefore $x$ can vary. Here, again, it is required that $x'$ follow the variations in $x$.

To prevent $x'$ from varying in sudden jumps due to the sequential processing of the information, the same organisation as that described in the parent patent will be utilised, namely a speed store 13 supplied from the differences $\epsilon_i$ ($i \neq 0$) and the quantity $\Delta_2$, and controlling a continuous variation in the value $x'$.

In the present instance, however, this organisation must be supplemented by an action of V on the quantities $\phi_1'$ and $\phi_2'$ stored in the stores 5 and 6.

In other words, within the framework of the parent patent, the coefficients $k_2'$ were in principal constant and did not vary from one sequence to the next. This is not so with the coefficients $\phi_i'$ ($i \neq 0$) as soon as $x$ starts to vary and therefore in order for the local signal to follow the corresponding signal from one sequence to the next it is necessay to maintain it or in other words to make the value $\phi_i'$ vary as a function of $v$.

More precisely, it will have to be arranged that:

$$d\phi_i'/dt = K_1 \cdot v.$$

It is a simple matter to modify the variant embodiment of FIG. B7 (receiver for two-signal type of emission) by applying the rules enunciated earlier, in order to convert from the receiver of FIG. B3 to that of FIG. C1 of the present invention.

In the case where several LF channels are available at the output of the receiver unit 1, a similar number of separate copying groups can be provided. Thus, in the case of the receiver described in FIG. C1, if the receiver unit 1 simultaneously produces the reference LF signal and the two LF direction-finding signals, it is possible to discard the selector device 10 (FIG. 2) by providing three separate loops for the storage of the local signal phases $\phi_i'$. In this case, the difference detectors 14, 15, 16 will be provided for each local signal. The direction-finding signals can then be received permanently.

FIG. C3 a illustrates a variant embodiment of the phase comparator forming part of the difference detector 3 and constituted, in the parent patent by an EXCLUSIVE-OR gate formed by the three gates 17, 18 and 19.

The device disclosed in the parent patent, in other words, has the drawback that the directions are made by compensation of the pulses applied to the two inputs of the +/− unit, which are associated with the store in which the correction is to be made. This method of correction gives rise to the appearance of a parasitic modulation which can be a source of disturbance. The improved device of FIG. C3a makes it possible to arrange for pulses to be applied only to one of the inputs of the +/− unit, and thus to effect correction of a given sign only. To this end, the output signal from the phase detector is split into two channels furnishing the signals $\beta$ and $\bar{\beta}$, $\bar{\beta}$ being obtained by inversion of the signal $\beta$ in the element 20. The signals $\beta$ and $\bar{\beta}$ are respectively applied to one of the two inputs of the two NAND-gates 21 and 22, the other input of each of these gates being supplied with two complementary signals $\alpha$ and $\bar{\alpha}$ coming from the last but one stage of the counter 23 furnishing the local signal L. The signals $\alpha$ and $\bar{\alpha}$ have the same frequency, namely twice that of the local signal. Finally, after inversion of the output signals from the gates 21 and 22 in the inverter elements 24, 25, the signals $a$ and $b$ are obtained, the signal $a$ being zero in the example under consideration and the signal $b$ being formed by a squarewave signal the mean value of which is representative of the phase-shift between the signals S and L. The signals $a$ and $b$ are then "quantised" in pulse form, as in the case of the parent patent. In FIG. C3c, the mean value of the signal $a$ has been shown and in FIG. C3d the mean value of the signal $b$, has a function of the value of the phase-shift between the input signals S and L. It will be observed that there is an equilibrium position for a phase-shift of $\pi/2$, in respect of which the mean values of $a$ and $b$ are zero. No correcting pulse is then applied to the associated +/− units. For a variation in the phase-shift, of + or −$\pi/2$ around this equilibrium position, one of the mean values of the signals $a$ and $b$ is necessarily zero so that in this range correcting pulses will appear at only one of the inputs of the +/− units 1. If the phase-shift exceeds these limits, then correcting pulses will appear in both channels and the operation of the device of FIG. C3a is then comparable to that of the device shown in FIG. B4, in the same range. However, in practice the phase differences must remain sufficiently small not to exceed these limits.

The point P in FIGS. C3c and C3d corresponds to the phase-shift between the signals S and L of FIG. C3b.

To generate the differences $k_2' - k_1'$, in other words the quantities $\Delta_j$, it is possible to use as phase detectors devices such as those shown in FIGS. C4a and C5a.

FIG. C4a illustrates a phase detector for detecting the phase-shift between the signals $L_1$ and $L_2$ representing respectively the output signals from the counters $k_1'$ and $k_2'$. The detector of FIG. C4a comprises two known kinds of trigger stages, namely "J K triggers", 26 and 27. The signals $L_1$ and $L_2$ are applied respectively to the clock inputs C of the trigger stages 26 and 27 and simultaneously to the set inputs S of the other trigger stage (when the signal applied to the S input acquires the "zero" state, the output 2 of the trigger stage is immediately placed in the "+" or "1" state). The "Q" outputs of the trigger stages respectively furnish the signals A and B shown at left and right in FIG. C4b. It will be observed from a consideration of FIGS. C4c and C4d, which represent respectively the mean values of the signals A and B, that these mean values are both zero for an equilibrium position corresponding to zero phase-shift between the signals $L_1$ and $L_2$.

Within the range of variation of $+/- \pi$ around said equilibrium position, one of the two mean values of A or B (depending upon the sign of the phase-shift) will be zero whilst the other will vary in proportion with the phase-shift. Thus, the mean value of A is zero when the signal $L_2$ leads the signal $L_1$ (FIG. C4b, left), and the mean value of B is zero when the contrary is the case (FIG. C4b, right). The quantising of the signals A and B makes it possible, then, as in the case of FIG. C3a, to avoid any parasitic modulation. It should be pointed out that in order to achieve correct operation of the device shown in FIG. 4a throughout the whole range from $+\pi$ to $-\pi$, it is necessary for the signals $L_1$ and $L_2$ both to be symmetrical, that is to say that their positive envelope portions (+) and their negative envelope portions (−), should have the same length.

The device shown in FIG. C5a is not subject to this limitation to symmetrical input signals. This device consists of two JK trigger stages 28, 29 and four NAND-gates 30 to 33, the pair of gates 30 and 31 on the one hand and that 32 and 33 on the other, having a common output (each pair of gates forms the wired logic operator "OR"). The signals $L_1$ and $L_2$, whose phase-shift is to be detected, are applied respectively to the clock inputs C of the trigger stages. The output signal $Q_1$ from the trigger stage 28 is applied to one input of the gate 30 of the pair 30, 31 which has a common output, and one input of the gate 32 of the other pair 32, 33 which also has a common output. Similarly, the signal appearing at the corresponding output $Q_2$ of the other trigger stage is applied simultaneously to the inputs of the gates 31 and 32.

The signals appearing at the corresponding outputs $\bar{Q}_1$ and $\bar{Q}_2$ of the two trigger stages are also applied simultaneously to one of each pair of gates having commonised outputs, the signal appearing at the output $\bar{Q}_1$ being applied to the inputs of the gates 31 and 33, and that appearing at the output $\bar{Q}_2$ of the gates 30 and 33. Moreover, the output signal from each pair of gates is applied to the inputs J and K of the corresponding trigger stage. The result (FIG. C5b) is that the signals $s$ and $\bar{s}$ furnished by the device shown in FIG. C5a are squarewave signals, the relative lengths of the square waveforms being proportional to the phase-shift between the signals $L_1$ and $L_2$. The signals $s$ and $\bar{s}$ can then be quantised using pulses, in order to enable them to be used in a corrective capacity.

It should be pointed out here that phase detectors such as that shown in FIG. C3a, only contain elements (in particular logic gates) which are sensitive simply to the states of the applied signals and not to variations in said states. The result is that the signals applied to these devices, which are constituted by the LF local and direction-finding signals, may contain noise components without the mean value of the output signals representing the detected differences being substantially disturbed. The applied signals must be symmetrical.

By contrast, the phase detectors used to generate the coefficients $\Delta_j$, are sensitive to state variations in a given direction, on the part of the applied signals. The signals applied to these detectors should not therefore contain any noise components.

The quantising of the signals representing the differences, can be carried out using pulses in the manner shown in FIG. B4. In a variant embodiment, this quantising can be performed with the help of a squarewave signal in the manner shown in FIG. C6. In this case, the two signals coming from the phase detector (signals A and B of FIG. C4a, signals $s$, $\bar{s}$ of FIG. C5a, for example) are applied to the inputs J and K of the trigger stages 34 and 35, the squarewave chopping signals being applied simultaneously to the clock inputs C of these trigger stages. The signals coming from the outputs $Q_1$ and $Q_2$ of these trigger stages are then applied to counter-dividers as in FIG. B4 (in practice, the trigger stages 34 and 35 constitute the first stages of these counter-dividers).

In the case where the two signals coming from the phase detectors are complementary signals (detectors of FIGS. B6 and C5a of the present invention, in particular), it is possible to utilise only one of these signals, the other being replaced by a signal of fixed frequency.

The second signal obtained is chopped using pulses or a squarewave signal as before, and is used to perform corrections with a determinate sign. The fixed frequency signal is used to effect corrections with the opposite sign, the fixed frequency being chosen such that the sum of the corrections in one direction and those in the other, is zero when the phase-shift between the two signals applied to the detector corresponds to the equilibrium position. This method of processing is referred to as "asymmetrical processing" by contrast to that which utilises two identical channels for the two complementary outputs (FIG. B4), which is referred to as "symmetrical processing".

Reference has been made on several occasions to devices known as +/− units which make it possible, when they are supplied with the correcting signals, to modify the frequency of the clock signals supplying a counter-divider, and, therefore, ultimately to modify the phase of the signal coming from the counter. FIG. C7 illustrates a preferred embodiment of this kind of +/− unit. The +/− unit of FIG. C7 commprises an input 36 for the clock signal, an output 37 for the signal whose frequency has been corrected, and two inputs 38 and 39 for the correcting signals which are designed to increase (+) and reduce (−) the frequency of the output signal. All these signals are squarewave signals and in the following the term "information" will be used to signify the change in state which a signal undergoes in a given direction.

The +/− unit comprises two channels for transmission of the clock signal information, terminating at an information adder element, one of the channels normally being open and the other normally closed. The normally open channel can be closed by the appearance of a piece of information at the input (−) 39 in order to block the transfer of a piece of clock signal information. The normally closed channel can be opened by the appearance of a piece of information at the input (+) 38 in order to allow a piece of clock signal information to pass. The result is that the adder element ultimately forms the algebraic sum of the clock information, the information applied to the input (+) and the information applied to the input (−).

The normally open channel 40 comprises a JK trigger stage 41 normally passing the clock signal applied to its input C (clock). The normally closed channel 42 comprises a JK trigger stage 43 which normally blocks the clock signal applied to its input C (clock). The output signals from these two trigger stages are applied to an adder element constituted by an EXCLUSIVE-OR gate 44. The trigger stages 41 and 43 play the part of logic elements. They are controlled respectively by the information appearing at the inputs (−) 39 and (+) 38 in such a fashion that these pieces of information can arrive at any instant in relation to the clock signal information. FIG. C8a illustrates by way of example the control device when subjected to the action of correcting information at the input (−) 39. This device comprises two JK trigger stages 45, 46. The output $\bar{Q}$ of the trigger stage 45 is connected to the clock input C of the trigger stage 46, the output Q of the latter being connected to the input K of the former. The output Q of the trigger stage 45 constitutes the output of the control device and is connected to the inputs J and K of the trigger stage 41. The input C of the trigger stage 45 is supplied with the clock signal applied at 36 to the +/− unit. The two trigger stages 45, 46 are simultaneously supplied at their inputs S, namely their set inputs, with the correcting signal (−) (applied via the lead 39). In FIG. C88b, the clock signals 36', the correcting signal 39' and the output signal Q from the trigger stage 45, have been shown. When the correcting signal is in the "0" state, the two trigger stages 45 and 46 are blocked so that their outputs Q are in the (+) state. With the appearance of a piece of correcting information, that is to say when the correcting signal 39' changes to its maximum voltage level, the trigger stages 45 and 46 unblock so that with the arrival of the next decay portion 47 in the clock signal, the output Q of the trigger stage 45 changes to the "0" state. This blocks the trigger stage 41, closing the channel 40 (FIG. 7), but the decay portion 47 of the clock signal will already have passed. With the arrival of the next decay portion 48 in the clock signal, the output Q of the trigger stage 45 reverts to the "+" state whilst the output $\bar{Q}$ of the trigger stage 45 changes to the "0" state, causing the output Q of the trigger stage 46 to change to the "0" state and thus, by its action at the input K of the trigger stage 45, blocking the latter in the state which it already occupies, this corresponding to the case in which the channel 40 is open. However, the change in state at the output Q of the trigger stage 45, occurs slightly after the arrival of the information 48 so that the information 48 is unable to pass through the trigger stage 41. Summarising, a piece of information which has appeared at the correcting input (−) 39, has suppressed a piece of information (decay portion) in the clock signal. It should be pointed out that the arrival of the correcting information (−) can occur at any moment in relation to the changes in state in the clock signal but that nevertheless it is always reliably ensured that a piece of clock signal information will be suppressed.

The opening and closing of the channel 42 which is normally closed, is controlled in a similar way, the clock signal being inverted in the element 49 before being applied to the trigger stage 43 and to the control device comprising the trigger stages 50 and 51.

Due to this inversion, the decay portion in the clock signal, which will pass across a trigger stage 43 with the appearance of a piece of correcting information (+), will never coincide with a decay portion in the clock signal passing through the open channel 40. This non-coincidence is necessary because the adder 44 does not furnish any information if the two pieces of information are applied to it simultaneously.

It should also be noted that in order to control the inputs J and K of the trigger stage 43, the output $\bar{Q}$ of the trigger stae 50, which output is normally in the "0" state, is used, thus blocking the channel 42; this output only changes to the "+" state (unblocking channel 42) during a clock signal period and on appearance of each piece of correcting information "+".

FIG. C9 illustrates a simplified variant embodiment of the +/− unit. In this case, first of all addition is carried out, in the adder 44, of the clock information applied at 36 and the correcting information (+) applied at 38. The output signal from the adder 44 is applied simultaneously to the first trigger stage 52 of the counter-divider, which follows the +/− unit, and to a device 53 controlling said trigger stage 52 and itself having the correcting information (−) applied to it. The device 53 is identical with that described in relation to FIG. C8a. It will be observed that the (+) and (−) information can arrive at the same time since they neutralise each other. By contrast, the (+) information must not arrive at the same time as the clock information otherwise they will cancel one another out in the adder 44.

In the various illustrated embodiments of the receiver in accordance with the invention, speed information $v$ has been obtained from the differences $\epsilon_i$, and thus from positional measurements. This gives rise to difficulties in speed adjustment in the receiver, and in the response to vehicle accelerations.

In FIG. C10, a preferred variant embodiment of the system used to obtain the speed information, has been shown, the receiver proper being that shown in FIG. C1 of the present addition. This variant can of course be used for the various proposed embodiments of the receiver.

The device for obtaining the speed information, comprises a difference detector 54 supplied at one input 55 with an LF signal picked up on board the vehicle, and at its other input 56 with a local signal of the same LF frequency, generated by a high-stability crystal-control oscillator 57 supplying a counter-divider 58 across a +/− unit 59. The detected difference $\epsilon$ reacts upon the +/− unit to the lines 60 in order to form a copying loop with the counter 58.

If the phase of the signal applied at 55 is written in the form $\epsilon = k + K\,x$, then it will be appreciated that if the vehicle displaces, $d\phi/dt = K = dx/dt = K\,v$. Everything happens as is the frequency $f$ of the signal received at 55 had been modified by an amount $\delta f$ such that $2\pi\delta f = Kv$. Thanks to the presence of the copying loop, we therefore have $\epsilon = N\,.\delta f = N/2\pi\,.\,v$; where $N$ is the division ratio of the counter 58. The difference $\epsilon$ is processed in 54, undergoing a quantising operation in the manner already described earlier several times. The quantised signal is divided in different ratios in order to obtain the correcting signal at the unit 59 (line 60) and in order to obtain the speed signal which acts upon $x'$ and upon the quantities $\phi_1'$ and $\phi_2'$ stored in the stores 5 and 6 through the agency of the links 61a, 61b, 61c.

The reading out of the quantity $x'$ which represents the position of the vehicle, will preferably be carried out with the help of the reader unit shown in FIG. 11. We know that the quantity $x'$ is represented by the phase difference between two counters, i.e., in other words, by the time interval separating a rise portion of the signal produced by one counter from the next rise portion in the signal produced by the other counter.

The reader unit comprises a counter 62 permanently supplied with a clock signal produced by a crystal-controlled oscillator 63, assembler unit 64 and a decoding and read-out unit 65.

In order to read out $x'$, first of all the counter 62 is zeroed by a reset signal, following which the counter 62 counts until it is sampled by a sampling signal transferring its content to the sampling unit 64 so that the time interval separating the resetting and sampling operations is equal to the phase difference representing the value $x'$. The information responsible for the reset and sampling functions, will for example be constituted by the pieces of information carried by the signals furnished by the counters responsible for defining the phase difference. The reset and sampling signals are constituted by squarewaves of given duration and sign.

These signals are generated from the two counters doing duty as store for the value $x'$ (one of them for example being a time-base); in the following, the phrase "first store signal" will be used to designate the signal from which the reset signal is derived and the term "second store signal" will be used to designate the signal from which the first sampling signal is derived. It will assumed that the information carried by the first and second store signals, is constituted by the rise portion of a square waveform.

In accordance with the invention, the sampling signal ("+" squarewave) is generated in such a fashion that sampling takes place at an instant at which the trigger stages of the counter 62 are in a stable state, and not at an instant at which they are changing from one state to another. To this end, a device 66 is provided which times the second store signal, that is to say a device which, from the second store signal, produces a similar signal whose rise portion is located at a precise point in relation to the clock signal. The device 66 primarily comprises (se FIG. C12a) a JK trigger stage 67. The sampling signal which is to be timed and which is supplied at 69 and illustrated at 68 in FIG. C12b, is applied to the input S of the trigger stage 67 whilst the clock signal 70 is applied to the input C of said same trigger stage. The output Q of the trigger stage 67 is connected to the input J of said same trigger stage. The result is that at the output $\bar{Q}$ there appears a timing signal 71 whose rise portion substantially coincides in time (except for a very short delay) with the rise portion of the clock signal immediately following the rise portion of the timing signal. The timed signals appearing at the outputs Q and $\bar{Q}$ of the trigger stage 67 are then processed in a shaper device 72 which comprises two channels for the signals which are the complements of the outputs Q and Q', each channel comprising a capacitor $C_1$ and $C_2$ respectively to delay the signals Q and Q inverted by the elements 73 and 74. These delayed signals are then applied, after fresh inversion in the elements 75 and 76, to a NAND-gate 77 which in respect of each rise portion in the signal 71, produces a squarewave envelope 78 of given length the start of which exhibits a given delay in relation to the decay portion in the clock signal. The length of this squarewave envelope is arranged so that it can be accommodated between two pieces of clock information. The delay exhibited by this squarewave envelope in relation to the decay portion of the clock signal, must enable said decay portion to influence the system comprising the counter 62, before the sampling squarewave envelope arrives.

It may also be a good idea to retime the store signal from which the reset squarewave envelope has been derived. This timing is effected by the device 81 which essentially comprises a JK trigger stage 80 in the same way as the sampling system, the first store signal being applied at 82. The thus retimed signal is processed in the shaper device 83 in order to produce a "0" squarewave envelope of sufficient length (determined by the capacitor $C_3$) to ensure resetting of the counter 62, albeit such that its end (rise portion) occurs before the arrival of the next piece of clock information.

The result of the timing of the reset and sampling signals, is that the value $x'$ which is read out represents the true value $x'$ contained in the store, to within $+/-$ one unit.

APPENDIX D

This invention relates to a procedure and device to detect the time deviation between data carried by two electric signals.

The related electric signals are of a type of those capable of taking two distinct values characterizing two states, one time datum being formed by the passage of a signal from one state to another in a given direction.

According to a particularity of the procedure according to this invention, an output signal is elaborated representing the said deviation at each appearance of a time datum on one of the signals and always the same, so as to avoid a shift of the output signal.

According to another particularity of the procedure according to the invention, an output signal is elaborated the amplitude of which varies between two limit values in function of the deviation when this deviation is included between the limits of a narrow range, and the amplitude of which is equal to one of these limit values when the deviation is found to be outside this range, according to the sign of this deviation, so that the slope of the curve representing the amplitude of the output signal in function of the deviation is very high within the limits of this range.

This invention relates more particularly to a procedure for the measurement of the deviation between the time data carried by two electric signals, one properly called signal and one reference signal, each one of them being formed by an electric voltage capable of taking two different states (a first state and a second state), the time data being formed by the passage from one state to the other in a given direction, in which an output electric voltage is elaborated representing the said deviation and included betwen two limit values (a first limit value and a second limit value) characterized in so far as:

a. output voltage is brought to a given value intermediate between the two limit values, at each appearance of the time datum of the properly called signal;

b. then, for an interval of analysis time of a given duration the start of which is linked with the time datum of the properly called signal, output voltage is brought to tend towards one or the other of these limit values according to the state of the reference signal so that at the end of the interval of analysis time, the value of the output voltage is function of times spent, by the reference signal in one state and the other during the duration of the interval of analysis time, output voltage reaching at the end of the interval of analysis time, one or the other of these limit values, should the state of the reference signal not change during the whole duration of the interval of analysis time;

c. and the value reached by the output voltage at the end of the interval of analysis time, is stored until the next appearance of the time datum of the properly called signal.

To understand better how the procedure according to the invention can be implemented, a description will be given hereinafter of various methods of achievement of an appliance according to the invention and several assemblies according to the invention using this appliance, thanks to the appendixed drawings on which:

FIG. D1 illustrates a unit diagram of an appliance according to the invention;

FIG. D2 illustrates the voltages at various points of the unit of FIG. D1;

FIG. D3 illustrates four possible cases of the position of the time datum of the reference signal as compared with the analysis pulse;

FIG. D4a illustrates a periodical and rectangular reference signal;

FIG. D4b illustrates the output voltage in function of the deviation to be measured;

FIG. D5 illustrates a first alternative for a practical achievement of the appliance according to the invention;

FIG. D6 illustrates a second alternative for the achievement of the appliance according to the invention;

FIG. D7 illustrates an assembly according to the invention to create two signals with frequencies in a given ratio should the reference and properly called signals have the same frequency;

FIGS. D8a and D8b ilustrate two alternatives of an assembly according to the invention to create two signals with frequencies in a given ratio, should the frequency of the reference signal be a multiple of that of the properly called signal;

FIG. D9 illustrates an assembly according to the invention to regulate the phase of an electric signal;

FIG. D10 illustrates signals at various points of the assembly of FIG. D9;

FIG. D11 illustrates an assembly according to the invention to create two electric signals of same frequency and with regulatable mutual outphasing;

FIG. D12 illustrates an assembly according to the invention to regulate the frequency of an electric signal;

FIG. D13 illustrates diagrammatically a system of transmission in radiolocalization;

FIG. D14 illustrates an assembly to create the radiolocalization signal of the transmission system of FIG. D13, and FIG. D15 illustrates an assembly to create another radiolocalization signal of the transmission system of FIG. D13.

The appliance according to the invention is intended to supply an output signal S representing the deviation existing between time data carried by two electric input signals, a properly called signal $E_S$ and a reference signal $E_R$, each one formed by an electric voltage capable of taking two distinct values characterizing two states.

In the example represented in FIG. D2, the properly called signal $E_S$ and the reference signal $E_R$ are formed by rectangular pulses. Time data carried by these two signals are formed by the descending fronts of the pulses, that is to say through the passage of the signals from one state to another in a given direction. More precisely, each time datum is put into a concrete form at the instant the voltage representing the signal under consideration passes through a given value between the two values characterizing the states.

FIG. D1 illustrates the sketch as a principle of an example of appliance according to the invention. This appliance includes essentially condenser 1 the voltage of which at terminals represents output signal S associated with locking diodes 2, 3, means of processing the properly called signal 4 and means 5 to elaborate a load signal of condenser 1.

The means of processing properly called signal 4 receive the properly called signal $E_S$ on input 6, and supply on outputs 7,8 respectively a discharge signal D of condenser 1, and an analysis signal A applied to input 9 of means 5 to elaborate load signal C of condenser 1. Reference signal $E_R$ is applied on the other input 10 of means 5, load signal of condenser 1 appearing on output 11.

Operation of the appliance will now be explained as well as the part played by the various signals thanks to FIG. 2.

The two possible states of the signals will be called state "0" and state "1", state "0" representing generally a voltage appreciably zero and state "1" a given positive amplitude voltage for example 5 V.

The appearance of a time datum on the properly called signal at instant $t_s$ starts up a process in unit 4 which first delivers on its output 7 a discharge pulse D of condenser 1 and then on its output 8 an analysis pulse A.

The discharge pulse has the effect of bringing voltage at the terminals of condenser 1 to an appreciably zero value forming a lower limit value (part 12 of curve S).

The beginning of the analysis pulse in linked in a precise manner with the arrival of the time datum of signal $E_S$ and it is selected by construction so as to intervene after the disappearance of the discharge pulse. The analysis pulse is of a given duration of relatively low value; between 100 nanoseconds and 1 microsecond for example. It relates somewhat to a "window" through which the state in which reference signal $E_R$ is observed, so as to deduce from the same position of time datum $t_R$ of reference signal $E_R$ as compared with this analysis pulse, therefore finally as compared with the time datum $t_s$ of the properly called signal. To this effect, the two signals E and $E_R$ in unit 5 are multiplied logically to supply load signal C, the duration of which represents time spent by reference signal $E_R$ in a given state, here in state "1" during the analysis pulse. This load signal C is of a given amplitude and is used to load condenser 1 through diode 3 so that voltage at the terminals of the condenser increases appreciably in saw tooth shape (part 13 of curve S) until the end of the load signal, and thereafter, voltage at the terminals of condenser 1 remains at the value reached thanks to the locking effect of diode 3.

This process starts again at the next appearance of the time datum of the properly called signal. Output voltage is zeroed by a further discharge pulse and a further analysis pulse will allow for the elaboration of a new value of output voltage.

It is seen that it is the time datum of the properly called signal which provokes the start-up of the process of measurement.

FIG. D3 illustrates very diagrammatically the various cases liable to arise in function of the position of the time datum of the reference signal as compared with the analysis pulse (the time datum of signal $E_S$ is formed here by the descending front of an impulse).

Case I reproduces the example of FIG. D2.

In Case II, the reference signal remains in the state "1" for the whole duration of the analysis pulse. Voltage at the terminals of the condenser then reaches a maximum value or upper limit value at the end of the analysis pulse and remains locked at this value. In this case, the reference signal being in state "1", it may be considered that its time datum has not yet arrived when the analysis is made.

In case III, the reference signal remains, on the other hand, in state "0" for the whole duration of the analysis pulse, so that voltage at the terminals of the condenser does not vary and, therefore, remains equal to its lower limit value. In this case, it may be considered that the time datum of the reference signal has already arrived when analysis is made.

In case IV, the change of state of the reference signal arises during the duration of the analysis pulse, but in the direction reverse to that of case I. Here again, output voltage represents time spent by the reference signal in state "1".

Summarizing, it is seen that during the duration of the analysis pulse, output voltage tends towards its upper limit value for a more or less long time, according to time spent by the reference signal in a given state during the duration of the analysis pulse, and that the value reached by the output voltage at the end of the analysis pulse then remains stored. When this value thus reached is equal to its upper or lower limit, there is no precise information relating to the time deviatiion actually existing, but its sign is known and it may be surely said that the time datum of the reference signal has arrived before or after the analysis pulse.

The main interest in the appliance resides in the great sensitivity of the datum it gives on the value of the measured deviation when the time datum of the reference signal reaches the inside of the analysis pulse. Thus, for example, should the deviation between the two limit values of the output voltage be 5 V and should the duration of the analysis pulse be 100 ns, in this case, a curve is reached representing the deviation having a slope of 5/100 V per nanosecond, and this allows practically for the appraisal of the value of this deviation with an accuracy better than 1 nanosecond.

FIG. D4$b$ illustrates the curve of output voltage (in ordinate) in function of the deviation between the time date of signals $E_S$ and $E_R$ (in abcissa) when the reference signal is a periodical signal with rectangular pulses according to FIG. D4$a$. The dotted lines in the curve have been used because it has not been possible to comply with the scale of times owing to $t_1 - t_2 = 100$ ns and to the period of the reference signal being, for example, equal to 1 ms.

It is noticed that this curve has two sloped curves, with slopes of opposite signs. In practice, the datum given is only often used by a single slope of a given sign. This is the case, for example, when the appliance intervenes in a monitoring curve, the other curve giving instability.

Among the feasibilies of application of this appliance, there should be pointed out the case when the properly called signal and the reference signal are both periodical signals of same frequency. In this case, amplitude of the output signal gives a datum on the value and the sign of outphasing between the two signals.

FIG. D5 illustrates an example of achievement of the appliance according to the invention. It is described hereinafter and its operaion is explicited when signals $E_R$ and $E_S$ are rectangular periodical signals and when the time datum of the reference signal falls inside the analysis pulse.

Periodical signal $E_S$ illustrated in the form of a rectangular signal is applied, on one part, at the input of element 14 carrying out its logical operation "NO" and, on the other part, at a lag cell consisting of resistor 15 and condenser 16. The two signals thus elaborated as from input signal $E_S$ are applied to the inputs of a unit playing the part of an "AND" gate, consisting of two diodes 17, 18, and resistor 19 linked with a source of positive voltage $V_1$ with $V_1 > V_2$. It is, therefore, seen that a positive pulse appears at output 20 of this unit, for each front of descent of signal $E_S$ that is to say at each of the time data of signal $E_S$, the beginning of the pulse coinciding appreciably with this front of descent, and the duration of the pulse being equal to the lag introduced by lag cell 15, 16. This positive pulse unlocks transistor npn 21 usually locked so that a discharge signal D appears on the collector of transistor 21, that is to say a signal usually of an equal amplitude $+ V_1$, interrupted temporarily by an appreciably zero amplitude pulse. It is seen that this pulse unloads condenser 1 (when the latter is loaded) through the circuit formed by diode 2, the collector-transmitter junction of the transistor and diode 22. The decreasing part of the output voltage S arises therefrom, illustrated in FIG. D2.

Input signal $E_S$ is used, besides, to form analysis signal A. There is applied at the inputs of "NO AND" gate 23, on the one part, output signal of element "NO" 14 and, on the other part, input signal $E_S$ delayed in the lag cell formed by resistor 24 and condenser 25. There, therefore, appears at the output of gate 23 for each front of descent of signal $E_S$, a negative pulse the length of which is given by delay introduced into cell 24,25. This negative pulse is transformed into a positive pulse by element "NO" 26, the positive pulse obtained is delayed by a lag cell formed by resistor 26 and condensor 28, this pulse thus delayed forming the analysis pulse, lag thus introduced being at least equal to the width of the discharge signal of the pulse D so that one may be sure at the beginning of each analysis pulse that the discharge pulse is finished.

The analysis signal and the second input signal or reference signal $E_R$, are applied in unit 5, on the inputs of a "NO AND" gate. The case when the front of descent of signal $E_R$ falls into the upper window formed by the analysis pulse is illustrated. A negative pulse, therefore, appears at the output of gate 29, starting with the analysis pulse and ending with the front descent of $E_R$. This pulse is reversed by resistor 30 so that a positive pulse appears on the collector of the latter and forming load signal C. This signal loads condenser 1, and the value of voltage obtained at the end of the analysis pulse at the terminals of this condenser, is function of the duration of the pulse of signal C. The load curve forms part 13 of output signal S of FIG. D2. The load circuit is formed by diode 3 and collector-transmitter linkage of transistor 30. The condenser then remains loaded because diodes 2 and 3 are locked.

FIG. D6 illustrates a preferred alternative of achievement of the appliance according to the invention, in which means 4 of logical elements in integrated circuit are mainly used, according to the D.T.L technique (diode-transistor-logic). Time data of signals $E_S$ and $E_R$ are also formed here by the descending fronts of rectangular pulses.

Discharge signal D is obtained thanks to the simultaneous application on the basis of transistor 21 of the reverse of signal $E_S$ and signal $E_R$, delayed by the assembly formed by condenser 31 and logical reversers 32 and 33. Reversal of signal $E_S$ is obtained thanks to logical reverser 34. Analysis signal A is obtained by processing in a similar manner, the signal obtained by reversal, by logical reverser 5 of voltage appearing at the terminals of condenser 31. This processing is carried out by reversers 37, 38, 39 and condenser 36, the latter determining the duration of the analysis pulse. Outputs of reversers 38, 39 are interconnected to give the analysis signal.

Analysis signal A and reference signal $E_R$ are applied to the two inputs of "NO AND" gate 29 delivering the reverse of the load signal. Transistor 30 reverses the output of gate 29 so that load signal C appears on its collector 11.

Output voltage stored being formed by voltage at the terminals of condenser 1, a circuit with very high input impedance should only be taken as current using this voltage, so as not to perturb the "store" function of the condenser.

Instead of bringing output voltage up to its value at lower limit at each appearance of the time datum of the properly called signal, it is possible according to the invention to bring it up to an intermediate value included between its two limit values. In this case during the duration of the analysis pulse, this voltage is tended towards one or the other of these limit values according to time spent by the reference signal in one state or the other, characteristics of variation of output voltage being such that the latter will reach its lower or upper value at the end of the analysis pulse should the reference signal remain in the sme state "0" or "1" during the whole duration of the analysis pulse. This intermediate value is equal to the lower limit value of the methods of achievement described.

FIG. D7 illustrates an assembly in which the appliance according to the invention is used as a phase detector. This assembly is intended to supply an electric output signal the phase and frequency of which are closely linked with those of another signal of different frequency, this linkage being comparable to that existing between two mechanical shafts interconnected in position and speed by a set of gears.

This assembly includes two sources 40 and 41 of periodic electric signals of different frequencies, the frequency of each of these signals being divided in meter-divider 42,43 before being applied to an input 44, 45 of appliance 46 according to the invention. The "modulo" of each of meters 42 and 43 is such that the signals applied in 44 and 45 have the same frequency (modulo is the number by which a meter-divider divides the frequency of an input signal). The signal appearing on output 47 of appliance 46 is used to control the value of the frequency of one of sources 40 or 41 (of source 41 in the illustrated example). Sources may consist of quartz oscillators, associated or not with meters-dividers built in the oscillator or not.

Should the appliance have detected a deviation in phase between the signals emanating from meters 42 and 43, the output signal of appliance 46 changes the frequency of quartz 41 in the direction of cancellation of this deviation. It is said here that the difference in phase is zero when the time datum of the signal playing the part of the reference signal falls to the centre of the analysis pulse elaborated as from the other signal, or more precisely when the value of output voltage of appliance 46 is half-way between its two extreme values. In this case, there subsists a residual, constant and well-defined deviation. When balance is estabished, the output signal appearing in 48 is "wedged", "geared" or "locked" on the signal supplied by source 40.

An advantage of the assembly in FIG. D7 resides in the fact that the slope of the curve in FIG. D4$b$ in its sensitive part (between $t_1$ and $t_2$) characterizing the variations in amplitude of the output signal in fuction of the values of the deviations, only depends on the characteristics of construction of appliance 46 and not on the frequency of signals applied to inputs 44 and 45 of this appliance. It arises therefrom that the frequency of these signals can be relatively low, this frequency being able to descend down to about 100 hertz, frequencies of sources 40 and 41 being currently approximately the megahertz, the moduloes of meters 42 and 43 can be relatively high numbers, approximate several thousand.

As an example, assembly allows for interlocking of two signals with a respective frequency of 1800 kHz and 1001 kHz, the frequency of the first being divided by 1800 and that of the second 1001, and this gives a frequency of comparison of 1 kHz. It should be noted that the characteristics of construction of the appliance are such that the magnitude of output varies to the extent of 100% for a variation in deviation of a few hundred nanoseconds, and this corresponds with classical techniques of phase detection to be compared with frequencies greater than the megahertz. Reverting to the preceding example where the duration of the analysis pulse is 500 ns, it is seen that a variation in phase of the controlled signal (1001 kHz) of 1/200ths of a revolution provokes a variation in output voltage of 1%.

FIG. D8$a$ illustrates an assembly according to the invention intended to supply two interlocked signals, in frequency and phase as in the preceding cases, the values of the frequencies of these signals being between them in a given ratio, but where locking is carried out by direct comparison of signals of different frequencies. This assembly includes source 49 of frequency $F_1$ and source 50 of frequency $F_2$, the signal emanating from source 49 being applied direct to the input "reference signal" of appliance 46 according to the invention, the signal emanating from source 50 being applied to the input "properly called signal" of appliance 46 through a meter-divider 51 of modulo $N_2$. The output signal of appliance is used to control variations in the frequency of source 50 in the neighbourhood of its nominal value. Reverting go the analysis of operation of the appliance according to the invention, it is seen that should frequency $F_1$ be a whole multiple of the frequency of the signal emanating from meter-divider 51, that is to say should $$F_1 = N_1 (F_2/N_2)$$

where $N_1$ is a fixed whole coefficient, assembly of FIG. D8$a$ gives the same result as that of FIG. D7. In fact, appliance 46 detects the value of the possible deviation between each time datum of the properly called signal emanating from meter-divider 51 and a time datum on $N_1$ data of reference signal emanating from source $F_2$ The result of the assembly of FIG. D7 is actually found again where the fact of dividing frequency $F_1$ of source 40 by a meter of modulo $N_1$(42) means precisely the selection of a particular time datum among $N_1$ data supplied by source 40. But assembly of FIG. D8$a$ has advantages as compared with that of FIG. D7.

Besides the evident advantage of the economy of a meter-divider of modulo $N_1$, it can be noticed first of all that owing to the fact that all the time data of the signal emanating from source 42 are applied to appliance 46, the maximum value of the deviation liable to be detected by this appliance is equal to a semi-period of frequency signal $F_1$, insted of being equal to a semi-period of frequency $N_1$, as was the case for the assembly of FIG. D7, that is to say it will be $N_1$ times smaller and this will reduce to the same extent time required for the "catching" of the assembly, that is to say at interlocking of the two sources.

Of course, the fact of having all the time data of the signal of source 49 at input "reference signal" of appliance 46, entails that there is a risk of ambiguity as to the value of coefficient $N_1$, which is not put into a concrete form in the assembly. It is, therefore, necessary to choose for the initial value of frequency $F_2$, a value sufficiently close to the divided value $(N_1/N_2) F_1$. The maximum value AF of this difference in absolute value is such that $(AF/F_2)<(1/2N_1)$ and this conditions nominal stability of the quartz used in source 50.

Source 50 thus supplies a signal the frequency $F_2$ of which is in a strict ration $N_2/N_1$ with frequency $F_1$. Moreover, the signal supplied by source 50 follows possible fluctuations in frequency and in phase of the signal supplied by source 49. It is then seen that it suffices to choose for source 49 a quartz of great stability to obtain an identical stability for the signal delivered in 52.

Besides, standard exchange of a quartz allows for the carrying out of most diversified combinations of frequencies in a very flexible manner as from a standard assembly such as that of FIG. D8$a$. For example, we can obtain a frequency $F_3$ found in a given ratio with frequency $F_2$ by replacing the quartz of frequency $F_2$ in FIG. D8$a$ by another quartz having a frequency such that source 50 delivers a frequency signal $F_3$ such that $$F_1 = N_1' (F_3/N_2)$$

where $N_1'$ is a whole fixed coefficient. Then:

$$F_3/F_2 = N_1/N_1'$$

and, therefore, two signals are obtained the frequencies $F_3$ and $F_2$ of which are in a fixed ratio and both interlocked on a third same signal.

FIG. D8$b$ illustrates a similar assembly in which there is a reaction on frequency $F_2$ of the signal of the nondivided source, this signal being besides the output signal of the assembly and the modulo of the meter-divider then being $N_1$.

FIG. D9 illustrates an assembly allowing for the obtaining of a frequency signal $F_2$ locked on a frequency signal $F_1$ as seen above but the phase of which can be controlled that is to say modified at will.

To this effect the assembly of FIG. D8a is changed by inserting an element 54 in series between controlled source 50 and meter-divider 51, allowing for adding and/or subtracting data from data normally emanating from source 50 and applied at the input of meter 51. In the selected example, element 54 allows for the adding of data at the input of meter 54, data supplied on its input 55. This element 54 will be called hereinafter in this case "box +".

It is assumed as an example that $F_1 = 1,001$ kHz and $F_2 = 1,000$ kHz and that $N_2 = 1,000$ (modulo of meter 51). This time sketch of FIG. D10 illustrates in 56 the time data supplied by the reference signal delivered by source 49, the period of these data being 999 ns. Time data of the properly called signal emanating from meter 51 is illustrated in 57, and more precisely data 58 and 59, 1 millisecond away from each other, have been illustrated. Each of these two data coincides with a datum of the reference signal and the unit is in balance and one has $F_1 = (1001/1000) F_2$.

Should an extra datum then be introduced during the millisecond under consideration here, on the input of meter 51, thanks to element 54, the phase of the output signal of meter 51 is shifted in advance by 1/1000th of a revolution, that is to say by $1/\mu s$ and time datum 59 of the properly called signal will take place one microsecond earlier, that is to say in 59a but it will no longer coincide with the time data of the reference signal which are separated from each other by 999 ns.

There, therefore, appears a difference of 1 ns between datum 59a and the datum nearest reference signal 56. Monitoring exercised by appliance 46 will act so as to cancel this difference by changing temporarily the frequency of source 50 and afterwards in a permanent manner, the phase of the signal supplied by this source so that each of the next time data of the properly called signal coincides with a datum of the reference signal. It arises therefrom that the phase of the signal supplied by source 50 has finally been modified by 1 ns that is to say 1/1000th of a revolution, this signal still remaining besides "hung" on to frequency signal $F_1$, as in the preceding assemblies.

It can, therefore, be seen that a given outphasing with a very fine "grain" can be introduced easily into a periodical signal.

Of course, a similar result is known by placing meter unit 51 and element 54 at the output of source 49, the moduloes of meter 51 then being equal to 1,001, with the one exception that the change in phase of the signal supplied by source 50 is of the opposite sign. More generally speaking, should frequencies $F_1$ and $F_2$ be in the ratio $N_1/N_2$ $$F_1/F_2 = N_1/N_2$$

the change of phase of the signal supplied by source 50, driven by the introduction of an extra datum on "box +" 54 is $(N_2 - N_1)/N_1$ revolution.

It is, therefore, more advantageous to take $N_2$ and $N_1$ very near each other and at the best $N_2 = N_1 + 1$ as is the case in the example under consideration.

FIG. 11 illustrates an assembly according to the invention to elaborate two periodical signals of same frequency the outphasing of which can be controlled. This assembly forms the combination of the assemblies FIGS. D8b and D9.

The assembly including sources 50b ($F_2$) and 49 ($F_1$) as well as meter 51b of modulo $N_2$ and appliance 46b, interlocks frequency signals $F_1$ and $F_2$ so that $F_1/F_2 = N_1/N_2$. Frequency signal $F_1$ is used besides to lock reference signal $F_2$ of source 50a, the phase of the outlet signal of this source being controlled by element 54, so that finally there will be two signals of same frequency (emanating from sources 50a and 50b) interlocked through the signal of source 49, their relative outphasing being liable to be controlled at will with a very fine grain.

Of course, here again, numerous alternatives can be contributed to the diagram of FIG. D11, for example by placing meter 51b at the output of source 49, the modulo of the meter then being equal to $N_1$ and device 46a continuing to be supplied direct by the output of source 49. Should the two meters 51a and 51b as well as element 54 be placed at the output of source 49, there should be two different channels to supply appliances 46a and 46b, although the two meters have the same modulo $N_1$, element 54 being liable to be on one or the other channel.

FIG. D12 illustrates an assembly identical to that of FIG. D9 intended to control with great fineness, the frequency of a periodical signal. Instead of applying on input 55 of element 54, the correction data with a sole view to adjusting the phase of the signal supplied by source 50, systematic data are applied presenting a given periodicity of frequency called $f$, $f$ being fixed or variable. It is understood that under these conditions, it is finally the frequency of source 50 which will be changed to the extent of a quantity function of this value $f$.

Should $f = o$, it is known that the signals supplied by sources 49 and 50 are interlocked and that $F_1/N_1 = F_2/N_2$. When applying frequency signal $f$, balance thus reached will be perturbed and device 46 will react to change the value of frequency $F_2$ so as to find a new balance once again.

Should $N_2 = N_1 + 1$, application of $f$ extra data per second on element 54, changes the phase of output signal of source 50 by $f/N_1$ revolution per second and, therefore, changes the mean value of frequency $F_2$ by $f/N_1$ hertz.

It could be seen that the deviation in phase of the actual signal supplied by source 50 as compared with a perfect signal of frequency $F_2+/-f/N_1$, always remains less than $1/N_1$ revolution.

The sign + or − depends on the nature of element 54 as said hereinabove: "box +", "box −" or "box +/−".

Of course, the value of the change $f/N$ must remain in the range of possible variation for the frequency of the quartz.

It is seen that the grain of the variation of frequency $F_2$ is very low because it is equal to that of frequency $f$ divided by $N_1$. Should, for example, the grain of $f$ be one hertz, $N_1 = 1,000$ and $F_2$ around the megahertz, it is possible to adjust the value of $F_2$ to the nearest 1/1000 hertz, that is to say $10^{-9}$ approximately.

Should $f$ be constant, a periodical signal is obtained the frequency $F_2$ of which is locked on frequency signal $F_1$, the frequencies being between each other in a ratio the terms of which, the first between each other, are very large (about several million). Should, therefore, source 49 be of a very great stability, it is possible to create any frequency signal $F_2$ to the nearest 1/1000 hertz having the same characteristics of stability as frequency $F_1$.

Frequency $f$ can be variable and form the result of a monitoring.

Frequency $f$ can be supplied in particular as from a frequency synthetizer, by division of a fixed frequency or by cutting of a pulse of variable duration.

The assemblies just described are particularly adapted in case of transmission of radioelectric signals in the framework of a system of localization in radionavigation.

As an example, FIG. D13 illustrates a system of radionavigation transmission of the type including transmission of a frequency of low frequency (such as described, for example, in French letters patent 790,386).

It is known that in such a system of transmission, an electric reference signal, formed by a frequency signal F, is transmitted and modulated according to a low frequency of value $f$, as well as two electric signals of radiolocalization of respective frequencies $Fo + f$ and $Fo$. Frequency $f$ is equal, for example, to 40 Hz. Because it is from outphasing between, on the one part, the low frequency signal emanating from the reference signal and, on the other part, the low frequency signal emanating from the beat of the two radiolocalization signals, that a datum is drawn on the position of a mobile, it is necessary to synchronize these two LF signals in a fixed point.

To this effect, the signals transmitted at a known place, indicated by 60, are received, and the deviation in phase existing between the two LF frequencies is detected, to react on the frequency of one of the radiolocalization signals (here reference signal $Fo + f$) so as to cancel this deviation.

FIG. D14 illustrates an assembly identical to that of FIG. D8$b$ to create frequency signal $Fo$, as from a source of very high stability $F^x$, frequencies $Fo$ and $F^x$ being in the ratio $Fo = No (F^x/N)$.

As already said in connection with FIGS. D8$a$ and D8$b$, this assembly can be used to create signals $Fo$, $F_1$, $F_2$, etc, the values of which are in the given ratios, values $F^x$ and N being selected so that low frequency $F^x/N$ is a common submultiple of frequencies $Fo$, $F_1$, $F_2$, etc.

FIG. D15 illustrates an assembly similar to that of FIG. D11 to create frequency signal $Fo + f$ so that the conditions of synchronism of the lower frequencies of FIG. D13 are permanently complied with.

To this effect, the frequencies F (source 50$b$) and $F^x$ (source 49) are interlocked, being in the ratio $F_o = N_0 (F^x/N)$. The two frequencies $Fo$ (source 50$a$) and $F^x$ (source 49) are also interlocked in the same ratio. A box — 54 is inserted in series between source 50$a$ and meter-divider 51$a$ and a signal of low frequency of value N$o$f, emanating from local source 61 is applied to it, should $N^o = N + 1$. The signal emanating from local source 61 can be used advantageously by dividing its frequency N$o$, to modulate frequency F of the reference signal. It is then understood that the output appearing in 62 has frequency $Fo + f$. Another box of type "box +/−", 63, is arranged in series with box 54 between source 50$a$ and meter 51$a$. Box 59 receives a correction signal emanating from device 60 of FIG. D13 to act finally on frequency $Fo$ of signal transmitter in 63 so that the condition of synchronism may be ensured.

Box 13 can possibly be subdivided into two boxes of same types, one to ensure correction of position (phase correction), the other a correction of speed (frequency correction).

The assemblies according to the invention can, of course, be used in other types of transmission of radiolocalization.

What we claim is:

1. A radio-position-fixing receiver of the hyperbolic-position-line phase-measurement type, for use with at least two transmitting stations ($E_1$ ; $E_2$) transmitting continuous waves ($0_1$ ; $0_2$) having respective "specific" frequencies ($Fs_1$ ; $Fs_2$) of known nominal values which are specific of the transmitting stations, and interrupted waves ($0_{11}$ ; $0_{21}$) having a "measuring" frequency ($F_1$) of the same known nominal value for both transmitting stations, the interrupted waves being non-simultaneously transmitted by the two stations, in accordance with a known fashion related to the locations of the stations and the specific frequencies thereof, characterized in that said receiver comprises:

a first synchronous receiving circuit, having inputs for receiving waves at the said two "specific" frequencies ($Fs_1$ ; $Fs_2$), other inputs for local signals to heterodyne and synchronously demodulate waves at said two specific frequencies ($Fs_1$ ; $Fs_2$), and outputs supplying two first remainder signals ($R_1'$ ; $R_2'$) representing the frequency remainders after heterodyning and synchronously demodulating waves received at the two specific frequencies with local signals, respectively;

a first frequency generator for permanently delivering first local signals to the other inputs of said first synchronous receiving circuit, at least two of the first local signals being individually controllable in frequency;

a first control circuit for controlling frequency adjustments of the said two controllable first local signals so as to have said first remainder signals ($R_1'$ ; $R_2'$) representing substantially no frequency remainders for the two specific frequencies, respectively;

a second synchronous receiving circuit, having an input for receiving waves of the said measuring frequency ($F_1$), other inputs for local signals to heterodyne and synchronously demodulate waves at the measuring frequency ($F_1$), and an output supplying a second remainder signal representing the frequency and phase remainder after heterodyning and synchronously demodulating received waves at the measuring frequency ($F_1$) with the local signals;

a second frequency generator, capable of selectively delivering second local signals to the other inputs of the second synchronous receiving circuit, the second frequency generator being coupled to the first frequency generator so that at least two of the second local signals are subjected to frequency corrections which are coupled in predetermined proportionality ratios with the frequency adjustments of said two controllable first local signals, respectively, the predetermined proportionality ratios being substantially equal to the ratios of the known measuring frequency ($F_1$) to each of the two known specific frequencies ($Fs_1$ ; $Fs_2$) respectively associated to the two controllable first local signals, and also at least two of the second local signals being individually controllable in phase;

a second control circuit capable of selectively controlling phase adjustments of said phase controllable second local signals so as to have said second remainder signal representing substantially no frequency remainder and a substantially constant phase remainder; and a time-programme circuit, operative during each known time-period of transmission of an interrupted wave by a station having anyone of the two specific frequencies, for selectively coupling the second frequency generator to the second synchronous receiving circuit with the corrected second local signal having a predetermined correction proportionality ratio which is related to the specific frequency of that station, and with an associated one of the two phase controllable second local signals, and for selectively coupling the second control circuit to the second frequency generator to control phase adjustments of that associated phase-controllable second local signal.

2. A receiver according to claim 1, wherein the first and second generator means commonly include on one hand a first frequency source for generating said first and second local signals except two unique of the first local signals which have frequencies substantially equal to the products of the two specific frequencies by the same coefficient ($x$) and except two unique of the second local signals which both have a frequency substantially equal to the product of the measuring frequency by said same coefficient ($x$), and on the other hand two second frequency sources, each for generating one of the two unique first local signals and a corresponding one of the two unique second local signals.

3. A receiver according to claim 2, wherein said second frequency sources are controllable in frequency, and said first control circuit is operative for controlling the frequencies of the two second frequency sources depending upon said two first remainder signals, respectively.

4. A receiver according to claim 3, wherein each second frequency source is comprised of a respective auxiliary frequency modification circuit coupled to the first frequency source and capable of deriving therefrom a frequency controlled by a respective one of the two first remainder signals.

5. A receiver according to claim 4, wherein said first frequency source is also controllable in frequency, and the receiver comprises means for correcting the frequency thereof in response to at least one of the two first remainder signals.

6. A receiver according to claim 2, wherein said first frequency source is controllable in frequency and one of said second frequency sources is controllable in frequency, and said first control circuit is operative for controlling the first controllable frequency source and the controllable one of the second frequency sources depending upon said two first remainder signals, respectively.

7. A receiver according to claim 2, wherein each of the second frequency sources includes means for adjusting the phase of its respective unique second local signal, and wherein the second control circuit is responsive to the second remainder signal for selectively controlling said phase adjusting means of said two second frequency sources, depending upon said time-programme circuit.

8. A receiver to claim 2, wherein the two second frequency sources respectively include oscillators having two frequencies of the same nominal value, the receiver comprising a position information circuit for integrating the difference between these two frequencies of the same nominal value of the two second sources, as an information on the difference in the distances from the receiver to the two transmitting stations.

9. A receiver according to claim 2, wherein said first and second synchronous receiving circuits are such that all of the local signals except the unique ones are heterodyne local signals, and the said unique local signals are synchronous demodulation local signals.

10. A receiver according to claim 1, wherein said first and second frequency generator comprise a single frequency source, for generating each of the first and second local signals, with the frequencies of two of the first local signals and two of the second local signals being controllable, and wherein the first control circuit is responsive to each of the first remainder signals, on the one hand by an adjustment ($df_1$ ; $df_2$) of the frequency of a respective one of the two controllable first local signals, and, on the other hand by an adjustment ($df_{11}$ ; $df_{21}$) of the frequency of a respectively corresponding one of the two controllable second local signals, the latter adjustments ($df_{11}$ ; $df_{21}$) of the two controllable second local signals being proportional to the former adjustments ($df_1$ ; $df_2$) of the two controllable first local signals according to ratios respectively equal to the ratio of the measuring frequency ($F_1$) to the corresponding specific frequency ($Fs_1$ ; $Fs_2$).

11. A receiver according to claim 10, wherein said single frequency source is controllable in frequency and the receiver includes means for correcting the frequency thereof in response to at least one of the first remainder signals.

12. A receiver according to anyone of claims 10 and 11, wherein said single frequency source includes means for adjusting the phases of said two of the second local signals which are controllable in frequency, said second control circuit being operative upon said phase adjusting means.

13. A receiver according to claim 10 comprising a position information circuit for integrating the difference between two frequency adjustments ($df_1$ ; $df_2$) of said two frequency controllable first local signals, as an information representative of the difference of the distances from the receiver to the two transmitting stations.

14. A receiver according to claim 10, wherein the single frequency source is such that the frequency controllable ones of the first local signals have the same nominal frequency, the receiver comprising a position information circuit for integrating the difference between multiple frequencies of these two controllable first local signals, as an information on the difference in the distances from the receiver to the two transmitting stations.

15. A receiver according to claim 1, wherein said first and second frequency generator comprise a single frequency source for generating each of the first and second local signals, with the frequency of one of the first local signals and of one of the second local signals being further controllable, and wherein the first control circuit is responsive to one of the first remainder signals for controlling the frequency of the single frequency source, and to the other of the first remainder signals for controlling on the one hand an adjustment ($df_2$) of the frequency of the further controllable first local signal and on the other hand an adjustment ($df_{21}$) of the frequency of the further controllable second local signal, the latter adjustment ($df_{21}$) of the further controllable second local signal being proportional to the former adjustment ($df_2$) of the further controllable first local signal according to a ratio equal to the ratio of the measuring frequency ($F_1$) corresponding to said other one of the first residues.

16. A receiver according to claim 15, wherein said single frequency source includes means for adjusting the phases of said further controllable second local signal, and of another one of the second local signals having the same frequency as said further controllable second local signal, said second control circuit being operative upon said phase adjusting means.

17. A receiver according to claim 1, wherein said first synchronous receiving circuit has two first local signals of substantially equal low frequency ($f$), for synchronously demodulating the waves at the two specific frequencies, respectively.

18. A receiver according to claim 1, wherein said second synchronous receiving circuit has two second local signals of substantially equal low frequency ($f$), selectable for synchronously demodulating the waves at the measuring frequency depending upon said time-programme circuit.

19. A receiver in accordance with claim 2, wherein the first frequency source includes digital frequency dividers for supplying said first and second local signals except the unique ones thereof, and the two second frequency sources each include a digital frequency divider for supplying the unique first local signal and a digital frequency divider for supplying the unique second local signal.

20. A receiver in accordance with claim 1, wherein the first and second frequency generator comprise in common a single frequency source including a high stability oscillator supplying a reference high frequency in digital form, a first plurality of digital frequency scalers for supplying the first local signals and a second plurality of digital frequency scalers for supplying the second local signals.

21. A receiver according to claim 20 wherein each of said plurality of frequency scalers includes a digital frequency divider for supplying each local signal.

22. A receiver according to claim 20, wherein each of said plurality of frequency scalers includes a digital frequency divider for supplying each heterodyne local signal and a digital frequency synthetiser in series with a digital frequency divider for supplying each synchronous detection local signal.

23. A receiver according to claim 19, wherein each of the digital frequency dividers for providing a unique second local signal has a logic combination element upstream on the path from the corresponding second source thereto, said logic combination element being capable of controllably altering the input frequency to the digital frequency divider.

24. A receiver according to claim 20, wherein each of the digital frequency scalers for providing a controllable first local signal has a logic combination element upstream on the path from the frequency source thereto, each of the digital frequency scalers for providing a frequency corrected second local signal has a logic combination element upstream on the path from the frequency source thereto, and each of the digital frequency scalers for providing a phase controllable second local signal has a logic combination element upstream on the path from the frequency source thereto, said logic combination elements being capable of controllably altering the input frequency to the digital frequency scalers, and being responsive to said first control circuit and second control circuit, respectively.

25. A receiver according to claim 20, wherein said first control circuit is capable of transforming said two first remainder signals into two first digital remainder frequencies, proportional to the frequency remainders represented by said first remainder signals, respectively, and wherein the second frequency generator comprises a high frequency source, a pair of logic combination elements (+/− box) capable of combining the high frequency with the two first digital remainder frequencies on two outputs, respectively, a first pair of phase digital counters respectively coupled to the outputs of the logic combination elements in said pair, the pair of counters thereby containing two phase quantities which are integrations of said two first digital remainder frequencies, respectively, a first digital differential phase multiplier circuit capable of multiplying the difference between the phase contained in one of said first pair of digital counters and a phase reference, with such a multiplying number that the multiplied phase difference on the output of the first digital differential phase multiplier has a sensitivity factor corresponding to the measuring frequency ($F_1$), a shifting circuit capable of selectively correcting one of said two frequency corrected second local signals, depending upon the multiplied phase difference output of said first digital differential phase multiplier, and switch means capable of selectively coupling the first digital differential phase multiplier circuit to anyone of the two digital counters, and the shifting circuit to a corresponding one of said two frequency corrected second local signals, depending upon said time-programme circuit.

26. A receiver according to claim 25, wherein the second frequency generator further comprises a digital second local signal counter whose count is periodically reset at the frequency of said second local signals to be frequency corrected, and the shifting circuit comprises a first digital adder having first inputs coupled to the count of said digital second local signal counter, second inputs coupled to said multiplied phase difference of said first digital differential multiplier circuit, and a carry output, the carry output thereby supplying one of said frequency corrected second local signal depending upon said time programme circuit.

27. A receiver according to claim 25, wherein said second control circuit is capable of transforming said second remainder signal into a second digital remainder frequency having a frequency and phase proportional to the frequency and phase remainder represented by said second remainder signal, and said second frequency generator further comprises a second phase counter coupled to said second digital remainder frequency from said second control circuit, and a digital subtracter connected between said first digital differential multiplier circuit and said first digital adder for subtracting the count of said second phase counter therefrom, and two digital phase stores, said time-programme circuit enabling said phase counter while having one of the phase stores selectively coupled thereto depending upon which station transmits the measuring frequency.

28. A receiving according to claim 27, comprising a stimulus frequency generator capable of locally generating said measuring frequency ($F_1$), a local phase shift counter, receiving the said second digital remainder frequency from said second control circuit, and a digital local phase shift store, and wherein said time-programme circuit is operative during time-periods when no station transmits the measuring frequency for coupling the stimulus frequency generator to the second synchronous receiving circuit and enabling said local phase shift counter to count said digital second remainder frequency.

29. A receiver according to claim 25, for use with at least two transmitting stations each transmitting a plurality of interrupted waves having a plurality of measuring frequencies, wherein the single source further comprises, a reference digital frequency divider coupled to the frequency source for deriving therefrom a reference low frequency, and means operative at times coupled to said reference low frequency, for resetting each of the digital frequency scalers in the second plurality to a respective preselected position whereby all of said second local signals have a common phase reference.

30. A receiver according to claim 25, for use with at least two transmitting stations each transmitting a plurality of interrupted waves having a plurality of measuring frequencies, comprising local phase shift sensing means capable of sensing the local phase shifts at each of the measuring frequencies through the second synchronous receiving circuit, and wherein said second frequency generator comprises means capable of setting all of the second local signals to have a common phase reference, a plurality of pairs of digital phase stores, each pair being capable of storing the difference between the phase of the two phase controllable second local signals and said local phase shift, at a respective one of the measuring frequencies, characterized in that it comprises:

a second pair of digital phase counters coupled to the outputs of said pair of logic combination elements, the second pair of counters thereby containing two other phase-quantities which are other integrations of said two first digital residue frequencies, than in the first pair of counters, respectively, a second digital differential controllable phase multiplier circuit, capable of multiplying the difference between two digital phase counters of the first and second pairs with a controllable multiplying number such that the multiplied phase difference has a desired sensitivity factor among a plurality of sensitivity factors, digital comparator means capable of being coupled between digital phase stores of said plurality of pairs of digital phase stores and the second digital differential phase multiplier output, for indicating the digital difference therebetween, another digital shifting circuit, capable of selectively shifting the digital position in one of said second pair of digital phase counters so as to tend to reduce the digital difference indicated by the said digital comparator means a digital presetting circuit (diode matrix) capable of presetting successive multiplying numbers corresponding to successive decreasing sensitivities in said second digital differential phase multiplier, and switch means capable of selectively coupling to said second digital differential phase multiplier circuit, a selected one of the first digital phase counters and a selected one of the second digital phase counters both integrating the same first residue corresponding to the same transmitting station, while coupling the digital comparator means to selected ones of the digital phase stores corresponding to the same transmitting station and coupling the digital shifting circuit to said selected one of the second digital counters.

* * * * *